United States Patent
Clawson

(10) Patent No.: US 7,436,937 B2
(45) Date of Patent: *Oct. 14, 2008

(54) METHOD AND SYSTEM FOR THE POLICE RESPONSE DISPATCH PROTOCOL OF AN EMERGENCY DISPATCH SYSTEM

(76) Inventor: Jeffrey J. Clawson, 4646 Farm Meadow La., Salt Lake City, UT (US) 84101

( * ) Notice: Subject to any disclaimer, the term of this patent is extended or adjusted under 35 U.S.C. 154(b) by 0 days.

This patent is subject to a terminal disclaimer.

(21) Appl. No.: 10/255,905

(22) Filed: Sep. 25, 2002

(65) Prior Publication Data

US 2007/0116189 A1      May 24, 2007

Related U.S. Application Data

(60) Provisional application No. 60/325,666, filed on Sep. 26, 2001.

(51) Int. Cl.
  *H04M 11/00* (2006.01)
(52) U.S. Cl. ........................................ 379/45
(58) Field of Classification Search ................. 379/45, 379/38, 37, 42, 265.01, 265.02, 265.13
  See application file for complete search history.

(56) References Cited

U.S. PATENT DOCUMENTS

| | | | |
|---|---|---|---|
| 3,799,147 A | 3/1974 | Adolph et al. ........ 128/2.05 S |
| 4,130,881 A | 12/1978 | Haessler et al. | |
| 4,164,320 A | 8/1979 | Irazoqui et al. | |
| 4,237,344 A | 12/1980 | Moore | |
| 4,290,114 A | 9/1981 | Sinay ........................ 364/900 |
| 4,338,493 A | 7/1982 | Stenhuis et al. | |
| 4,360,345 A | 11/1982 | Hon ............................. 434/262 |
| 4,455,548 A | 6/1984 | Burnett | |
| 4,489,387 A | 12/1984 | Lamb et al. | |
| 4,731,725 A | 3/1988 | Suto et al. ................... 364/415 |
| 4,839,822 A | 6/1989 | Dormond et al. | |
| 4,858,121 A | 8/1989 | Barber et al. | |
| 4,865,549 A | 9/1989 | Sonsteby | |
| 4,922,514 A | 5/1990 | Bergeron et al. .............. 379/6 |
| 4,926,495 A | 5/1990 | Comroe et al. ............... 455/54 |
| 4,945,476 A | 7/1990 | Bodick et al. | |
| 4,967,754 A | 11/1990 | Rossi | |
| 5,063,522 A | 11/1991 | Winters ....................... 395/51 |
| 5,065,315 A | 11/1991 | Garcia | |
| 5,072,383 A | 12/1991 | Brimm et al. | |
| 5,077,666 A | 12/1991 | Brimm et al. | |
| 5,086,391 A | 2/1992 | Chambers ............. 364/413.02 |
| 5,109,399 A | 4/1992 | Thompson ................... 379/45 |

(Continued)

OTHER PUBLICATIONS

Radosevich, Lynda, "Network holds sway on life, death," Computerworld, v27 n21, May 24, 1993, 2 pgs.

(Continued)

*Primary Examiner*—Stella L Woo
(74) *Attorney, Agent, or Firm*—John R. Thompson; Stoel Rives LLP

(57) ABSTRACT

A method and system for receiving, processing, responding and managing police request calls is described. A consistent, standard and systematic process is provided which in combination with adequate training, supervision and quality assurance service to provide a technique for classifying the criticality of calls into various determinate levels for appropriate response.

9 Claims, 82 Drawing Sheets

U.S. PATENT DOCUMENTS

| | | | |
|---|---|---|---|
| 5,122,959 A | 6/1992 | Nathanson et al. | 364/436 |
| 5,193,855 A | 3/1993 | Shamos | |
| 5,228,449 A | 7/1993 | Christ et al. | 128/691 |
| 5,253,164 A | 10/1993 | Holloway et al. | |
| 5,255,187 A | 10/1993 | Sorensen | |
| 5,291,399 A | 3/1994 | Chaco | |
| 5,323,444 A | 6/1994 | Ertz et al. | 379/45 |
| 5,339,351 A | 8/1994 | Hoskinson et al. | 379/45 |
| 5,348,008 A | 9/1994 | Bornn et al. | 128/642 |
| 5,379,337 A | 1/1995 | Castillo et al. | 379/45 |
| 5,404,292 A | 4/1995 | Hendrickson | 364/413.02 |
| 5,410,471 A | 4/1995 | Alyfuku et al. | |
| 5,423,061 A | 6/1995 | Fumarolo et al. | 455/54.1 |
| 5,438,996 A | 8/1995 | Kemper et al. | 128/661.02 |
| 5,441,047 A | 8/1995 | David et al. | |
| 5,462,051 A | 10/1995 | Oka et al. | 128/630 |
| 5,471,382 A | 11/1995 | Tallman et al. | 364/406 |
| 5,502,726 A | 3/1996 | Fischer | 370/94.1 |
| 5,513,993 A | 5/1996 | Lindley et al. | 434/319 |
| 5,516,702 A | 5/1996 | Senyei et al. | 436/510 |
| 5,521,812 A | 5/1996 | Feder et al. | 364/400 |
| 5,536,084 A | 7/1996 | Curtis et al. | |
| 5,544,649 A | 8/1996 | David et al. | 128/630 |
| 5,554,031 A | 9/1996 | Moir et al. | 434/111 |
| 5,590,269 A | 12/1996 | Kruse et al. | 395/209 |
| 5,594,638 A | 1/1997 | Iliff | 395/203 |
| 5,594,786 A | 1/1997 | Chaco et al. | |
| 5,596,994 A | 1/1997 | Bro | |
| 5,630,125 A | 5/1997 | Zellweger | 395/614 |
| 5,636,873 A | 6/1997 | Sonsteby | |
| 5,650,995 A | 7/1997 | Kent | 455/508 |
| 5,660,176 A | 8/1997 | Iliff | 128/630 |
| 5,675,372 A | 10/1997 | Aguayo, Jr. et al. | 348/12 |
| 5,682,419 A | 10/1997 | Grube et al. | 379/60 |
| 5,684,860 A | 11/1997 | Milani et al. | 379/59 |
| 5,689,229 A | 11/1997 | Chaco et al. | |
| 5,719,918 A | 2/1998 | Serbetciouglu et al. | 379/58 |
| 5,722,418 A | 3/1998 | Bro | 128/732 |
| 5,724,983 A | 3/1998 | Selker et al. | 128/696 |
| 5,734,706 A | 3/1998 | Windsor et al. | 379/142 |
| 5,745,532 A | 4/1998 | Campana, Jr. | 375/347 |
| 5,748,907 A | 5/1998 | Crane | |
| 5,754,960 A | 5/1998 | Downs et al. | 455/508 |
| 5,759,044 A | 6/1998 | Redmond | 434/307 R |
| 5,761,278 A | 6/1998 | Pickett et al. | 379/90.01 |
| 5,761,493 A | 6/1998 | Blakeley et al. | 395/604 |
| 5,787,429 A | 7/1998 | Nikolin, Jr. | |
| 5,805,670 A | 9/1998 | Pons et al. | 379/45 |
| 5,809,493 A | 9/1998 | Ahamed et al. | 206/52 |
| 5,822,544 A | 10/1998 | Chaco et al. | |
| 5,823,948 A | 10/1998 | Ross, Jr. et al. | |
| 5,826,077 A | 10/1998 | Blakeley et al. | 395/604 |
| 5,832,187 A | 11/1998 | Pedersen et al. | 395/50 |
| 5,842,173 A | 11/1998 | Strum et al. | |
| 5,844,817 A | 12/1998 | Lobley et al. | 364/578 |
| 5,857,966 A | 1/1999 | Clawson | 600/300 |
| 5,901,214 A | 5/1999 | Shaffer et al. | 379/220 |
| 5,902,234 A | 5/1999 | Webb | |
| 5,910,987 A | 6/1999 | Ginter et al. | 380/24 |
| 5,912,818 A | 6/1999 | McGrady et al. | |
| 5,915,019 A | 6/1999 | Ginter et al. | 380/4 |
| 5,926,526 A | 7/1999 | Rapaport et al. | 379/88.25 |
| 5,933,780 A | 8/1999 | Connor et al. | 455/519 |
| 5,961,446 A | 10/1999 | Beller et al. | |
| 5,962,891 A | 10/1999 | Arai | |
| 5,964,700 A | 10/1999 | Tallman et al. | 600/300 |
| 5,986,543 A | 11/1999 | Johnson | 340/426 |
| 5,989,187 A | 11/1999 | Clawson | 600/300 |
| 5,991,730 A | 11/1999 | Lubin et al. | |
| 5,991,751 A | 11/1999 | Rivette et al. | 707/1 |
| 6,004,266 A | 12/1999 | Clawson | 600/300 |
| 6,010,451 A | 1/2000 | Clawson | 600/300 |
| 6,022,315 A | 2/2000 | Iliff | |
| 6,035,187 A | 3/2000 | Franza | 455/404 |
| 6,040,770 A | 3/2000 | Britton | 340/539 |
| 6,052,574 A | 4/2000 | Smith, Jr. | 455/404 |
| 6,053,864 A | 4/2000 | Clawson | 600/300 |
| 6,058,179 A | 5/2000 | Shaffer et al. | 379/220 |
| 6,074,345 A | 6/2000 | van Oostrom et al. | 600/300 |
| 6,076,065 A * | 6/2000 | Clawson | 379/45 |
| 6,078,894 A | 6/2000 | Clawson et al. | 705/11 |
| 6,106,459 A | 8/2000 | Clawson | 600/300 |
| 6,112,083 A | 8/2000 | Sweet et al. | 455/426 |
| 6,115,646 A | 9/2000 | Fiszman et al. | 700/181 |
| 6,117,073 A | 9/2000 | Jones et al. | 600/300 |
| 6,118,866 A | 9/2000 | Shtivelman | 379/309 |
| 6,127,975 A | 10/2000 | Maloney | 342/457 |
| 6,134,105 A | 10/2000 | Lueker | 361/683 |
| 6,292,542 B1 | 9/2001 | Bilder | |
| 6,370,234 B1 * | 4/2002 | Kroll | 379/45 |
| 6,535,121 B2 | 3/2003 | Matheny | |
| 6,607,481 B1 * | 8/2003 | Clawson | 379/38 |
| 6,879,819 B2 * | 4/2005 | Brooks | 455/404.1 |
| 6,901,397 B1 | 5/2005 | Moldenhauer et al. | |
| 6,931,112 B1 | 8/2005 | McFarland et al. | |
| 6,968,375 B1 | 11/2005 | Brown | |
| 7,106,835 B2 | 9/2006 | Saalsaa | |
| 2002/0004729 A1 | 1/2002 | Zak et al. | |
| 2002/0106059 A1 * | 8/2002 | Kroll et al. | 379/45 |
| 2003/0028536 A1 * | 2/2003 | Singh et al. | 707/10 |
| 2003/0212575 A1 | 11/2003 | Saalsaa et al. | |
| 2006/0178908 A1 | 8/2006 | Rappaport | |
| 2007/0055559 A1 | 3/2007 | Clawson | |
| 2007/0116189 A1 | 5/2007 | Clawson | |

OTHER PUBLICATIONS

Harris, Roger, "Updated 911 Phone System Top Concern of Residents," Business First-Louisville, v9 n19 s1, Dec. 1992, 3 pgs.

"Geac Completes Software Install," Wireless Week, Nov. 18, 1996, 3 pgs.

"Dictaphone introduces Windows-based Computer-Aided Dispatch (CAD) system," Business Wire, Apr. 23, 1996, 2 pgs. (in commercial use in 1995).

Holroyd, Brian, et al., "Medical Control; Quality Assurance in Prehospital Care," JAMA, the Journal of American Medical Association, v256, n8, Aug. 1986, p. 1027-1031.

CBS web page News Story entitled "911 Operator: 'It's got to be Hell'", Mar. 31, 2006 (excerpts from 911 operators' actions during the attacks on Sep. 11, 2001), 3 pgs.

Best, Wendy, "999 United Emergency services share life-saving Role to boost response," Western Daily Press, WDP Severnside ed., May 27, 1999, 2 pgs.

Poellmitz, William C., "Wireless technology keeps public safety a step ahead," Nation's Cities Weekly, v21 n17, Apr. 27, 1998, 3 pgs.

Crowley, Mark, "Learning from CAD System Implementation," Communications, v29 n8, Aug. 1992, 5 pgs.

Anonymous, "Suburban Chicago towns centralize 911 services," Communications News, v31 n10, Oct. 1994, 2 pgs.

* cited by examiner

```
                                                    ┌─ 3004
┌──────────────────────────────────────────────────┐
│ ┌────────────────────────────────────────────────┐ │
│ │ DESCRIPTION OF INCIDENT                        │ │
│ │   ABDUCTION/KIDNAP - GOTO ABDUCTION PROTOCOL   │ │
│ │   ADMISTRATIVE - GOTO ADMIN PROTOCOL           │ │
│ │   ALARMS - GOTO ALARMS PROTOCOL                │ │
│ │   ANIMIAL - GOTO ANIMAL PROTOCOL               │ │
│ │   ASSAULT/SEXUAL - GOTO ASSAULT PROTOCOL       │ │
│ │   ASSIST OTHER - GOTO ASSIST PROTOCOL          │ │
│ │   AUTO CRIME - GOTO AUTO CRIME PROTOCOL        │ │
│ │   BOMB FOUND - GOTO BOMB FOUND PROTOCOL        │ │
│ │   BOMB THREAT - GOTO BOMB THREAT PROTOCOL      │ │
│ │   BURGLARY - GOTO BURGLARY PROTOCOL            │ │
│ │   DAMAGE/VANDAL - GOTO DAMAGE PROTOCOL         │ │
│ │   DECEASED PERSON - GOTO DECEASED PROTOCOL     │ │
│ │   DISTURBANCE - GOTO DISTURBANCE PROTOCOL      │ │
│ │   DOMESTIC - GOTO DOMENSTIC PROTOCOL           │ │
│ │   DUI - GOTO DUI PROTOCOL                      │ │
│ │   DRUGS - GOTO DRUGS PROTOCOL                  │ │
│ │   EXPLOSION - GOTO EXPLOSION PROTOCOL          │ │
│ │   FRAUD/DECEPTION - GOTO FRAUD PROTOCOL        │ │
│ │   HARASSMENT - GOTO HARASSMENT PROTOCOL        │ │
│ │   INDECENCY - GOTO INDECENCY PROTOCOL          │ │
│ │   JUVENILE - GOTO JUVENILE PROTOCOL            │ │
│ │   MENTAL DISORDER - GOTO MENTAL PROTOCOL       │ │
│ │   MISCELLANEOUS - GOTO MISCELLANEOUS PROTOCO   │ │
│ │   MISSING PERSON-GOTO MISSING PERSON PROTOCOL  │ │
│ │   OFFICER ASSIST - GOTO OFFICER ASSIST PROTOCOL│ │
│ │   PUBLIC SERV. - GOTO PUBLIC SERVICE PROTOCOL  │ │
│ │   ROBBERY - GOTO ROBBERY PROTOCOL              │ │
│ │   SUICIDAL PERSON - GOTO SUICIDAL PROTOCOL     │ │
│ │   SUPPLEMENTAL - GOTO SUPPLEMENTAL PROTOCOL    │ │
│ │ · SUSPICIOUS PERSON - GOTO SUSPICIOUS PROTOCOL │ │
│ │   THEFT - GOTO THEFT PROTOCOL                  │ │
│ │   TRAFFIC ACCIDENT - GOTO TRAFFIC PROTOCOL     │ │
│ │   TRAFFIC VIOLATION - GOTO TRAF VIO PROTOCOL   │ │
│ │   TRESPASSING - GOTO TRESPASSING PROTOCOL      │ │
│ │   UNKNOWN PARTY - GOTO UNKNOWN PROTOCOL        │ │
│ │   WEAPONS - GOTO WEAPONS PROTOCOL              │ │
│ └────────────────────────────────────────────────┘ │
└──────────────────────────────────────────────────┘
```

ENTRY QUESTIONS

1. What's the address of the emergency?
   a. (Silent call) Follow department policy regarding activating TDD/Minicom.
2. What's the phone number you're calling from?
3. What's your name?
4. Tell me exactly what happened?
   - Alarms — 103
   - Assist other Agencies — 106
   - Bomb found — 108
   - Bomb threat — 109
   - Life Threat — E
5. Are you safe and out of danger?
   - No — CCI
6. (Not obvious) What did you see or hear?
7. (Not obvious) How many people are involved?
8. (Not obvious) Where did this occur?
9. (Not obvious) When did this occur?

| ECHO Determinant Practice | Rules | Axioms |
|---|---|---|
| The ECHO level allows early recognition and response initiation when life is being immediately threatened. | 1. Always verify the incident address and the caller's phone number regardless of ANI/ALI information. | 1. The information determined during Case Entry for all Incident Types should include the number of suspects involved whenever it is appropriate. |
| Repetitive Persistence Use When using repetitive persistence to calm a caller, always provide a reason for the instruction (i.e., I need you to tell me the exact location of your son so that the police officers can locate him quickly). | 2. All suspects are to be considered armed until proven otherwise. 3. When a more specific incident type becomes known, shunt to the correct incident type during interrogation. 4. Always inform responders of information relating to officer safety. | |
| Deluca's Law EPDs will follow all protocols per se, avoiding freelance questioning or information unless it enhances, not replaces, the written protocol questions and scripts. | 5. If the incident type and status are unknown initially (3rd party caller), go to Protocol 135. 6. If at any time the caller expresses that they may be in danger, refer to Critical Caller Instructions. | |
| Caller Party 1st party: The caller is also the victim or perpetrator. 2nd party: The caller is in close proximity to the victim. 3rd party: The caller is removed from, or not in close proximity to, the victim or perpetrator | 7. Case Entry and key questions must always be completed, even when an ECHO determinant has been selected. 8. Questions must be asked unless the answer is obvious or spontaneously provided by the caller. | |

100 CASE ENTRY PROTOCOL

FIG. 5B

101 ABDUCTION / KIDNAPPING

| KEY QUESTIONS | PRE-ARRIVAL INSTRUCTIONS |
|---|---|
| 1. Were weapons involved or mentioned? | a. Do not disturb anything at the scene including weapons, tools, or objects found nearby. |
| a. (Yes) What type? | |
| 2. Where's the person(s) responsible? | b. Determine if anything is missing like clothing, toys, or medications. |
| a. (Suspect left/leaving) How did s/he leave? | |
| i. (Vehicle) Obtain vehicle description. | c. (Known suspect) Write down the names, addresses, and phone numbers of people the suspect(s) may contact. |
| ii. What direction was s/he going? | |
| iii. Do you know where s/he is going? | |
| 3. Obtain suspect descriptions (armed suspects first). | |
| 4. How did s/he arrive? | |
| a. (Vehicle) Obtain vehicle description. | * (Appropriate) Do computer check. |
| i. Where's the vehicle now? | |
| 5. (Appropriate) Obtain victim descriptions. | |
| 6. (Appropriate) Is anyone injured (sick)? | E 1 Life threat — 101-E-1 |
| 7. Are you still safe and out of danger? | 2 Officer or dispatcher discretion — 101-E-2 |
| No — CCI | D 1 In progress or occurred < 5 min. — 101-D-1 |
| | 2 Suspect on scene or nearby — 101-D-2 |
| | C 1 Occurred > 5 min. — 101-C-1 |
| | 2 Medical response needed — 101-C-2 |
| | B 1 Occurred > 30 min. — 101-B-1 |
| | 2 Suspect not on scene and not nearby — 101-B-2 |
| | A 1 Information to air only — 101-A-1 |
| | Ω 1 Referral — 101-Ω-1 |

FIG. 5C

| DESCRIPTION ESSENTIALS | Abduction | Axioms |
|---|---|---|
| Weapons<br>• Gun (pistol, rifle, shotgun)<br>• Knife (long, short)<br>• Club (bat, tire iron)<br>• Other (glass, bottle, vehicle)<br>• Explosive (bomb)<br><br>Person(s)<br>• Name<br>• Race<br>• Gender<br>• Age (DOB)<br>• Build/Height/Weight<br>• Hair color<br>• Eye color<br>• Other identifiable characteristics (facial hair, accent, tattoos, earrings)<br>• Complexion<br>• Hat<br>• Coat/Shirt<br>• Pants/Skirt<br>• Shoes<br>• Jewelry<br><br>Vehicle (CYMBALS)<br>• Color<br>• Year<br>• Make/Model<br>• Body style<br>• Additional<br>• License<br>• State | To carry off, or lead away a person by fraud, persuasion, or force.<br><br>Kidnapping<br>The taking and carrying away of one person by another by force or fraud and without the consent of the person being taken away, and involves a ransom demand.<br><br>1. All suspects are to be considered armed until proven otherwise.<br>2. Always inform responders if there are any weapons involved.<br>3. Relay suspect and vehicle information as received.<br>4. Ransom notes should be carefully preserved for forensic evidence. | 1. Parental or custodial abductions usually occur after a decision by the Courts that may favor one parent or guardian over another.<br><br>2. Suspects in parental kidnapping cases often hide out at the homes of other relatives. |

101 ABDUCTION / KIDNAPPING

FIG. 5D

102 ADMINISTRATIVE (DOCUMENT, MESSAGES, TRANSPORTS) — 504

| KEY QUESTIONS | PRE-ARRIVAL INSTRUCTIONS | | |
|---|---|---|---|
| 1. What type of service are you requesting?<br>  a. (Document Pick Up)<br>    i. What kind of document are we picking up?<br>    ii. Where are we picking up the document?<br>    iii. Who do we need to contact?<br>    iv. Where are we delivering the document?<br>  b. (Message Delivery)<br>    i. Where are we delivering the message?<br>    ii. Who are we delivering the message to?<br>    iii. What is the message?<br>    iv. (Appropriate) Does anyone need to go with us to deliver the message (Chaplain, friend)?<br>  c. (Transports)<br>    i. Who/what are we transporting?<br>    ii. (Person) Is the person cooperative?<br>    iii. (Person) Is the paperwork ready?<br>    iv. (Person) Is any special equipment needed (shackles, extra handcuffs)?<br>    v. Where is the pickup point?<br>    vi. Who do we need to contact?<br>    vii. What is the destination?<br>    viii. Who are we contacting at the destination?<br>  d. (Other) Obtain details pertaining to the specific request. | *(Appropriate) Notify requested person (Chaplain, friend).<br>*Determine a specific meeting point for the officer.<br><br>SEVERITY & DETERMINANT DESCRIPTIONS | | CODES |
| | D | 1 Blood or Organ Transport | 102-D-1 |
| | C | 1 Transport - not cooperative | 102-C-1 |
| | B | 1 Document pick up<br>2 Message delivery<br>3 Transport<br>4 Other | 102-B-1<br>102-B-2<br>102-B-3<br>102-B-4 |
| | A | 1 Information to air only | 102-A-1 |
| | Ω | 1 Referral | 102-Ω-1 |

| DESCRIPTION ESSENTIALS | Administrative Tasks | Axioms |
|---|---|---|
| Weapons<br>• Gun (pistol, rifle, shotgun)<br>• Knife (long, short)<br>• Club (bat, tire iron)<br>• Other (glass, bottle, vehicle)<br>• Explosive (bomb)<br><br>Person(s)<br>• Name<br>• Race<br>• Gender<br>• Age (DOB)<br>• Build/Height/Weight<br>• Hair color<br>• Eye color<br>• Other identifiable characteristics (facial hair, accent, tattoos, earrings)<br>• Complexion<br>• Hat<br>• Coat/Shirt<br>• Pants/Skirt<br>• Shoes<br>• Jewelry<br><br>Vehicle (CYMBALS)<br>• Color<br>• Year<br>• Make/Model<br>• Body style<br>• Additional<br>• License<br>• State | Agency defined tasks (including transports and message deliveries) that are not necessarily related to criminal activity. | |

102 ADMINISTRATIVE (DOCUMENT, MESSAGES, TRANSPORTS)

FIG. 5F

103 ALARMS

| KEY QUESTIONS | | PRE-ARRIVAL INSTRUCTIONS |
|---|---|---|
| 1. What type of alarm is this?<br>   Audible<br>   Burglary<br>   Fire<br>   Hold up/Panic/Duress<br>   Medical<br>   Panic/Duress<br>   Vehicle | FP<br><br>O | a. (Alarm company) Call us back with the keyholder information.<br>b. (Private caller) Do not disturb anything at the scene including weapons, tools, or objects found nearby. |
| 2. (Business) What's the name of the business? | | |
| 3. (Audible) How long has the alarm been sounding? | | |
| (Alarm monitoring company) | | |
| 4. Has contact been made with someone at the business (residence)?<br>  a. (Yes) Who was contacted?<br>    i. What's their relationship to the business (residence)? | | * Follow department policy regarding callbacks on alarms.<br>* (Appropriate) Do computer check. |

RESPONSE DETERMINANT DESCRIPTORS / CODES

| | | | |
|---|---|---|---|
| E | 1 | Life threat | 103-E-1 |
| | 2 | Officer or dispatcher discretion | 103-E-2 |
| D | 1 | In progress or occurred < 5 min. | 103-D-1 |
| C | 1 | Occurred > 5 min. | 103-C-1 |
| B | 1 | Occurred > 30 min. | 103-B-1 |
| A | 1 | Information to air only | 103-A-1 |
| Ω | 1 | Referral | 103-Ω-1 |

5. Who is responding to the business (residence)?
  a. How will s/he be responding?
    i. Obtain descriptions.
  b. What's their estimated time of arrival (ETA)?

(Private caller)
6. Do you see anything suspicious (Open window, door, lights on, people, vehicles)?
    Auto Crime — 107
    Burglary — 110

(Vehicle)
7. Obtain vehicle description.
8. Do you know who owns the vehicle?
  a. (Yes) Obtain name, address, and phone number of owner.

FIG. 5G

| DESCRIPTION ESSENTIALS | Alarms | Axioms |
|---|---|---|
| Weapons<br>• Gun (pistol, rifle, shotgun)<br>• Knife (long, short)<br>• Club (bat, tire iron)<br>• Other (glass, bottle, vehicle)<br>• Explosive (bomb)<br><br>Person(s)<br>• Name<br>• Race<br>• Gender<br>• Age (DOB)<br>• Build/Height/Weight<br>• Hair color<br>• Eye color<br>• Other identifiable characteristics (facial hair, accent, tattoos, earrings)<br>• Complexion<br>• Hat<br>• Coat/Shirt<br>• Pants/Skirt<br>• Shoes<br>• Jewelry<br><br>Vehicle (CYMBALS)<br>• Color<br>• Year<br>• Make/Model<br>• Body style<br>• Additional<br>• License<br>• State | Physical hardware installed at a given location to monitor burglary, robbery, medical, fire, hazardous materials, panic, or distress situations. Alarms may be monitored by an alarm company or may make local notifications only.<br><br>1. Consider all alarms as a crime in progress until proven otherwise. | 1. Panic alarms are normally activated by a person.<br>2. Alarms can malfunction due to storms, high winds, power outages, animals, heating cycles, water contact, or operator error. |

103 ALARMS

FIG. 5H

104 ANIMAL

— 508

| KEY QUESTIONS | PRE-ARRIVAL INSTRUCTIONS |
|---|---|
| 1. (Appropriate) Were weapons involved or mentioned?<br>a. (Yes) What type? ⟶<br>2. What type of animal complaint is this?<br>    CRUELTY<br>    Dangerous/Attack<br>    EXOTIC<br>    Injured<br>    Lost/Stray<br>    Wildlife<br>3. Obtain animal description.<br>    Type<br>    Color<br>    Size<br>4. (Not obvious) Is the animal aggressive?<br>a. (Yes) Has the animal bitten (attacked) anyone?<br>b. (Yes) Are any other animals in danger?<br>5. Is anyone injured (sick)?<br>6. Where's the animal now?<br>7. Is the animal injured?<br>8. Is the animal confined?<br>9. (Suspected cruelty) What type of cruelty is involved?<br>a. (Suspect left /leaving) How did s/he leave?<br>  i. (Vehicle) Obtain vehicle description. ⟶<br>  ii. What direction was s/he going?<br>  iii. Do you know where s/he is going?<br>b. (Detained) Is s/he cooperative?<br>c. Obtain suspect descriptions (armed suspects first). ⟶<br>d. How did s/he arrive?<br>  i. (Vehicle) Obtain vehicle description. ⟶<br>  ii. Where's the vehicle now?<br>10. Are you still safe and out of danger?<br>    No ⟶ CCI | a. Do not approach an unfamiliar animal.<br>b. (Appropriate) If there are any witnesses, ask them to stay until an officer can contact them (or obtain their names, addresses, and phone numbers).<br>c. If it's safe to do so, keep all bystanders away from the area.<br>d. Do not disturb anything at the scene including weapons or objects found nearby.<br><br>* (Appropriate) Do computer check.<br>* (Appropriate) Notify Animal Control.<br>* Obtain owner information if license number is provided. |

| | | | |
|---|---|---|---|
| E | 1 | Life threat | 104-E-1 |
|   | 2 | Officer or dispatcher discretion | 104-E-2 |
| D | 1 | In progress or occurred < 5 min. | 104-D-1 |
|   | 2 | Suspect on scene or nearby | 104-D-2 |
|   | 3 | Suspect detained but not cooperative | 104-D-3 |
| C | 1 | Occurred > 5 min. | 104-C-1 |
|   | 2 | Suspect detained and cooperative | 104-C-2 |
|   | 3 | Medical response needed | 104-C-3 |
| B | 1 | Occurred > 30 min. | 104-B-1 |
|   | 2 | Suspect not on scene and not nearby | 104-B-2 |
| A | 1 | Information to air only | 104-A-1 |
| Ω | 1 | Referral | 104-Ω-1 |

| DESCRIPTION ESSENTIALS | Animal Complaints | Animal Cruelty |
|---|---|---|
| Weapons<br>• Gun (pistol, rifle, shotgun)<br>• Knife (long, short)<br>• Club (bat, tire iron)<br>• Other (glass, bottle, vehicle)<br>• Explosive (bomb)<br><br>Person(s)<br>• Name<br>• Race<br>• Gender<br>• Age (DOB)<br>• Build/Height/Weight<br>• Hair color<br>• Eye color<br>• Other identifiable characteristics (facial hair, accent, tattoos, earrings)<br>• Complexion<br>• Hat<br>• Coat/Shirt<br>• Pants/Skirt<br>• Shoes<br>• Jewelry<br><br>Vehicle (CYMBALS)<br>• Color<br>• Year<br>• Make/Model<br>• Body style<br>• Additional<br>• License<br>• State | Animal complaints can apply to both domestic and wild animals. Complaints may include injured animals, animal attacks, abandoned animals, livestock, cruelty to animals, poaching or game law offenses, or wild animal sightings.<br><br>Exotic Animal<br>Any animal that may be poisonous, dangerous, or whose risk is unknown.<br><br>Axioms<br>1. Lions, tigers, bears (large carnivores) and EXOTIC or zoo animals may be considered extremely dangerous if lost, strayed, or injured.<br>2. Injured animals may become aggressive and attack other animals (humans) in the immediate vicinity.<br><br>1. Weapons questions must be asked in animal cruelty and poaching incidents. | The infliction of physical pain, suffering, or death with intent or by neglect upon an animal, when not necessary or when done for mere sport, for the indulgence of a cruel and vindictive temper, or with reckless indifference to its pain.<br><br>Homicidal Triad<br>Childhood traits of cruelty to small animals, bed wetting (beyond the normal appropriate age), and fire starting are known as the "Homicidal Triad." It is believed that juveniles with these characteristics have an increased risk of committing homicide in their adult life. Some of the most infamous serial killers had an early history of animal abuse and cruelty.<br><br>While not everyone who abuses animals will become a serial killer, virtually every serial killer first abused animals. |

104 ANIMAL

FIG. 5J

105 ASSAULT / SEXUAL ASSAULT

| KEY QUESTIONS | PRE-ARRIVAL INSTRUCTIONS |
|---|---|
| 1. Were weapons involved or mentioned?<br>   a. (Yes) What type?<br>2. Where's the person(s) responsible?<br>   a. (Suspect left/leaving) How did s/he leave?<br>      i. (Vehicle) Obtain vehicle description.<br>      ii. What direction was s/he going?<br>      iii. Do you know where s/he is going?<br>   b. (Detained) Is s/he cooperative?<br>3. Obtain suspect descriptions (armed suspects first).<br>4. How did s/he arrive?<br>   a. (Vehicle) Obtain vehicle description.<br>      i. Where's the vehicle now?<br>5. (Appropriate) Where's the victim?<br>6. (Appropriate) Obtain victim descriptions.<br>7. (Assault) Is anyone injured (sick)?<br>   (Sexual assault) Does s/he have any other injuries?<br>8. Are you still safe and out of danger?<br>             No | a. If the assailant (attacker) is nearby, keep very quiet and stay out of sight.<br>b. Do not disturb anything at the scene including weapons or objects found nearby.<br>c. (Sexual Assault) Do not change clothes, bathe, shower, or go to the bathroom. Do not clean the carpet or floor. Do not handle or wash the bedding.<br><br>* (Appropriate) Do computer check. |

| | | |
|---|---|---|
| E | 1 Life threat | 105-E-1 |
| | 2 Officer or dispatcher discretion | 105-E-2 |
| D | 1 In progress or occurred < 5 min. | 105-D-1 |
| | 2 Suspect on scene or nearby | 105-D-2 |
| | 3 Suspect detained but not cooperative | 105-D-3 |
| C | 1 Occurred > 5 min. | 105-C-1 |
| | 2 Suspect detained and cooperative | 105-C-2 |
| | 3 Medical response needed | 105-C-3 |
| B | 1 Occurred > 30 min. | 105-B-1 |
| | 2 Suspect not on scene and not nearby | 105-B-2 |
| A | 1 Information to air only | 105-A-1 |
| Ω | 1 Referral | 105-Ω-1 |

FIG. 5K

| DESCRIPTION ESSENTIALS | Assault | Axioms |
|---|---|---|
| Weapons<br>• Gun (pistol, rifle, shotgun)<br>• Knife (long, short)<br>• Club (bat, tire iron)<br>• Other (glass, bottle, vehicle)<br>• Explosive (bomb)<br><br>Person(s)<br>• Name<br>• Race<br>• Gender<br>• Age (DOB)<br>• Build/Height/Weight<br>• Hair color<br>• Eye color<br>• Other identifiable characteristics (facial hair, accent, tattoos, earrings)<br>• Complexion<br>• Hat<br>• Coat/Shirt<br>• Pants/Skirt<br>• Shoes<br>• Jewelry<br><br>Vehicle (CYMBALS)<br>• Color<br>• Year<br>• Make/Model<br>• Body style<br>• Additional<br>• License<br>• State | An unlawful attack, or attempted attack, upon another person. It can include certain types of threats.<br><br>Sexual Assault<br>An assault or attempted assault of a sexual nature. It can vary from unwanted touching of areas of the body to violent, invasive sexual intercourse.<br><br>Rape<br>Sexual intercourse by force or by putting the person in fear or in circumstances in which the person is unable to control her/his conduct or to resist. | 1. The collection of evidence after an individual has alleged a sexual assault (rape) may be psychologically as well as physically traumatic.<br><br>2. The preservation of evidence and compassionate care in sexual assault (rape) situations may be of much greater eventual importance to the injured party than initial response and treatment of physical injuries. |

105 ASSAULT / SEXUAL ASSAULT

FIG. 5L

107 AUTO CRIME

| KEY QUESTIONS | PRE-ARRIVAL INSTRUCTIONS |
|---|---|
| 1. Were weapons involved or mentioned?<br>  a. (Yes) What type? —<br>2. Where's the person(s) responsible?<br>  a. (Suspect left /leaving) How did s/he leave?<br>    i. (Vehicle) Obtain vehicle description.—<br>    ii. What direction was s/he going?<br>    iii. Do you know where s/he is going?<br>  b. (Detained) Is s/he cooperative?<br>3. Obtain suspect descriptions (armed suspects first). —<br>4. How did s/he arrive?<br>  a. (Vehicle) Obtain vehicle description. —<br>    i. Where's the vehicle now?<br>5. (Appropriate) Obtain victim's vehicle description. —<br>6. (Appropriate) Is s/he carrying anything from the vehicle?<br>  a. (Yes) Can you describe it to me?<br>7. Is anyone injured (sick)?—<br>8. Are you still safe and out of danger?<br>    No ———— CCI | a. Do not disturb anything at the scene including weapons or objects found nearby.<br><br>* (Appropriate) Do computer check. |

| | | | |
|---|---|---|---|
| E | 1 | Life threat | 107-E-1 |
| | 2 | Officer or dispatcher discretion | 107-E-2 |
| D | 1 | In progress or occurred < 5 min. | 107-D-1 |
| | 2 | Suspect on scene or nearby | 107-D-2 |
| | 3 | Suspect detained but not cooperative | 107-D-3 |
| C | 1 | Occurred > 5 min. | 107-C-1 |
| | 2 | Suspect detained and cooperative | 107-C-2 |
| | 3 | Medical response needed | 107-C-3 |
| B | 1 | Occurred > 30 min. | 107-B-1 |
| | 2 | Suspect not on scene and not nearby | 107-B-2 |
| A | 1 | Information to air only | 107-A-1 |
| Ω | 1 | Referral | 107-Ω-1 |

FIG. 50

| DESCRIPTION ESSENTIALS | Repossession | Rules |
|---|---|---|
| Weapons<br>• Gun (pistol, rifle, shotgun)<br>• Knife (long, short)<br>• Club (bat, tire iron)<br>• Other (glass, bottle, vehicle)<br>• Explosive (bomb)<br><br>Person(s)<br>• Name<br>• Race<br>• Gender<br>• Age (DOB)<br>• Build/Height/Weight<br>• Hair color<br>• Eye color<br>• Other identifiable characteristics (facial hair, accent, tattoos, earrings)<br>• Complexion<br>• Hat<br>• Coat/Shirt<br>• Pants/Skirt<br>• Shoes<br>• Jewelry<br><br>Vehicle (CYMBALS)<br>• Color<br>• Year<br>• Make/Model<br>• Body style<br>• Additional<br>• License<br>• State | Reclaiming of a vehicle by a finance company for lack of payment. Since this usually occurs at night, the owner wakes to find the vehicle missing, and reports it to the police.<br><br>Motor Vehicle Theft<br>The act of stealing or taking a vehicle without the owner's consent.<br><br>Theft from Auto<br>Removal of property from a vehicle without the owner's consent.<br><br>Damage to Auto<br>To damage a vehicle. | 1. Always inform responders if there are any weapons involved.<br><br>2. Relay suspect and vehicle information as received.<br><br>Axioms<br>1. Vehicles taken in a civil situation are not considered stolen. |

107 AUTO CRIME

FIG. 5P

108 BOMB FOUND / SUSPICIOUS PACKAGE

| KEY QUESTIONS | PRE-ARRIVAL INSTRUCTIONS |
|---|---|
| 1. (Appropriate) Why is the package suspicious? | a. If it's safe to do so, stay on the line with me. |
| 2. Where exactly is the suspicious package (bomb)? | b. Do not touch or approach the package. |
| 3. When was it found? | c. Do not use, turn on, or turn off any electronic devices (cell phones, two-way radios, video games, or cordless phones). |
| 4. Do you know how long it's been there? | |
| 5. Without getting any closer or touching it, can you describe it to me? | d. If you can, try to keep some type of shield between yourself and the device (or site) as protection (from flying debris). |
| 6. Are you safe and out of danger? | |
| a. (No) You're in a potentially hazardous situation and you need to follow your company policy regarding bombs (suspicious packages). | |
| i. Are you willing to continue talking with me? | * Follow department policy on advising caller to evacuate. |
| 7. Have you (or your organization) received any threats? | * (Appropriate) Do computer check. |
| a. (Yes) Can you describe them to me? | * Notify appropriate agencies per department policy. |
| 8. Do you have any idea who is responsible? | |
| a. (Yes) Obtain suspect descriptions. | |
| b. Were weapons involved or mentioned? | |
| i. (Yes) Obtain weapon description. | |
| c. (Yes) Obtain suspect vehicle description. | |
| 9. Have you seen anything else suspicious? | |
| a. (Yes) Can you describe it to me? | |

| | | | |
|---|---|---|---|
| E | 1 | Life threat | 108-E-1 |
| | 2 | Officer or dispatcher discretion | 108-E-2 |
| D | 1 | In progress or occurred < 5 min. | 108-D-1 |
| C | 1 | Occurred > 5 min. | 108-C-1 |
| B | 1 | Occurred > 30 min. | 108-B-1 |
| A | 1 | Information to air only | 108-A-1 |
| Ω | 1 | Referral | 108-Ω-1 |

FIG. 5Q

| DESCRIPTION ESSENTIALS | Bomb | |
|---|---|---|
| Weapons<br>• Gun (pistol, rifle, shotgun)<br>• Knife (long, short)<br>• Club (bat, tire iron)<br>• Other (glass, bottle, vehicle)<br>• Explosive (bomb)<br><br>Person(s)<br>• Name<br>• Race<br>• Gender<br>• Age (DOB)<br>• Build/Height/Weight<br>• Hair color<br>• Eye color<br>• Other identifiable characteristics (facial hair, accent, tattoos, earrings)<br>• Complexion<br>• Hat<br>• Coat/Shirt<br>• Pants/Skirt<br>• Shoes<br>• Jewelry<br><br>Vehicle (CYMBALS)<br>• Color<br>• Year<br>• Make/Model<br>• Body style<br>• Additional<br>• License<br>• State | An explosive or incendiary material designed to cause injury or damage.<br><br>Primary Device<br>A device that draws emergency service personnel to the scene.<br><br>Secondary Device<br>A device that is intended to explode after emergency personnel arrive. The sole purpose of the secondary device is to kill and/or disable emergency response personnel and to increase casualties.<br><br>Devices used by fanatic and terrorist communities that may include chemical, biological, and nuclear materials and are designed to harm a large group of people.<br><br>Axioms<br>1. Touching, disturbing, or approaching anything in the building or in the area where the bomb was found may cause the device to explode.<br>2. An evacuation may place more people in greater danger if not conducted properly. | Rules<br>1. Always presume that a secondary device is present and will be placed where people naturally congregate.<br>2. Suspicious packages should be considered bombs until proven otherwise.<br><br>Types of Bombs<br>• Incendiary devices<br>• Mail bombs<br>• Mailbox bombs<br>• Military ordnance (found)<br>• Molotov cocktail<br>• Pipe bombs<br>• Pop bottle bombs<br>• Switch devices<br>• Time-delayed devices<br><br>Explosive Device Descriptions<br>• Antenna<br>• Color on device<br>• Dynamite (crystals showing, number of sticks)<br>• Homemade devices<br>• Markings or words<br>• Military ordnance<br>• Size<br>• Shape (oblong, round)<br>• Suspicious packages<br>• Wires showing (color) |

108 BOMB FOUND / SUSPICIOUS PACKAGE

FIG. 5R

109 BOMB THREAT — 518

KEY QUESTIONS
(3rd party caller)

1. When exactly did you receive the threat?
2. How exactly did you receive the threat?
3. What's the target?
4. What time were you told the bomb would explode?
5. What were you told about the bomb itself?
6. Are you safe and out of danger?
    a. (No) You're in a potentially hazardous situation and you need to follow your company policy regarding bombs (suspicious packages).
       i. Are you willing to continue talking with me?
7. Were you given a reason for the bomb being planted?
8. Obtain description of original caller.
9. Were you given any other information?
10. (Appropriate) What telephone number did you receive the threat on?
11. Have you (or your organization) received any previous threats?
    a. (Yes) Can you describe them to me?
12. Do you have any idea who is responsible?
    a. Obtain suspect descriptions. —————

(Suspect caller)

1. When is the bomb going to explode?
2. Where exactly is the bomb?
3. Obtain description of bomb. ——————
4. What makes it explode?
5. How is it deactivated?
6. Why was the bomb planted?

PRE-ARRIVAL INSTRUCTIONS a. Do not use, turn on, or turn off any electronic devices (cell phones, two-way radios, video games, or cordless phones).
b. If you find any suspicious packages, do not touch, disturb, or approach them and call me back immediately.
c. Do not disturb anything at the scene including weapons or objects found nearby.
d. If it's safe to do so, keep all bystanders away from the area.

* Follow department policy on advising caller to evacuate.
* (Appropriate) Do computer check.
* Attempt a telephone trace.
* Notify appropriate agencies per department policy.
* Refer to agency policy on obtaining caller characteristics.

| | | | |
|---|---|---|---|
| E | 1 | Life threat | 109-E-1 |
| | 2 | Officer or dispatcher discretion | 109-E-2 |
| D | 1 | In progress or occurred < 5 min. | 109-D-1 |
| C | 1 | Occurred > 5 min. | 109-C-1 |
| B | 1 | Occurred > 30 min. | 109-B-1 |
| A | 1 | Information to air only | 109-A-1 |
| Ω | 1 | Referral | 109-Ω-1 |

| DESCRIPTION ESSENTIALS | Bomb Threat | Explosive Device Descriptions |
|---|---|---|
| Weapons<br>• Gun (pistol, rifle, shotgun)<br>• Knife (long, short)<br>• Club (bat, tire iron)<br>• Other (glass, bottle, vehicle)<br>• Explosive (bomb)<br><br>Person(s)<br>• Name<br>• Race<br>• Gender<br>• Age (DOB)<br>• Build/Height/Weight<br>• Hair color<br>• Eye color<br>• Other identifiable characteristics (facial hair, accent, tattoos, earrings)<br>• Complexion<br>• Hat<br>• Coat/Shirt<br>• Pants/Skirt<br>• Shoes<br>• Jewelry<br><br>Vehicle (CYMBALS)<br>• Color<br>• Year<br>• Make/Model<br>• Body style<br>• Additional<br>• License<br>• State | A statement made reporting the existence of an explosive device.<br><br>1. Building evacuations should be handled according to local protocol.<br>2. Always presume that a secondary device is present and will be placed where people naturally congregate.<br><br>Axioms<br>1. An evacuation may place more people in greater danger if not conducted properly.<br>2. Bomb threats are often made by disgruntled individuals, and may target former or current employers. | • Antenna<br>• Color on device<br>• Dynamite (crystals showing, number of sticks)<br>• Homemade devices<br>• Markings or words<br>• Military ordnance<br>• Size<br>• Shape (oblong, round)<br>• Wires showing (color) |

109 BOMB THREAT

FIG. 5T

110 BURGLARY

| KEY QUESTIONS | PRE-ARRIVAL INSTRUCTIONS |
|---|---|
| 1. Were weapons involved or mentioned?<br>　a. (Yes) What type?<br>2. Where's the person(s) responsible?<br>　a. (Suspect left/leaving) How did s/he leave?<br>　　i. (Vehicle) Obtain vehicle description.<br>　　ii. What direction was s/he going?<br>　　iii. Do you know where s/he is going?<br>　b. (Detained) Is s/he cooperative?<br>3. Obtain suspect descriptions (armed suspects first).<br>4. How did s/he arrive?<br>　a. (Vehicle) Obtain vehicle description.<br>　　i. Where's the vehicle now?<br>5. (Appropriate) Where did s/he enter the building?<br>6. Where are the possible exits from the building?<br>7. (Appropriate) Is s/he carrying anything from the building?<br>　a. (Yes) Can you describe it to me?<br>8. (Appropriate) Where did s/he exit the building?<br>9. (Appropriate) What items were taken?<br>10. Is anyone injured (sick)?<br>11. Are you still safe and out of danger?<br>　　　　No ─────────── CCI | 1. Do not disturb anything at the scene including weapons or objects found nearby.<br><br>* (Appropriate) Do computer check. |

LEVELS / DETERMINATE DESCRIPTORS / CODES

| | | | |
|---|---|---|---|
| E | 1 | Life threat | 110-E-1 |
|   | 2 | Officer or dispatcher discretion | 110-E-2 |
| D | 1 | In progress or occurred < 5 min. | 110-D-1 |
|   | 2 | Suspect on scene or nearby | 110-D-2 |
|   | 3 | Suspect detained but not cooperative | 110-D-3 |
| C | 1 | Occurred > 5 min. | 110-C-1 |
|   | 2 | Suspect detained and cooperative | 110-C-2 |
|   | 3 | Medical response needed | 110-C-3 |
| B | 1 | Occurred > 30 min. | 110-B-1 |
|   | 2 | Suspect not on scene and not nearby | 110-B-2 |
| A | 1 | Information to air only | 110-A-1 |
| Ω | 1 | Referral | 110-Ω-1 |

FIG. 5U

| DESCRIPTION ESSENTIALS | Burglary | Axioms |
|---|---|---|
| Weapons<br>• Gun (pistol, rifle, shotgun)<br>• Knife (long, short)<br>• Club (bat, tire iron)<br>• Other (glass, bottle, vehicle)<br>• Explosive (bomb)<br><br>Person(s)<br>• Name<br>• Race<br>• Gender<br>• Age (DOB)<br>• Build/Height/Weight<br>• Hair color<br>• Eye color<br>• Other identifiable characteristics (facial hair, accent, tattoos, earrings)<br>• Complexion<br>• Hat<br>• Coat/Shirt<br>• Pants/Skirt<br>• Shoes<br>• Jewelry<br><br>Vehicle (CYMBALS)<br>• Color<br>• Year<br>• Make/Model<br>• Body style<br>• Additional<br>• License<br>• State | Knowingly breaking into, entering, or remaining unlawfully in a building or occupied structure with the intent to commit a crime against a person or property.<br><br>Home Invasion<br>Breaking into or unlawfully entering a home with the intent to injure, kill, or terrorize the resident or occupant.<br><br>Burglary Tools<br>Devices, instruments, or tools that may be used to commit burglaries. These may include screwdrivers, bolt cutters, lock picks, or hammers.<br><br>1. Always inform responders if any weapons are involved.<br>2. Relay suspect and vehicle information as received. | 1. Most intruders use the same point of entry and exit.<br>2. Burglaries are usually property crimes, not crimes against persons.<br>3. Most residential burglaries occur during daylight hours.<br>4. Most business burglaries occur at night. |

110 BURGLARY

FIG. 5V

111  Damage / Vandalism

| KEY QUESTIONS | PRE-ARRIVAL INSTRUCTIONS |
|---|---|
| 1. Were weapons involved or mentioned?<br>   a. (Yes) What type? ⟶ 🔫<br>2. Where's the person(s) responsible?<br>   a. (Suspect left/leaving) How did s/he leave?<br>      i. (Vehicle) Obtain vehicle description. ⟶ 🚗<br>      ii. What direction was s/he going?<br>      iii. Do you know where s/he is going?<br>   b. (Detained) Is s/he cooperative?<br>3. Obtain suspect descriptions (armed suspects first). ⟶ 👤<br>4. How did s/he arrive?<br>   a. (Vehicle) Obtain vehicle description. ⟶ 🚗<br>      i. Where's the vehicle now?<br>5. What exactly has been damaged?<br>   a. (Vehicle) Obtain vehicle description. ⟶ 🚗<br>   b. (Building or property) Obtain specific location of damage. | a. Do not disturb anything at the scene including weapons or objects found nearby.<br><br><br><br><br><br><br><br>✳ (Appropriate) Do computer check. |

| | | | CODES |
|---|---|---|---|
| E | 1 | Life threat | 111-E-1 |
| | 2 | Officer or dispatcher discretion | 111-E-2 |
| D | 1 | In progress or occurred < 5 min. | 111-D-1 |
| | 2 | Suspect on scene or nearby | 111-D-2 |
| | 3 | Suspect detained but not cooperative | 111-D-3 |
| C | 1 | Occurred > 5 min. | 111-C-1 |
| | 2 | Suspect detained and cooperative | 111-C-2 |
| B | 1 | Occurred > 30 min. | 111-B-1 |
| | 2 | Suspect not on scene and not nearby | 111-B-2 |
| A | 1 | Information to air only | 111-A-1 |
| Ω | 1 | Referral | 111-Ω-1 |

FIG. 5W

| DESCRIPTION ESSENTIALS | Damage/Vandalism | Rules |
|---|---|---|
| Weapons<br>• Gun (pistol, rifle, shotgun)<br>• Knife (long, short)<br>• Club (bat, tire iron)<br>• Other (glass, bottle, vehicle)<br>• Explosive (bomb)<br><br>Person(s)<br>• Name<br>• Race<br>• Gender<br>• Age (DOB)<br>• Build/Height/Weight<br>• Hair color<br>• Eye color<br>• Other identifiable characteristics (facial hair, accent, tattoos, earrings)<br>• Complexion<br>• Hat<br>• Coat/Shirt<br>• Pants/Skirt<br>• Shoes<br>• Jewelry<br><br>Vehicle (CYMBALS)<br>• Color<br>• Year<br>• Make/Model<br>• Body style<br>• Additional<br>• License<br>• State | Willful or malicious acts that are intended to damage or destroy property. Willful or ignorant destruction of property.<br><br>Axioms<br>1. Most graffiti is gang related. | 1. Always inform responders if any weapons are involved.<br>2. Relay suspect and vehicle information as received. |

111  Damage / Vandalism

FIG. 5X

112 DECEASED PERSON

KEY QUESTIONS
1. Tell me why you think s/he's dead?
   a. (Suspicious) Assault ——————————————— 105
   b. Death not certain ——————————————— O
2. (Not obvious) How long ago did you find her/him?
3. (Not obvious) Where exactly is s/he?
4. (Not obvious) What's her/his name?
5. (Not obvious) Have you entered the premises (location)?
6. (Not obvious) Is anyone else at that location?
7. Are you still safe and out of danger?
   No ——————————————— CCI

PRE-ARRIVAL INSTRUCTIONS
a. Do not disturb anything at the scene including weapons or objects found nearby.
b. Is there anyone I can call for you?

✱ (Appropriate) Do computer check.
✱ (OBVIOUS or EXPECTED DEATH) Notify proper authorities.

| | | | |
|---|---|---|---|
| E | 1 | AED Required | 112-E-1 |
| | 2 | Officer or dispatcher discretion | 112-E-2 |
| D | 1 | In progress or occurred < 5 min. | 112-D-1 |
| C | 1 | Occurred > 5 min. | 112-C-1 |
| A | 1 | Information to air only | 112-A-1 |
| Ω | 1 | Referral | 112-Ω-1 |

| DESCRIPTION ESSENTIALS | Deceased Person | Axioms |
|---|---|---|
| Weapons<br>• Gun (pistol, rifle, shotgun)<br>• Knife (long, short)<br>• Club (bat, tire iron)<br>• Other (glass, bottle, vehicle)<br>• Explosive (bomb)<br><br>Person(s)<br>• Name<br>• Race<br>• Gender<br>• Age (DOB)<br>• Build/Height/Weight<br>• Hair color<br>• Eye color<br>• Other identifiable characteristics (facial hair, accent, tattoos, earrings)<br>• Complexion<br>• Hat<br>• Coat/Shirt<br>• Pants/Skirt<br>• Shoes<br>• Jewelry<br><br>Vehicle (CYMBALS)<br>• Color<br>• Year<br>• Make/Model<br>• Body style<br>• Additional<br>• License<br>• State | Calls initiated when any person reports the finding of a dead body.<br><br>Suspicious<br>A death in which anything at the scene suggests criminal activity.<br><br>1. All deceased person calls are to be considered as homicides unless determined otherwise. Scene preservation is a high priority for the collection of physical evidence. | 1. An autopsy must be performed on all victims where the cause of death is unknown. |

112 DECEASED PERSON

FIG. 5Z

113 DISTURBANCE — 526

KEY QUESTIONS
1. Were weapons involved or mentioned?
   a. (Yes) What type? ⟶
2. Is (Was) it physical or verbal?
3. Where's the person(s) responsible?
   a. (Suspect left/leaving) How did s/he leave?
      i. (Vehicle) Obtain vehicle description. 🚗
      ii. What direction was s/he going?
      iii. Do you know where s/he is going?
   b. (Detained) Is s/he cooperative?
4. Obtain suspect descriptions (armed suspects first). ⚧
5. How did s/he arrive?
   a. (Vehicle) Obtain vehicle description. 🚗
      i. Where's the vehicle now?
6. (Appropriate) Has anyone involved been using alcohol or drugs?
7. (Appropriate) Is there a court order (restraining order) in place?
8. Is anyone injured (sick)?
9. Are you still safe and out of danger?
   No ⟶ CCI

PRE-ARRIVAL INSTRUCTIONS
a. Do not disturb anything at the scene including weapons, tools, or objects found nearby.
b. (Noise Complaints) Call us back if the noise stops.
c. (Court order involved) Have all paperwork available for responding officers.
d. (Appropriate) Lock your doors and windows. If the person returns, do not let her/him in and call us back immediately.

\* (Appropriate) Do computer check.

DISPATCH DETERMINANT DESCRIPTORS — CODES

| | | | |
|---|---|---|---|
| E | 1 | Life threat | 113-E-1 |
| | 2 | Officer or dispatcher discretion | 113-E-2 |
| D | 1 | In progress or occurred < 5 min. | 113-D-1 |
| | 2 | Suspect on scene or nearby | 113-D-2 |
| | 3 | Suspect detained but not cooperative | 113-D-3 |
| | 4 | Large Incident | 113-D-4 |
| C | 1 | Occurred > 5 min. | 113-C-1 |
| | 2 | Suspect detained and cooperative | 113-C-2 |
| | 3 | Medical response needed | 113-C-3 |
| | 4 | Court order involved | 113-C-4 |
| B | 1 | Occurred > 30 min. | 113-B-1 |
| | 2 | Suspect not on scene and not nearby | 113-B-2 |
| | 3 | Noise/Loud music | 113-B-3 |
| A | 1 | Information to air only | 113-A-1 |
| Ω | 1 | Referral | 113-Ω-1 |

| DESCRIPTION ESSENTIALS | Disturbance | Axioms |
|---|---|---|
| ⚔ Weapons<br>• Gun (pistol, rifle, shotgun)<br>• Knife (long, short)<br>• Club (bat, tire iron)<br>• Other (glass, bottle, vehicle)<br>• Explosive (bomb)<br><br>⚧ Person(s)<br>• Name<br>• Race<br>• Gender<br>• Age (DOB)<br>• Build/Height/Weight<br>• Hair color<br>• Eye color<br>• Other identifiable characteristics (facial hair, accent, tattoos, earrings)<br>• Complexion<br>• Hat<br>• Coat/Shirt<br>• Pants/Skirt<br>• Shoes<br>• Jewelry<br><br>🚗 Vehicle (CYMBALS)<br>• Color<br>• Year<br>• Make/Model<br>• Body style<br>• Additional<br>• License<br>• State | Any act causing annoyance, disquiet, agitation or interrupting the peace and quiet. | 1. Always consider weapons to be involved in physical disturbances.<br><br>2. Reports of arguments or fights are disturbances as long as they do not involve parties in an intimate or co-habitational relationship.<br><br>3. Loud music, loud vehicles, loud talking, and barking dog complaints should be classified as 113-B-3 Noise/Loud Music Disturbance or handled as a referral. |

113 DISTURBANCE

FIG. 5AB

114 DISTURBANCE (DOMESTIC)

| KEY QUESTIONS | PRE-ARRIVAL INSTRUCTIONS |
|---|---|
| 1. Were weapons involved or mentioned?<br>  a. (Yes) What type?<br>2. Is (Was) it physical or verbal?<br>3. Where's the person(s) responsible?<br>  a. (Suspect left /leaving) How did s/he leave?<br>    i. (Vehicle) Obtain vehicle description.<br>    ii. What direction was s/he going?<br>    iii. Do you know where s/he is going?<br>4. Obtain suspect descriptions (armed suspects first).<br>5. How did s/he arrive?<br>  a. (Vehicle) Obtain vehicle description.<br>    i. Where's the vehicle now?<br>6. Are children present?<br>7. Has anyone involved been using alcohol or drugs?<br>8. Is there a court order (restraining order) in place?<br>9. Is anyone injured (sick)?<br>10. Are you still safe and out of danger?<br>      No ———— CCI | a. (Appropriate) Lock your doors and windows. If the person returns, do not let her/him in and call us back immediately.<br>b. Do not disturb anything at the scene including weapons, tools, or objects found nearby.<br>c. (Court order/Injunction involved) Have all paperwork available for the responding officers.<br><br>*  (Appropriate) Do computer check. |

| | | LEVELS | | CODES |
|---|---|---|---|---|
| E | 1 | Life threat | | 114-E-1 |
| | 2 | Officer or dispatcher discretion | | 114-E-2 |
| D | 1 | In progress or occurred < 5 min. | | 114-D-1 |
| | 2 | Suspect on scene or nearby | | 114-D-2 |
| C | 1 | Occurred > 5 min. | | 114-C-1 |
| | 2 | Medical response needed | | 114-C-2 |
| | 3 | Court order involved | | 114-C-3 |
| B | 1 | Occurred > 30 min. | | 114-B-1 |
| | 2 | Suspect not on scene and not nearby | | 114-B-2 |
| A | 1 | Information to air only | | 114-A-1 |
| Ω | 1 | Referral | | 114-Ω-1 |

FIG. 5AC

| DESCRIPTION ESSENTIALS | Domestic Disturbance | Rules |
|---|---|---|
| Weapons<br>• Gun (pistol, rifle, shotgun)<br>• Knife (long, short)<br>• Club (bat, tire iron)<br>• Other (glass, bottle, vehicle)<br>• Explosive (bomb)<br><br>Person(s)<br>• Name<br>• Race<br>• Gender<br>• Age (DOB)<br>• Build/Height/Weight<br>• Hair color<br>• Eye color<br>• Other identifiable characteristics (facial hair, accent, tattoos, earrings)<br>• Complexion<br>• Hat<br>• Coat/Shirt<br>• Pants/Skirt<br>• Shoes<br>• Jewelry<br><br>Vehicle (CYMBALS)<br>• Color<br>• Year<br>• Make/Model<br>• Body style<br>• Additional<br>• License<br>• State | Any disturbance where the parties involved are in an intimate or co-habitational relationship.<br><br>Domestic Violence<br>A general term used to cover physical and mental abuse that occurs within the home and family. It usually involves arguments between partners, siblings, and parents and usually occurs over a long period of time.<br><br>The victims will often suffer in silence. Generally when the police are called, it is not the first occasion on which the abuse has occurred. The abuse can range from serious assaults and beating to psychological abuse and attacks on one's self-esteem and character. | 1. Always consider weapons to be involved in domestic disturbances.<br>2. Reports of arguments or fights are disturbances as long as they do not involve parties in an intimate or co-habitational relationship.<br>3. Domestic violence has the potential for escalating at any time.<br><br>Axioms<br>1. Domestic violence has no social, ethnic, or economic boundaries.<br>2. The majority of victims are women.<br>3. Victims of abuse can always leave home, but there are many economic, social and emotional factors that contribute to the decision to stay. Some factors include:<br>• Economic dependence<br>• Children<br>• Fear of reprisals<br>• Lack of knowledge and access to help<br>• Social isolation<br>• Emotional dependence<br>• Shame |

114 DISTURBANCE (DOMESTIC)

FIG. 5AD

115 DRIVING UNDER THE INFLUENCE

| KEY QUESTIONS | PRE-ARRIVAL INSTRUCTIONS |
|---|---|
| 1. Were weapons involved or mentioned? <br>    a. (Yes) What type? ⟶ 🔫 <br> 2. Obtain vehicle description. ⟶ 🚗 <br> 3. Where is the vehicle now? <br> 4. What direction is the vehicle going? <br> 5. Are you following the vehicle? <br>    a. Advise agency policy on following suspected DUIs. <br>    b. (Appropriate) Obtain caller's vehicle description. ⟶ 🚗 <br> 6. Obtain suspect descriptions (armed suspects first). ⟶ ↑ <br> 7. (Appropriate) Where is s/he going? <br> 8. (Appropriate) Is anyone injured (sick)? | ✱ (Appropriate) Do computer check. <br> ✱ (Appropriate) Notify bordering agencies. |

| | | LEVELS OF DETERMINANT CODES | |
|---|---|---|---|
| E | 1 | Life threat | 115-E-1 |
| | 2 | Officer or dispatcher discretion | 115-E-2 |
| D | 1 | In progress or occurred < 5 min. | 115-D-1 |
| | 2 | Suspect on scene or nearby | 115-D-2 |
| C | 1 | Occurred > 5 min. | 115-C-1 |
| | 2 | Medical response needed | 115-C-2 |
| B | 1 | Occurred > 30 min. | 115-B-1 |
| | 2 | Suspect not on scene and not nearby | 115-B-2 |
| A | 1 | Information to air only | 115-A-1 |
| | 2 | Drinking in parked vehicle | 115-A-2 |
| Ω | 1 | Referral | 115-Ω-1 |

FIG. 5AE

| DESCRIPTION ESSENTIALS | Driving Under the Influence (DUI) | MADD (Mothers Against Drunk Driving) |
|---|---|---|
| 🔫 Weapons <br> • Gun (pistol, rifle, shotgun) <br> • Knife (long, short) <br> • Club (bat, tire iron) <br> • Other (glass, bottle, vehicle) <br> • Explosive (bomb) <br><br> ↑ Person(s) <br> • Name <br> • Race <br> • Gender <br> • Age (DOB) <br> • Build/Height/Weight <br> • Hair color <br> • Eye color <br> • Other identifiable characteristics <br>   (facial hair, accent, tattoos, earrings) <br> • Complexion <br> • Hat <br> • Coat/Shirt <br> • Pants/Skirt <br> • Shoes <br> • Jewelry <br><br> 🚗 Vehicle (CYMBALS) <br> • Color <br> • Year <br> • Make/Model <br> • Body style <br> • Additional <br> • License <br> • State | An offense committed by one in control of a motor vehicle while under the influence of intoxicating liquor or drugs. <br><br> Indications of Possible DUI <br> • Driving on the wrong side of the road <br> • Extremely slow speed <br> • High speed <br> • Lights off at night <br> • Open container <br> • Weaving <br><br> Axioms <br> 1. Open container violations in motor vehicles often lead to driving under the influence complaints. | An active group of individuals supporting state laws involving drinking and driving. Members are often relatives of DUI accident victims. |

115 DRIVING UNDER THE INFLUENCE

FIG. 5AF

116 DRUGS — 532

| KEY QUESTIONS | PRE-ARRIVAL INSTRUCTIONS |
|---|---|
| 1. Were weapons involved or mentioned?<br>　a. (Yes) What type?<br>2. Where's the person(s) responsible?<br>　a. (Suspect left /leaving) How did s/he leave?<br>　　i. (Vehicle) Obtain vehicle description.<br>　　ii. What direction was s/he going?<br>　　iii. Do you know where s/he is going?<br>　b. (Detained) Is s/he cooperative?<br>3. Obtain suspect descriptions (armed suspects first).<br>4. How did s/he arrive?<br>　a. (Vehicle) Obtain vehicle description.<br>　　i. Where's the vehicle now?<br>5. What is the safest route for the officers to approach the location?<br>6. (Cultivation) How large an area is being cultivated (grown)?<br>7. Is anyone injured (sick)?<br>8. Are you still safe and out of danger?<br>　　　No　　　　　　　　　　CCI | ◊. (Appropriate) Do not touch anything.<br><br>＊ (Appropriate) Do computer check.<br>＊ (Appropriate) Notify bordering agencies. |

| | | | |
|---|---|---|---|
| E | 1 | Life threat | 116-E-1 |
| | 2 | Officer or dispatcher discretion | 116-E-2 |
| D | 1 | In progress or occurred < 5 min. | 116-D-1 |
| | 2 | Suspect on scene or nearby | 116-D-2 |
| | 3 | Suspect detained but not cooperative | 116-D-3 |
| C | 1 | Occurred > 5 min. | 116-C-1 |
| | 2 | Suspect detained and cooperative | 116-C-2 |
| | 3 | Medical response needed | 116-C-3 |
| B | 1 | Occurred > 30 min. | 116-B-1 |
| | 2 | Suspect not on scene and not nearby | 116-B-2 |
| A | 1 | Information to air only | 116-A-1 |
| Ω | 1 | Referral | 116-Ω-1 |

| DESCRIPTION ESSENTIALS | Drugs | Axioms |
|---|---|---|
| Weapons<br>• Gun (pistol, rifle, shotgun)<br>• Knife (long, short)<br>• Club (bat, tire iron)<br>• Other (glass, bottle, vehicle)<br>• Explosive (bomb)<br><br>Person(s)<br>• Name<br>• Race<br>• Gender<br>• Age (DOB)<br>• Build/Height/Weight<br>• Hair color<br>• Eye color<br>• Other identifiable characteristics (facial hair, accent, tattoos, earrings)<br>• Complexion<br>• Hat<br>• Coat/Shirt<br>• Pants/Skirt<br>• Shoes<br>• Jewelry<br><br>Vehicle (CYMBALS)<br>• Color<br>• Year<br>• Make/Model<br>• Body style<br>• Additional<br>• License<br>• State | Substances that affect the central nervous system causing changes in behavior and often addiction.<br><br>*Examples of Drug Offenses*<br>• Illegal possession or manufacture of drugs<br>• Unlawful cultivation<br>• Inhaling of substances like glue, hairspray, and print products<br>• Unlawful use of Marijuana<br><br>1. Advise responders if the location is a known or possible "drug lab". | 1. Drug paraphernalia may consist of needles, syringes, homemade pipes, bongs, baggies or small glassine bags.<br>2. The ultimate goal is to identify and arrest the source of the illegal drug. The best way to accomplish this goal may be to obtain the information for the Narcotics Section, which allows detectives to follow through with an undercover investigation.<br>3. The sight of a uniformed officer or a marked police vehicle often prompts the suspects to dispose of the drug, cease the activity temporarily, or flee the area. This solves the immediate problem, but does not generally lead to the successful completion of the ultimate goal.<br>4. Clandestine laboratories are illicit operations consisting of chemicals and equipment necessary to manufacture controlled substances. Laboratories can be found anywhere.<br>5. Effects of inhalants intoxication resemble those of alcohol inebriation (stimulation and loss of inhibition, followed by depression). |

116 DRUGS

FIG. 5AH

117 Explosion — 534

| KEY QUESTIONS | PRE-ARRIVAL INSTRUCTIONS |
|---|---|
| 1. (Not obvious) What has exploded? | a. Stay away from any unexploded devices, gas, fumes, and flames. |
| 2. Do you see any flames? | b. Do not disturb anything at the scene including weapons, tools, or objects found nearby. |
| a. (No) Do you see any smoke? | c. If it's safe to do so, keep all bystanders away from the area. |
| 3. Can you describe the extent of the damage? | |
| 4. Did you hear any bursting or hissing sounds? | |
| 5. Has anyone complained of an unusual odor? | |
| 6. Is anyone injured (sick)? | |
| 7. (Appropriate) Are there any unexploded devices left? | |
|     Yes ———— 108 | |
| 8. Where's the person(s) responsible? | * (Appropriate) Do computer check. |
|   a. (Suspect left/leaving) How did s/he leave? | * (Appropriate) Notify utilities. |
|     i. (Vehicle) Obtain vehicle description. | |
|     ii. What direction was s/he going? | |
|     iii. Do you know where s/he is going? | |
|   b. (Detained) Is s/he cooperative? | |
| 9. Obtain suspect descriptions. | |
| 10. How did s/he arrive? | |
|   a. (Vehicle) Obtain vehicle description. | |
|     i. Where's the vehicle now? | |
| 11. Are you still safe and out of danger? | |
|     No ———— CCI | |

| | # | Description | Code |
|---|---|---|---|
| E | 1 | Life threat | 117-E-1 |
|   | 2 | Officer or dispatcher discretion | 117-E-2 |
| D | 1 | In progress or occurred < 5 min. | 117-D-1 |
|   | 2 | Suspect on scene or nearby | 117-D-2 |
|   | 3 | Suspect detained but not cooperative | 117-D-3 |
| C | 1 | Occurred > 5 min. | 117-C-1 |
|   | 2 | Suspect detained and cooperative | 117-C-2 |
|   | 3 | Medical response needed | 117-C-3 |
| B | 1 | Occurred > 30 min. | 117-B-1 |
|   | 2 | Suspect not on scene and not nearby | 117-B-2 |
| A | 1 | Information to air only | 117-A-1 |
| Ω | 1 | Referral | 117-Ω-1 |

| DESCRIPTION ESSENTIALS | Explosion | Axioms |
|---|---|---|
| Weapons<br>• Gun (pistol, rifle, shotgun)<br>• Knife (long, short)<br>• Club (bat, tire iron)<br>• Other (glass, bottle, vehicle)<br>• Explosive (bomb)<br><br>Person(s)<br>• Name<br>• Race<br>• Gender<br>• Age (DOB)<br>• Build/Height/Weight<br>• Hair color<br>• Eye color<br>• Other identifiable characteristics (facial hair, accent, tattoos, earrings)<br>• Complexion<br>• Hat<br>• Coat/Shirt<br>• Pants/Skirt<br>• Shoes<br>• Jewelry<br><br>Vehicle (CYMBALS)<br>• Color<br>• Year<br>• Make/Model<br>• Body style<br>• Additional<br>• License<br>• State | Explosion events can be accidental or intentional and can include burst pipes, gas main explosions, terrorist activities, electrical explosions, and sonic booms. | 1. Unusual odors can signify what type of gas is present and include: fruity, strong garlic, geraniums, bitter almonds, and newly mown hay smells.<br><br><br>Bomb Fatality Statistics<br><br>Bomb incidents killed 155 people in the United States between 1990 and 1994.<br><br>In 1995, 168 people were killed in the Oklahoma City bombing alone. |

117 Explosion

FIG. 5AJ

118 FRAUD / DECEPTION

KEY QUESTIONS — 536
1. Were weapons involved or mentioned? ─ ⌐
   a. (Yes) What type? ─────────────── ⌐
2. Where's the person(s) responsible?
   a. (Suspect left /leaving) How did s/he leave?
      i. (Vehicle) Obtain vehicle description. ─── 🚗
      ii. What direction was s/he going?
      iii. Do you know where s/he is going?
   b. (Detained) Is s/he cooperative?
3. Obtain suspect descriptions (armed suspects first). ─── ✝
4. How did s/he arrive?
   a. (Vehicle) Obtain vehicle description. ─── 🚗
      i. Where's the vehicle now?
5. Are you still safe and out of danger?
                        No ─────────── CCI

PRE-ARRIVAL INSTRUCTIONS
a. (Appropriate) Have all required paperwork ready (Affidavit of forgery).

* (Appropriate) Do computer check.
* (Appropriate) Notify proper investigative unit (Fraud, Prescription checks).

| | | | |
|---|---|---|---|
| E | 1 | Life threat | 118-E-1 |
| | 2 | Officer or dispatcher discretion | 118-E-2 |
| D | 1 | In progress or occurred < 5 min. | 118-D-1 |
| | 2 | Suspect on scene or nearby | 118-D-2 |
| | 3 | Suspect detained but not cooperative | 118-D-3 |
| C | 1 | Occurred > 5 min. | 118-C-1 |
| | 2 | Suspect detained and cooperative | 118-C-2 |
| B | 1 | Occurred > 30 min. | 118-B-1 |
| | 2 | Suspect not on scene and not nearby | 118-B-2 |
| A | 1 | Information to air only | 118-A-1 |
| Ω | 1 | Referral | 118-Ω-1 |

| DESCRIPTION ESSENTIALS | Fraud | Axioms |
|---|---|---|
| ⌐ Weapons<br>• Gun (pistol, rifle, shotgun)<br>• Knife (long, short)<br>• Club (bat, tire iron)<br>• Other (glass, bottle, vehicle)<br>• Explosive (bomb)<br><br>✝ Person(s)<br>• Name<br>• Race<br>• Gender<br>• Age (DOB)<br>• Build/Height/Weight<br>• Hair color<br>• Eye color<br>• Other identifiable characteristics (facial hair, accent, tattoos, earrings)<br>• Complexion<br>• Hat<br>• Coat/Shirt<br>• Pants/Skirt<br>• Shoes<br>• Jewelry<br><br>🚗 Vehicle (CYMBALS)<br>• Color<br>• Year<br>• Make/Model<br>• Body style<br>• Additional<br>• License<br>• State | A false representation of a matter of fact, whether by words or by conduct, by false or misleading allegations, or by concealment of that which should have been disclosed.<br><br>Deception<br>The act of deceiving or intentionally misleading by falsehood whether spoken or acted. Knowingly and willfully making a false statement or representation, express or implied, pertaining to a present or past fact.<br><br>Uttering<br>The act of passing a forged document in person or by telephone.<br><br>Examples of Fraud/Deception<br>• Forged Checks<br>• Altered Prescriptions<br>• Bait and Switch<br>• Con Games<br>• Shell Games<br>• Flim-flam | 1. There is usually some element of truth or believability in a con artist's story.<br>2. Elderly people frequently are the targets for con artists.<br>3. Con artists may operate by telling people they will help find funding for college education, ask them to hold something of value but require some money from the victim first as a "good faith" gesture, write checks on closed accounts, or have insufficient funds to cover the check. |

118 FRAUD / DECEPTION

FIG. 5AL

119  HARASSMENT / STALKING / THREATS — 538

KEY QUESTIONS
1. Were weapons involved or mentioned?
   a. (Yes) What type? ⟶ ┏
2. (Not Obvious) What was the threat?
3. Where's the person(s) responsible?
   a. (Suspect left/leaving) How did s/he leave?
      i. (Vehicle) Obtain vehicle description. ⟶ 🚗
      ii. What direction was s/he going?
      iii. Do you know where s/he is going?
   b. (Detained) Is s/he cooperative?
4. Obtain suspect descriptions (armed suspects first). ⟶ ✝
5. How did s/he arrive?
   a. (Vehicle) Obtain vehicle description. ⟶ 🚗
      i. Where's the vehicle now?
6. (By Telephone) Do you have the phone number the person called from?
   a. (Yes) Obtain phone number.
7. Is there a court order (restraining order) in place?
8. Is anyone injured (sick)?
9. Are you still safe and out of danger?
   No ⟶ CCI

PRE-ARRIVAL INSTRUCTIONS
a. Make a list of all dates, times, and details of previous incidents.
b. Do not disturb anything at the scene including weapons, tools, or objects found nearby.
c. (By Telephone) Do not erase the caller ID or recorded message.
d. (By Telephone) Attempt a telephone trace by dialing *69. If you get a recording saying the line is blocked, dial *57.

✻ (Appropriate) Do computer check.
✱ Attempt a telephone trace.

| | | | |
|---|---|---|---|
| E | 1 | Life threat | 119-E-1 |
|   | 2 | Officer or dispatcher discretion | 119-E-2 |
| D | 1 | In progress or occurred < 5 min. | 119-D-1 |
|   | 2 | Suspect on scene or nearby | 119-D-2 |
|   | 3 | Suspect detained but not cooperative | 119-D-3 |
| C | 1 | Occurred > 5 min. | 119-C-1 |
|   | 2 | Suspect detained and cooperative | 119-C-2 |
|   | 3 | Medical response needed | 119-C-3 |
|   | 4 | Court order involved | 119-C-4 |
| B | 1 | Occurred > 30 min. | 119-B-1 |
|   | 2 | Suspect not on scene and not nearby | 119-B-2 |
| A | 1 | Information to air only | 119-A-1 |
| Ω | 1 | Referral | 119-Ω-1 |

DESCRIPTION ESSENTIALS

┏ Weapons
- Gun (pistol, rifle, shotgun)
- Knife (long, short)
- Club (bat, tire iron)
- Other (glass, bottle, vehicle)
- Explosive (bomb)

✝ Person(s)
- Name
- Race
- Gender
- Age (DOB)
- Build/Height/Weight
- Hair color
- Eye color
- Other identifiable characteristics (facial hair, accent, tattoos, earrings)
- Complexion
- Hat
- Coat/Shirt
- Pants/Skirt
- Shoes
- Jewelry 🚗 Vehicle (CYMBALS)
- Color
- Year
- Make/Model
- Body style
- Additional
- License
- State

Harassment
- Making a telephone call without purpose of legitimate communications.
- Insulting, taunting, or challenging another in a manner likely to provide violent or disorderly response.
- Making repeated communications anonymously, at extremely inconvenient hours, or in offensively coarse language.

Stalking
The crime of willfully, maliciously, and repeatedly following or harassing another and making threats intended to put the person in imminent fear of death or serious bodily injury.

Rules
1. All stalking situations are considered to be dangerous and potentially violent.

Axioms
1. In most cases, dialing *69 will obtain the telephone of the last call recieved and then provide the option of dialing it.
2. Information recorded when dialing *57 can be released only to local law enforcement personnel because it may include blocked or normally unobtainable numbers.
3. The victim commonly knows the suspect.

119  HARASSMENT / STALKING / THREATS

FIG. 5AN

120 INDECENCY / LEWDNESS — 540

KEY QUESTIONS

1. Where's the person(s) responsible?
   a. (Suspect left /leaving) How did s/he leave?
      i. (Vehicle) Obtain vehicle description. 🚗
      ii. What direction was s/he going?
      iii. Do you know where s/he is going?
   b. (Detained) Is s/he cooperative?
2. Obtain suspect descriptions (armed suspects first). ↑
3. How did s/he arrive?
   a. (Vehicle) Obtain vehicle description. 🚗
      i. Where's the vehicle now?
4. Is anyone injured (sick)?
5. Are you still safe and out of danger?
   No ———— CCI

PRE-ARRIVAL INSTRUCTIONS a. Do not disturb anything at the scene including weapons, tools, or objects found nearby.

\* (Appropriate) Do computer check.

| | | | |
|---|---|---|---|
| E | 1 | Life threat | 120-E-1 |
| | 2 | Officer or dispatcher discretion | 120-E-2 |
| D | 1 | In progress or occurred < 5 min. | 120-D-1 |
| | 2 | Suspect on scene or nearby | 120-D-2 |
| | 3 | Suspect detained but not cooperative | 120-D-3 |
| C | 1 | Occurred > 5 min. | 120-C-1 |
| | 2 | Suspect detained and cooperative | 120-C-2 |
| | 3 | Medical response needed | 120-C-3 |
| B | 1 | Occurred > 30 min. | 120-B-1 |
| | 2 | Suspect not on scene and not nearby | 120-B-2 |
| A | 1 | Information to air only | 120-A-1 |
| Ω | 1 | Referral | 120-Ω-1 |

| DESCRIPTION ESSENTIALS | Lewdness | Axioms |
|---|---|---|
| ↑ Weapons<br>• Gun (pistol, rifle, shotgun)<br>• Knife (long, short)<br>• Club (bat, tire iron)<br>• Other (glass, bottle, vehicle)<br>• Explosive (bomb)<br><br>↑ Person(s)<br>• Name<br>• Race<br>• Gender<br>• Age (DOB)<br>• Build/Height/Weight<br>• Hair color<br>• Eye color<br>• Other identifiable characteristics (facial hair, accent, tattoos, earrings)<br>• Complexion<br>• Hat<br>• Coat/Shirt<br>• Pants/Skirt<br>• Shoes<br>• Jewelry<br><br>🚗 Vehicle (CYMBALS)<br>• Color<br>• Year<br>• Make/Model<br>• Body style<br>• Additional<br>• License<br>• State | Gross and wanton indecency so notorious as to tend to corrupt the community's morals.<br><br>Indecency<br>Conduct that is considered provocative or offensive. The term is often used when referring to pornography, prostitution, and improper exposure of the body. | 1. Suspects in indecent exposures are usually male. |

120 INDECENCY / LEWDNESS

FIG. 5AP

121 JUVENILE (ABUSE, ABANDONED, NEGLECT) ⟵ 542

| KEY QUESTIONS | PRE-ARRIVAL INSTRUCTIONS |
|---|---|
| 1. Were weapons involved or mentioned?<br>　a. (Yes) What type? ──────── ⟵<br>2. Where's the person(s) responsible?<br>　a. (Suspect left /leaving) How did s/he leave?<br>　　i. (Vehicle) Obtain vehicle description. ── 🚗<br>　　ii. What direction was s/he going?<br>　　iii. Do you know where s/he is going?<br>　b. (Detained) Is s/he cooperative?<br>3. Obtain suspect descriptions (armed suspects first). ── ✝<br>4. How did s/he arrive?<br>　a. (Vehicle) Obtain vehicle description. ── 🚗<br>　　i. Where's the vehicle now?<br>5. (Appropriate) Obtain vehicle description. ── 🚗<br>6. Is anyone injured (sick)?<br>7. Are you still safe and out of danger?<br>　　　　　　No ──────── CCI | a. Do not disturb anything at the scene including weapons, tools, or objects found nearby.<br>b. Call me back if the person responsible returns.<br><br>✱ Notify appropriate agencies per department policy.<br>✱ (Appropriate) Do computer check. |

| | | | CODES |
|---|---|---|---|
| E | 1 | Life threat | 121-E-1 |
| | 2 | Officer or dispatcher discretion | 121-E-2 |
| D | 1 | In progress or occurred < 5 min. | 121-D-1 |
| | 2 | Suspect on scene or nearby | 121-D-2 |
| | 3 | Suspect detained but not cooperative | 121-D-3 |
| C | 1 | Occurred > 5 min. | 121-C-1 |
| | 2 | Suspect detained and cooperative | 121-C-2 |
| | 3 | Medical response needed | 121-C-3 |
| B | 1 | Occurred > 30 min. | 121-B-1 |
| | 2 | Suspect not on scene and not nearby | 121-B-2 |
| A | 1 | Information to air only | 121-A-1 |
| Ω | 1 | Referral | 121-Ω-1 |

| DESCRIPTION ESSENTIALS | Juvenile | Axioms |
|---|---|---|
| ⌐ Weapons<br>　• Gun (pistol, rifle, shotgun)<br>　• Knife (long, short)<br>　• Club (bat, tire iron)<br>　• Other (glass, bottle, vehicle)<br>　• Explosive (bomb)<br><br>✝ Person(s)<br>　• Name<br>　• Race<br>　• Gender<br>　• Age (DOB)<br>　• Build/Height/Weight<br>　• Hair color<br>　• Eye color<br>　• Other identifiable characteristics<br>　　(facial hair, accent, tattoos, earrings)<br>　• Complexion<br>　• Hat<br>　• Coat/Shirt<br>　• Pants/Skirt<br>　• Shoes<br>　• Jewelry<br><br>🚗 Vehicle (CYMBALS)<br>　• Color<br>　• Year<br>　• Make/Model<br>　• Body style<br>　• Additional<br>　• License<br>　• State | A male who has not attained the age of ___ or a female that has not attained the age of ___.<br><br>A juvenile is further defined as a person who has not been deemed an adult by a directive of the courts, or who has not yet attained the age at which he or she should be treated as an adult for the purpose of criminal law.<br><br>Child Neglect<br>Any case in which the child's parents, legal guardians, or custodians fail to take the same actions to provide adequate food, clothing, shelter, affection, medical care, other suitable care, or supervision that a prudent parent would take.<br><br>Abuse<br>Any intentional act that causes physical harm, or harms a child's moral or mental well-being. | 1. 3rd party callers usually report juvenile situations, not the victims themselves. |

121 JUVENILE (ABUSE, ABANDONMENT, NEGLECT)

124  MISSING / FOUND PERSON — 548

| KEY QUESTIONS | PRE-ARRIVAL INSTRUCTIONS | | |
|---|---|---|---|
| (Missing Person) | (Missing Person) | | |
| 1. Obtain description of missing person. | a. Try to find a recent photograph of her/him. | | |
| 2. (Not obvious) When did you last see her/him? | b. Make a list of her/his friends, including their addresses and phone numbers. | | |
| 3. Did s/he leave in a vehicle? | c. Write down the names of the favorite places s/he frequents. | | |
| a. (Yes) Obtain vehicle description. | d. Try to locate her/him by checking with her/his friends. | | |
| 4. Do you know where s/he might go? | e. If s/he is located, call me back immediately. | | |
| 5. Has s/he been missing before? | (Found Person) | | |
| a. (Yes) Where was s/he found? | a. Call me back if s/he leaves to update me with her/his location. | | |
| 6. Did s/he take any personal items with her/him? Clothing Medications | * Follow department policy on Runaways/Missing persons. | | |
| 7. Does s/he have any medical or mental conditions that we need to be aware of? | * (Appropriate) Do computer check. | | |
| 8. Do you think s/he has run away? | LEVEL / DETERMINANTS | | CODES |
| 9. (Appropriate) Is there a court order (restraining order) in place? | E | 1 Life threat | 124-E-1 |
|  |  | 2 Officer or dispatcher discretion | 124-E-2 |
| (Found Person) | D | 1 "At Risk" person involved | 124-D-1 |
| 1. Obtain description of found person. |  | 2 Found person not cooperative | 124-D-2 |
| 2. Is s/he cooperative? | C | 1 Occurred > 5 min. | 124-C-1 |
| 3. Does s/he know who s/he is? |  | 2 Found person/Runaway | 124-C-2 |
| 4. Does s/he know where s/he lives? |  | 3 Medical response needed | 124-C-3 |
| 5. Who can we call for her/him? |  | 4 Court order involved | 124-C-4 |
| 6. Is s/he a Runaway? | B | 1 Occurred > 30 min. | 124-B-1 |
| 7. Is s/he injured (sick)? |  | 2 Reporting a Runaway | 124-B-2 |
|  | A | 1 Information to air only | 124-A-1 |
|  | Ω | 1 Referral | 124-Ω-1 |

| DESCRIPTION ESSENTIALS | Missing Person | Axioms |
|---|---|---|
| Weapons<br>• Gun (pistol, rifle, shotgun)<br>• Knife (long, short)<br>• Club (bat, tire iron)<br>• Other (glass, bottle, vehicle)<br>• Explosive (bomb)<br>Person(s)<br>• Name<br>• Race<br>• Gender<br>• Age (DOB)<br>• Build/Height/Weight<br>• Hair color<br>• Eye color<br>• Other identifiable characteristics (facial hair, accent, tattoos, earrings)<br>• Complexion<br>• Hat<br>• Coat/Shirt<br>• Pants/Skirt<br>• Shoes<br>• Jewelry<br>Vehicle (CYMBALS)<br>• Color<br>• Year<br>• Make/Model<br>• Body style<br>• Additional<br>• License<br>• State | Any person whose location is not known, but there is no evidence that a criminal act has taken place.<br><br>Found Person<br>Any person who has been located.<br><br>At Risk<br>Very young people, the elderly, and persons with physical or mental handicaps that impair their ability to care for themselves, or to make sound decisions based on circumstances presented to them. | 1. "Missing" elementary school age children are usually found at friend's homes, or return from friend's homes past the time they were expected.<br>2. Many "missing" middle school age and older children have actually run away from home.<br>3. Many murders begin as missing person reports. |

124 MISSING / FOUND PERSON

FIG. 5AX

125 OFFICER NEEDS ASSISTANCE — 550

KEY QUESTIONS
1. Were weapons involved or mentioned?
   a. (Yes) What type? — 𝚪
2. Where's the person(s) responsible?
   a. (Suspect left/leaving) How did s/he leave?
      i. (Vehicle) Obtain vehicle description. — 🚘
      ii. What direction was s/he going?
      iii. Do you know where s/he is going?
   b. (Detained) Is s/he cooperative?
3. Obtain suspect descriptions (armed suspects first). — ✝
4. How did s/he arrive?
   a. (Vehicle) Obtain vehicle description. — 🚘
      i. Where's the vehicle now?
5. Where exactly is the officer(s) now?
6. Obtain officer descriptions. — ✝
7. (Appropriate) Obtain police vehicle numbers. — 🚘
8. Is anyone injured (sick)?
9. Are you still safe and out of danger?
   No — CCI

PRE-ARRIVAL INSTRUCTIONS
a. Do not disturb anything at the scene including weapons, tools, or objects found nearby.
b. If the assailant (attacker) is nearby, keep very quiet and stay out of sight.

∗ (Appropriate) Do computer check.
∗ (Appropriate) Notify bordering agencies.

E
1. Life threat — 125-E-1
2. Officer or dispatcher discretion — 125-E-2

D
1. In progress or occurred < 5 min. — 125-D-1
2. Suspect on scene or nearby — 125-D-2
3. Suspect detained but not cooperative — 125-D-3

C
1. Suspect detained and cooperative — 125-C-1
2. Medical response needed — 125-C-2

Ω
1. Referral — 125-Ω-1

| DESCRIPTION ESSENTIALS | Officer Needs Assistance | Axioms |
|---|---|---|
| 𝚪 Weapons<br>• Gun (pistol, rifle, shotgun)<br>• Knife (long, short)<br>• Club (bat, tire iron)<br>• Other (glass, bottle, vehicle)<br>• Explosive (bomb)<br><br>✝ Person(s)<br>• Name<br>• Race<br>• Gender<br>• Age (DOB)<br>• Build/Height/Weight<br>• Hair color<br>• Eye color<br>• Other identifiable characteristics (facial hair, accent, tattoos, earrings)<br>• Complexion<br>• Hat<br>• Coat/Shirt<br>• Pants/Skirt<br>• Shoes<br>• Jewelry<br><br>🚘 Vehicle (CYMBALS)<br>• Color<br>• Year<br>• Make/Model<br>• Body style<br>• Additional<br>• License<br>• State | Any law enforcement officer who needs some type of assistance or aid. This is generally used in emergent situations where the safety of the officer is at stake.<br><br>1. Weapons are present at all Officer Needs Assistance scenes.<br>2. An Officer Needs Assistance call will create an emotional response from all officers hearing the call. It is important for the Dispatcher to maintain control of the response in order to help ensure the safety of an officer involved. | 1. Most Officer Needs Assistance calls involve a physical struggle between the officer and another person.<br>2. Citizens can call in Officer Needs Assistance calls over the officer's radio. |

125 OFFICER NEEDS ASSISTANCE

FIG. 5AZ

126 PUBLIC SERVICE (LOCK-OUT / IN, PEACE, WELFARE) — 552

KEY QUESTIONS

(Lock-out/Lock-in)

1. (Vehicle) Obtain vehicle description. 🚗
2. Is the vehicle occupied?
   a. (Yes) Is it running?
      i. (Yes) Is the air conditioning (heat) on?
3. Does anyone have a key?
4. Obtain suspect descriptions. 👤
5. Is anyone injured (sick)?

(Keep the Peace)

1. Are weapons involved or mentioned?
   a. (Yes) What type? 🔫
2. Obtain suspect descriptions (armed suspects first). 👤
3. Is there a court order (restraining order) in place?
4. Is anyone injured (sick)?
5. Are you still safe and out of danger?
   No ———————————————— CCI (Check the Welfare)

1. Were weapons involved or mentioned?
   a. (Yes) What type? 🔫
2. Obtain suspect descriptions (armed suspects first). 👤
3. (Vehicle) Obtain vehicle description. 🚗
4. Does s/he have any medical or mental conditions that we need to be aware of?
5. Does anyone have a key to the residence (vehicle)?
6. Is anyone injured (sick)?
7. Are you still safe and out of danger?
   No ———————————————— CCI

PRE-ARRIVAL INSTRUCTIONS a. (Lockout/Welfare Check) Attempt to notify a keyholder and have them respond.
b. (Keep the Peace) Have a copy of related documents ready for the officer.
c. (Keep the Peace) Officers can only stand by while essential personal property is obtained. They will not stand by indefinitely while you negotiate any disposition of property.

∗ (Appropriate) Do computer check.

| | | | |
|---|---|---|---|
| E | 1 | Life threat | 126-E-1 |
| | 2 | Officer or dispatcher discretion | 126-E-2 |
| D | 1 | Urgent Check the Welfare | 126-D-1 |
| C | 1 | Non-Urgent Check the Welfare | 126-C-1 |
| | 2 | Urgent Lock-out | 126-C-2 |
| | 3 | Medical response needed | 126-C-3 |
| | 4 | Court order involved | 126-C-4 |
| B | 1 | Keep the Peace | 126-B-1 |
| | 2 | Non-Urgent Lock-out | 126-B-2 |
| A | 1 | Information to air only | 126-A-1 |
| Ω | 1 | Referral | 126-Ω-1 |

DESCRIPTION ESSENTIALS

🔫 Weapons
- Gun (pistol, rifle, shotgun)
- Knife (long, short)
- Club (bat, tire iron)
- Other (glass, bottle, vehicle)
- Explosive (bomb)

👤 Person(s)
- Name
- Race
- Gender
- Age (DOB)
- Build/Height/Weight
- Hair color
- Eye color
- Other identifiable characteristics (facial hair, accent, tattoos, earrings)
- Complexion
- Hat
- Coat/Shirt
- Pants/Skirt
- Shoes
- Jewelry 🚗 Vehicle (CYMBALS)
- Color
- Year
- Make/Model
- Body style
- Additional
- License
- State

Public Service

Where Police, Fire, or others engage in a civil activity, or provide a function that does not involve investigating criminal activity.

Urgent Check the Welfare

Requests to check the well-being of a person who has not been seen or heard from for an unusual period of time or whose situation may be life threatening.

Non-Urgent Check the Welfare

Requests to check the well-being of a person who may need temporary shelter, food, or help in other ways but whose situation does not appear to be life threatening.

Lock-out

People who need help after accidentally locking themselves in or out of their house or vehicle.

Keep the Peace

Requests for officers to standby to keep the peace while people obtain property or exchange children.

Rules

1. Open line to calls with sounds of a disturbance in the background should be classified as Urgent Check the Welfare calls.
2. Open line to calls with no sounds in the background should be classified as Non-Urgent Check the Welfare calls.

Axioms

1. Lockouts can be life-threatening situations if they occur during extreme weather conditions.
2. Check the Welfare calls should be considered crime scenes until information indicates they are otherwise.
3. A homeless person searching for a place to sleep may be a Non-Urgent Check the Welfare.
4. Young children playing in the street may be an Urgent Check the Welfare.

126 PUBLIC SERVICE (LOCK-OUT / IN, PEACE, WELFARE)

FIG. 5BB

127 ROBBERY — 554

| KEY QUESTIONS | PRE-ARRIVAL INSTRUCTIONS |
|---|---|
| 1. Were weapons involved or mentioned?<br>  a. (Yes) What type? —<br>2. Where's the person(s) responsible?<br>  a. (Suspect left/leaving) How did s/he leave?<br>    i. (Vehicle) Obtain vehicle description. —<br>    ii. What direction was s/he going?<br>    iii. Do you know where s/he is going?<br>  b. (Detained) Is s/he cooperative?<br>3. Obtain suspect descriptions (armed suspects first). —<br>4. How did s/he arrive?<br>  a. (Vehicle) Obtain vehicle description. —<br>    i. Where's the vehicle now?<br>5. What was taken?<br>  a. (Money) How much money was taken?<br>    i. In what denominations?<br>    ii. What was it put in?<br>    iii. Was the money marked?<br>    iv. Was the money in a dye pack?<br>6. Is anyone injured (sick)?<br>7. Are you still safe and out of danger?<br>             No ———————— CCI | (Business)<br>a. If it's safe to do so, lock the door and come back to the phone.<br>b. Secure the videotape of the incident if it is available.<br>c. Do not disturb anything at the scene including weapons, tools, or objects found nearby.<br><br>✱ (Appropriate) Do computer check.<br>✱ Do not air the amount of money taken.<br>✱ (Appropriate) Notify proper investigative unit and agencies. |

| | | CODES |
|---|---|---|
| E | 1 Life threat<br>2 Officer or dispatcher discretion | 127-E-1<br>127-E-2 |
| D | 1 In progress or occurred < 5 min.<br>2 Suspect on scene or nearby<br>3 Suspect detained but not cooperative | 127-D-1<br>127-D-2<br>127-D-3 |
| C | 1 Occurred > 5 min.<br>2 Suspect detained and cooperative<br>3 Medical response needed | 127-C-1<br>127-C-2<br>127-C-3 |
| B | 1 Occurred > 30 min.<br>2 Suspect not on scene and not nearby | 127-B-1<br>127-B-2 |
| A | 1 Information to air only | 127-A-1 |
| Ω | 1 Referral | 127-Ω-1 |

| DESCRIPTION ESSENTIALS | Robbery | Axioms |
|---|---|---|
| ⚐ Weapons<br>• Gun (pistol, rifle, shotgun)<br>• Knife (long, short)<br>• Club (bat, tire iron)<br>• Other (glass, bottle, vehicle)<br>• Explosive (bomb)<br><br>† Person(s)<br>• Name<br>• Race<br>• Gender<br>• Age (DOB)<br>• Build/Height/Weight<br>• Hair color<br>• Eye color<br>• Other identifiable characteristics (facial hair, accent, tattoos, earrings)<br>• Complexion<br>• Hat<br>• Coat/Shirt<br>• Pants/Skirt<br>• Shoes<br>• Jewelry<br><br>🚗 Vehicle (CYMBALS)<br>• Color<br>• Year<br>• Make/Model<br>• Body style<br>• Additional<br>• License<br>• State | The taking of money, personal property, or any other article of value in the possession of another, from his person or immediate presence, and against his will, which has been accomplished by means of force or fear. | 1. Weapons are used or mentioned in most robberies.<br><br><br><br><br><br><br><br>Carjacking Homicide Statistics<br><br>FBI data in the U.S. indicates that about 272 homicides each year are committed by strangers involved in the act of automobile theft. |

127 ROBBERY

FIG. 5BD

128 SUICIDAL PERSON — 556

KEY QUESTIONS
(2nd or 3rd party caller)

1. Were weapons involved or mentioned?
   a. (Yes) What type? ———————————— r
2. Where's the suicidal person?
   a. (Person left/leaving) How did s/he leave?
      i. (Vehicle) Obtain vehicle description. ————
      ii. What direction was s/he going?
      iii. Do you know where s/he is going?
   b. (Detained) Is s/he cooperative?
3. Obtain suspect description. ————————
4. Is s/he violent?
5. How is s/he going to hurt her/himself?
6. How did s/he arrive?
   a. (Vehicle) Obtain vehicle description. ————
      i. Where's the vehicle now?
7. Is anyone injured (sick)?
8. Are you still safe and out of danger?
   No ———————————————————— CCI (1st party caller)

1. How do you intend to kill yourself?
2. Do you have any weapons?
   a. (Yes) What type? ————————————
3. Obtain caller's description. ——————————
4. Is anyone else with you?
5. Why do you want to kill yourself?
6. Are you injured (sick)?

PRE-ARRIVAL INSTRUCTIONS
(2nd or 3rd party caller)

a. Speak softly and calmly to the person.
b. Write down any known drugs (medications) the person has taken.
c. Write down the names, addresses, and phone numbers of any family or friends that s/he might go see, or that officers can speak with.

* (Appropriate) Do computer check.
* (1st party caller) Speak softly and calmly to the person.

| | | | |
|---|---|---|---|
| E | 1 | Life threat | 128-E-1 |
| | 2 | Officer or dispatcher discretion | 128-E-2 |
| D | 1 | In progress or occurred < 5 min. | 128-D-1 |
| | 2 | Person on scene or nearby | 128-D-2 |
| | 3 | Person detained but not cooperative | 128-D-3 |
| C | 1 | Occurred > 5 min. | 128-C-1 |
| | 2 | Person detained and cooperative | 128-C-2 |
| | 3 | Medical response needed | 128-C-3 |
| | 4 | Person not on scene or nearby | 128-C-4 |
| A | 1 | Information to air only | 128-A-1 |
| Ω | 1 | Referral | 128-Ω-1 |

| DESCRIPTION ESSENTIALS | Suicidal Person | Axioms |
|---|---|---|
| r Weapons<br>• Gun (pistol, rifle, shotgun)<br>• Knife (long, short)<br>• Club (bat, tire iron)<br>• Other (glass, bottle, vehicle)<br>• Explosive (bomb)<br><br>† Person(s)<br>• Name<br>• Race<br>• Gender<br>• Age (DOB)<br>• Build/Height/Weight<br>• Hair color<br>• Eye color<br>• Other identifiable characteristics (facial hair, accent, tattoos, earrings)<br>• Complexion<br>• Hat<br>• Coat/Shirt<br>• Pants/Skirt<br>• Shoes<br>• Jewelry<br><br>🚗 Vehicle (CYMBALS)<br>• Color<br>• Year<br>• Make/Model<br>• Body style<br>• Additional<br>• License<br>• State | A person considering self-destruction, which is the deliberate termination of one's own life.<br><br>1. Suicides are considered homicides until proven otherwise. | 1. Most people who call threatening suicide have not made that decision yet and are really asking for help. |

128 SUICIDAL PERSON

FIG. 5BF

129 SUPPLEMENTAL

| KEY QUESTIONS | PRE-ARRIVAL INSTRUCTIONS |
|---|---|

1. What type of incident do you want to add information to?
2. What's the original case (incident) number assigned to your call?
3. What type of information do you want to add?
   a. (Suspect) Obtain suspect descriptions. ⬈
   b. (Weapon) Obtain weapon descriptions. 🔫
   c. (Vehicle) Obtain vehicle description. 🚗
   d. (Items Stolen) Obtain detailed descriptions.
   e. (Other) Obtain appropriate information.
4. Do you know the name of the officer who took the report?
5. (Appropriate) What agency does the officer work for?

✱ (Appropriate) Do computer check.
✱ (Appropriate) Refer caller to appropriate section or agency for follow up.

LEVEL / DETERMINANT DESCRIPTIONS / CODES

| | | | |
|---|---|---|---|
| B | 1 | Add supplemental information | 129-B-1 |
| A | 1 | Information to air only | 129-A-1 |
| Ω | 1 | Referral | 129-Ω-1 |

| DESCRIPTION ESSENTIALS | Supplemental | |
|---|---|---|
| 🔫 Weapons<br>• Gun (pistol, rifle, shotgun)<br>• Knife (long, short)<br>• Club (bat, tire iron)<br>• Other (glass, bottle, vehicle)<br>• Explosive (bomb)<br><br>👤 Person(s)<br>• Name<br>• Race<br>• Gender<br>• Age (DOB)<br>• Build/Height/Weight<br>• Hair color<br>• Eye color<br>• Other identifiable characteristics (facial hair, accent, tattoos, earrings)<br>• Complexion<br>• Hat<br>• Coat/Shirt<br>• Pants/Skirt<br>• Shoes<br>• Jewelry<br><br>🚗 Vehicle (CYMBALS)<br>• Color<br>• Year<br>• Make/Model<br>• Body style<br>• Additional<br>• License<br>• State | Information to be added to an existing report. It can be in the form of additional suspect information, additional items missing, or general information about the circumstances of the incident.<br><br>1. Supplements are not "In Progress" events. | |

129 SUPPLEMENTAL

FIG. 5BH

130 SUSPICIOUS / WANTED (PERSON, CIRCUMSTANCES, VEHICLE) — 560

| KEY QUESTIONS | PRE-ARRIVAL INSTRUCTIONS |
|---|---|
| 1. Were weapons involved or mentioned?<br>  a. (Yes) What type? ⟶ ⟵<br>2. (Wanted person) What is s/he wanted for?<br>3. (Not Obvious) What is suspicious about the person (circumstances, vehicle)?<br>4. (Vehicle) Obtain vehicle description. ⟶<br>5. Where's the person(s) responsible?<br>  a. (Suspect left /leaving) How did s/he leave?<br>    i. (Vehicle) Obtain vehicle description. ⟶<br>    ii. What direction was s/he going?<br>    iii. Do you know where s/he is going?<br>  b. (Detained) Is s/he cooperative?<br>6. Obtain suspect descriptions (armed suspects first). ⟶<br>7. How did s/he arrive?<br>  a. (Vehicle) Obtain vehicle description. ⟶<br>    i. Where's the vehicle now?<br>8. Is anyone injured (sick)?<br>9. Are you still safe and out of danger?<br>          No ⟶ CCI | a. (Appropriate) Try to avoid the person or vehicle. Tell me immediately if the suspect(s) leaves the scene.<br>b. Do not disturb anything at the scene including weapons, tools, or objects found nearby.<br><br>* (Appropriate) Do computer check.<br>* (Appropriate) Check for warrants. |

| | | | CODES |
|---|---|---|---|
| E | 1 | Life threat | 130-E-1 |
|  | 2 | Officer or dispatcher discretion | 130-E-2 |
| D | 1 | In progress or occurred < 5 min. | 130-D-1 |
|  | 2 | Suspect on scene or nearby | 130-D-2 |
|  | 3 | Suspect detained but not cooperative | 130-D-3 |
| C | 1 | Occurred > 5 min. | 130-C-1 |
|  | 2 | Suspect detained and cooperative | 130-C-2 |
|  | 3 | *Medical response needed* | *130-C-3* |
| B | 1 | Occurred > 30 min. | 130-B-1 |
|  | 2 | Suspect not on scene and not nearby | 130-B-2 |
| A | 1 | Information to air only | 130-A-1 |
| Ω | 1 | Referral | 130-Ω-1 |

| DESCRIPTION ESSENTIALS | Suspicious | Axioms |
|---|---|---|
| Weapons<br>• Gun (pistol, rifle, shotgun)<br>• Knife (long, short)<br>• Club (bat, tire iron)<br>• Other (glass, bottle, vehicle)<br>• Explosive (bomb)<br><br>Person(s)<br>• Name<br>• Race<br>• Gender<br>• Age (DOB)<br>• Build/Height/Weight<br>• Hair color<br>• Eye color<br>• Other identifiable characteristics (facial hair, accent, tattoos, earrings)<br>• Complexion<br>• Hat<br>• Coat/Shirt<br>• Pants/Skirt<br>• Shoes<br>• Jewelry<br><br>Vehicle (CYMBALS)<br>• Color<br>• Year<br>• Make/Model<br>• Body style<br>• Additional<br>• License<br>• State | The act of suspecting. Suspicion implies the belief or opinion based upon the facts or circumstances which do not amount to proof.<br><br>Wanted<br><br>A person or vehicle, sought by the police, in connection with a crime. | 1. Most wanted people will try to escape if they see officers approaching. |

130 SUSPICIOUS / WANTED (PERSON, CIRCUMSTANCES, VEHICLE)

FIG. 5BJ

131 THEFT (LARCENY)

| KEY QUESTIONS | PRE-ARRIVAL INSTRUCTIONS |
|---|---|
| 1. Were weapons involved or mentioned?<br>  a. (Yes) What type? ———————————— 🔫<br>2. Where's the person(s) responsible?<br>  a. (Suspect left/leaving) How did s/he leave?<br>    i. (Vehicle) Obtain vehicle description. ———— 🚗<br>    ii. What *direction* was s/he going?<br>    iii. Do you know *where* s/he is going?<br>  b. (Detained) Is s/he cooperative?<br>3. Obtain suspect descriptions (armed suspects first). ——— 👤<br>4. How did s/he arrive?<br>  a. (Vehicle) Obtain vehicle description. ———— 🚗<br>    i. Where's the vehicle now?<br>5. What type of property was taken?<br>  a. (Property) What is the estimated value of the items taken?<br>  b. (Money) How much was taken?<br>6. Is anyone injured (sick)?<br>7. Are you still safe and out of danger?<br>          No ———————————— CCI | a. Do not disturb anything at the scene including weapons, tools, or objects found nearby.<br><br>✱ (Appropriate) Do computer check.<br>✱ Follow department policy on referring the caller to other sections or agencies. |

| | | | |
|---|---|---|---|
| E | 1 | Life threat | 131-E-1 |
| | 2 | Officer or dispatcher discretion | 131-E-2 |
| D | 1 | In progress or occurred < 5 min. | 131-D-1 |
| | 2 | Suspect on scene or nearby | 131-D-2 |
| | 3 | Suspect detained but not cooperative | 131-D-3 |
| C | 1 | Occurred > 5 min. | 131-C-1 |
| | 2 | Suspect detained and cooperative | 131-C-2 |
| | 3 | Medical response needed | 131-C-3 |
| B | 1 | Occurred > 30 min. | 131-B-1 |
| | 2 | Suspect not on scene and not nearby | 131-B-2 |
| A | 1 | Information to air only | 131-A-1 |
| Ω | 1 | Referral | 131-Ω-1 |

FIG. 5BK

| DESCRIPTION ESSENTIALS | Theft (Larceny) | Axioms |
|---|---|---|
| Weapons<br>• Gun (pistol, rifle, shotgun)<br>• Knife (long, short)<br>• Club (bat, tire iron)<br>• Other (glass, bottle, vehicle)<br>• Explosive (bomb)<br><br>Person(s)<br>• Name<br>• Race<br>• Gender<br>• Age (DOB)<br>• Build/Height/Weight<br>• Hair color<br>• Eye color<br>• Other identifiable characteristics (facial hair, accent, tattoos, earrings)<br>• Complexion<br>• Hat<br>• Coat/Shirt<br>• Pants/Skirt<br>• Shoes<br>• Jewelry<br><br>Vehicle (CYMBALS)<br>• Color<br>• Year<br>• Make/Model<br>• Body style<br>• Additional<br>• License<br>• State | The act of dishonestly taking property from another with the intent of permanently depriving the other of it (stealing). | 1. Most stolen property is sold or pawned to support a drug habit. |

131 THEFT (LARCENY)

FIG. 5BL

132 TRAFFIC ACCIDENT

KEY QUESTIONS
1. How many vehicles are involved?
2. Is anyone injured?
   a. (Yes)
3. Is anyone trapped?
4. Was anyone thrown from the vehicle(s)?
5. Are there chemicals or fuel leaking from the vehicle(s)?
   a. (Commercial Vehicle) Obtain placard number, words or colors (chemical ID).
6. Are all of the drivers still there?
   a. Is everyone cooperative?
   b. (Suspect left /leaving) How did s/he leave?
      i. (Vehicle) Obtain vehicle description.
      ii. What direction was s/he going?
      iii. Do you know where s/he is going?
      iv. Obtain suspect descriptions.
7. Has anyone involved been using alcohol or drugs?
8. Obtain descriptions of vehicles on scene.
9. What's the exact location of the vehicle(s) now?
10. Are the vehicle(s) blocking or slowing the flow of traffic?
11. Is any other property damaged?

PRE-ARRIVAL INSTRUCTIONS
a. Do not walk in or touch any chemicals or fuel leaking from the vehicles.
b. Stand away from the gas or fumes.
c. (Vehicle on fire) Stand a safe distance away because of the possibility of explosion.
d. (1st party caller) Have your driver's license, vehicle registration, and insurance paperwork ready for the officer.
* (Appropriate) Do computer check.
* Follow department policies on investigating non-reportable, or private property accidents.

LEVELS & DETERMINANTS — CODES

| | | | |
|---|---|---|---|
| E | 1 | Life threat | 132-E-1 |
| | 2 | Officer or dispatcher discretion | 132-E-2 |
| D | 1 | In progress or occurred < 5 min. | 132-D-1 |
| | 2 | Suspect on scene or nearby | 132-D-2 |
| | 3 | Suspect detained but not cooperative | 132-D-3 |
| | 4 | Chemicals involved | 132-D-4 |
| C | 1 | Occurred > 5 min. | 132-C-1 |
| | 2 | Suspect detained and cooperative | 132-C-2 |
| | 3 | Medical response needed | 132-C-3 |
| | 4 | Vehicle(s) causing a hazard | 132-C-4 |
| | 5 | Alcohol or drugs involved | 132-C-5 |
| B | 1 | Occurred > 30 min. | 132-B-1 |
| | 2 | Suspect not on scene and not nearby | 132-B-2 |
| A | 1 | Information to air only | 132-A-1 |
| Ω | 1 | Referral | 132-Ω-1 |
| | 2 | Cold Report | 132-Ω-2 |

FIG. 5BM

FIG. 5BN

133  TRAFFIC VIOLATION / COMPLAINT — 566

| KEY QUESTIONS | PRE-ARRIVAL INSTRUCTIONS |
|---|---|
| 1. Were weapons involved or mentioned?<br>  a. (Yes) What type? ⟶ 🔫<br>2. How many vehicles are involved?<br>  a. Obtain vehicle description. ⟶ 🚗<br><br>(Moving Traffic Violation or Complaint)<br><br>3. Where was the vehicle(s) last seen?<br>  a. Obtain direction of travel.<br>4. Obtain driver descriptions (armed suspects first). ⟶ †<br>5. Do you want to talk with an officer about taking legal action?<br><br>(Stalled vehicle or parking complaint)<br><br>6. Is the vehicle blocking or slowing the flow of traffic?<br>7. Is anyone with the vehicle now?<br>  a. Obtain person descriptions. ⟶ † | a. (Following suspect) Do not continue to follow or make contact with the driver of the other vehicle.<br><br><br><br><br><br><br><br>✴ (Appropriate) Do computer check.<br>✴ Follow department policy on asking caller to sign a complaint at the police facility. |

| | | DETERMINANTS | |
|---|---|---|---|
| E | 1 | Life threat | 133-E-1 |
|   | 2 | Officer or dispatcher discretion | 133-E-2 |
| D | 1 | In progress or occurred < 5 min. | 133-D-1 |
|   | 2 | Suspect on scene or nearby | 133-D-2 |
|   | 3 | Road rage - with weapons | 133-D-3 |
| C | 1 | Occurred > 5 min. | 133-C-1 |
|   | 2 | Road rage - no weapons | 133-C-2 |
|   | 3 | Hazard - High traffic area | 133-C-3 |
| B | 1 | Occurred > 30 min. | 133-B-1 |
|   | 2 | Suspect not on scene and not nearby | 133-B-2 |
|   | 3 | Hazard - Low traffic area | 133-B-3 |
| A | 1 | Information to air only | 133-A-1 |
| Ω | 1 | Referral | 133-Ω-1 |

| DESCRIPTION ESSENTIALS | Traffic Violation / Complaint | Axioms |
|---|---|---|
| ⚡ Weapons<br>• Gun (pistol, rifle, shotgun)<br>• Knife (long, short)<br>• Club (bat, tire iron)<br>• Other (glass, bottle, vehicle)<br>• Explosive (bomb)<br><br>† Person(s)<br>• Name<br>• Race<br>• Gender<br>• Age (DOB)<br>• Build/Height/Weight<br>• Hair color<br>• Eye color<br>• Other identifiable characteristics (facial hair, accent, tattoos, earrings)<br>• Complexion<br>• Hat<br>• Coat/Shirt<br>• Pants/Skirt<br>• Shoes<br>• Jewelry<br><br>🚗 Vehicle (CYMBALS)<br>• Color<br>• Year<br>• Make/Model<br>• Body style<br>• Additional<br>• License<br>• State | Reporting improper parking or the inappropriate driving actions of another. These can be simple violations such as speeding or very serious offenses such as reckless driving.<br><br><br>Inappropriate driving actions accompanied by threats.<br><br><br><br>Anything that restricts or blocks traffic.<br><br><br><br>1. Blocked driveways are considered low traffic area complaints. | 1. Most Traffic Violation / Complaints require the caller to sign a summons or complaint and testify against the other person in court, if the suspect is located. |

133  TRAFFIC VIOLATION / COMPLAINT

FIG. 5BP

134 TRESPASSING / UNWANTED

KEY QUESTIONS

1. Were weapons involved or mentioned?
   a. (Yes) What type? ──────────── ⌐
2. Where's the person(s) responsible?
   a. (Suspect left /leaving) How did s/he leave?
      i. (Vehicle) Obtain vehicle description. ──── 🚗
      ii. What direction was s/he going?
      iii. Do you know where s/he is going?
   b. (Detained) Is s/he cooperative?
3. Obtain suspect descriptions (armed suspects first). ──── ✝
4. (Appropriate) Have you asked her/him to leave?
5. How did s/he arrive?
   a. (Vehicle) Obtain vehicle description. ──── 🚗
      i. Where's the vehicle now?
6. Who is responsible for the property (owner)?
7. Is anyone injured (sick)?
8. Are you still safe and out of danger?
   No ──────────── CCI

PRE-ARRIVAL INSTRUCTIONS

* (Appropriate) Do computer check.

| | | DETERMINANT DESCRIPTIONS | CODES |
|---|---|---|---|
| E | 1 | Life threat | 134-E-1 |
| | 2 | Officer or dispatcher discretion | 134-E-2 |
| D | 1 | In progress or occurred < 5 min. | 134-D-1 |
| | 2 | Suspect on scene or nearby | 134-D-2 |
| | 3 | Suspect detained but not cooperative | 134-D-3 |
| C | 1 | Occurred > 5 min. | 134-C-1 |
| | 2 | Suspect detained and cooperative | 134-C-2 |
| | 3 | Medical response needed | 134-C-3 |
| B | 1 | Occurred > 30 min. | 134-B-1 |
| | 2 | Suspect not on scene and not nearby | 134-B-2 |
| A | 1 | Information to air only | 134-A-1 |
| Ω | 1 | Referral | 134-Ω-1 |

FIG. 5BQ

| DESCRIPTION ESSENTIALS | Trespassing | Axioms |
|---|---|---|
| ⌐ Weapons<br>• Gun (pistol, rifle, shotgun)<br>• Knife (long, short)<br>• Club (bat, tire iron)<br>• Other (glass, bottle, vehicle)<br>• Explosive (bomb)<br><br>✝ Person(s)<br>• Name<br>• Race<br>• Gender<br>• Age (DOB)<br>• Build/Height/Weight<br>• Hair color<br>• Eye color<br>• Other identifiable characteristics (facial hair, accent, tattoos, earrings)<br>• Complexion<br>• Hat<br>• Coat/Shirt<br>• Pants/Skirt<br>• Shoes<br>• Jewelry<br><br>🚗 Vehicle (CYMBALS)<br>• Color<br>• Year<br>• Make/Model<br>• Body style<br>• Additional<br>• License<br>• State | Any unauthorized intrusion or invasion of private premises or land of another.<br><br>Unwanted<br><br>When a person is not wanted at a location, but has not been officially advised by a law enforcement officer that they are trespassing. | 1. Some trespassing or unwanted situations occur as a result of a *domestic violence situation*.<br>2. Many trespassers do not realize they are trespassing. |

134 TRESPASSING / UNWANTED

FIG. 5BR

135  UNKNOWN—3RD PARTY

| KEY QUESTIONS | → PRE-ARRIVAL INSTRUCTIONS |
|---|---|

1. Were weapons involved or mentioned?
   Weapons/Firearms ——— 136
2. Where's the person who asked you to call?
   a. (Person left/leaving) How did s/he leave?
      i. (Vehicle) Obtain vehicle description. ———
      ii. What direction was s/he going?
      iii. Do you know where s/he is going?
3. Obtain person description. ———
4. How did s/he arrive?
   a. (Vehicle) Obtain vehicle description. ———
      i. Where's the vehicle now?
5. Are you still safe and out of danger?
   No ——— CCI

* (Appropriate) Do computer check.

| | | | |
|---|---|---|---|
| E | 1 | Life threat | 135-E-1 |
|   | 2 | Officer or dispatcher discretion | 135-E-2 |
| D | 1 | In progress or occurred < 5 min. | 135-D-1 |
| C | 1 | Occurred > 5 min. | 135-C-1 |
| B | 1 | Occurred > 30 min. | 135-B-1 |
| A | 1 | Information to air only | 135-A-1 |
| Ω | 1 | Referral | 135-Ω-1 |

| DESCRIPTION ESSENTIALS | Unknown—3rd Party | Axioms |
|---|---|---|
| Weapons<br>• Gun (pistol, rifle, shotgun)<br>• Knife (long, short)<br>• Club (bat, tire iron)<br>• Other (glass, bottle, vehicle)<br>• Explosive (bomb)<br><br>Person(s)<br>• Name<br>• Race<br>• Gender<br>• Age (DOB)<br>• Build/Height/Weight<br>• Hair color<br>• Eye color<br>• Other identifiable characteristics<br>  (facial hair, accent, tattoos, earrings)<br>• Complexion<br>• Hat<br>• Coat/Shirt<br>• Pants/Skirt<br>• Shoes<br>• Jewelry<br><br>Vehicle (CYMBALS)<br>• Color<br>• Year<br>• Make/Model<br>• Body style<br>• Additional<br>• License<br>• State | Where not enough details exist to be able to accurately classify the call. An example is the caller who is asked to call the police for another, but does not know what the situation is, or why the other person needs the police. | 1. These calls have the potential to be very dangerous because no information is generally available concerning the real nature of the problem. |

135  UNKNOWN—3RD PARTY

FIG. 5BT

136 WEAPONS / FIREARMS

| KEY QUESTIONS | | PRE-ARRIVAL INSTRUCTIONS | |
|---|---|---|---|
| 1. What type of weapons are involved? | | ○ Do not disturb anything at the scene including weapons, tools, or objects found nearby. | |
| a. Obtain weapon description. | 🔫 | | |
| 2. Where's the person(s) responsible? | | | |
| a. (Suspect left /leaving) How did s/he leave? | | | |
| i. (Vehicle) Obtain vehicle description. | 🚗 | | |
| ii. What direction was s/he going? | | | |
| iii. Do you know where s/he is going? | | | |
| b. (Detained) Is s/he cooperative? | | | |
| 3. Obtain suspect descriptions (armed suspects first). | 👤 | | |
| 4. How did s/he arrive? | | | |
| a. (Vehicle) Obtain vehicle description. | 🚗 | * (Appropriate) Do computer check. | |
| i. Where's the vehicle now? | | | |
| 5. Is anyone injured (sick)? | | E 1 Life threat | 136-E-1 |
| 6. Are you still safe and out of danger? | | 2 Officer or dispatcher discretion | 136-E-2 |
| No | CCI | D 1 In progress or occurred < 5 min. | 136-D-1 |
| | | 2 Suspect on scene or nearby | 136-D-2 |
| | | 3 Suspect detained and not cooperative | 136-D-3 |
| | | C 1 Occurred > 5 min. | 136-C-1 |
| | | 2 Suspect detained and cooperative | 136-C-2 |
| | | 3 Medical response needed | 136-C-3 |
| | | B 1 Occurred > 30 min. | 136-B-1 |
| | | 2 Suspect not on scene and not nearby | 136-B-2 |
| | | A 1 Information to air only | 136-A-1 |
| | | Ω 1 Referral | 136-Ω-1 |

FIG. 5BU

| DESCRIPTION ESSENTIALS | Weapons | Axioms |
|---|---|---|
| 🔫 Weapons<br>• Gun (pistol, rifle, shotgun)<br>• Knife (long, short)<br>• Club (bat, tire iron)<br>• Other (glass, bottle, vehicle)<br>• Explosive (bomb) | Situations that involve the carrying or displaying of any article made, adapted, or intended to be used for incapacitating or injuring a person. | 1. Not all displays of weapons are illegal.<br>2. Not all Shots Fired complaints involve weapons. Some vehicle backfires and the use of fireworks are reported as Shots Fired. |
| 👤 Person(s)<br>• Name<br>• Race<br>• Gender<br>• Age (DOB)<br>• Build/Height/Weight<br>• Hair color<br>• Eye color<br>• Other identifiable characteristics (facial hair, accent, tattoos, earrings)<br>• Complexion<br>• Hat<br>• Coat/Shirt<br>• Pants/Skirt<br>• Shoes<br>• Jewelry | Shots Fired<br>The act of illegally discharging a weapon such as a handgun, shotgun, rifle, or military weapon, or home made weapon such as a potato gun.<br><br>1. All Shots Fired calls should be considered authentic until proven otherwise. | |
| 🚗 Vehicle (CYMBALS)<br>• Color<br>• Year<br>• Make/Model<br>• Body style<br>• Additional<br>• License<br>• State | | |

136 WEAPONS / FIREARMS

CCI CRITICAL CALLER INSTRUCTIONS

1. Safety Relocation
Are you able to get yourself to safety?

2. Going Where?
Where are you going?

3. Phone Mobility
Can you take the phone with you?

Yes – EО-6
(No) Call us back when you get there.

Yes – 2
No – 4

4. Can't Relocate, Not Safe
Can you talk with me freely?

5. Exact Location
Where exactly are you?
(What's the best way to get to you?)

3    Terminate

6. Yes/No Answers
Can you answer yes or no questions?

Yes – 5
No – 6

EО-6

Yes – 7
No – 8

7. Is Yes/No Okay?
Try to make this sound like a casual conversation between friends.

8. Okay to Tap
Can you tap the phone one time for yes, two times for no?

9. Silent and On-line
Stay on the line with me as long as you can. If you need to leave, don't hang up, just put the phone down.

PC

Can tap – PC
Can't tap – 9

Wait
Terminate/Caller Hung-up

X  CASE EXIT

| 1  Routine Disconnect | Descriptors | 1  Urgent Disconnect |
|---|---|---|
| Where can we contact you?<br>(Appropriate) Describe your clothing to me so the officer can identify you easily.<br>  Shirt (type, color)<br>  Pants/Skirt (type, color)<br><br>(Appropriate) Describe your vehicle to me.<br>  CYMBALS<br><br>(Appropriate) If there are any witnesses, ask them to stay until an officer can contact them (or obtain their names, addresses, and phone numbers).<br><br>(Appropriate) Call me back immediately if the person(s) responsible returns.<br><br>(Appropriate) If you can, please:<br>  • Put away any family pets.<br>  • Turn on the outside lights.<br><br>(Always) If anything changes, or if you have any further information, call me back immediately. | 🚗 Vehicle (CYMBALS)<br>  • Color<br>  • Year<br>  • Make/Model<br>  • Body style<br>  • Additional<br>  • License<br>  • State | I need to hang up now (to take another call).<br><br>(Appropriate) Call me back immediately if the person(s) responsible returns.<br><br>(Appropriate) If you can, please:<br>  • Put away any family pets.<br>  • Turn on the outside lights.<br><br>(Always) If anything changes, or if you have any further information, call me back immediately.<br><br>2  Stay on the line<br>I'll stay on the line with you as long as I can.<br><br>Describe your clothing to me so the officer can identify you easily.<br>  Shirt (type, color)<br>  Pants/Skirt (type, color)<br><br>If anything changes, just let me know.<br>(Appropriate) Tell me when the officers contact you. |

FIG. 5BX

| DESCRIPTION ESSENTIALS | Notifications | Responses |
|---|---|---|
| ⌐ Weapons<br>• Gun (pistol, rifle, shotgun)<br>• Knife (long, short)<br>• Club (bat, tire iron)<br>• Other (glass, bottle, vehicle)<br>• Explosive (bomb)<br>⚡ Person(s)<br>• Name<br>• Race<br>• Gender<br>• Age (DOB)<br>• Build/Height/Weight<br>• Hair color<br>• Eye color<br>• Other identifiable characteristics<br>(facial hair, accent, tattoos, earrings)<br>• Complexion<br>• Hat<br>• Coat/Shirt<br>• Pants/Skirt<br>• Shoes<br>• Jewelry<br>🚗 Vehicle (CYMBALS)<br>• Color<br>• Year<br>• Make/Model<br>• Body style<br>• Additional<br>• License<br>• State | ⊕ Police<br>○ Fire<br>❷ Electrical<br>✪ HAZMAT<br>⊕ EMS<br>❽ Bomb Squad<br>⊙ Gas Utility<br>❼ Animal Control<br>Directors & Warnings<br>✔ Verify<br>∗ Critical EFD Information<br>↘ Shunt, Go To<br>⛯ Go to PDIs, then FLS links<br>⇌ Send & return to questioning<br>⇌ Send, PDIs, & return to questioning<br>▽ Scene Safety<br>☎ Routine Disconnect<br>☎ Urgent Disconnect<br>ƒ Stay on Line | ⊕ Police<br>○ Fire<br>❷ Electrical<br>✪ HAZMAT<br>⊕ EMS<br>❽ Bomb Squad<br>⊙ Gas Utility<br>❼ Animal Control |

— 576

NATIONAL ACADEMY

LEGEND OF SYMBOLS

FIG. 5BY

METHOD AND SYSTEM FOR THE POLICE RESPONSE DISPATCH PROTOCOL OF AN EMERGENCY DISPATCH SYSTEM

CROSS REFERENCE TO RELATED APPLICATIONS

This application is based on U.S. Provisional Patent Application No. 60/325,666 filed on Sep. 26, 2001, copending at the filing date of this present application and priority is hereby claimed thereto.

BACKGROUND OF INVENTION

1. Field of the Invention

This invention relates to methods and systems of the emergency dispatch of law enforcement services. More specifically, this invention relates to methods and systems for the dispatch of law enforcement services, which has the capability of systematically gathering critical information during an emergency, call and producing a determinate value for the categorization of the emergency call, said categorization being used in the subsequent dispatch of law enforcement services.

2. Description of Related Art

A variety of methods, systems and devices have been proposed for use in law enforcement dispatch. Several systems and methods have been proposed for medical dispatch, which involve the calculation of a determinate value to be used in categorizing the criticality of an emergency medical call. Nevertheless, the inventors are unaware of a method and system, which is adapted specifically to the needs of law enforcement dispatch, which provides an appropriate determinate value for use in the dispatch of a law enforcement response to an emergency call.

The reader is directed to the following U.S. patent documents for general background material. Each of which is hereby incorporated by reference in its entirety for the material contained therein.

U.S. Pat. No. 3,799,147 describes an apparatus and method for diagnosing myocardial infarction predicted on analysis of the acoustical frequency spectrum of the human heart during the isovolumic contraction phase of the cardiac cycle for the purpose of detecting a shift in the predominant frequency component of the spectrum from 30-50 cps frequency band.

U.S. Pat. No. 4,290,114 describes a computer-aided health care system for use by a paramedic. Findings taken from the patient by the paramedic are assigned numerical codes by use of preprinted forms.

U.S. Pat. No. 4,360,345 describes a computer controlled interactive instruction system for teaching an individual in a health education system.

U.S. Pat. No. 4,731,725 describes a data processing system for use in a total medical image diagnosis system.

U.S. Pat. No. 4,922,514 describes a method and system for the dispatch of resources to remote sites in response to alarm signals.

U.S. Pat. No. 4,926,495 describes a computer aided dispatch system for use in a trunked communication system.

U.S. Pat. No. 5,086,391 describes a medical alert system for domestic use wherein the system is comprised of two major components, a device worn about the neck and a home computer.

U.S. Pat. No. 5,109,399 describes a computer-based system for receiving emergency telephone calls which, upon receipt of the call, provides a voice connection to the operator as well as displaying a map showing the location of the calling party and other relevant textual information.

U.S. Pat. No. 5,122,959 describes an integrated vehicle dispatch system that performs the management, coordination and communication functions for dispatching vehicles.

U.S. Pat. No. 5,228,449 describes a monitoring system uses infrared photoplethysmography to monitor the pulse of a person wearing a wrist unit and the wrist unit sends RF signals, which describe his, hear condition to a base unit.

U.S. Pat. No. 5,323,444 describes a community emergency response service system that is provided with three types of destinations to which emergency calls may be routed.

U.S. Pat. No. 5,339,351 describes a 911 emergency response system that includes a location identification module, preferably in solid-state circuit form.

U.S. Pat. No. 5,348,008 describes a cardiorespiratory alert system, which comprises a patient unit, which communicates with a caregiver unit.

U.S. Pat. No. 5,379,337 describes an emergency call routing system that includes a platform having a call router and a processor for identifying destinations to which such router directs emergency calls.

U.S. Pat. No. 5,404,292 describes a data processing system and method for automatically performing prioritized nursing diagnoses from patient assessment data that stores a diagnosis table.

U.S. Pat. No. 5,423,061 describes a method for providing dispatch services, using a communication system, an operating station that provides dispatch services to communication groups and multi-communication groups.

U.S. Pat. No. 5,438,996 describes an ambulatory, ultrasonic transit time, real-time, cervical effacement and dilation monitor with disposable probes, preferably transducers in the substantial shapes of three-dimensional bodies.

U.S. Pat. No. 5,462,051 describes a medical communication system that includes a sensor and a first device disposed on a side of the living body, receiving the physical information signal from the sensor.

U.S. Pat. No. 5,471,382 describes a medical network management system and process wherein health plan beneficiaries access a team of health care professionals over the telephone to help them assess their health needs and select appropriate care.

U.S. Pat. No. 5,502,726 describes a network of telemetry system, which allows virtual services at the application or presentation layer to communicate with other virtual services without regard to the physical interconnections.

U.S. Pat. No. 5,513,993 describes an educational training device in disclosed, which includes a replica of a telephone including a telephone headset having an operational speaker and a telephone keypad having a plurality of numeric key buttons.

U.S. Pat. No. 5,516,702 describes a screening method for identifying women at increased risk for imminent delivery, by providing an early, biochemical indication of increased risk of impeding preterm delivery.

U.S. Pat. No. 5,521,812 describes devices and methods for providing emergency information.

U.S. Pat. No. 5,544,649 describes an ambulatory patient health monitoring system is disclosed wherein the patient is monitored by a health care worker at a central station, while the patient is at a remote location.

U.S. Pat. No. 5,554,031 describes a method of training a child for reporting an emergency on a telephone system of the type having an emergency access code.

U.S. Pat. No. 5,590,269 describes a resource assignment system provides mixed-initiative updates of a user interface display in response to asynchronous events independently triggered updates.

U.S. Pat. Nos. 5,594,638 and 5,660,176 describe a system and method for providing computerized, knowledge-based medical diagnostic and treatment advice.

U.S. Pat. No. 5,630,125 describes an apparatus and a method for an information management system, that includes an Application Generator, the Distribution files generated by the Application Generator, and a Retrieval system which accesses the Distribution files.

U.S. Pat. No. 5,650,995 describes a console dispatch in an extended overall radio communications network where one or more dedicated Network Interface Modules (NIMs) are provided in each multisite trunked communications systems to permit the interconnection and communication between plural, multisite systems.

U.S. Pat. No. 5,682,419 describes a communication system that employs DMT technology to couple a primary site to a plurality of secondary sites providing call support infrastructure.

U.S. Pat. No. 5,684,860 describes an apparatus for automatically distributing communications between users and a fleet of mobile stations through a central stations through a central station including a telephone exchange.

U.S. Pat. No. 5,719,918 describes a transaction handling system for use in a cellular telephone network using Short Messages.

U.S. Pat. No. 5,722,418 describes a method for mediating social and behavioral influence processes through an interactive telecommunications guidance system for use in medicine and business that utilizes an expert, such as a physician, counselor, manager, supervisor, trainer, or peer in association with a computer.

U.S. Pat. No. 5,724,983 describes a method for continuously monitoring the medical condition of a patient, the method including the steps of continuously monitoring one or more clinical features of the patient; periodically computing a probability of a medical outcome or diagnosis based upon the continuously monitored one or more clinical features.

U.S. Pat. No. 5,734,706 describes a method and apparatus for identification through telephony signaling, including formatting an incoming or outgoing basic telephone signal and storing or retrieving information pertaining thereto.

U.S. Pat. No. 5,754,960 describes a dispatcher console for use in a digitally trunked, multisite public service radio system.

U.S. Pat. No. 5,759,044 describes a system for generating and processing synthetic and absolute real time remote environments for interaction with a user and her biological senses.

U.S. Pat. No. 5,761,278 describes a system for integrated data delivery in 9-1-1 calls for service application.

U.S. Pat. No. 5,761,493 describes an object-oriented query language apparatus and method that provides data abstraction, seamlessness with respect to the host programming language, set support orthogonal to persistence and strong typing.

U.S. Pat. No. 5,805,670 describes a private notification system designed to communicate 9-1-1 information to preselected recipients, such as family and friends, identified by a subscriber to the system.

U.S. Pat. No. 5,809,493 describes a knowledge processing system that includes a memory for storing knowledge in a plurality of knowledge modules in a knowledge bank.

U.S. Pat. No. 5,826,077 describes an object-oriented query language apparatus and method that provides data abstraction, seamlessness with respect to the host programming language.

U.S. Pat. No. 5,844,817 describes a decision support system, including a decision model that provides an indication, either of itself or in combination with a weighted average of the scores assigned to the decision model factors.

U.S. Pat. No. 5,857,966 describes a method and system for receiving, processing and responding to emergency medical calls for patients who have fainted or are unconscious.

U.S. Pat. Nos. 5,910,987 and 5,915,019 describe systems and methods for secure transaction management and electronic rights protection.

U.S. Pat. No. 5,926,526 describes an automated patient information retrieval system for notifying patients of medical information.

U.S. Pat. No. 5,933,780 describes a digital recorder that detrunks calls for logging prior to recording.

U.S. Pat. No. 5,964,700 describes a medical network management system, health plan beneficiaries access a team of health care professionals over the telephone to help them assess their health needs and select appropriate care.

U.S. Pat. No. 5,986,543 describes a security system having two-way communication with a central monitoring station.

U.S. Pat. No. 5,989,187 describes a method and system for providing emergency medical counseling to childbirth patients remotely.

U.S. Pat. No. 5,991,751 describes a system, method, and computer product for processing patent-centric and group-oriented data.

U.S. Pat. No. 6,004,266 describes a method and system for receiving, processing and responding to emergency medical calls for patients with heart problems.

U.S. Pat. No. 6,010,451 describes a method and system for providing emergency medical counseling to choking patients remotely.

U.S. Pat. No. 6,035,187 describes an emergency call box that has a cellular transceiver, a controller for controlling the cellular transceiver, and a memory for storing preprogrammed telephone numbers.

U.S. Pat. No. 6,040,770 describes a communication path integrity supervision system provided in a network system that allows communication of automatic alarm data.

U.S. Pat. No. 6,052,574 describes a system for auxiliary monitoring of emergency access calls functions to identify the geographical location of the origination point of the emergency access call and interconnects the appropriate emergency response agency that serves this geographic location to the emergency access call.

U.S. Pat. No. 6,053,864 describes a method and system for providing emergency medical counseling to arrest patients remotely.

U.S. Pat. No. 6,074,345 describes a method and apparatus for connecting to and coordinating data communications of various medical devices having different communication protocols.

U.S. Pat. No. 6,076,065 describes a method and system for receiving, processing and responding to emergency medical calls for patients with pregnancy related medical problems.

U.S. Pat. No. 6,078,894 describes a method and system for evaluating the performance of emergency medical dispatchers in adhering to a provided systematic procedure or protocol for handling emergency medical calls.

U.S. Pat. No. 6,106,459 describes a method and system for receiving, processing and responding to emergency medical calls by emergency dispatchers.

U.S. Pat. No. 6,112,083 describes a system for providing communication between multiple users in a closed user group arrangement, that includes first and second mobile earth terminals registering with the mobile satellite system.

U.S. Pat. No. 6,115,646 describes a dynamic and generic object-oriented process automation engine that provides workflow management services in a heterogeneous distributed computing environment.

U.S. Pat. No. 6,117,073 describes an integrated medical database system for the emergency medical transportation business.

U.S. Pat. No. 6,118,866 describes an emergency call load handling system in a call network has an interactive voice response unit associated with a switching apparatus.

U.S. Pat. No. 6,127,975 describes a combination of the measured characteristics of a radio signal in a communications environment with collateral information to produce an accurate and economical way to locate a mobile transmitter station.

U.S. Pat. No. 6,134,105 describes a versatile and highly portable command center comprised of a standard carrying case with carrying attachments.

SUMMARY OF INVENTION

It is desirable to provide a system and method for managing the process of police response so as to efficiently deploy law enforcement services in a manner appropriate to the emergency call. It is particularly desirable to provide a system and method for managing the emergency police call response that provides a systematic process for gathering critical information, calculating a determinate value which provides a quantitative indication of the criticality of the emergency, and communicating essential and helpful information to the dispatched police personnel and to individuals on the site of the emergency.

In a typical use of this invention in a police emergency response situation a caller uses a telephone or radio device to call an emergency response call center. Generally, the call center either has dispatch personnel ("dispatchers") or is capable of transferring the incoming call to a dispatcher. Once the dispatcher, using the system of this invention, receives the call he or she acts as a voice to the automated system of this invention, wherein the dispatcher asks for specific information, inputs the responses from the caller into the system. Included in the specific information requested is whether or not the caller is safe and out of danger. A description of what happened leads to a specific set of inquiries. The result of the inquiries is used to define a determinate, which indicates the degree of criticality of the call. The dispatcher then communicates with police response, indicating the type of response required according to the type of call and the determinate value. Post dispatch instructions and guidance are provides as appropriate. Throughout the process of this invention the dispatcher is directed to ask specific questions, in a specific order, gather specific information and dispatch police services based on a specific quantified determinate value. This invention removes the variability of dispatcher inquiries and responses, which have previously led to inefficient and often dangerous police response. By providing a preprogrammed set of inquiries and responses for dispatchers and by calculating a determinate value, which specifies the appropriate response, this invention provides an important improvement in the management of emergency dispatch services, specifically the dispatch of services associated with a police related emergency call.

Accordingly, it is an object of this invention to provide a method and system for managing the dispatch of an emergency police response.

Another object of this invention is to provide a method and system for managing the dispatch of emergency police response wherein inquiries are made in a manner such as to avoid variability in the dispatcher process.

A further object of this invention is to provide a method and system for managing the dispatch of emergency police response wherein a determinate value is defined appropriate based on specific responses from the emergency caller.

A still further object of this invention is to provide a method and system for managing the dispatch of emergency police response wherein a communication to police response is dependent on a determinate value.

It is another object of this invention to provide a method and system for managing the dispatch of emergency police response that provides medically competent consistent post-dispatch instructions to police emergency callers.

A further object of this invention is to provide a method and system for managing the dispatch of emergency police response that is adapted specifically to the requirements of emergency police calls and responses.

Additional objects, advantages, and other novel features of this invention will be set forth in part in the description that follows and in part will become apparent to those skilled in the art upon examination of the following description, drawings and claims or may be learned with the practice of the invention. The objects and advantages of this invention may be realized and attained by means of the instrumentalities and combinations particularly pointed out in the appended claims. Still other objects of the present invention will be become readily apparent to those skilled in the art from the following description wherein there is shown and described the preferred embodiment of this invention, simply by way of illustration of the modes best suited to carry out this invention. As it will be realized, this invention is capable of other different embodiments, and its several details, and specific steps, are capable of modification in various aspects without departing from the invention. Accordingly, the drawings and descriptions should be regarded as illustrative in nature and not as restrictive.

To achieve the foregoing and other objectives, and in accordance with the purposes of the present invention, two separate and independent embodiments of this invention are presented. The first and presently preferred embodiment of this invention is a computerized process, while an alternative preferred embodiment of this invention is a cross-referenced card deck.

BRIEF DESCRIPTION OF DRAWINGS

The accompanying drawings incorporated in and forming a part of the specification, illustrate a preferred embodiment of the present invention. Some, although not all, alternative embodiments are described in the following description. In the drawings.

Figure 1:
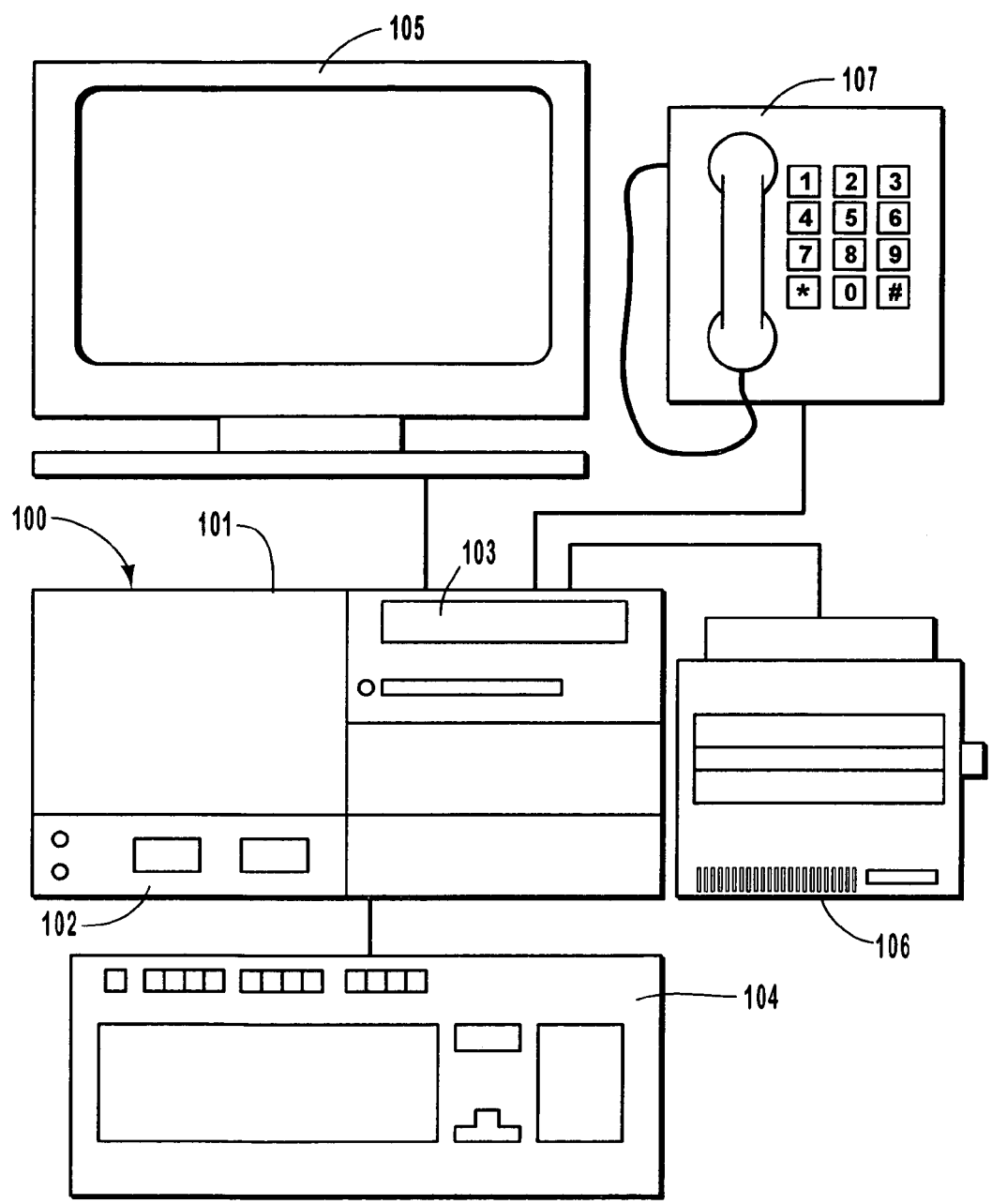
FIG. 1 is a top-level system block diagram of the computerized embodiment of this invention.

Reference will now be made in detail to the present preferred embodiment of the invention, examples of which are illustrated in the accompanying drawings.

DETAILED DESCRIPTION

This invention provides a method, system and apparatus for receiving, processing and communicating police calls from emergency callers and to police response units. This invention enables the assessment of critical or "key" information by trained emergency dispatch personnel. When the invention is properly employed the initial interrogation of the caller will provide critical information, such as the address of the emergency, the phone number called from, the caller's name, incident information, whether the caller is safe and out of danger, what the caller saw or heard, how many people are involved, where and when the incident occurred. This information is immediately put to use in calculating a determinate value, which identifies the criticality of the emergency. The process of this invention provides a consistent, tested method of gathering information, and determining the criticality of the emergency call, in order to maximize the efficiency of dispatched law enforcement units, while minimizing unnecessary high speed maximum response calls. This invention also provides consistent pre-arrival instructions to be given to the caller during or after telephone interrogation. The determinate value is calculated based on the criticality of the call that is the type and duration of the incident, the number people in danger, and other similar information. In the present preferred embodiment of the invention, the determinate value is a combination of a determinate level (Alpha A, Bravo B, Charlie C, Delta D, Echo E and Omega Ω) and a numeric value. Generally, A2 is the least serious while E1 is the most serious call. Depending on the determinate level, the appropriate emergency response is dispatched as indicated by the response protocol. For example, an Alpha-A call will typically be responded to by a next available law enforcement unit using the safest arrival method reasonably possible. While a Delta-D call will typically be responded to by any or all available law enforcement units proceeding under the most urgent method possible. Echo-E calls typically involve likely immediate life threatening situations and will be responded to in the most urgent manner available. Bravo-B and Charlie-C calls are intermediate calls that are typically responded to in business—like orderly manner according to specific department protocol. An Omega-Ω call is generally not specifically responded to, rather is referred to another person or agency. Typically, after the response, law enforcement units, have been sent the dispatcher remains on the telephone with the caller to give pre-arrival instructions. For the purposes of this disclosure, the Echo-E is generally abbreviated as E; Delta-D is generally abbreviated as D; Charlie-C is generally abbreviated as C; Bravo-B is generally abbreviated as B; Alpha-A is generally abbreviated as A; and Omega-Ω is generally abbreviated as Ω. The Generally, the lower numbers within a determinate classification are more urgent than higher numbers. For example, an emergency dispatch call with a determinate value of D1 is generally more critical requiring a more urgent response than a call with a determinate value of D2. However, in some instances, the numeric values within a determinate code serve only to identify the type, rather than criticality of the call. Also, if more than one determinate code can be assigned to a particular call, the more critical or higher determinate code is assigned. That is, the call is assigned a criticality determinate code based on the fact that would lead to the most urgent response. For example, if the call concerns a burglary that occurred over 30 minutes before, but where the suspect remains on the scene or nearby and the caller indicates that he or she is still in danger and feels his or her life is threatened, then the determinate value assigned would be E1 (due to the life threat) rather than D2 (suspect on scene or nearby) or B1 (incident occurred over 30 minutes before).

FIG. 1 shows a top level system block diagram of the preferred computer system 100, which typically is programmed with specially designed computer software incorporating the process of this invention and which essentially converts the computer system hardware 100 into the special purpose machine used in the computerized embodiment of this invention. A processing unit 101 is provided to execute the steps of the software embodiment of the process of this invention and to thereby generate the prompts for information in the preferred order, receive the corresponding information, set the appropriate determinate value based on the received information, display the appropriate dispatch response and the corresponding pre-arrival instructions. The present preferred processing unit 101 is a standard Intel or Intel compatible microprocessor with the standard interface and control circuitry as is typically provided in a standard, moderately high performance desktop computer. A power supply 102, which typically and preferably includes surge protection and an uninterruptible power source, provides required electrical power to operate the computer system 100. Generally, the power supply 102 receives its electrical power connection from a standard AC wall outlet. A storage device 103 is provided in electronic communication with the processing unit 101 to store the program and data, as well as the computer operating system and utilities. The typical presently preferred storage device includes one or more of the following: one or more computer hard disk drive units; one or more removable disk units; a tape drive unit; an optical drive unit; and semiconductor memory. An input device 104, in communication with the processing unit 101 is provided to permit the user to input information and/or to respond to queries from the software embodiment of the process of this invention. Typically input devices 104 include a keyboard, mouse, trackball, touch sensitive pad and/or voice recognition equipment. An output device 106 in communication with the processing unit 101 may also be used to provide hard copy (paper) records and reports. A display unit 105 in communication with the processing unit 101 is provided to give the user instruction, queries and to prompt for information. A telephone device 107, which may be in communication with the processing unit 101 to track phone calls and to look up addresses from caller ID information, provides a communication channel between the emergency caller and the dispatcher. For the purposes of this disclosure, a telephone device or telephone equipment shall be defined to be an electronic communication device capable of transmitting information between two or more locations and employing wired and/or wireless communication channels and includes but is not limited to standard wired telephones, radios and computer devices. Optionally, it is envisioned that this invention will operate on a computers 100 which are networked together and using a telephone device 107 that is part of a telephone switchboard system.

Figure 2:
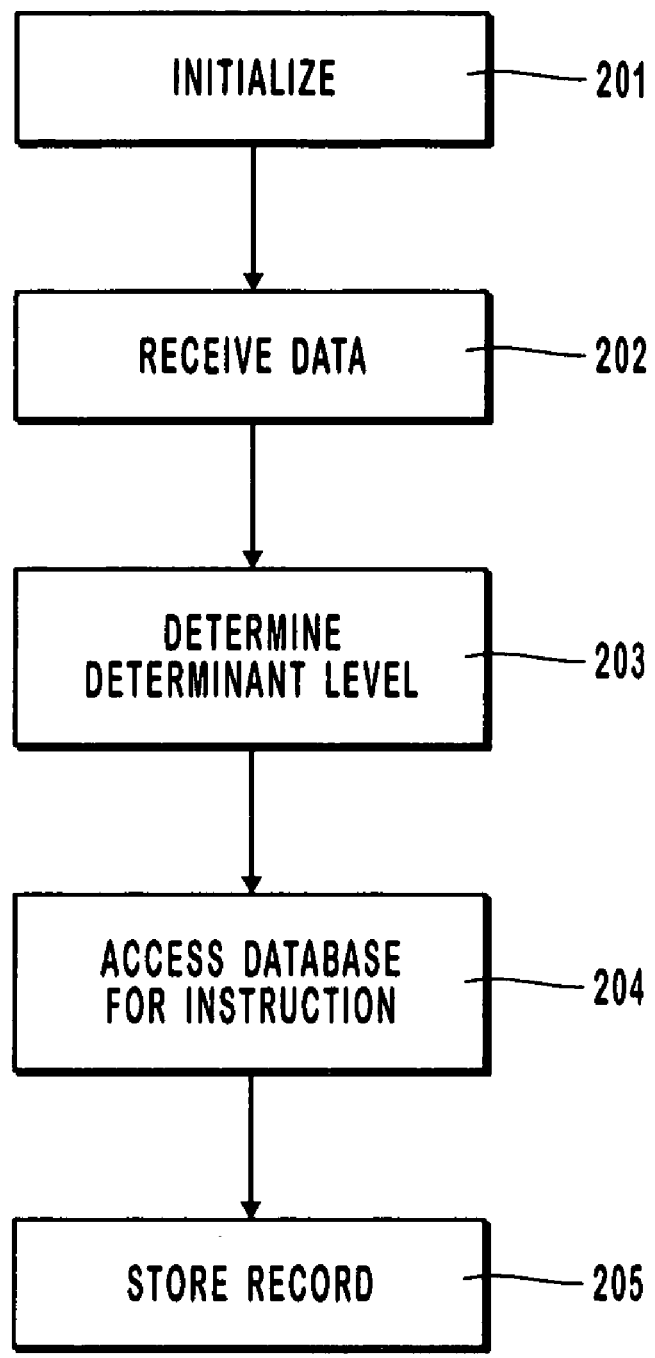
FIG. 2 is a top-level flow chart of the preferred embodiment of this invention.

FIG. 2 shows a top-level flow chart of the preferred embodiment of this invention. The process is first initialized 201. This initialization step includes starting up the software program embodiment of the process of this invention, collecting information regarding the current deployment of law enforcement units and other dispatcher relevant information. A call is received 202 using telephone equipment 107 from a caller requesting emergency police assistance or providing information to the dispatcher. This data is entered into the computer system 101 for use by the computer software process of this invention. The process then assigns the appropriate determinate level 203 for use in assessing the criticality of the emergency police dispatch call. A database is accessed 204 for instruction information, which the dispatcher uses to provide information to the caller. The record of the call is stored 205 to the computer storage device 103, and may then be used to produce reports and to provide quality review of dispatchers and the dispatch process.

Throughout the process of the various parts of this invention it is typical to request and obtain information regarding the description of weapons, people and vehicles. Generally the following information is relevant to these descriptions. For weapons, whether the weapon is a gun, and if so the particular type such as pistol, rifle, shotgun and/or any other distinguishing features like caliber, automatic/semi-automatic/single shot and the like. If the weapon is a knife, whether it is a long knife or a short knife and any other distinguishing features like whether it has a scabbard, is a folding knife and/or is easily concealable. If the weapon is a club, what type of club is it, for example a bat or a tire iron. If the weapon is some other device, like glass or a bottle or automobile that is being used as a weapon a detailed description of the device is desired. If the weapon is an explosive or flammable device, such as a bomb or other incendiary device, the best description, including whether it is on a timer, has a contact detonator, or is unknown and merely suspicious is desired. The preferred description of a person includes as much of the following information as is available: name; race; gender; age or date of birth; build; height; weight; hair color; eye color; other identifying characteristics including facial hair, accent, tattoos, earrings, and scars; complexion; and clothing including: hat, coat, skirt, pants, shirt, shoes, jewelry. The preferred description of a vehicle includes: the color, year, make, model, body style, license number, state of license, and any other additional information such as damage, tire type, fluid leakage and the like that is available.

Figure 3A:
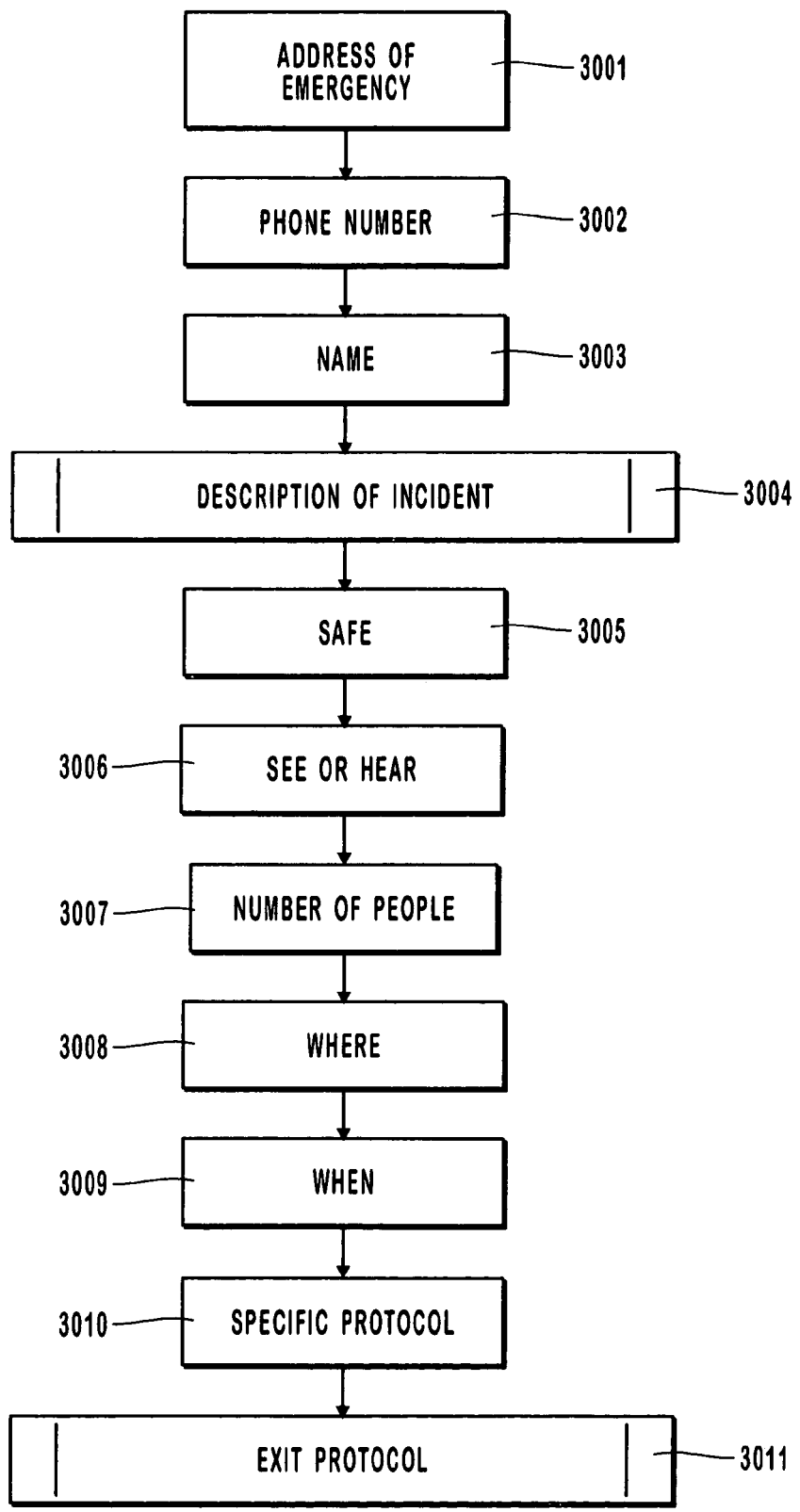
FIGS. 3a to 3 an are detailed flow charts of the detailed preferred steps of this invention.
Figure 3C:
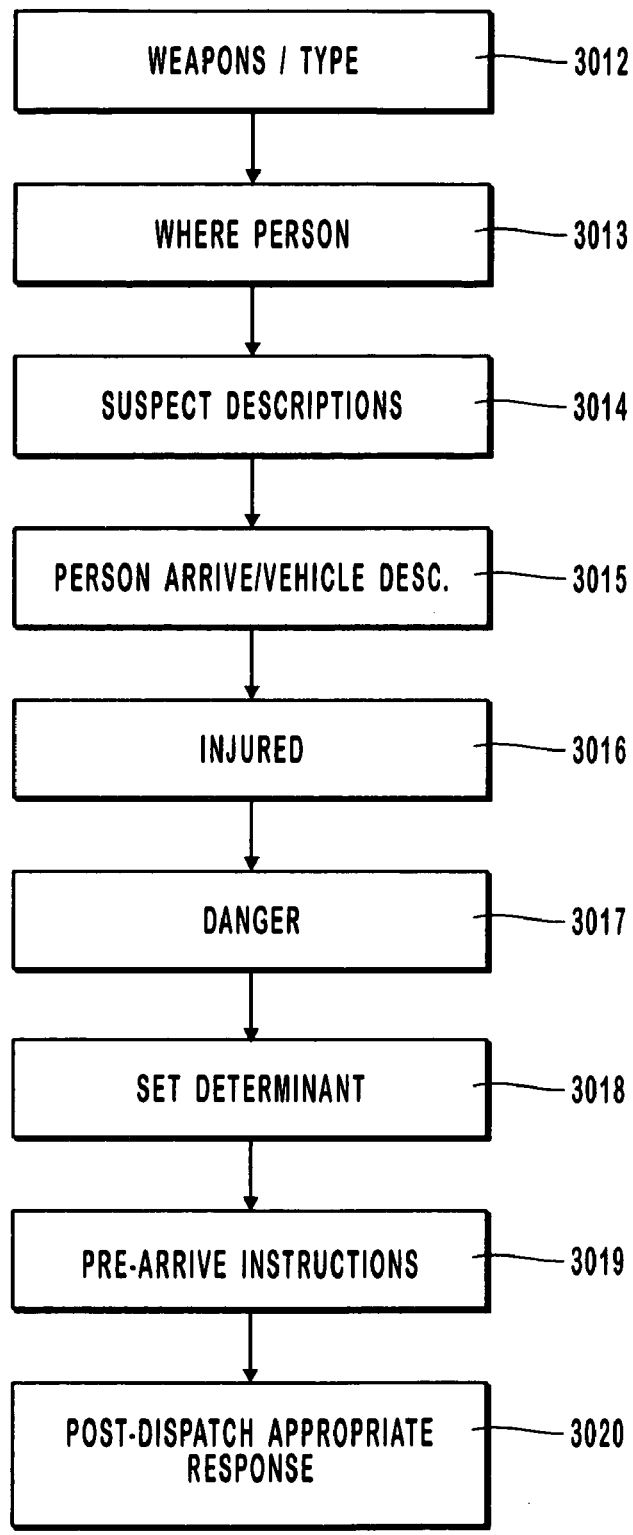
Figure 3D:
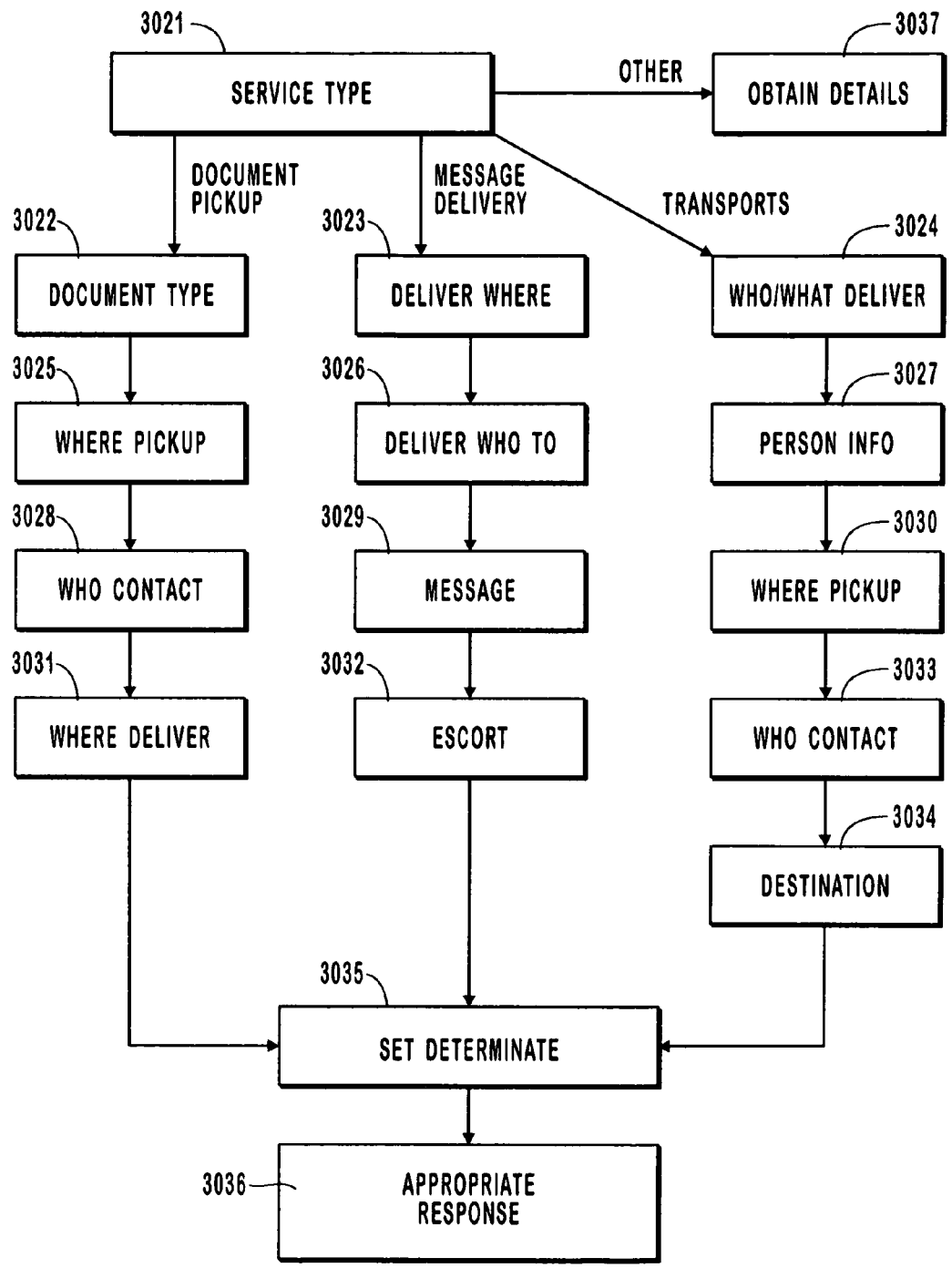
Figure 3E:
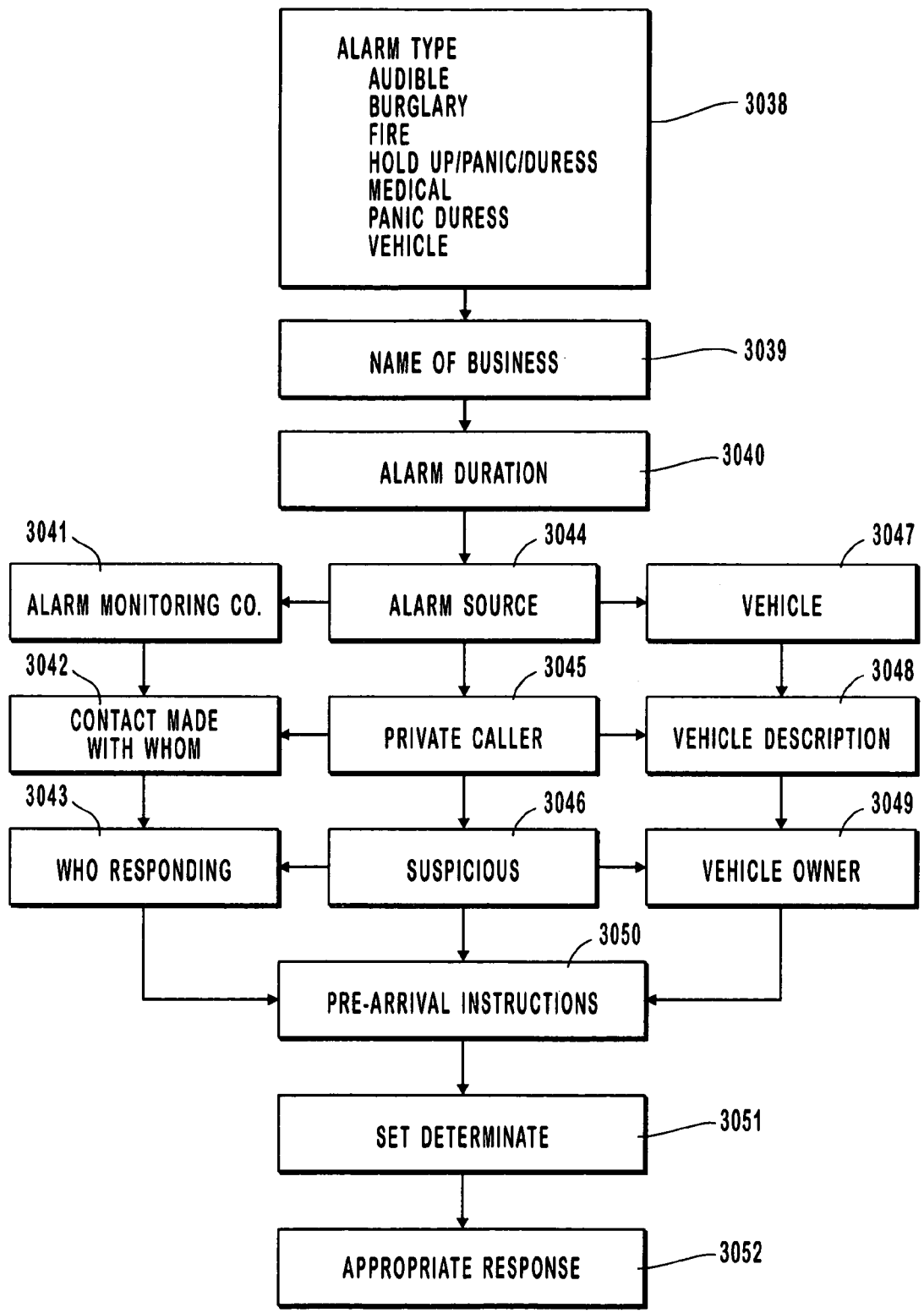
Figure 3F:
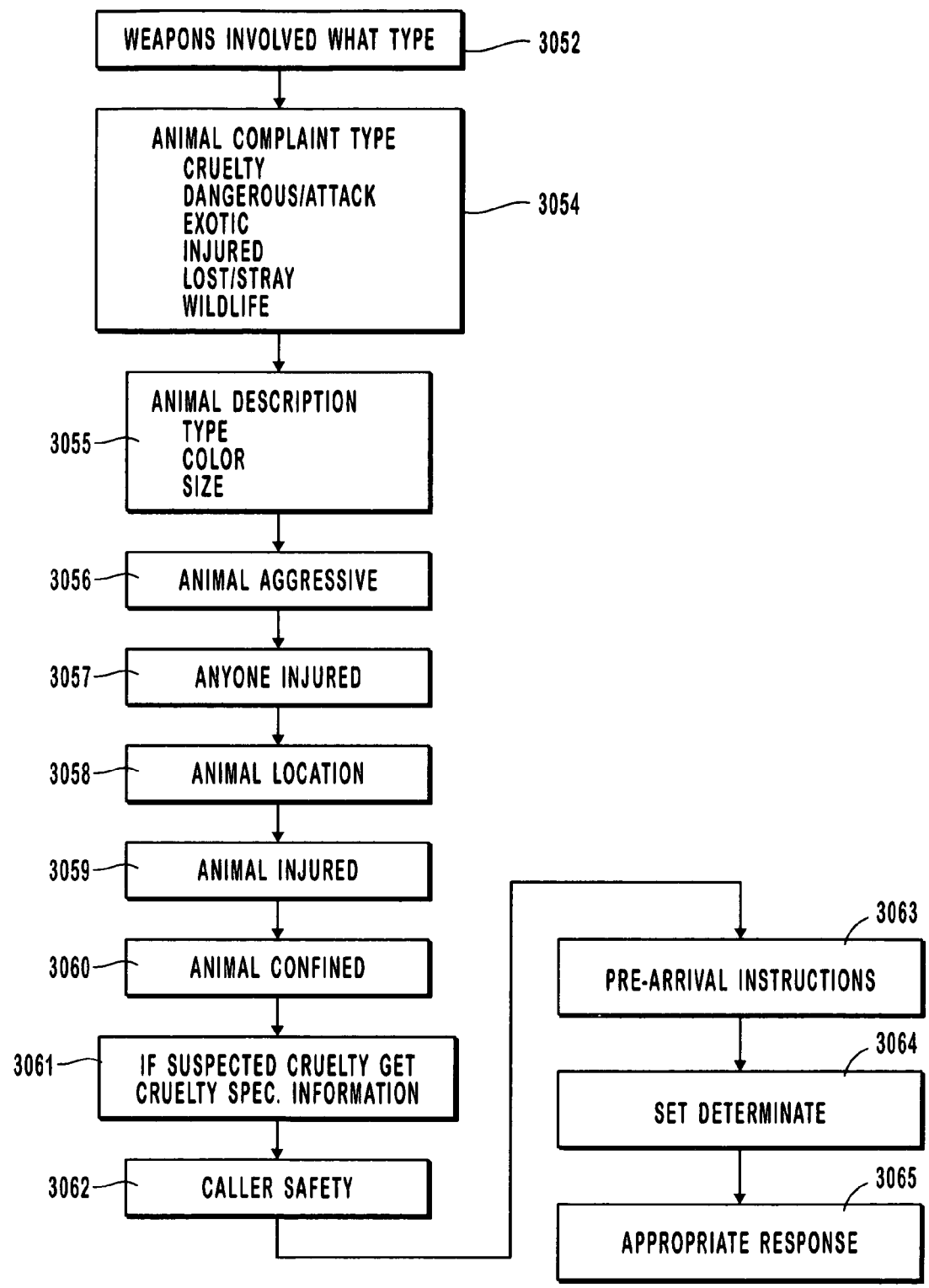
Figure 3G:
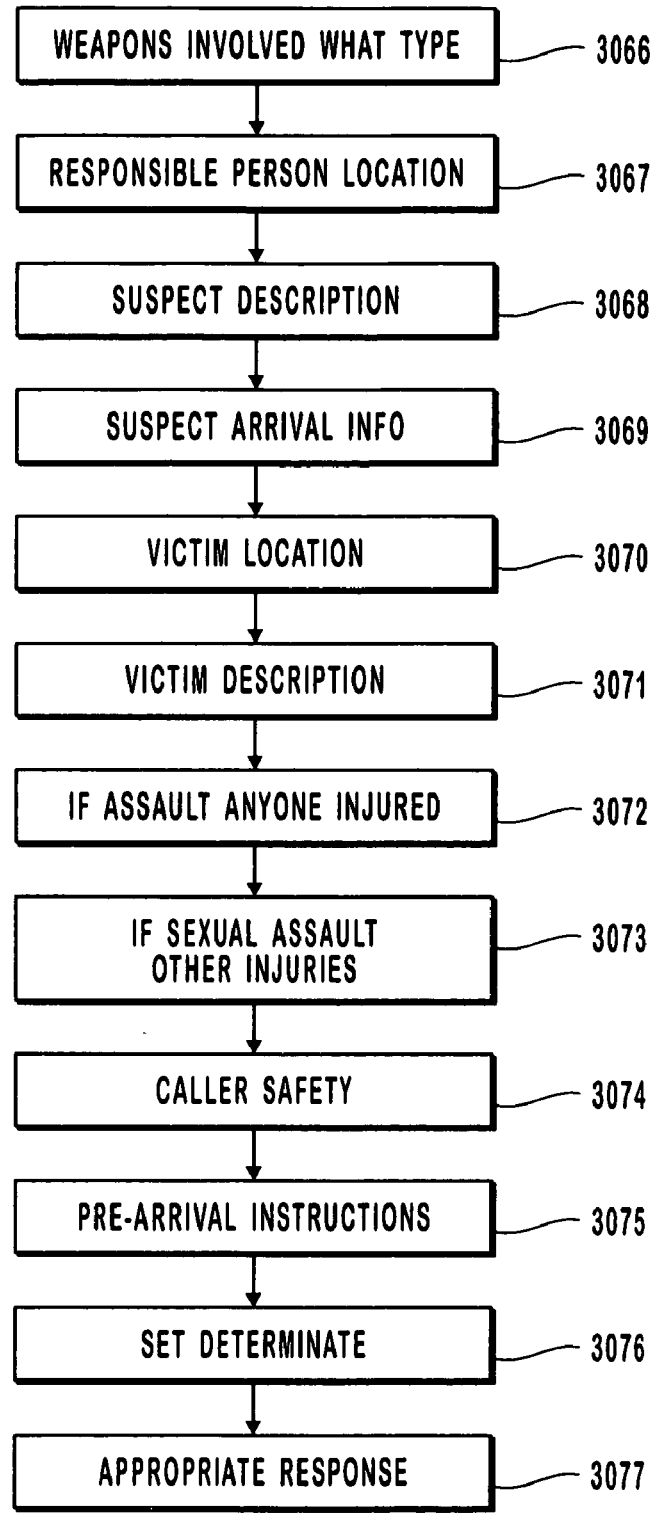
Figure 3H:
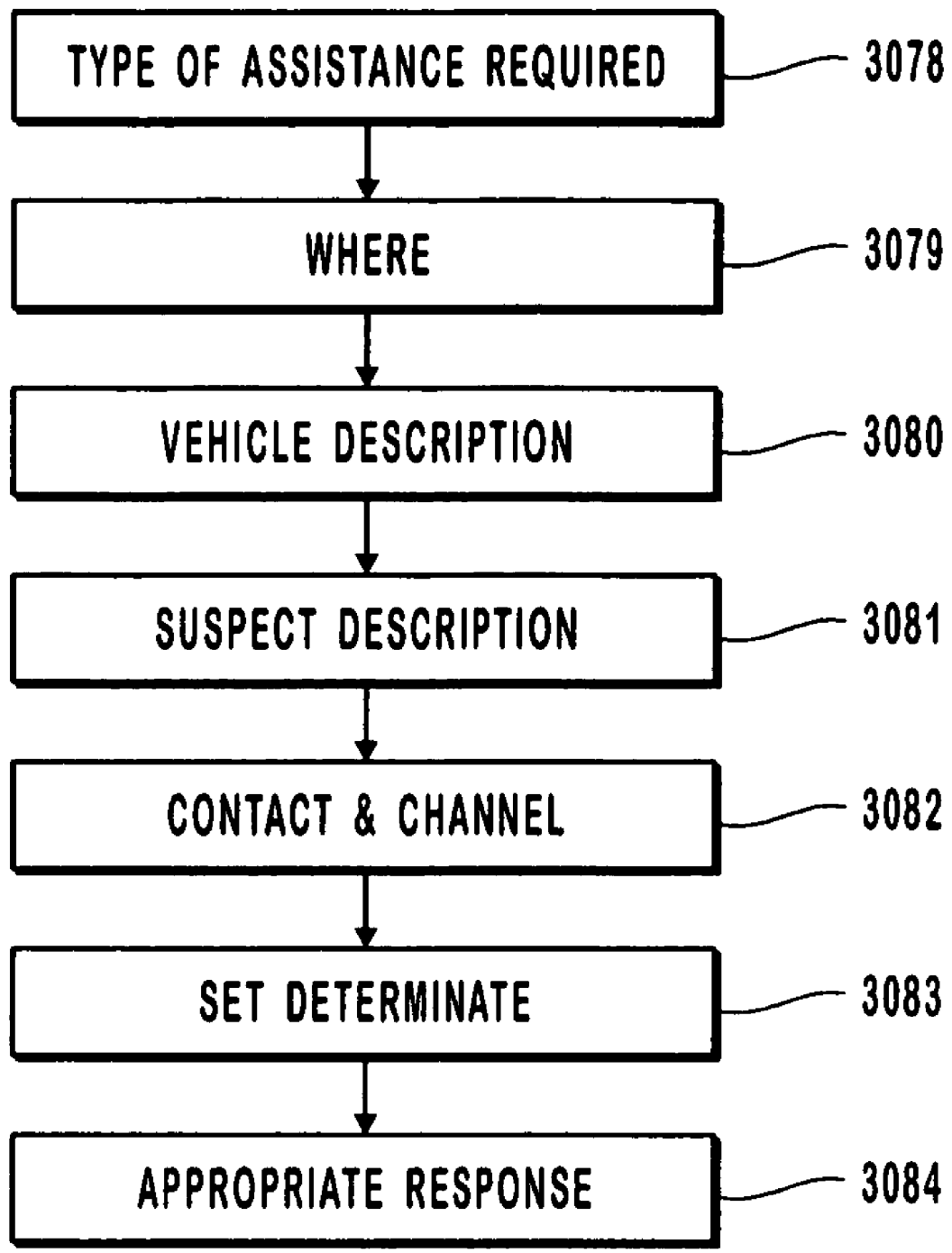
Figure 31:
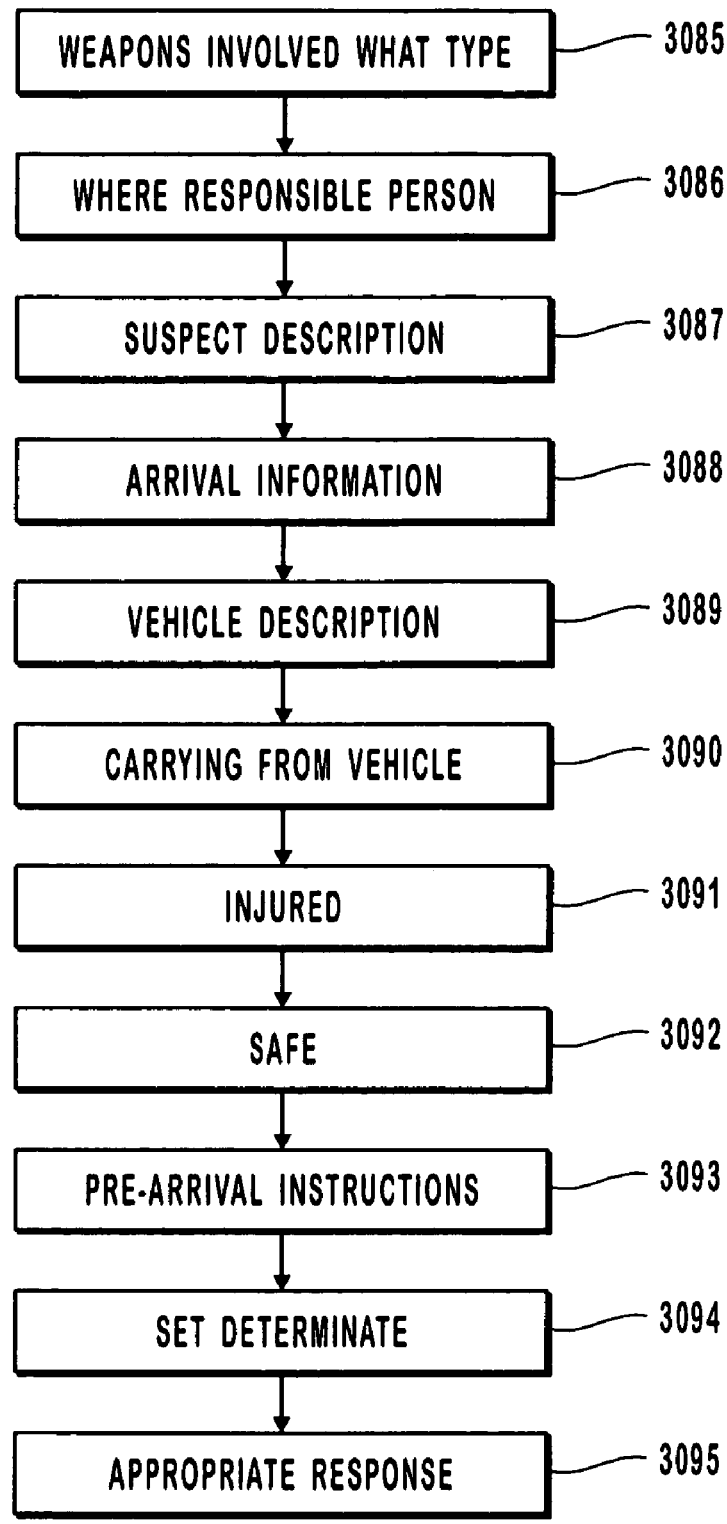
Figure 3J:
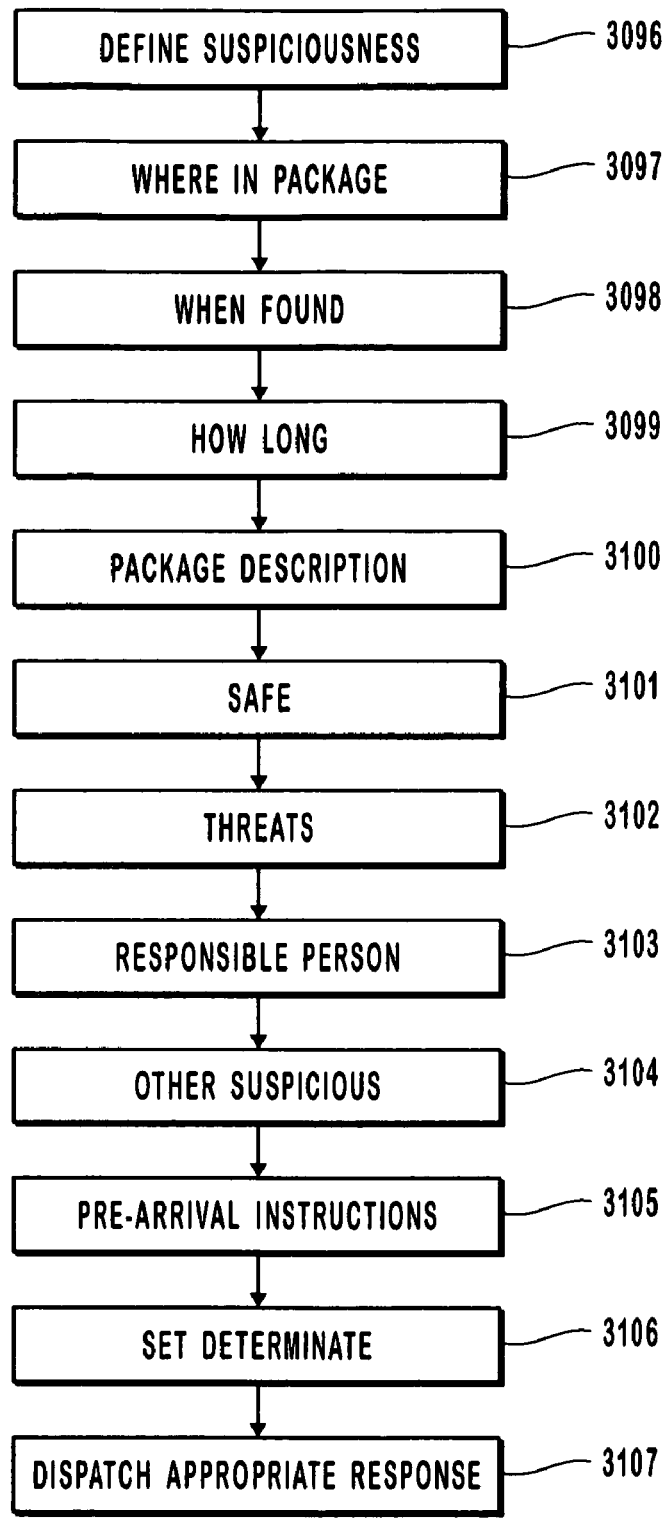
Figure 3K:
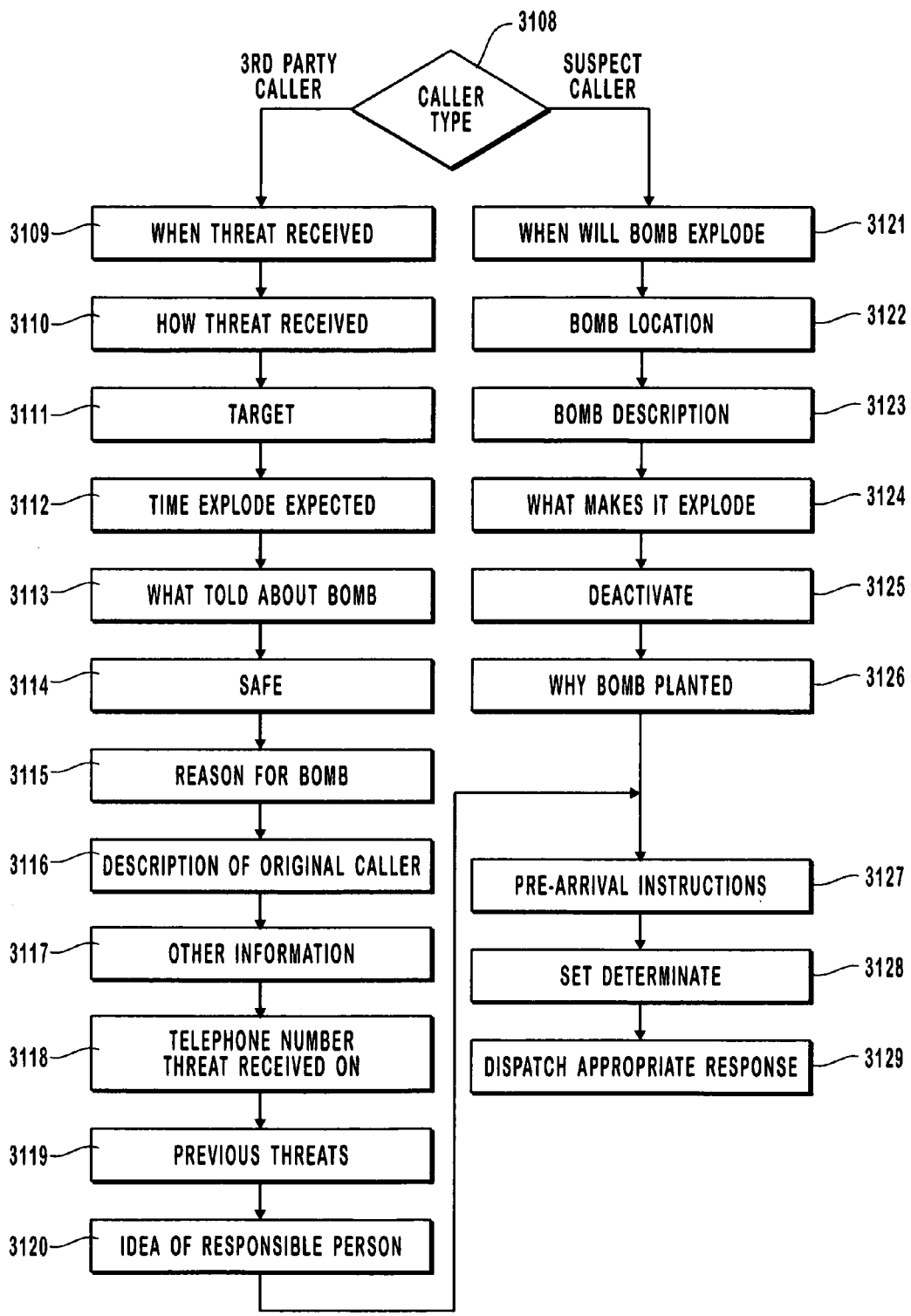
Figure 3L:
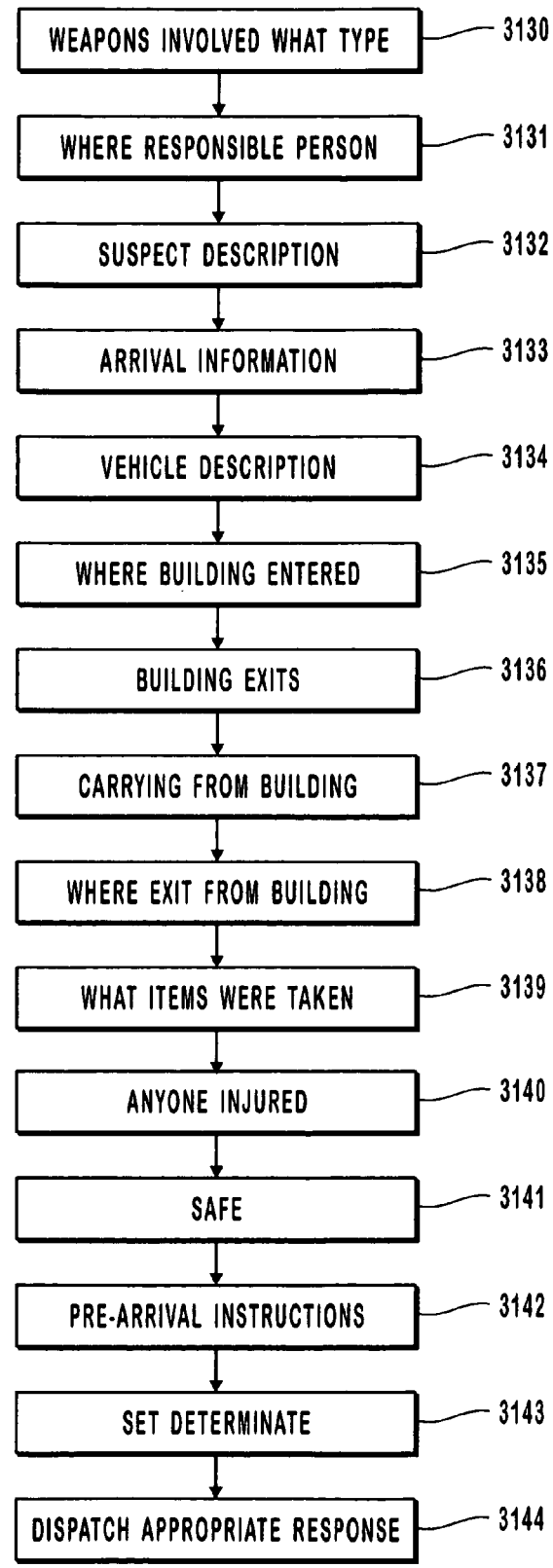
Figure 3M:
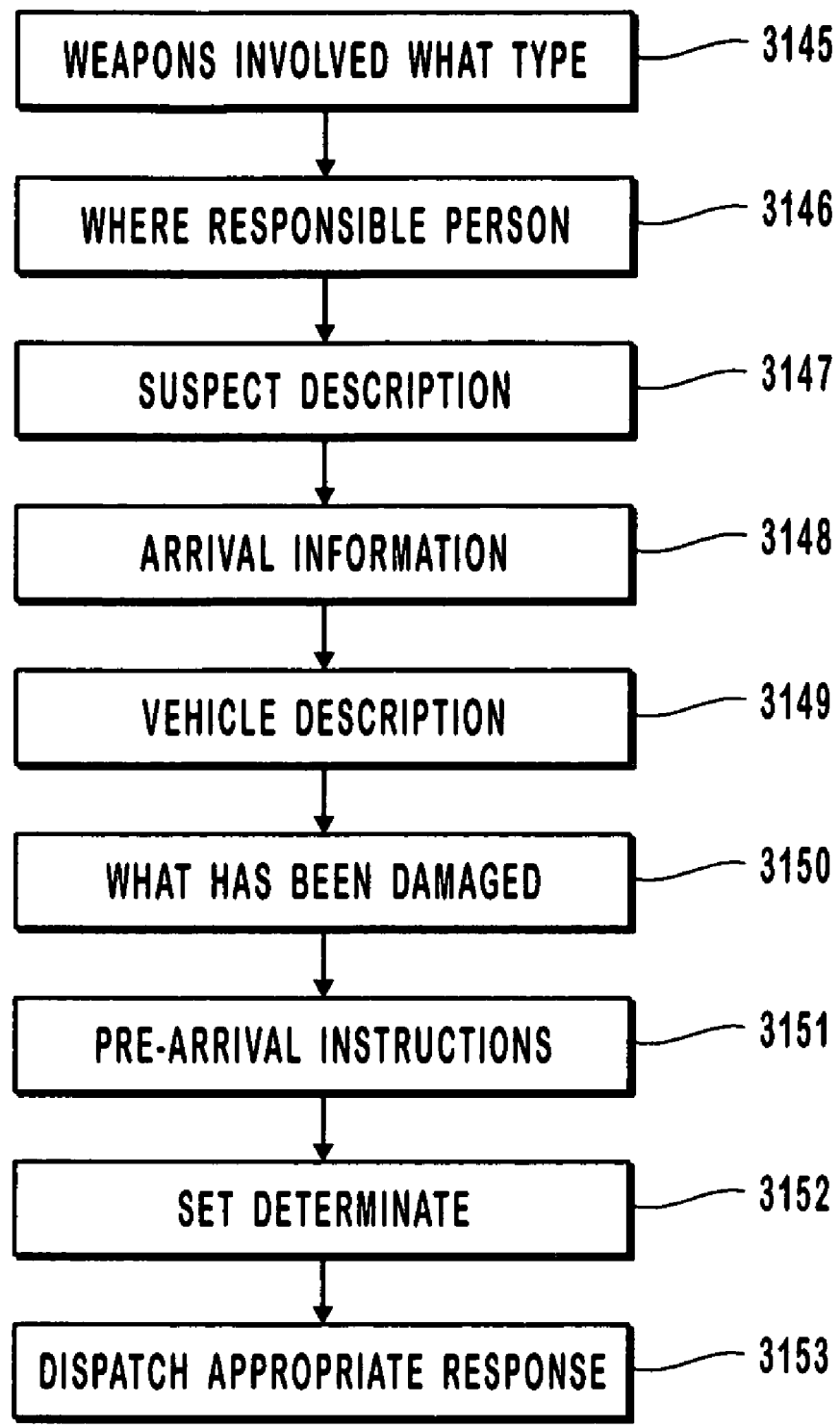
Figure 3N:
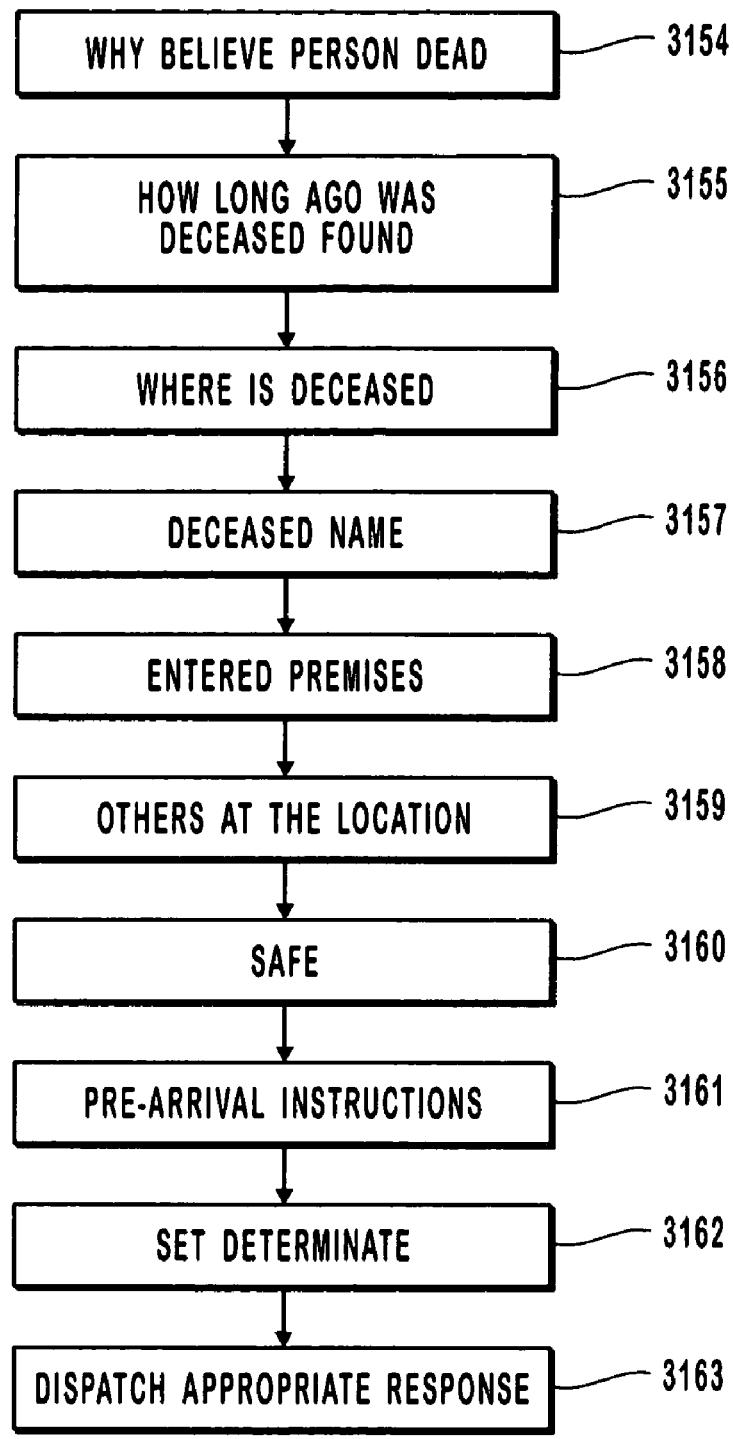
Figure 30:
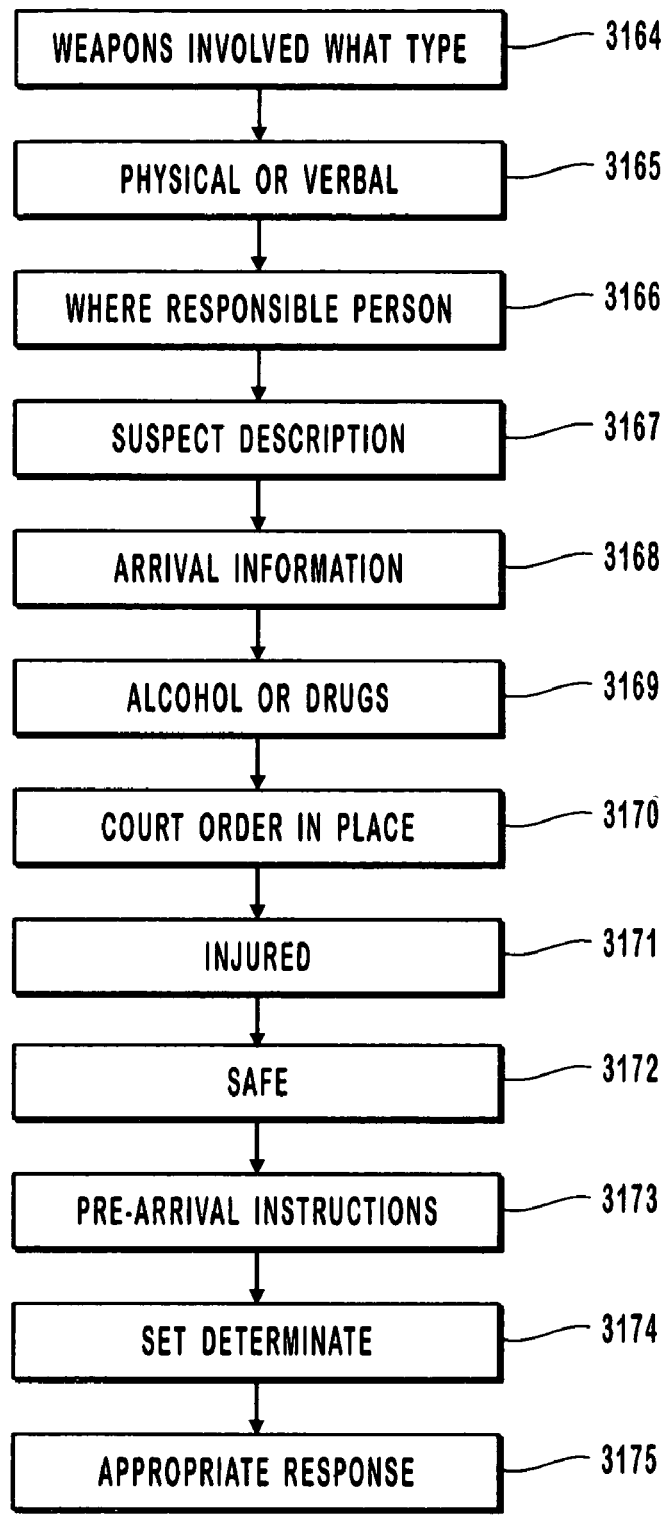
Figure 3P:
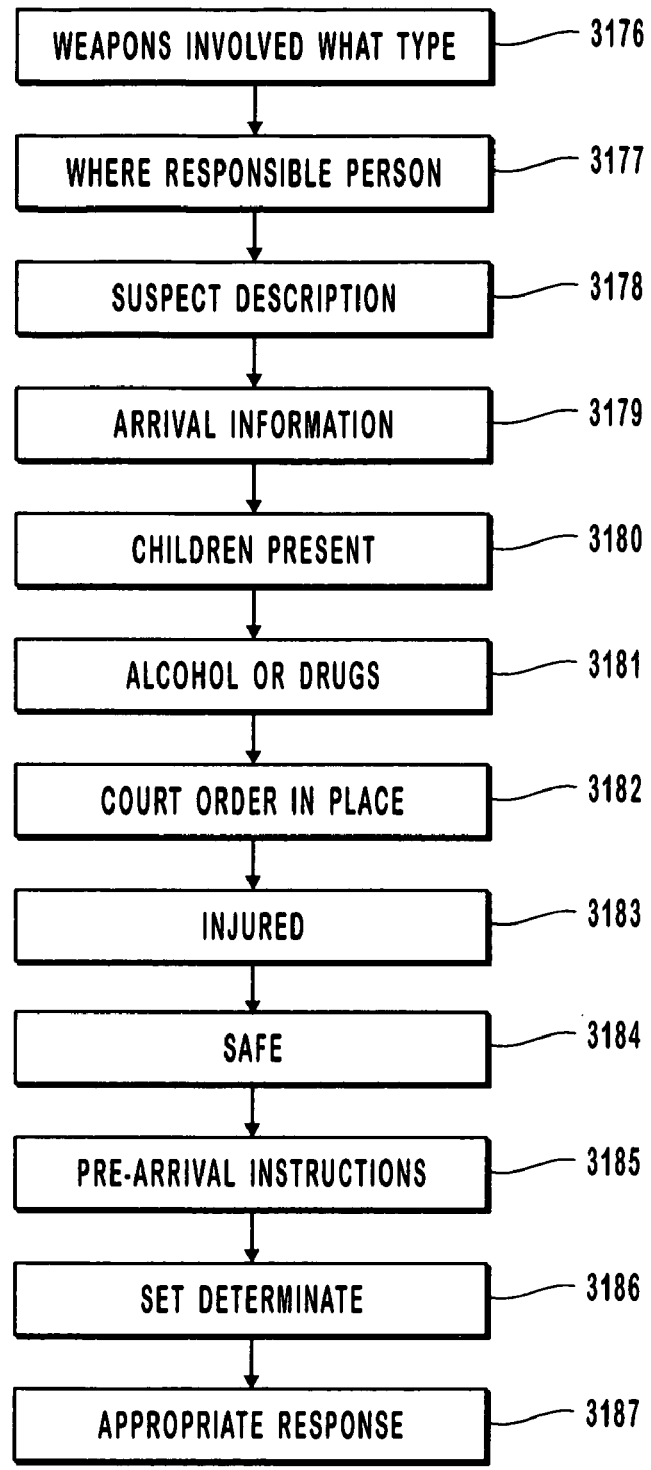
Figure 3Q:
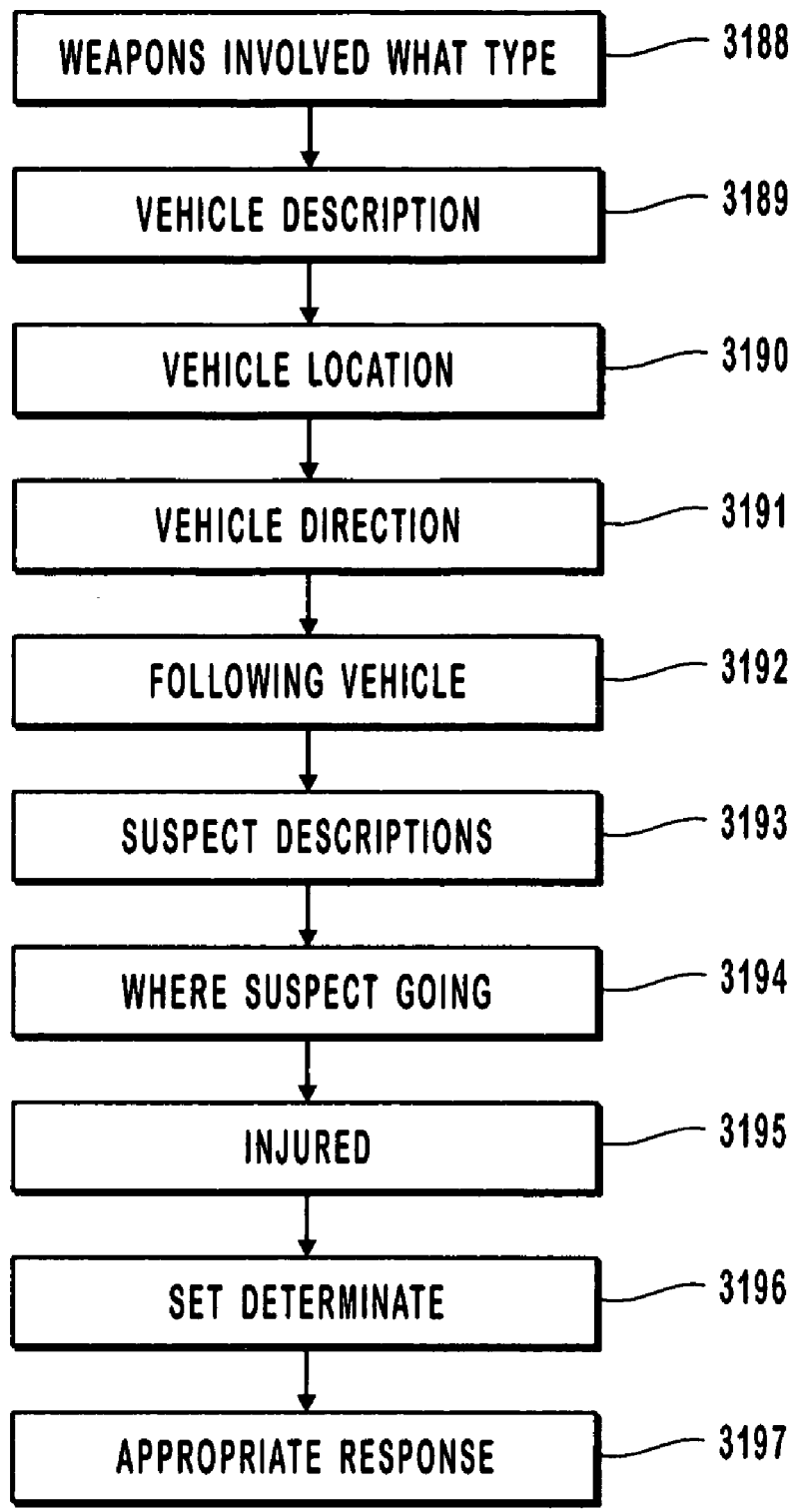
Figure 3R:
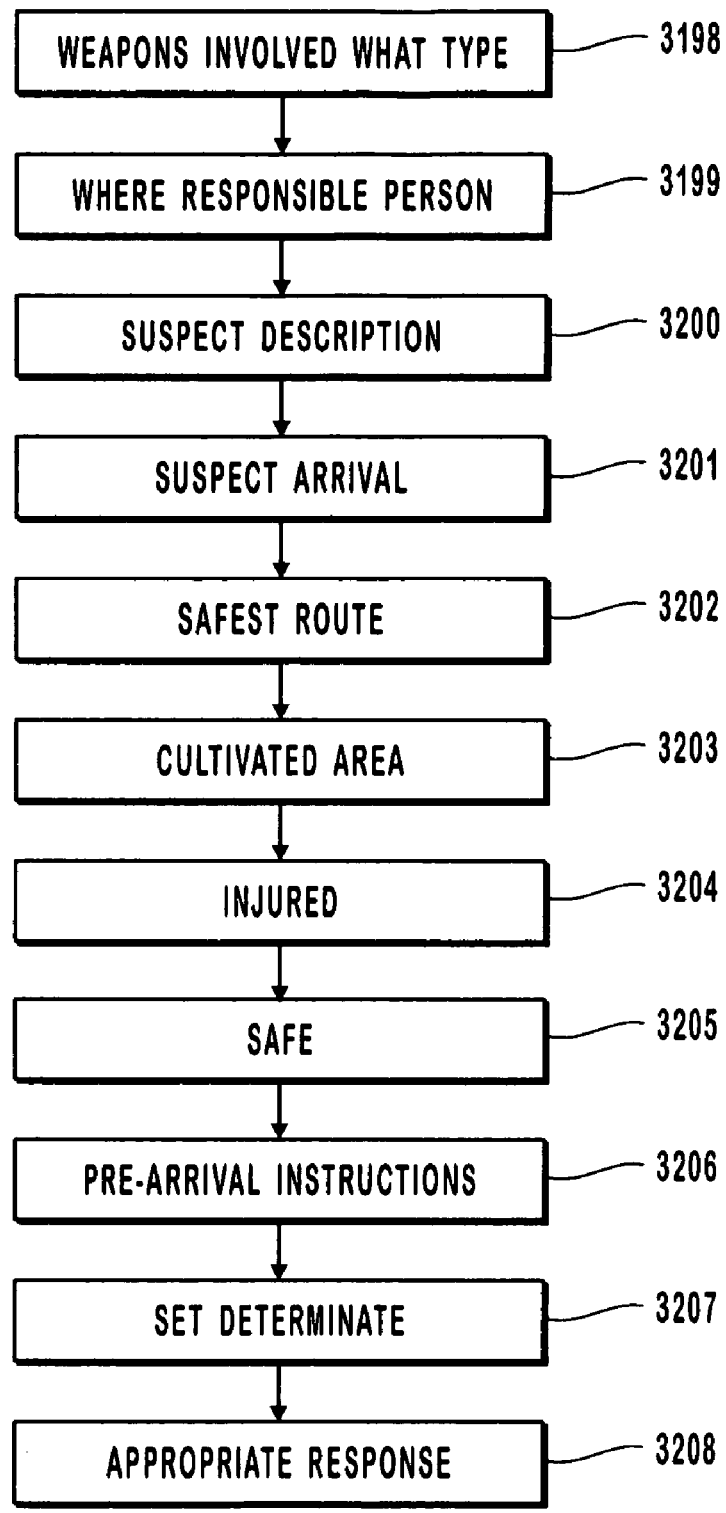
Figure 3S:
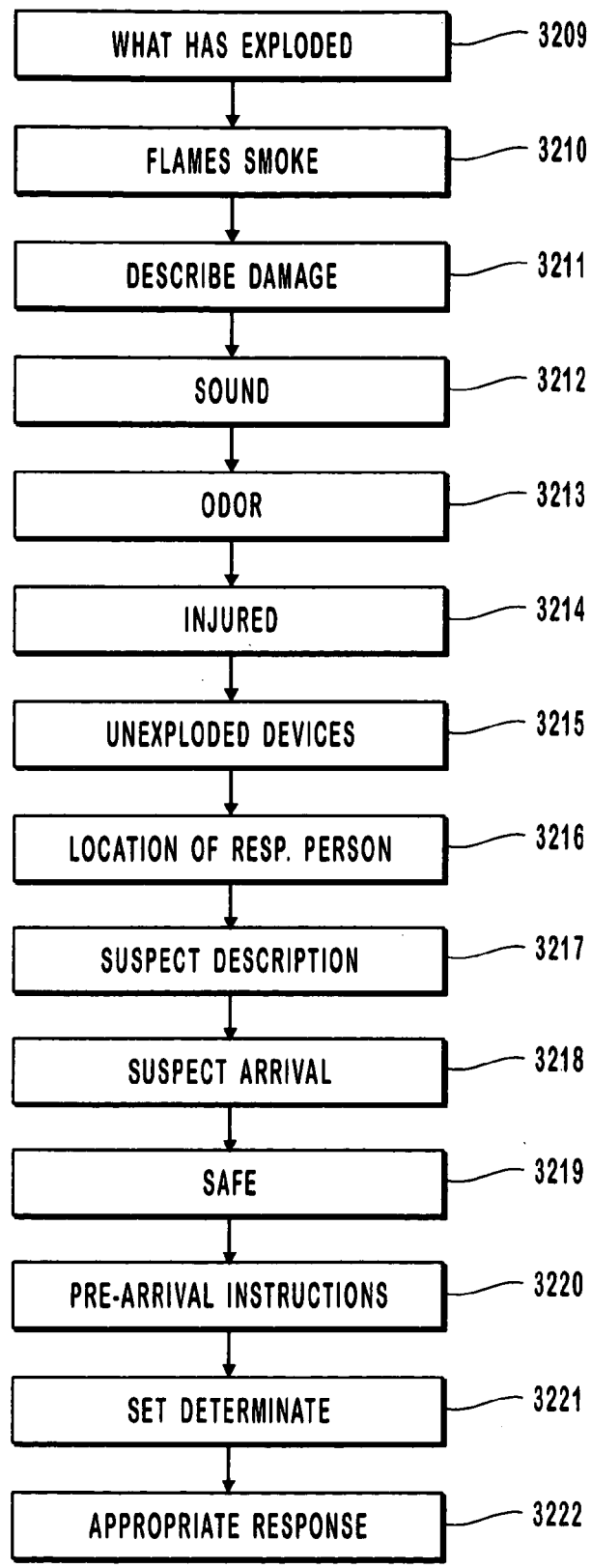
Figure 3T:
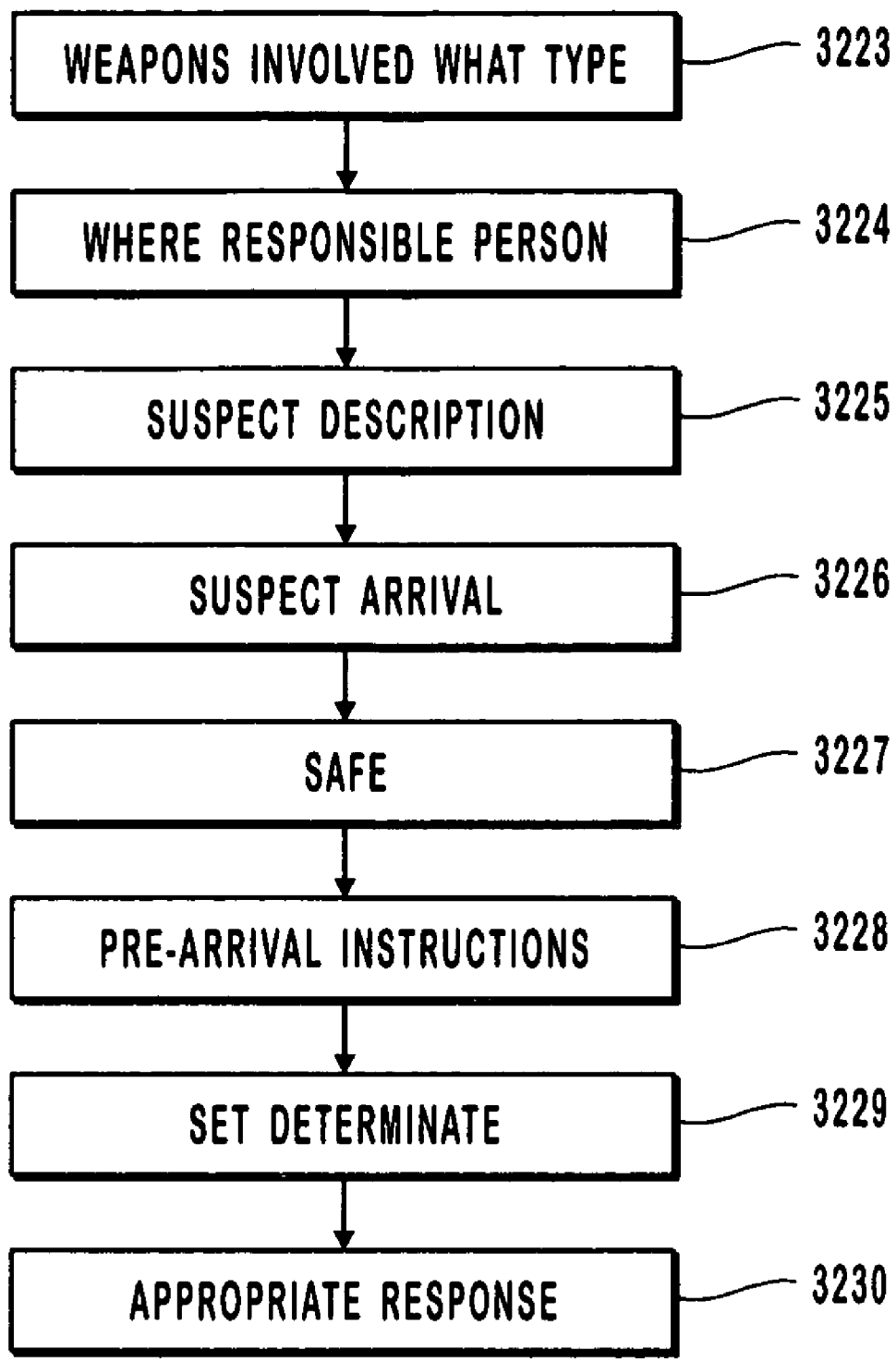
Figure 3U:
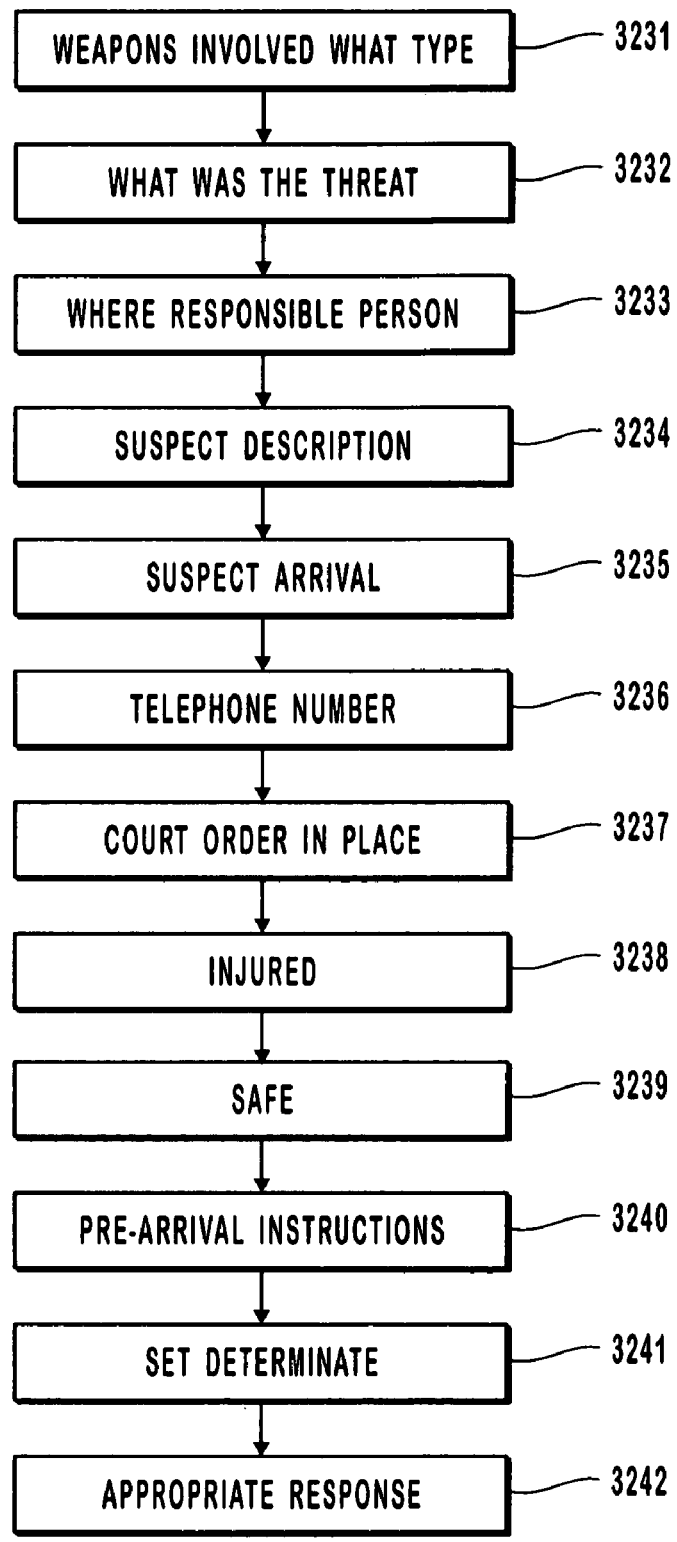
Figure 3V:
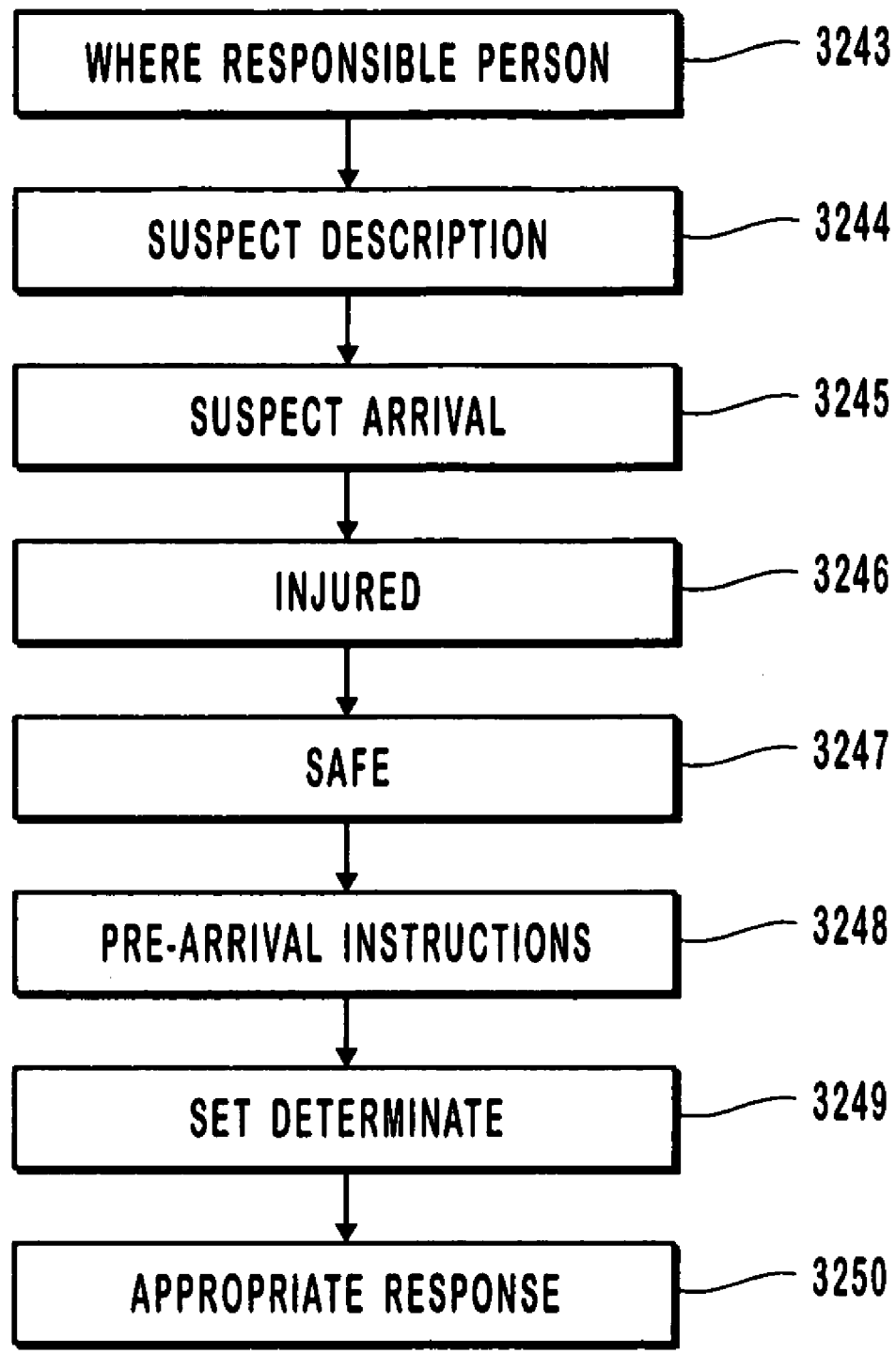
Figure 3W:
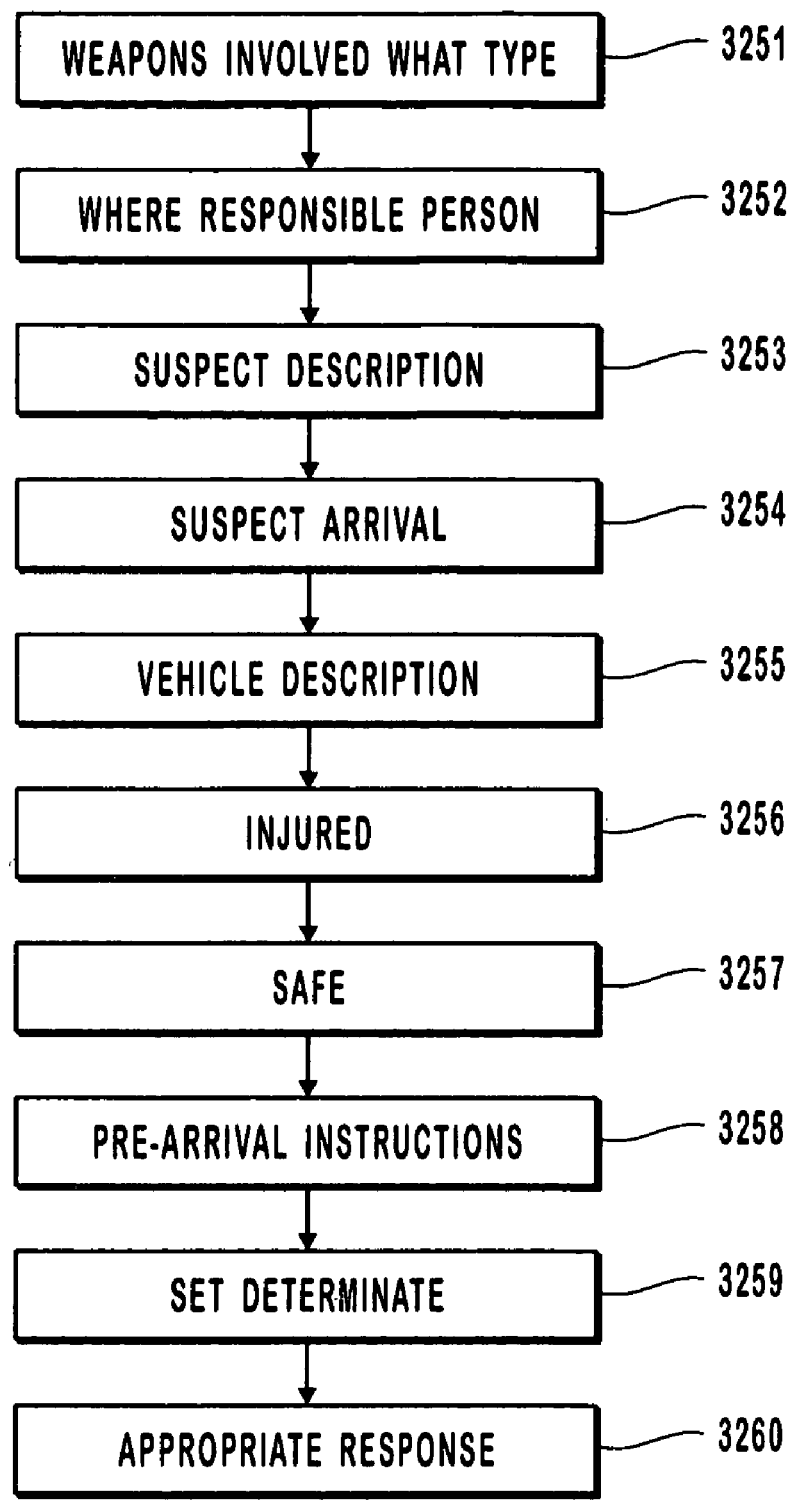
Figure 3X:
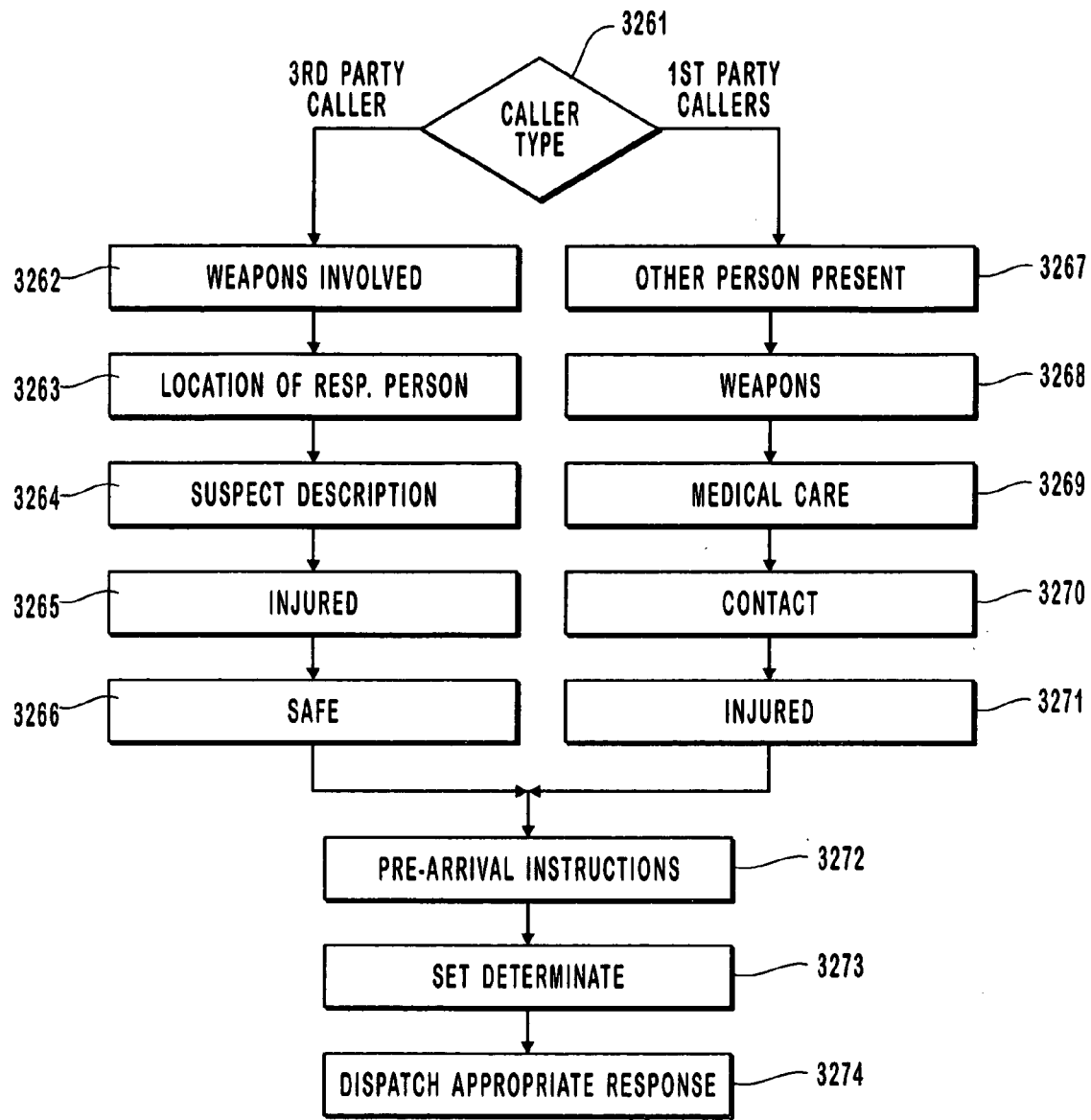
Figure 3Y:
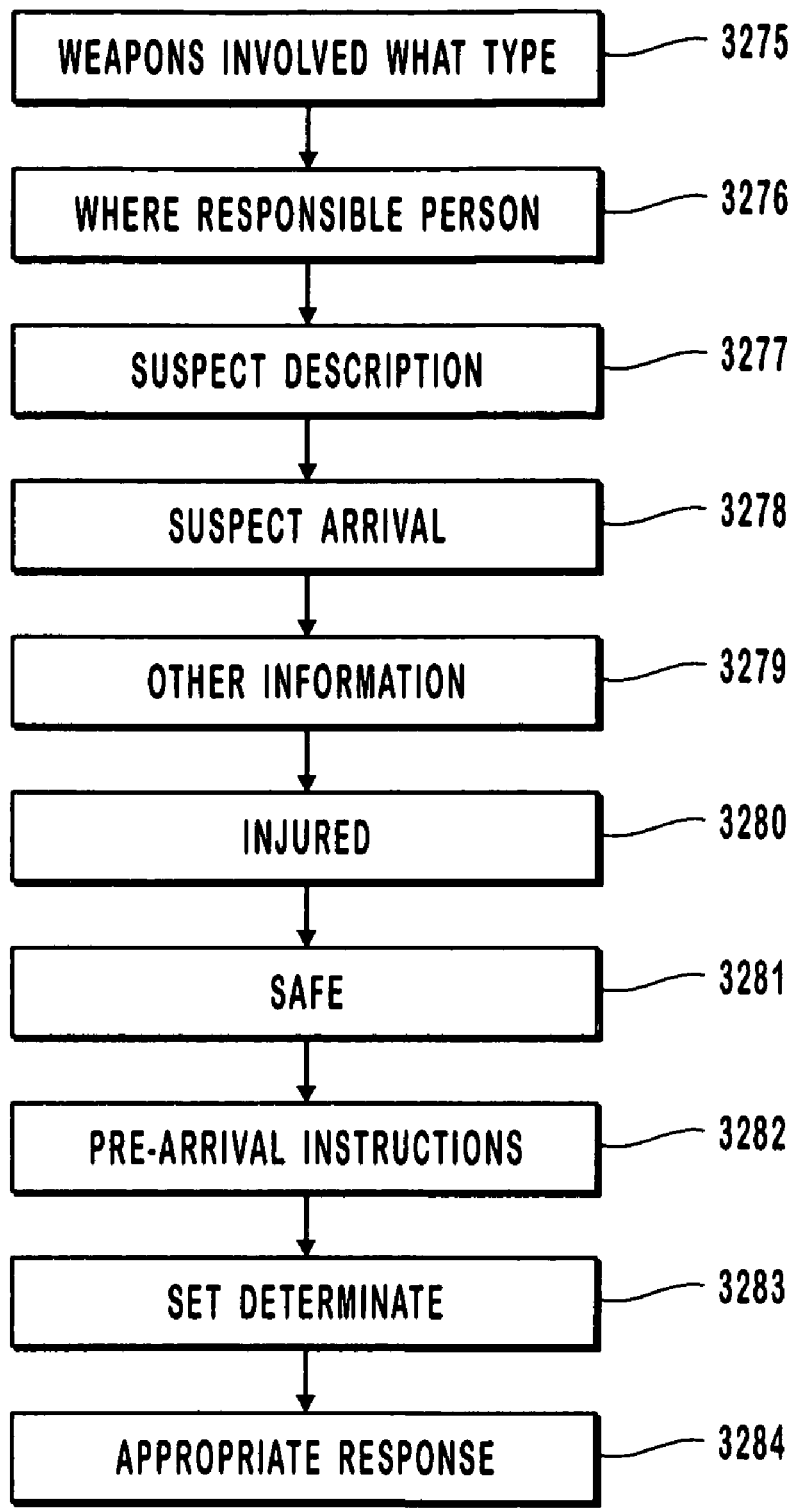
Figure 3Z:
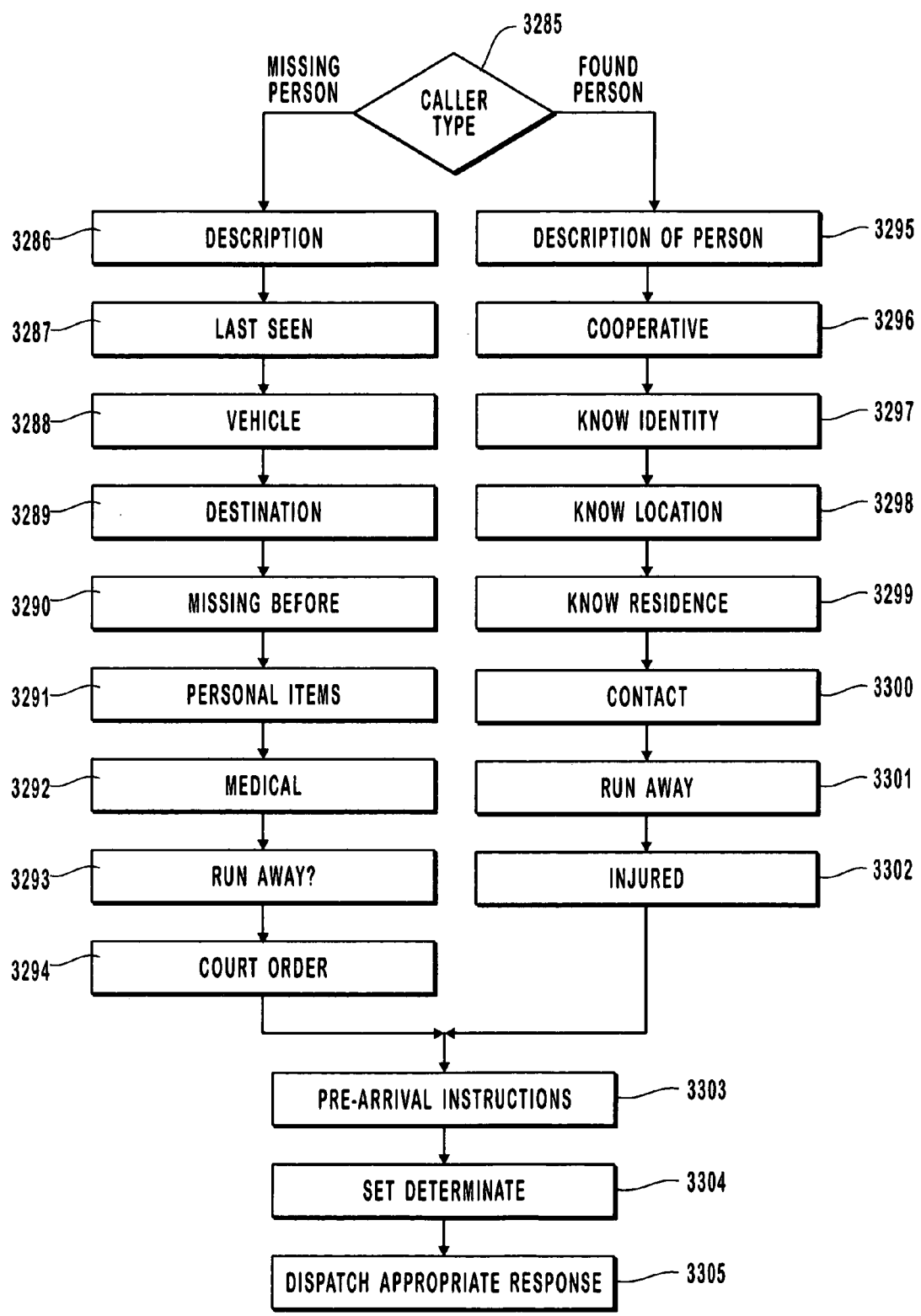
Figure 3A:
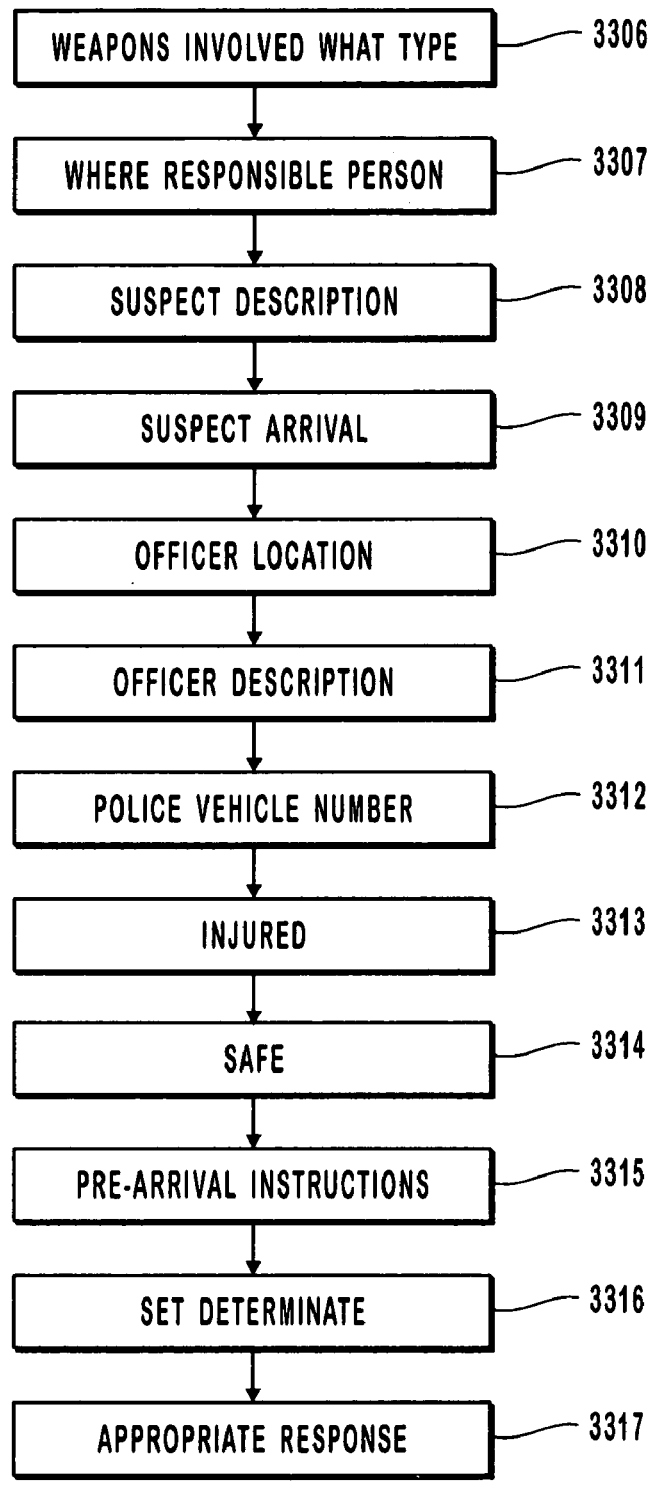
Figure 3A:
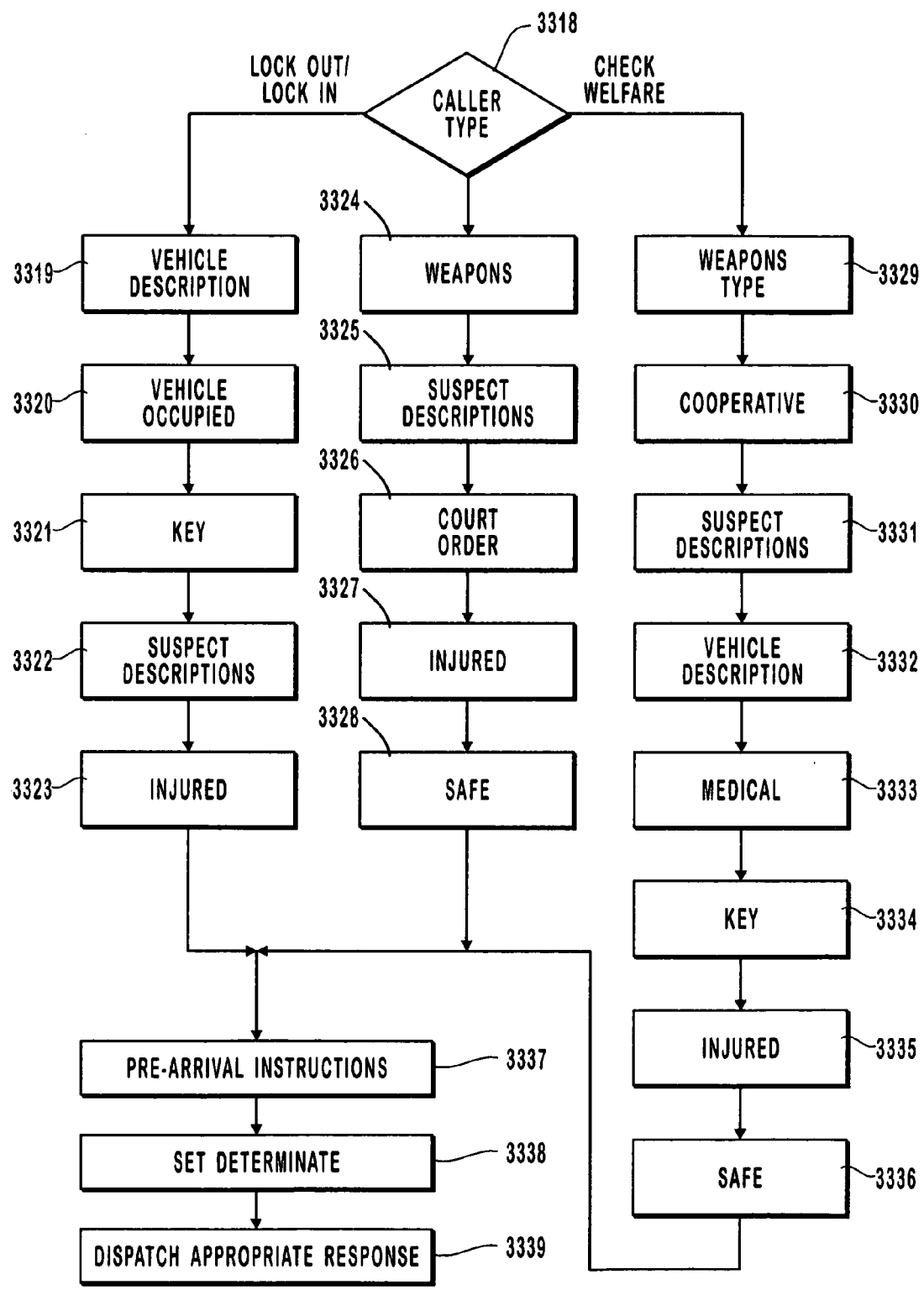
Figure 3A:
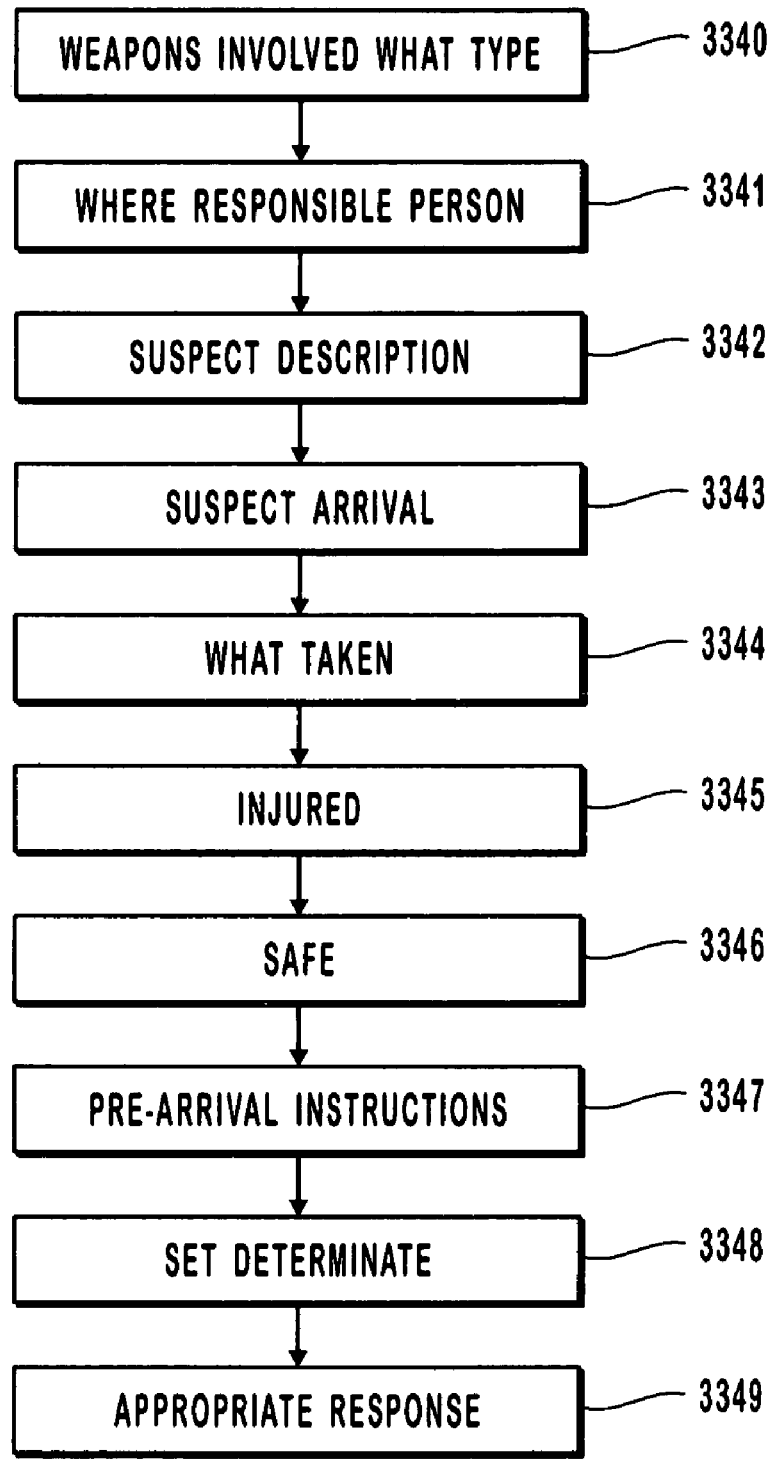
Figure 3A:
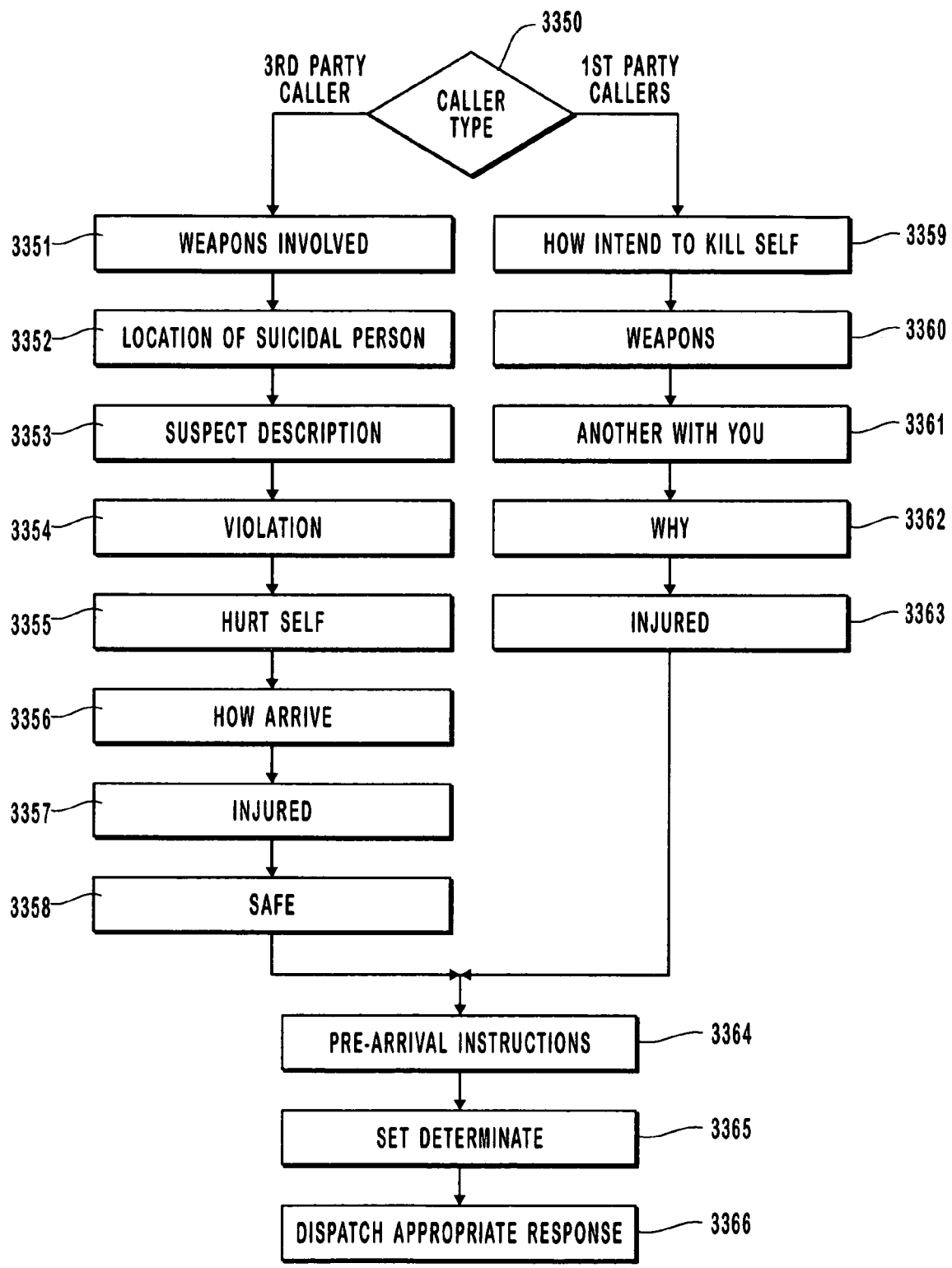
Figure 3A:
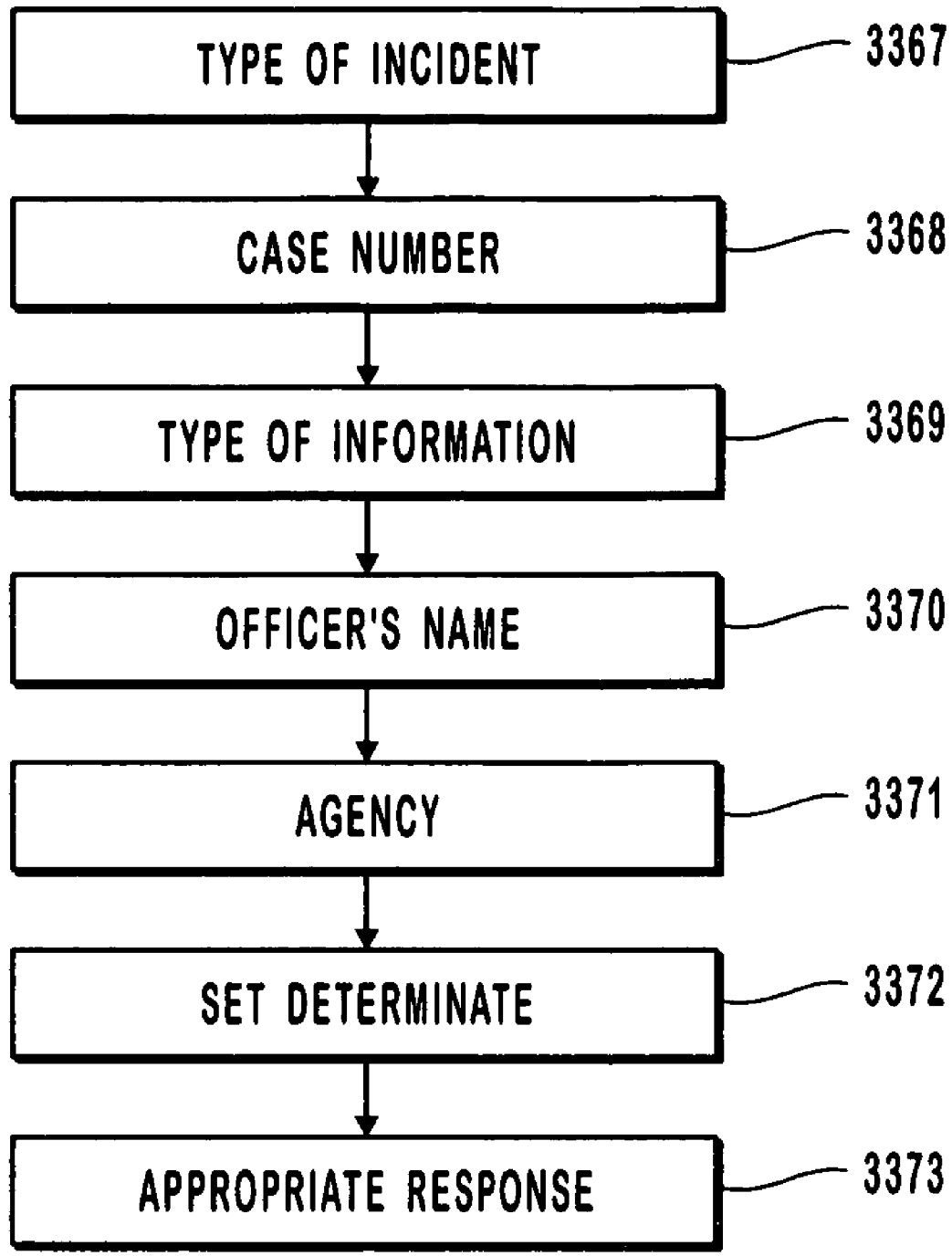
Figure 3A:
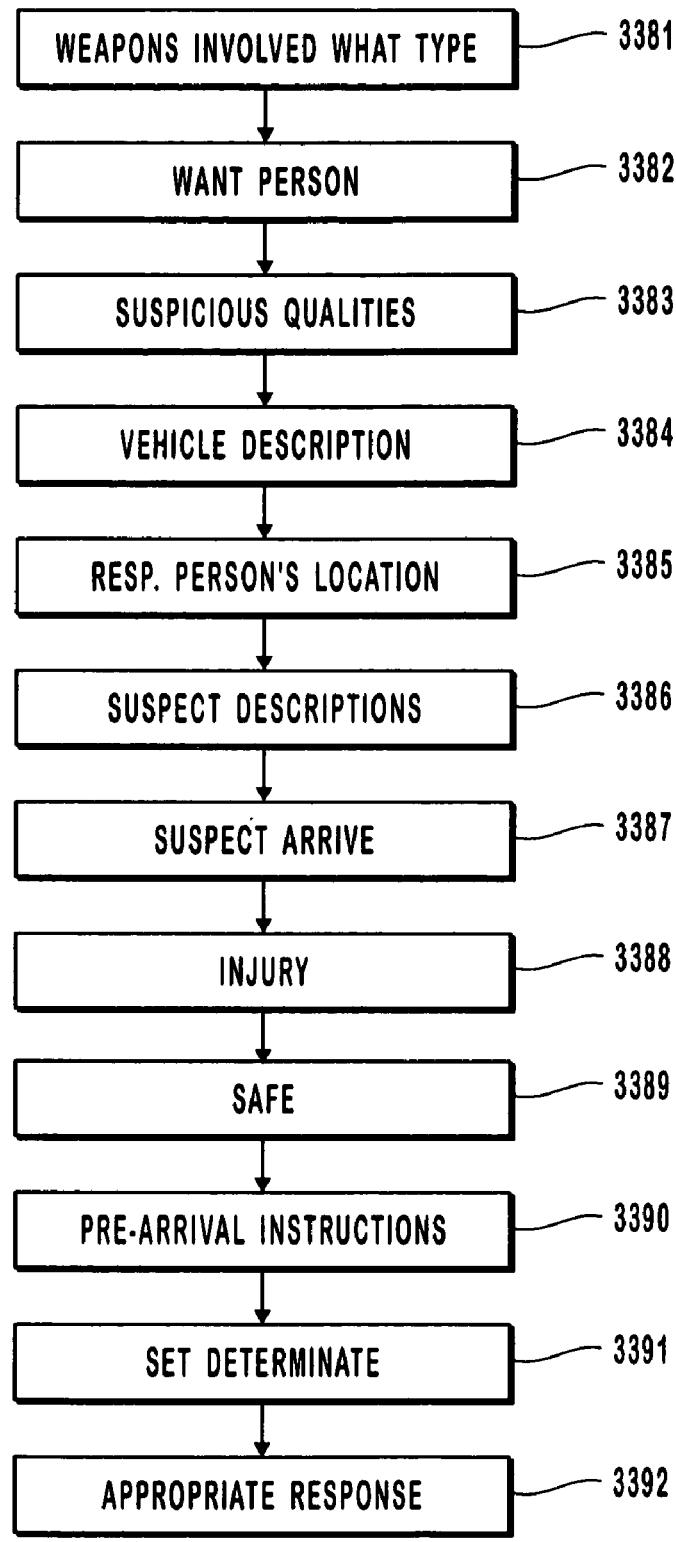
Figure 3A:
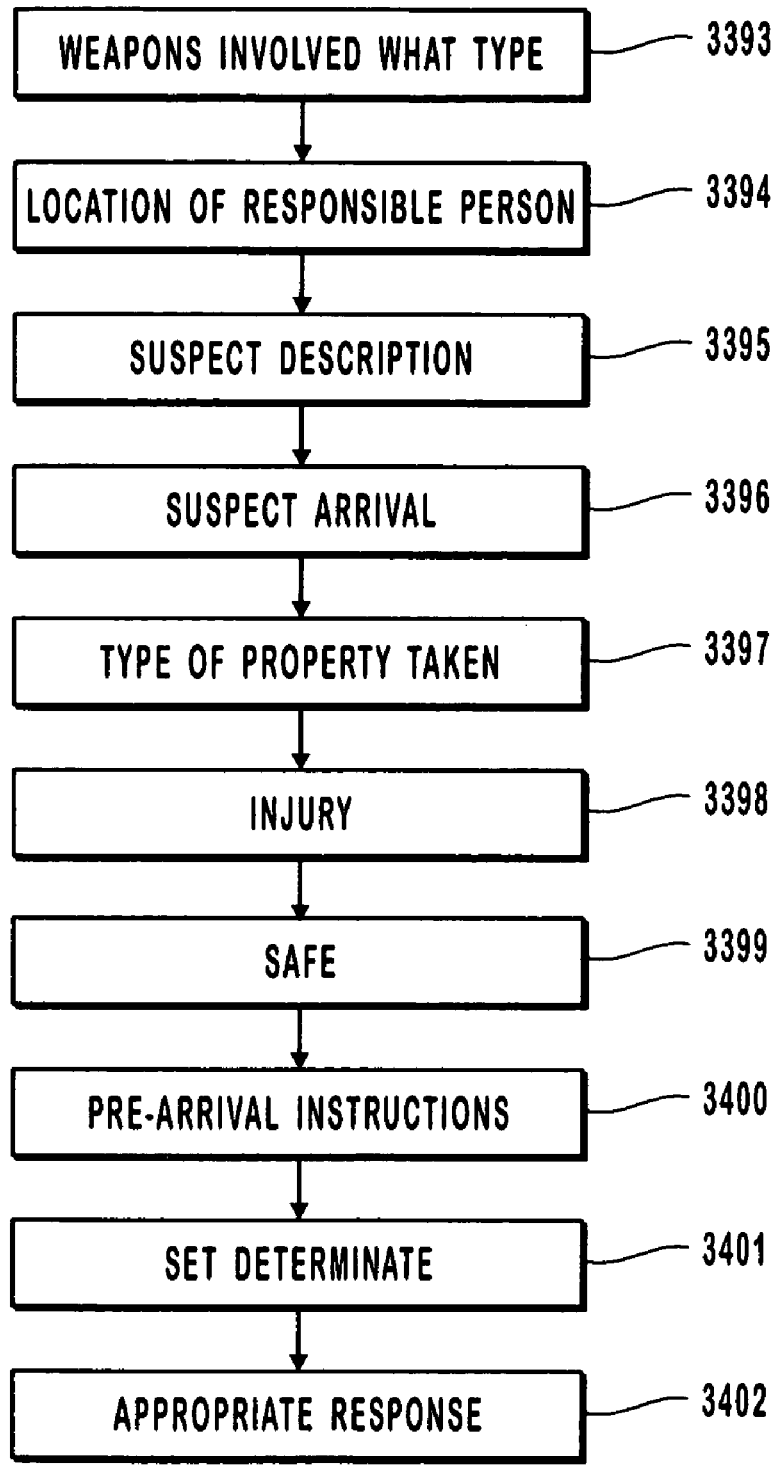
Figure 3A:
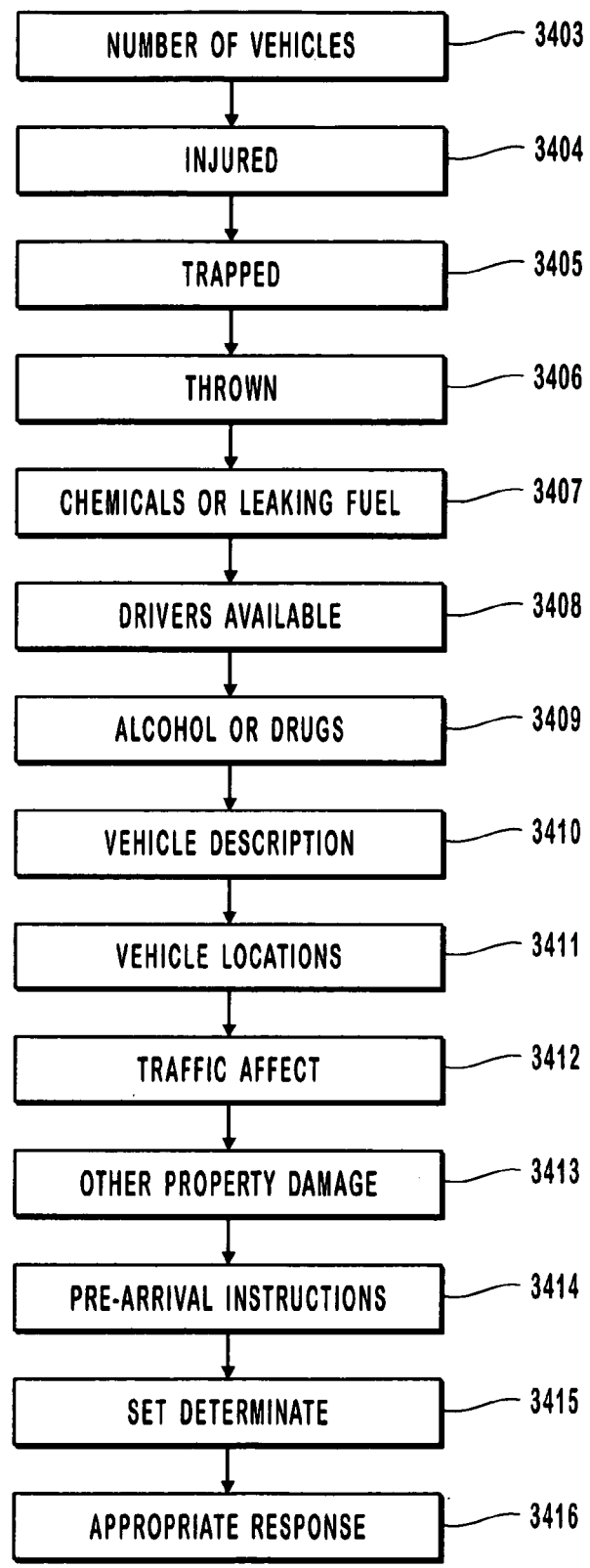
Figure 3A:
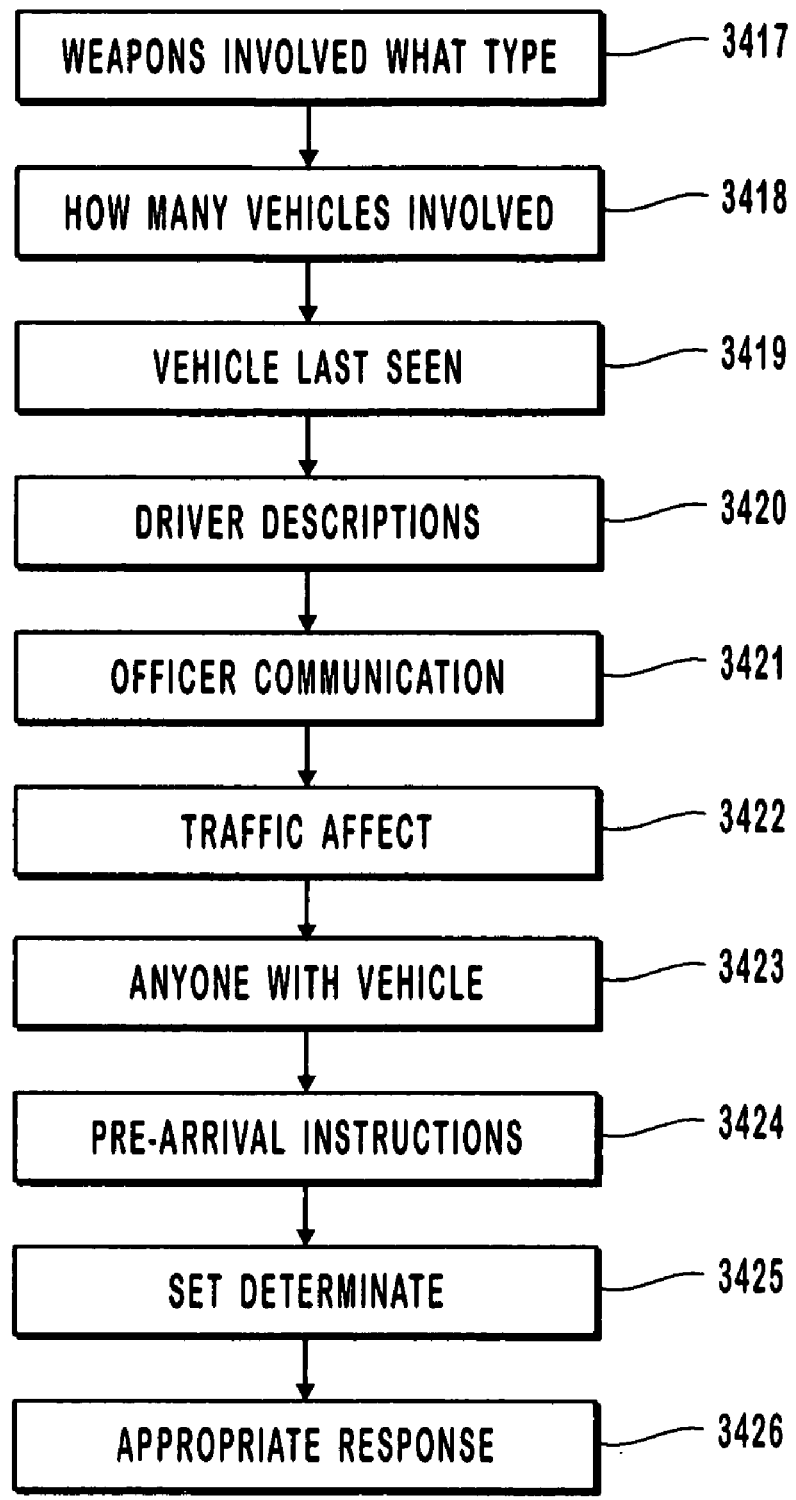
Figure 3A:
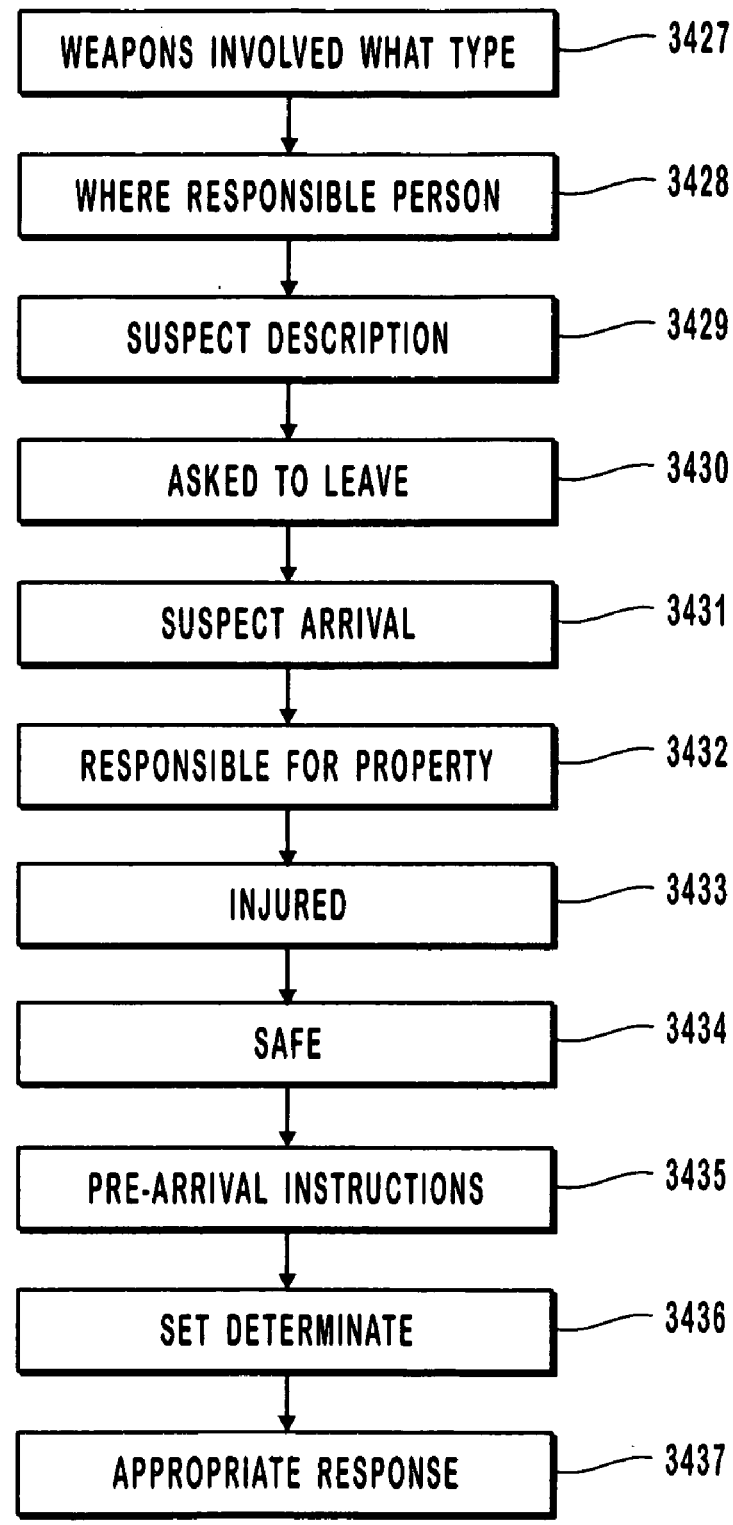
Figure 3A:
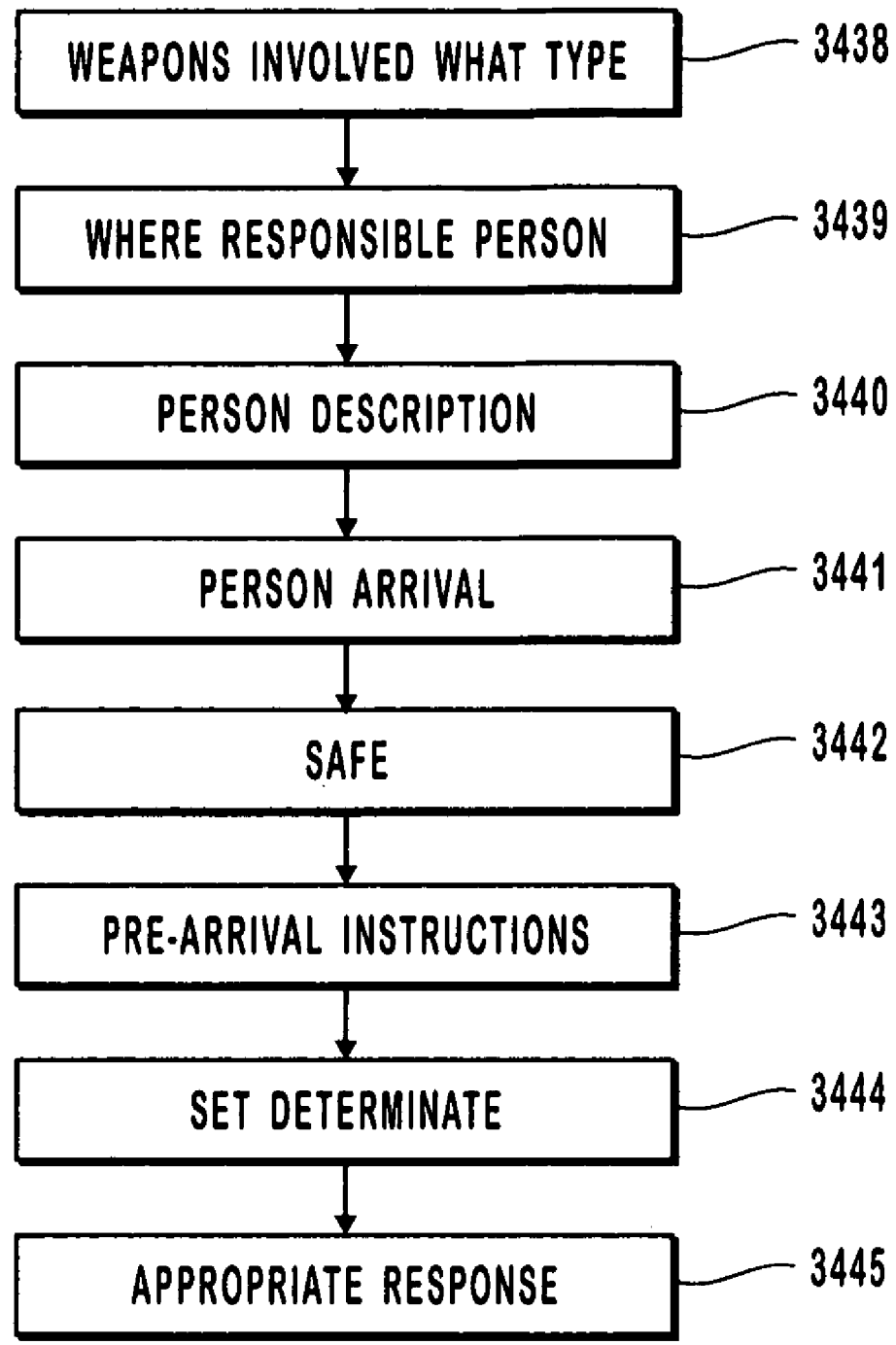
Figure 3A:
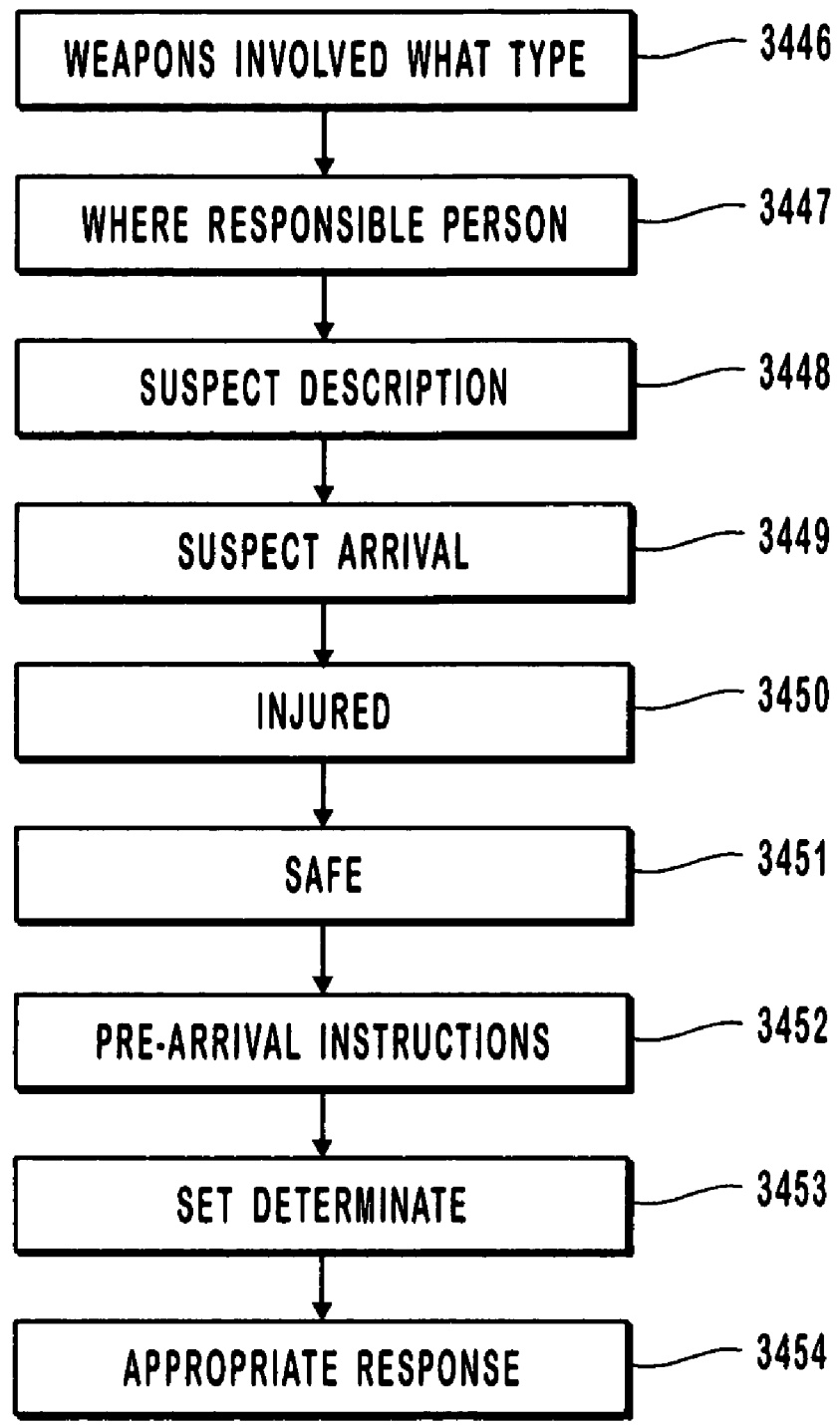
Figure 3A:
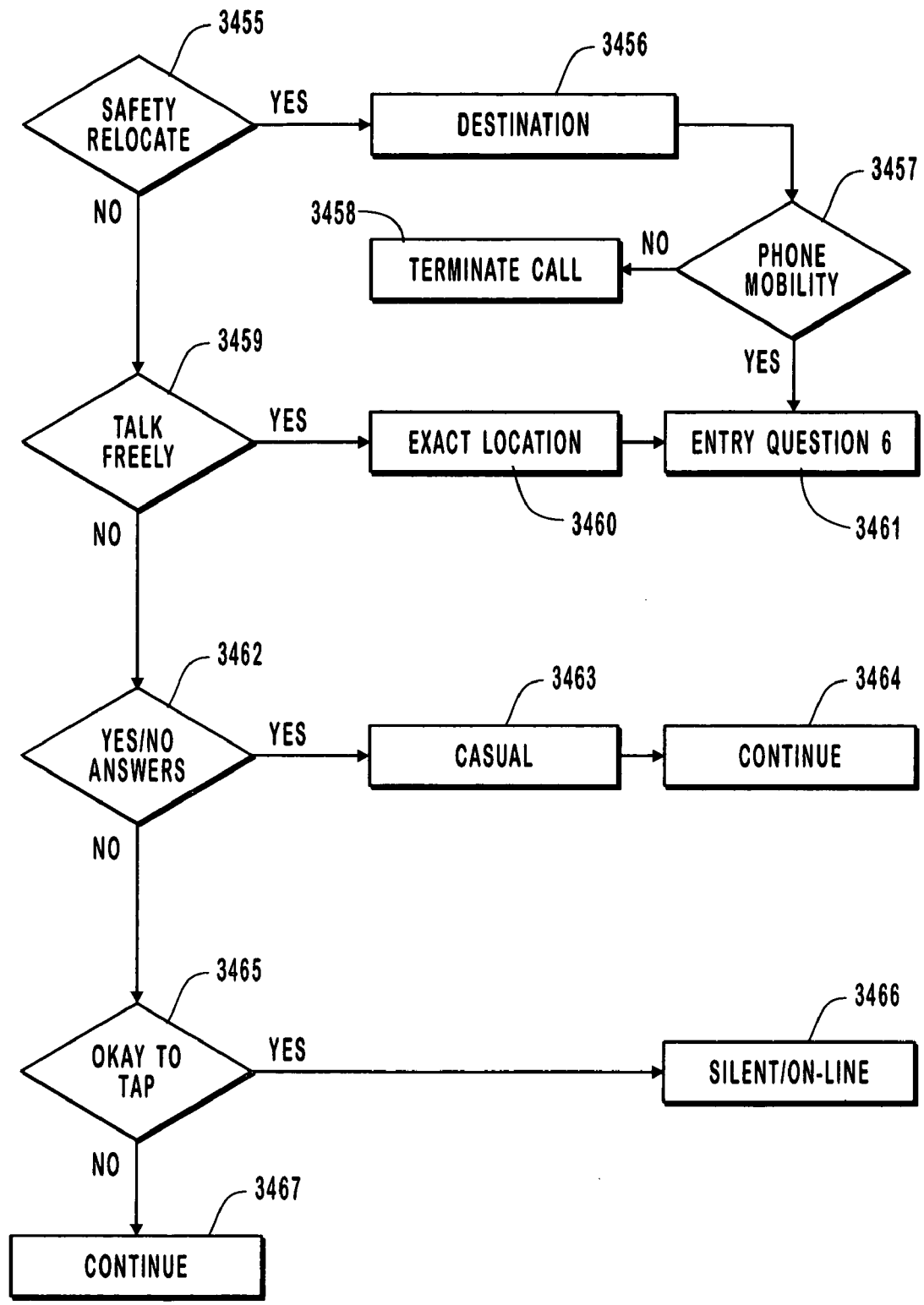
Figure 3A:
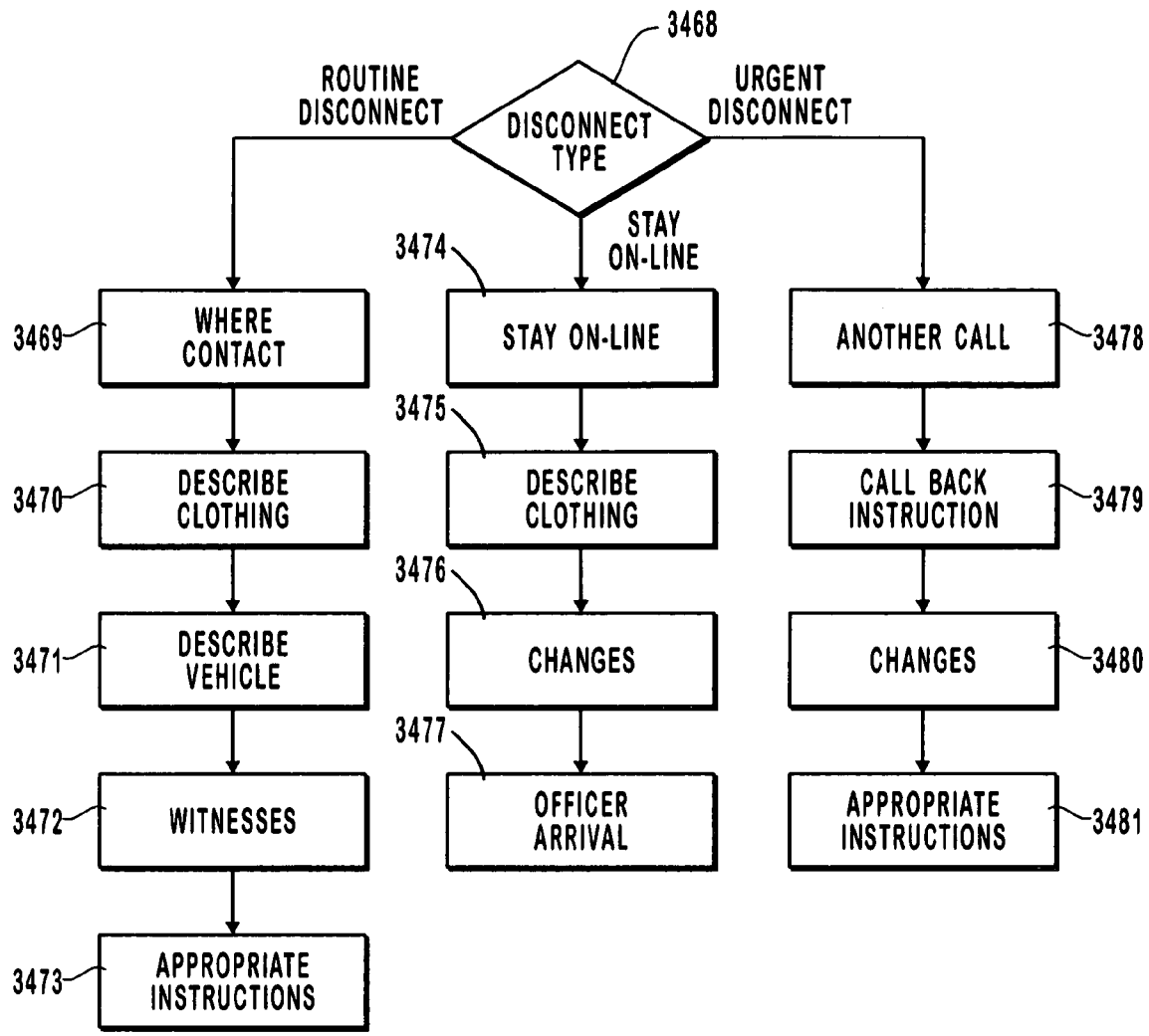

FIGS. 3*a* to 3*z* show detailed flow charts of the detailed preferred steps of this invention. FIG. 3*a* shows the entry protocol of the preferred embodiment of the invention. The address of the emergency is collected 3001. Generally, the address information is collected via an inquiry of the caller received on telephone equipment 107, although alternatively a caller identification phone number reverse address look-up database may be used. The call may also be initiated by an automatic alarm system ("silent call"). In the case of a "silent call" the dispatcher is instructed to follow the department's policy regarding activating an appropriate response. The phone number that the caller is calling from is ascertained 3002. Typically, the phone number is acquired by inquiry of the caller. Although, alternatively a caller identification system which provides the phone number can also be used. The caller's name is acquired 3003 by asking the caller to identify him or herself. An inquiry is made to get a description of the incident 3004. Certain incidents are identified as being especially critical, including alarms, assist other agencies, bomb found, bomb threat aFnd life threat When these incidents are identified, the process is diverted to the appropriate protocol as soon as required Case Entry information has been collected. If there is a life threat the Echo-E determinate level is set. The Echo level provides early recognition and response initiation when life is being immediately threatened. Otherwise, the remaining information, steps 3005, 3006, 3007, 3008, 3009 of this protocol is collected, after which the appropriate detailed protocol is executed. Whether the caller is safe and out of danger is determined 3005. If the caller is not safe and out of danger, the process is diverted to Critical Caller Instructions. The caller is then asked what he or she saw or heard 3006. An inquiry is made to determine how many people are involved 3007. The location of incident is identified 3008 and the time/date of occurrence 3009 is determined. Naturally, if any of these, 3006, 3007, 3008, 3009, questions are inherent in the description of the incident 3004, the inquiry may be bypassed. Based on the description of incident 3004 and other information received in this Entry Protocol, the process goes to the specific protocol 3010, wherein specific information is collected, the determinate value is calculated, the appropriate dispatch is made and any appropriate post-dispatch instructions are given. Finally, the Exit Protocol 3011 is executed. These entry inquiries and responses provide the information, which leads the process into the more detailed protocols of the preferred embodiment of this invention. Moreover, this Entry Protocol also provides guidance to the Dispatcher, including the following: Regarding repetitive persistence use, when using repetitive persistence to calm a caller, always provide a reason for the instruction (i.e., I need you to tell me the exact location of your son so that the police officers can locate him quickly). Regarding Deluca's Law EPDs (Emergency Police Dispatchers) will follow all protocols per se, avoiding freelance questioning or information unless it enhances, not replaces, the written protocol questions and scripts. Regarding caller party identification $1^{st}$ party: the caller is also the victim or perpetrator; $2^{nd}$ party: the caller is in close proximity to the victim; and $3^{rd}$ party: the caller is removed from, or not in close proximity to, the victim or perpetrator. Regarding dispatcher rules: (1) Always verify the incident address and the caller's phone number regardless of ANI/ALI information. (2) All suspects are to be considered armed until proven otherwise. (3) When a more specific incident type becomes known, shunt to the correct incident type during interrogation. (4) Always inform responders of information relating to officer safety. (5) If the incident type and status are unknown initially ($3^{rd}$ party caller), go to Protocol 135 (Unknown $3^{rd}$ Party). (6) If at any time the caller expresses that they may be in danger, refer to Critical Caller Instructions. (7) Case Entry and key questions must always be completed, even when an Echo determination has been selected. And, (8) Questions must be asked unless the answer is obvious or spontaneously provided by the caller. Regarding axioms: The information determined during Case Entry for all incident Types should include the number of suspects involved whenever it is appropriate.

FIG. 3*b* shows the detail 3004 of the various types of incident descriptions. Each of these incident types is associated with a specific incident protocol and, depending on the type of incident, may lead to a direct diversion of the process to that particular protocol or may be diverted to the specific protocol only after collecting the remaining information 3005, 3006, 3007, 3008, 3009 of the Entry Protocol. The present preferred embodiment of this invention includes specific protocols to address the following incident types: Abduction/Kidnapping (see FIG. 3*c*); Administrative (see FIG. 3*d*); Alarms (see FIG. 3*e*); Animal (see FIG. 3*f*); Assault/Sexual Assault (see FIG. 3*g*); Assist Other Agencies (see FIG. 3*h*); Auto Crime (see FIG. 3*i*); Bomb Found/Suspicious Package (see FIG. 3*j*); Bomb Threat (see FIG. 3*k*); Burglary (see FIG. 3*l*); Damage/Vandalism (see FIG. 3*m*); Deceased Person (see FIG. 3*n*); Disturbance (see FIG. 3*o*); Disturbance Domestic (see FIG. 3*p*); Driving Under the Influence (see FIG. 3q); Drugs (see FIG. 3r); Explosion (see FIG. 3s); Fraud/Deception (see FIG. 3t); Harassment/Stalking/Threats (see FIG. 3u); Indecency/Lewdness (see FIG. 3v); Juvenile (see FIG. 3w); Mental Disorder (see FIG. 3x); Miscellaneous (see FIG. 3y); Missing/Found Person (see FIG. 3z); Officer Needs Assistance (see FIG. 3aa); Public Service (see FIG. 3ab); Robbery (see FIG. 3ac); Suicidal Person (see FIG. 3ad); Supplemental (see FIG. 3ae); Suspicious/Wanted (see FIG. 3af); Theft (see FIG. 3ag); Traffic Accident (see FIG. 3ah); Traffic Violation/Complaint (see FIG. 3ai); Trespassing (see FIG. 3aj); Unknown 3rd Party (see FIG. 3ak); and Weapons/Firearms (see FIG. 3al).

FIG. 3c shows the preferred steps of the Abduction/Kidnapping Protocol. In this protocol, abduction is defined as carrying off, or leading away a person by fraud, persuasion or force. Kidnapping is defined, for the purposes of this protocol, as the taking and carrying away of one person by another by force or fraud and without the consent of the person being taken away, and involves a ransom demand. In the present embodiment of this invention, each of the inquiries is made and the information is collected via the telephone equipment 107. An inquiry 3012 is made to determine if weapons are involved or mentioned, if so the type of weapon is determined. The following types of weapons in particular are of interest: guns (including: pistol, rifle and shotgun); knives (including both long and short knives); clubs (such as a bat, tire iron or the like); explosives, including bombs; and other weapons, such as glass, bottles and vehicles. The location of the responsible person is determined 3013. This determination 3013 is then followed with learning how he or she left, if by vehicle, acquiring the vehicle description. This determination 3013 also includes learning the direction that the person was going. Suspect descriptions are then determined 3014. Preferably, the suspect description includes as much of the following information as possible if known: the person's name; race; gender; age; build, including height and weight; hair color; eye color; other identifiable characteristics, such as facial hair, accent, tattoos, earrings; complexion; clothing, including hat, coat, skirt, pants, shirt, shoes; and jewelry. Information regarding the "suspect" arrival, including a vehicle description and the vehicle location is acquired 3015. The desired vehicle description includes the color, year, make, model, body style, license, state and any other additional descriptive information available. Next, inquiries are made as to whether anyone is injured 3016 and whether the caller is safe and out of danger 3017. Next, the determinate value is calculated 3018 as follows. If a life threat exists the determinate value is set to E1. If the officer or dispatcher believes, in his or her discretion, that the call is critical, the determinate value is set to E2. If the incident is in progress or occurred within the last five minutes, the determinate value is set to D1. If the suspect is on still on the scene or is nearby, the determinate value is set to D2. If the incident occurred more than five minutes ago, the determinate value is set to C1. If a medical response is required, the determinate value is set to C2. If the incident occurred more than thirty minutes ago, the determinate value is set to B1. If the suspect is not on the scene and is not nearby, the determinate value is set to B2. If the call provides information to be sent over the air only, the determinate value is set to A1. If the call is only a referral, the determinate value is set to Ω1. Once a determinate value is set 318, the appropriate response is dispatched 3020 and pre-arrival instructions 3019 are provided to the caller. The appropriate dispatched response 3020 is based on the calculated determinate value. The preferred pre-arrival instructions 3019 of this protocol include: (a) do not disturb anything at the scene including weapons, tools, or objects found nearby; (b) determine if anything is missing like clothing, toys, or medications; and (c) write down the names, addresses, and phone numbers of people the suspect, if known, may contact. This protocol also provides the following rules: (1) All suspects are to be considered armed until proven otherwise; (2) Always inform responders if there are any weapons involved; (3) Relay suspect and vehicle information as received; and (4) Ransom notes should be carefully preserved for forensic evidence. The axioms of the preferred abduction/kidnapping protocol are (1) Parental or custodial abductions usually occur after a decision by the Courts that may favor one parent or guardian over another; and (2) Suspects in parental kidnapping cases often hide out at the homes of other relatives.

FIG. 3d shows the preferred steps of the Administrative Protocol. In this protocol, administrative tasks are agency defined tasks, including transports and message deliveries) that are not necessarily related to criminal activity. In the present embodiment of this invention, each of the inquiries is made and the information is collected via the telephone equipment 107. An inquiry 3021 is made to determine the type of service that is requested. Presently, the types of service supported by this protocol include: document pick up, message delivery, transports and other. If the type of service is document pickup, then a determination 3022 is made of the type of document. Next, the location of where to pick up the document is determined 3025. Identification 3028 of the contact person is made and the delivery location is determined 3031. If the type of service is message delivery, then a determination 3023 is made of where the message must be delivered. The person to whom the message is to be delivered is identified 3026. The message itself is specified 3029 and an inquiry 3032 is made as to whether anyone (such as a Chaplain or friend) needs to go with the officers to deliver the message. If the type of service is a transport, an inquiry 3024 is made to determine who or what is to be transported. If a person is being transported, information regarding the person, such as: is the person cooperative, is the paperwork ready and is any special equipment (such as shackles, extra handcuffs, wheelchair) is provided 3027. The pickup location is identified 3030. The contact person is identified 3033 and the destination is specified 3034. If another type of service 3037 is required, additional details are requested and obtained 3021. In providing and collecting the required information, it is common to require a description. Once this information regarding the service type is acquired the determinate value is calculated or set as follows. If it is a blood or organ transport the determinate value is set to D1. If the transport is of an uncooperative person, the determinate value is set to C1. If the service type is a document pick up the determinate value is set to B1. If the service type is a message delivery the determinate value the determinate value is set to B2. If the service type is the transport of a cooperative person or thing the determinate value is set to B3. If the service type is other, the determinate value is set to B4. If the service request is to air (radio) information only, the determinate value is set to A1. If the service request is to refer the call to another party, the determinate value is set to Ω1. Once the determinate value for the call is set 3035, an appropriate response, based on the determinate value and the other information gathered, is dispatched 3036.

FIG. 3e shows the preferred steps of the Alarms Protocol. In this protocol, alarms are physical hardware installed at a given location to monitor burglary, robbery, medical, fire, hazardous materials, panic, or distress situations. Alarms may be monitored by an alarm company or may make local notifications only. The alarm type is identified 3038. Typical alarm types include audible, burglary, fire, hold-up/panic/ duress, medical, panic/duress and vehicle. The name of the business, if any, is provided 3039. An inquiry 3040 is made to determine how long the alarm has been sounding. The source of the alarm is identified 3044. The present embodiment of this invention supports alarms serviced by an alarm monitoring company, private caller alarms and vehicle alarms. If the alarm is serviced by an alarm monitoring company 3041, an inquiry 3042 is made to determine if contact has been made with someone at the business or residence and if so with whom contact was made. Another inquiry 3043 is made to determine who is responding to the business or residence, how they will be responding, including a description of the responding person and their estimated time of arrival. If the alarm originates from a private caller 3045, an inquiry 3046 is made to determine if anything suspicious, such as an open window, door, lights on, suspicious people or vehicles, was observed. If the alarm is a vehicle 3047 alarm, a vehicle description is requested 3048 along with an inquiry 3049 concerning who owns the vehicle. After the collection of the above information, pre-arrival instructions 3050 are given. Typical and appropriate pre-arrival instructions are, for an alarm company, "call back with the keyholder information" and, for a private caller, "do not disturb anything at the scene, especially including weapons, tools or objects found nearby." The determinate is set 3051, based on the information gathered from the inquiries described above, as follows. If a lift threat exists, the determinate value is set to E1. If the officer or dispatcher believes, in his or her discretion, that the call is critical, the determinate value is set to E2. If the incident is in progress or occurred within that last five minutes, the determinate value is set to D1. If the incident occurred between five and thirty minutes ago, the determinate value is set to C1. If the incident occurred more than thirty minutes ago, the determinate value is set to B1. If the call provides only information to be sent over the air, the determinate value is set to A1. If the call is appropriate for referral the determinate is set to Ω1. Once the determinate value is set 3051, the appropriate response is dispatched 3052 and the pre-arrival instructions 3050 are provided to the caller. This protocol also provides the following rule: Consider all alarms as a crime in progress until proven otherwise. The axioms of this present alarm protocol are as follows: (1) Panic alarms are normally activated by a person; and (2) Alarms can malfunction due to storms, high winds, power outages, animals, heating cycles, water contact, or operator error.

FIG. 3f shows the preferred steps of the Animal Protocol. Animal complaints, in this protocol, can apply to both domestic and wild animals. Complaints may include injured animals, animal attacks, abandoned animals, livestock, and cruelty to animals, poaching or game law offenses, or wild animal sightings. An exotic animal is defined as any animal that may be poisonous, dangerous, or whose risk is unknown. Animal cruelty is defined as the infliction of physical pain, suffering, or death with intent or by neglect upon an animal, when not necessary or when done for mere sport, for the indulgence of a cruel and vindictive temper, or with reckless indifference to its pain. It is worth noting that childhood traits of cruelty to small animals, bed wetting (beyond the normal appropriate age), and fire starting are known as the "Homicidal Triad." It is believed that juveniles with these characteristics have an increased risk of committing homicide in their adult life. Some of the most infamous serial killers had an early history of animal abuse and cruelty. While not everyone who abuses animals will become a serial killer, virtually every serial killer first abused animals. In the preferred embodiment of this invention, each of the inquiries is made and the information is collected via the telephone equipment 107. An inquiry 3053 is made to determine if weapons were involved and, if so, what type of weapons are involved. The type of animal complaint is determined 3054. The types of animal complaints presently supported in this embodiment of the invention are cruelty, dangerous/attack, exotic, injured, lost/stray and wildlife. A description of the animal is requested and obtained 3055. Typical animal descriptions include such information as animal type, color and size. An inquiry 3056 is made to determine if the animal is aggressive and, if so, whether the animal has bitten anyone and/or if other animals are in danger. An inquiry 3057 is made to determine if anyone is injured now. The animal's location is determined 3058. Whether the animal is injured is determined 3059. An inquiry 3060 is made to determine if the animal is confined. If cruelty is suspected, inquires 3061 are made to determine if the suspect left and, if so, how. If a vehicle is involved, a description of the vehicle is requested. The direction and/or where the suspect was going are requested. If the suspect is detained, the inquiry is made as to whether the suspect is cooperative. A description of each suspect is requested. An inquiry as to how the suspect arrived is made, including a vehicle description and the present the emergency, the phone number called from, the caller's name, incident information, caller is save and out of danger. Pre-arrival instructions 3063 are then given. The present preferred pre-arrival instructions 3063 include: (a) "Do not approach an unfamiliar animal"; (b) if appropriate, "If there are any witnesses, ask them to stay until an officer can contact them" (or obtain their names, addresses, and telephone numbers); (c) "If it is safe to do so, keep all bystanders away from the area"; (d) "Do not disturb anything at the scene including weapons or objects found nearby." The determinate value is set 3062 as follows. If a life threat exists, the determinate value is set to E1. If the officer or dispatcher believes, in his or her discretion, that the call is critical, the determinate value is set to E2. If the incident is in progress or occurred within the previous five minutes then the determinate value is set to D1. If the suspect is on the scene or is nearby, the determine value is set to D2. If the suspect has been detained but is not cooperative, the determine value is set to D3. If the incident occured between five and thirty minutes ago, the determinate value is set to C1. If the suspect is detained and cooperative, the determinate value is set to C2. If a medical response is needed, the determinate value is set to C3. If the incident occured more the thirty minutes ago, the determinate value is set to B1. If the suspect is not on the scene and is not nearby, the determinate value is set to B2. If the call provides information to be sent over the air only, the determinate value is set to A1. If the call is appropriate for referral, the determinate value is set to Ω1. Once the determinate value is set 3064 the appropriate response is dispatched 3065 and the pre-arrival instructions 3063 are provided to the caller. This appropriate dispatched response 3065 is based on the calculated determine value. This protocol also provides the following rule: (1) Weapons questions must be asked n animal cruelty and poaching incidents. The axioms of the animal protocol are (1) Lions, tigers, bears (large carnivores) and exotic or zoo animals may be considered extremely dangerous if lost, strayed, or injured; and (2) Injured animals may become aggressive and attack other animals (humans) in the immediate vicinity.

FIG. 3g shows the preferred steps of the Assault/Sexual Assault Protocol. According to this protocol, an assault is an unlawful attack, or attempted attack, upon another person. In can also include certain types of threats. A sexual assault is an dispatch call with a determinate value of D1 is generally more critical requiring a more areas of the body to violent, invasive sexual intercourse. Rape is sexual intercourse by force or by putting the person in fear or in circumstances in which the person is unable to control her or his conduct or to resist. An inquiry 3066 is made to determine if weapons are involved or mentioned, if so the type of weapon is determined. Determinations 3067 are made as to the location of the person(s) responsible, including how he or she left, if by vehicle, the vehicle description, the direction of suspect travel and/or where the suspect is going, and if the suspect has been detained, is he or she cooperative. The description of the suspect is requested 3068. Information about how the suspect arrived 3069, including a vehicle description and present location if appropriate is requested 3069. The victim's location is determined 3070. The victim's description is acquired 3071. If an assault occurred, an inquiry 3072 is made to determine if anyone is injured. If a sexual assault occurred, an inquiry 3073 is made to determine if the victim has any other injuries. The safety of the caller is determined 3074. Pre-arrival instructions 3075 are formulated. The present preferred pre-arrival instructions 3075 are as follows: (a) If the assailant (attacker) is nearby, keep very quiet and stay out of sight; (b) Do not disturb anything at the scene including weapons or objects found nearby; and (c) for sexual assault, do not change clothes, bathe, shower, or go to the bathroom. Do not clean the carpet or floor. Do not handle or wash the bedding. The determinate value is set 3076 as follows. If a life threat exists, the determinate value is set to E1. If the officer or dispatcher believes, in his or her discretion, that the call is critical, the determinate value is set to E2. If the incident is in progress or occurred within the previous five minutes then the determinate value is set to D1. If the suspect is on the scene or is nearby, the determine value is set to D2. If the suspect has been detained but is not cooperative, the determinate value is set to D3. If the incident occurred between five and thirty minutes ago, the determinate value is set to C1. If the suspect is detained and cooperative, the determinate value is set to C2. If a medical response is needed, the determinate value is set to C3. If the incident occurred more than thirty minutes ago, the determinate value is set to B1. If the suspect is not on the scene and is not nearby, the determinate value is set to B2. If the call provides information to be sent over the air only, the determinate value is set to A1. If the call is appropriate for referral, the determinate value is set to Ω1. Once the determinate value is set 3076 the appropriate response is dispatched 3077 and the pre-arrival instructions 3075 are provided to the caller. This appropriate dispatched response 3077 is based on the calculated determinate value. The axioms of this preferred assault/sexual assault protocol are (1) The collection of evidence after an individual has alleged a sexual assault (rape) may be psychologically as well as physically traumatic; and (2) The preservation of evidence and compassionate care in sexual assault (rape) situations may be of much greater eventual importance to the injured party than initial response and treatment of physical injuries.

FIG. 3h shows the preferred steps of the Assist other Agencies Protocol. Assisting other Agencies is the act of providing assistance or a requested service to another agency. In the preferred embodiment of this invention, each of the inquiries is made and the information collected via the telephone equipment 107. An inquiry 3078 is made to determine the type of assistance that is needed. Information regarding where the units are needed is requested 3079. A vehicle description is obtained 3080. The suspect description is obtained 3081. If appropriate, inquiries are made to learn 3082 who the officers should contact and to determine what radio, or other communication, channel should be used. The determinate value is set 3083 as follows. If a life threat exists, the determinate value is set to E1. If the officer or dispatcher believes, in his or her discretion, that the call is critical, the determinate value is set to E2. If the incident is an emergency request then the determinate value is set to D1. If the request is an urgent request, the determinate value is set to C1. If the request is to serve a court order, then the determinate value is set to C2. If the request is a non-urgent request, the determinate value is set to B1. If the request is to provide information to be sent over the air only, the determinate value is set to A1. If the call is appropriate for referral, the determinate value is set to Ω1. Once the determinate value is set 3083, the appropriate response is dispatched 3084. This appropriate dispatched response 3084 is based on the calculated determinate value. The axiom of this assist other agencies protocol is that emergency, urgent and non-urgent requests will be defined by each agency.

FIG. 3i shows the preferred steps of the Auto Crime Protocol. The Auto Crimes protocol addresses a variety of acts include repossession, motor vehicle theft, theft from an auto and damage to an auto. Repossession is the act of reclaiming a vehicle by a finance company for lack of payment. Since this usually occurs at night, the owner wakes to find the vehicle missing and reports it to the police. Motor vehicle theft is the act of stealing or taking a vehicle without the owner's consent. Theft from an auto is the removal of property from a vehicle without the owner's consent. While damage to an auto is to damage a vehicle. In the preferred embodiment of this invention, each of the inquiries is made and the information is collected via the telephone equipment 107. An inquiry 3085 is made to determine if weapons are involved or mentioned and, if so, the type of weapon is determined. The location of the responsible person is determined 3086, including: if the suspect left, how he or she left, a description of the vehicle if appropriate, the direction the suspect was going or where he or she is going, if known. If the suspect has been detained, is he or she being cooperative. The suspect description is requested and obtained 3087. Information about the arrival of the suspect is determined 3088, if by vehicle, the vehicle description and location are also identified. If it is appropriate, the description of the victim's vehicle is determined 3089 along with the present location of the victim's vehicle. An inquiry 3090 is made to determine if the victim is carrying anything from the vehicle, if so a description of the item is requested. An inquiry 3092 is made to determine if anyone is injured. An inquiry 3092 is made to learn if the caller is safe and out of danger. Pre-arrival instructions 3093 are formulated. The present preferred pre-arrival instruction is "do not disturb anything at the scene including weapons or objects found nearby. The determinate value is set 3094 as follows. If a life threat exists, the determinate value is set to E1. If the officer or dispatcher believes, in his or her discretion, that the call is critical, the determinate value is set to E2. If the incident is in progress or occurred within the previous five minutes then the determinate value is set to D1. If the suspect is on the scene or is nearby, the determine value is set to D2. If the suspect has been detained but is not cooperative, the determinate value is set to D3. If the incident occurred between five and thirty minutes ago, the determinate value is set to C1. If the suspect is detained and cooperative, the determinate value is set to C2. If a medical response is needed, the determinate value is set to C3. If the incident occurred more than thirty minutes ago, the determinate value is set to B1. If the suspect is not on the scene and is not nearby, the determinate value is set to B2. If the call provides information to be set over the air only, the determinate value is set to A1. If the call is appropriate for referral, the determinate value is set to Ω1. Once the determinate value is set 3094 the appropriate response is dispatched 3095 and the pre-arrival instructions 3093 are provided to the caller. This appropriate dispatched response 3095 is based on the calculated determinate value. This protocol also provides the following rules: (1) always inform responders if there are any weapons involved and (2) relay suspect and vehicle information as received. The axiom of this auto crime protocol is vehicles taken in a civil situation are not considered stolen.

FIG. 3j shows the preferred steps of the Bomb Found/Suspicious Package Protocol. A bomb is an explosive or incendiary material designed to cause injury or damage. A primary device is a device that draws emergency service personnel to the scene. A secondary device is a device that is intended to explode after emergency personnel arrive. The sole purpose of the secondary device is to kill and/or disable emergency response personnel and to increase casualties. Weapons of Mass Destruction (WMD) are devices used by fanatic and terrorist communities that may include chemical, biological, and nuclear materials and are designed to harm a large group of people. Types of bombs include, but are not necessarily limited to: incendiary devices, mail bombs, mailbox bombs, military ordnance, Molotov cocktail, pipe bombs, pop bottle bombs, switch devices and time-delayed devices. Characteristics used in the description of explosive devices include: antenna, color on device, dynamite (crystals showing, number of sticks), home made devices, markings or words, military ordnance, size, shape (oblong, round, cylindrical, etc.), suspicious packages and wires showing (color). In the present embodiment of this invention, each of the inquiries is made and the information is collected via the telephone equipment 107. An inquiry 3096 is made to describe why the package is suspicious. The package location is identified 3097. When the package was found is determined 3098. An inquiry 3099 is made to specify how long the package has been there. A description of the package is requested 3100. An inquiry 3101 is made as to whether the caller is safe and out of danger. A prior threat inquiry is made 3102. If prior threats have been made, a request is made for a description of these prior threats. An inquiry 3103 is made regarding responsible persons. Suspect descriptions, weapon descriptions and vehicle descriptions are collected, if appropriate. An inquiry 3104 regarding any other suspicious activity is made, along with a request for a description if appropriate. Pre-arrival instructions are prepared 3105. The present pre-arrival instructions of this protocol are (a) if it's safe to do so, stay on the line with me; (b) do not touch or approach the package; (c) do not use, turn on, or turn off any electronic devices (cell phones, two-way radios, video games, or cordless phones); and (d) if you can, try to keep some type of shield between yourself and the device (or site) as protection (from falling debris). The determinate value is set 3106 as follows. If a life threat exists, the determinate value is set to E1. If the officer or dispatcher believes, in his or her discretion, that the call is critical, the determinate value is set to E2. If the incident is in progress or occurred within the previous five minutes then the determinate value is set to D1. If the incident occurred between five and thirty minutes ago, the determinate value is set to C1. If the incident occurred more than thirty minutes ago, the determinate value is set to B1. If the call provides information to be set over the air only, the determinate value is set to A1. If the call is appropriate for referral, the determinate value is set to Ω1. Once the determinate value is set 3106 the appropriate response is dispatched 3107 and the pre-arrival instructions 3105 are provided to the caller. This appropriate dispatched response 3107 is based on the calculated determinate value. This protocol also provides the following rules: (1) Always presume that a secondary device is present and will be placed where people naturally congregate; and (2) Suspicious packages should be considered bombs, until proven otherwise. The axioms of the present bomb found/suspicious package are (1) Touching, disturbing, or approaching anything in the building or in the area where the bomb was found may cause the device to explode; and (2) An evacuation may place more people in greater danger if not conducted properly.

FIG. 3k shows the preferred steps of the Bomb Threat Protocol. A bomb threat is a statement made reporting the existence of an explosive device. In the present embodiment of this invention, each of the inquiries is made and the information is collected via the telephone equipment 107. An inquiry 3108 is made to determine the type of caller that is determining whether the caller is a 3rd party caller or a suspect caller. If the caller is a 3rd party caller, when the threat was received is identified 3109. How the threat was received is determined 3110. An inquiry 3111 is made to learn what the target is. The time that the bomb is expected to explode is identified 3112. An inquiry 3113 is made to learn what the caller was told about the bomb. Whether the caller is safe and out of danger is determined 3114. An inquiry 3115 is made to determine if a reason for the bomb was communicated. A description of the caller is requested 3116. An inquiry 3117 is made as to whether other information was provided. If appropriate, the phone number that the threat was received on is identified 3118. An inquiry 3119 is made to determine if previous threats have been received. Another inquiry 3120 is made to determine if the caller has an idea who is responsible. If the caller is a suspect caller, an inquiry 3121 is made to determine when the bomb will explode. An inquiry 3122 is made to determine the bomb location. A description of the bomb is determined 3123 if possible. An inquiry 3124 is made to learn what makes the bomb explode. How the bomb can be deactivated is identified 3125. An inquiry 3126 is made to learn why the bomb was planted. Pre-arrival instructions are prepared 3127. A determinate value is set 3128 as follows: If a life threat exists the determinate value is set to E1. If the officer or dispatcher believes, in his or her discretion, that the call is critical, the determinate value is set to E2. If the incident is in progress or occurred within the last five minutes, the determinate value is set to D1. If the suspect is on still on the scene or is nearby, the determinate value is set to D2. If the incident occurred more than five minutes ago, the determinate value is set to C1. If a medical response is required, the determinate value is set to C2. If the incident occurred more than thirty minutes ago, the determinate value is set to B1. If the suspect is not on the scene and is not nearby, the determinate value is set to B2. If the call provides information to be sent over the air only, the determinate value is set to A1. If the call is only a referral, the determinate value is set to Ω1. Once a determinate value is set 3128, the appropriate response is dispatched 3029 and pre-arrival instructions 3127 are provided to the caller. The appropriate dispatched response 3129 is based on the calculated determinate value. The preferred pre-arrival instructions 3127 of this protocol include: (a) do not use, turn on, or turn off any electronic devices (cell phones, two-way radios, video games, or cordless phones); (b) if you find any suspicious packages, do not touch, disturb, or approach them and call me back immediately; (c) do not disturb anything at the scene including weapons or objects found nearby; and (d) if it's safe to do so, keep all bystanders away from the area. This protocol also provides the following rules: (1) Building evacuations should be handled according to local protocol; and (2) Always presume that a secondary device is present and will be placed where people naturally congregate. The axioms of this bomb threat protocol are: (1) An evacuation may place more people in greater danger if not conducted properly; and (2) Bomb threats are often made by disgruntled individuals, and may target former or current employers.

FIG. 3l shows the preferred steps of the Burglary Protocol. A burglary is knowingly breaking into, entering, or remaining unlawfully in a building or occupied structure with the intent to commit a crime against a person or property. Home invasions are the breaking into or unlawfully entering a home with the intent to injure, kill, or terrorize the resident or occupant. Burglary tools are devices, instruments or tools that may be used to commit burglaries. These may include screwdrivers, bolt cutters, lock picks or hammers. In the present embodiment of this invention, each of the inquiries is made and the information is collected via the telephone equipment 107. An inquiry 3130 is made to learn if weapons were involved. The location of the responsible person is identified 3131. The suspect description is determined 3132. An inquiry 3133 is made to learn how the suspect arrived. A description of the vehicle, if appropriate, is requested 3134. If appropriate, an inquiry 3135 is made as to where the suspect entered the building. The location of possible exits from the building are identified 3136. An inquiry 3137 is made to learn if the suspect carried anything from the building. Where the suspect left the building is identified 3138. What items were taken is determined 3139. Inquiries are made to determine if anyone is injured 3140 and if the caller is safe and out of danger 3141. Suspect descriptions, weapon descriptions and vehicle descriptions are collected, if appropriate. The pre-arrival instructions 3142 are prepared. The determinate value is set 3143, as follows. If a life threat exists the determinate value is set to E1. If the officer or dispatcher believes, in his or her discretion, that the call is critical, the determinate value is set to E2. If the incident is in progress or occurred within the last five minutes, the determinate value is set to D1. If the suspect is on still on the scene or is nearby, the determinate value is set to D2. If the incident occurred more than five minutes ago, the determinate value is set to C1. If a medical response is required, the determinate value is set to C2. If the incident occurred more than thirty minutes ago, the determinate value is set to B1. If the suspect is not on the scene and is not nearby, the determinate value is set to B2. If the call provides information to be sent over the air only, the determinate value is set to A1. If the call is only a referral, the determinate value is set to Ω1. Once a determinate value is set 3143, the appropriate response is dispatched 3144 and pre-arrival instructions 3142 are provided to the caller. The appropriate dispatched response 3144 is based on the calculated determinate value. The preferred pre-arrival instructions 3142 of this protocol include: (a) do not disturb anything at the scene including weapons or objects found nearby. This protocol also provides the following rules: (1) Always inform responders if any weapons are involved; and (2) Relay suspect and vehicle information as received. The axioms of this burglary protocol are: (1) Most intruders use the same point of entry and exit; (2) Burglaries are usually property crimes, not crimes against persons; (3) Most residential burglaries occur during the daylight hours; and (4) Most business burglaries occur at night.

FIG. 3m shows the preferred steps of the Damage/Vandalism Protocol. Damage or vandalism is willful or malicious acts that are intended to damage or destroy property, or willful or ignorant destruction of property. In the present embodiment of this invention, each of the inquiries is made and the information is collected via the telephone equipment 107. An inquiry 3145 is made to learn if weapons are involved or mentioned. If possible, the location of the responsible person is identified 3146. The description of the suspect is provided 3147 if possible. Suspect arrival information is determined 3148. An inquiry 3149 is made to gain suspect vehicle description. The damage is described 3150. Pre-arrival instructions 3151 are prepared. The determinate value is set 3152 as follows. If a life threat exists the determinate value is set to E1. If the officer or dispatcher believes, in his or her discretion, that the call is critical, the determinate value is set to E2. If the incident is in progress or occurred within the last five minutes, the determinate value is set to D1. If the suspect is on still on the scene or is nearby, the determinate value is set to D2. If the incident occurred more than five minutes ago, the determinate value is set to C1. If a medical response is required, the determinate value is set to C2. If the incident occurred more than thirty minutes ago, the determinate value is set to B1. If the suspect is not on the scene and is not nearby, the determinate value is set to B2. If the call provides information to be sent over the air only, the determinate value is set to A1. If the call is only a referral, the determinate value is set to Ω1. Once a determinate value is set 31 52, the appropriate response is dispatched 3153 and pre-arrival instructions 3151 are provided to the caller. The appropriate dispatched response 3153 is based on the calculated determinate value. The preferred pre-arrival instructions 3151 of this protocol include: (a) do not disturb anything at the scene including weapons or objects found nearby. This protocol also provides the following rules: (1) Always inform responders if any weapons are involved; and (2) Relay suspect and vehicle information as received. The axiom of this damage/vandalism protocol is most graffiti is gang related.

FIG. 3n shows the preferred steps of the Deceased Person Protocol. A deceased person call is any call that is instigated by a person finding of a dead body. A suspicious death is one in which anything at the scene suggests criminal activity. In the present embodiment of this invention, each of the inquiries is made and the information is collected via the telephone equipment 107. An inquiry 3154 is made to learn why the caller believes the person is dead. How long before the call the caller found the person is identified 3155. The location of the body is identified 3156. What is the deceased person's name is identified 3157. An inquiry 3158 is made to learn if the caller has entered the premises. If anyone else is at the location is determined 3159. An inquiry 3160 is made to determine whether the caller is safe and out of danger. Pre-arrival instructions 3161 are prepared. The determinate value is set 3162 as follows. If a life threat exists the determinate value is set to E1. If the officer or dispatcher believes, in his or her discretion, that the call is critical, the determinate value is set to E2. If the incident is in progress or occurred within the last five minutes, the determinate value is set to D1. If the suspect is on still on the scene or is nearby, the determinate value is set to D2. If the incident occurred more than five minutes ago, the determinate value is set to C1. If a medical response is required, the determinate value is set to C2. If the incident occurred more than thirty minutes ago, the determinate value is set to B1. If the suspect is not on the scene and is not nearby, the determinate value is set to B2. If the call provides information to be sent over the air only, the determinate value is set to A1. If the call is only a referral, the determinate value is set to Ω1. Once a determinate value is set 3162, the appropriate response is dispatched 3163 and pre-arrival instructions 3161 are provided to the caller. The appropriate dispatched response 3163 is based on the calculated determinate value. The preferred pre-arrival instructions 3161 of this protocol include: (a) do not disturb anything at the scene including weapons or objects found nearby; and (b) is there anyone I can call for you? This protocol also provides the following rule: All deceased person calls are to be considered as homicides unless determined otherwise. Scene preservation is a high priority for the collection of physical evidence. The axiom of this deceased person protocol is an autopsy must be performed on all victims where the cause of death is unknown.

FIG. 3o shows the preferred steps of the Disturbance Protocol. A disturbance is any act causing annoyance, disquiet, and agitation or interrupting the peace and quiet. In the present embodiment of this invention, each of the inquiries is made and the information is collected via the telephone equipment 107. An inquiry 3164 is made to determine what weapons were involved or mentioned. Whether the disturbance was physical or verbal is determined 3165. Where the person is located is identified 3166. If possible, the description of the person is determined 3167. How the person arrived is determined 3168. If appropriate, whether anyone involved has been using alcohol or drugs is determined 3169. An inquiry 3170 is made to learn if a court order is in place. Whether anyone is injured is determined 3171. An inquiry 3172 is made to learn if the caller is safe and out of danger. Pre-arrival instructions 3173 are prepared. The determinate value is set 3174 as follows. If a life threat exists the determinate value is set to E1. If the officer or dispatcher believes, in his or her discretion, that the call is critical, the determinate value is set to E2. If the incident is in progress or occurred within the last five minutes, the determinate value is set to D1. If the suspect is on still on the scene or is nearby, the determinate value is set to D2. If the incident occurred more than five minutes ago, the determinate value is set to C1. If a medical response is required, the determinate value is set to C2. If the incident occurred more than thirty minutes ago, the determinate value is set to B1. If the suspect is not on the scene and is not nearby, the determinate value is set to B2. If the call provides information to be sent over the air only, the determinate value is set to A1. If the call is only a referral, the determinate value is set to Ω1. Once a determinate value is set 3174, the appropriate response is dispatched 3175 and pre-arrival instructions 3173 are provided to the caller. The appropriate dispatched response 3175 is based on the calculated determinate value. The preferred pre-arrival instructions 3019 of this protocol include: (a) do not disturb anything at the scene including weapons, tools, or objects found nearby; (b) for noise complaints, call back if the noise stops; (c) for court order involvement, have all paperwork available for responding officers; and (d) if appropriate, lock your doors and windows, if the person returns, do not let him/her in and call back immediately. This protocol also provides the following rules: (1) Always consider weapons to be involved in physical disturbances; (2) Reports of arguments or fights are disturbances as long as they do not involve parties in an intimate or cohabitation relationship; and (3) Loud music, loud vehicles, loud talking, and barking dog complaints should be classified as 113-B-3 Noise/Loud Music Disturbance or handled as a referral.

FIG. 3p shows the preferred steps of the Disturbance (Domestic) Protocol. A domestic disturbance is any disturbance where the parties involved are in an intimate or co-habitational relationship. Domestic violence is a general term that is used to cover physical and mental abuse that occurs within the home and family. It usually involves arguments between partners, siblings, and parents and usually occurs over a long period of time. The victims of domestic violence often suffer in silence. Generally, when the police are called, it is not the first occasion on which the abuse has occurred. The abuse can range from serious assaults and beating to psychological abuse and attacks on "one" elf-esteem and character. In the present embodiment of this invention, each of the inquiries is made and the information is collected via the telephone equipment 107. An inquiry 3176 is made to determine what weapons were involved or mentioned. Where the person responsible is located is identified 3177. If possible, the description of the person is determined 3178. How the person arrived is determined 3179. An inquiry 3180 is made to learn if children are present. Whether anyone involved has been using alcohol or drugs is determined 3181. An inquiry 3182 is made to learn if a court order is in place. Whether anyone is injured is determined 3183. An inquiry 3184 is made to learn if the caller is safe and out of danger. The pre-arrival instructions 3185 are prepared. The determinate value 3186 is set as follows. If a life threat exists the determinate value is set to E1. If the officer or dispatcher believes, in his or her discretion, that the call is critical, the determinate value is set to E2. If the incident is in progress or occurred within the last five minutes, the determinate value is set to D1. If the suspect is on still on the scene or is nearby, the determinate value is set to D2. If the incident occurred more than five minutes ago, the determinate value is set to C1. If a medical response is required, the determinate value is set to C2. If the incident occurred more than thirty minutes ago, the determinate value is set to B1. If the suspect is not on the scene and is not nearby, the determinate value is set to B2. If the call provides information to be sent over the air only, the determinate value is set to A1. If the call is only a referral, the determinate value is set to Ω1. Once a determinate value is set 3186, the appropriate response is dispatched 3187 and pre-arrival instructions 3185 are provided to the caller. The appropriate dispatched response 3187 is based on the calculated determinate value. The preferred pre-arrival instructions 3185 of this protocol include: (a) if appropriate, lock your doors and windows, if the person returns, do not let him/her in and call back immediately; (b) do not disturb anything at the scene including weapons, tools, or objects found nearby; and (c) if court order/injunction involved, have all paperwork available for the responding officers. This protocol also provides the following rules: (1) Always consider weapons to be involved in domestic disturbances; (2) Reports of arguments or fights are disturbances as long as they do not involve parties in an intimate or cohabitation relationship; and (3) domestic violence has the potential for escalating at any time. The axioms of this disturbance (domestic) protocol are: (1) Domestic violence has no social, ethnic, or economic boundaries; (2) The majority of victims are women; (3) Victims of abuse can always leave home, but there are many economic, social and emotional factors that contribute to the decision to stay. Some factors include: economic dependence; children; fear of reprisals; lack of knowledge and access to help; social isolation; and emotional dependence; and shame.

FIG. 3q shows the preferred steps of the Driving Under The Influence (DUI) Protocol. Driving under the influence is an offense committed by one in control of a motor vehicle while under the influence of intoxicating liquor or drugs. Indications of possible DUI include: driving on the wrong side of the road; extremely slow speed; high speed; lights off at night; an open container of alcohol; and weaving on the road. In the present embodiment of this invention, each of the inquiries is made and the information is collected via the telephone equipment 107. An inquiry 3188 is made to determine what weapons were involved or mentioned. The description of the vehicle is determined 3189. The vehicle location is identified 3190. The direction of the vehicle 3191 is identified. Whether the caller is following the vehicle is determined 3192. If possible, the description of the suspect is determined 3193. Where the suspect is going is determined 3194. If appropriate, where the suspect is going is determined 3194. Whether anyone is injured is determined 3195. The determinate value is set 3196 as follows. If a life threat exists the determinate value is set to E1. If the officer or dispatcher believes, in his or her discretion, that the call is critical, the determinate value is set to E2. If the incident is in progress or occurred within the last five minutes, the determinate value is set to D1. If the suspect is on still on the scene or is nearby, the determinate value is set to D2. If the incident occurred more than five minutes ago, the determinate value is set to C1. If a medical response is required, the determinate value is set to C2. If the incident occurred more than thirty minutes ago, the determinate value is set to B1. If the suspect is not on the scene and is not nearby, the determinate value is set to B2. If the call provides information to be sent over the air only, the determinate value is set to A1. If the call is only a referral, the determinate value is set to $\Omega 1$. Once a determinate value is set 3196, the appropriate response is dispatched 3197. The appropriate dispatched response 3197 is based on the calculated determinate value. The axiom of the driving under the influence protocol is open container violations in motor vehicles often lead to driving under the influence complaints.

FIG. 3r shows the preferred steps of the Drugs Protocol. The drugs of interested in this protocol are substances that can affect the central nervous system causing changes in behavior and often addiction. Examples of drug offenses include: illegal possession or manufacture of drugs; unlawful cultivation; inhaling of substances like glue, hairspray and print products; and unlawful use of Marijuana. In the present embodiment of this invention, each of the inquiries is made and the information is collected via the telephone equipment 107. An inquiry 3198 is made to determine what weapons were involved or mentioned. Where the responsible person is located is identified 3199. If possible, the description of the person is determined 3200. How the person arrived is determined 3201. The safest route to approach the location is identified 3202. The size of the cultivated area is determined 3203 if appropriate. Whether anyone is injured or sick is determined 3204. An inquiry 3205 is made to learn if the caller is safe and out of danger.

The pre-arrival instructions 3206 are prepared. The determinate value is set 3207 as follows. If a life threat exists the determinate value is set to E1. If the officer or dispatcher believes, in his or her discretion, that the call is critical, the determinate value is set to E2. If the incident is in progress or occurred within the last five minutes, the determinate value is set to D1. If the suspect is on still on the scene or is nearby, the determinate value is set to D2. If the incident occurred more than five minutes ago, the determinate value is set to C1. If a medical response is required, the determinate value is set to C2. If the incident occurred more than thirty minutes ago, the determinate value is set to B1. If the suspect is not on the scene and is not nearby, the determinate value is set to B2. If the call provides information to be sent over the air only, the determinate value is set to A1. If the call is only a referral, the determinate value is set to $\Omega 1$. Once a determinate value is set 3207, the appropriate response is dispatched 3208 and pre-arrival instructions 3206 are provided to the caller. The appropriate dispatched response 3208 is based on the calculated determinate value. The preferred pre-arrival instructions 3206 of this protocol include: (a) if appropriate, do not touch anything. This protocol also provides the following rule: Advise responders if the location is a known or possible "drug lab." The axioms of this drugs protocol are (1) Drug paraphernalia may consist of needles, syringes, homemade pipes, bongs, baggies or small glassine bags; (2) The ultimate goal is to identify and arrest the source of the illegal drug. The best way to accomplish this goal may be to obtain the information for the Narcotics Section, which allows detectives to follow through with an undercover investigation; (3) The sight of a uniformed officer or a marked police vehicle often prompts the suspects to dispose of the drug, cease the activity temporarily, or flee the area, this solves the immediate problem, but does not generally lead to the successful completion of the ultimate goal; (4) Clandestine laboratories are illicit operations consisting of chemicals and equipment necessary to manufacture controlled substances, laboratories can be found anywhere; and (5) Effects of inhalants intoxication resemble those of alcohol inebriation (stimulation and loss of inhibition, followed by depression).

FIG. 3s shows the preferred steps of the Explosion Protocol. An explosion event can be accidental or intentional and can include burst pipes, gas main explosions, terrorist activities, electrical explosions and sonic booms. In the present embodiment of this invention, each of the inquiries is made and the information is collected via the telephone equipment 107. An inquiry 3209 is made to determine what has exploded. Whether the caller can see any flames is inquired 3210. An inquiry 3211 is made to gain a description of the extent of the damage. Whether the caller hears bursting or hissing sounds is determined 3212. Any complaint of an unusual odor is identified 3213. If anyone is injured or sick is determined 3214. An inquiry 3215 is made to learn if there are any unexploded devices left. Where the responsible person is located is identified 3216. If possible, the description of the suspect is determined 3217. How the suspect person arrived is determined 3218. An inquiry 3219 is made to learn if the caller is safe and out of danger. The pre-arrival instructions 3220 are prepared. The determinate value is set 3221 as follows. If a life threat exists the determinate value is set to E1. If the officer or dispatcher believes, in his or her discretion, that the call is critical, the determinate value is set to E2. If the incident is in progress or occurred within the last five minutes, the determinate value is set to D1. If the suspect is on still on the scene or is nearby, the determinate value is set to D2. If the incident occurred more than five minutes ago, the determinate value is set to C1. If a medical response is required, the determinate value is set to C2. If the incident occurred more than thirty minutes ago, the determinate value is set to B1. If the suspect is not on the scene and is not nearby, the determinate value is set to B2. If the call provides information to be sent over the air only, the determinate value is set to A1. If the call is only a referral, the determinate value is set to $\Omega 1$. Once a determinate value is set 318, the appropriate response is dispatched 3020 and pre-arrival instructions 3019 are provided to the caller. The appropriate dispatched response 3020 is based on the calculated determinate value. The preferred pre-arrival instructions 3019 of this protocol include: (a) stay away from any unexploded devices, gas, fumes, and flames; (b) do not disturb anything at the scene including weapons, tools, or objects found nearby; and (c) if it's safe to do so, keep all bystanders away from the area. The axiom of this explosion protocol is usually odors can signify what type of gas is present and include: fruity, strong garlic, geraniums, bitter almonds, and new mown lawn smells.

FIG. 3t shows the preferred steps of the Fraud/Deception Protocol. Fraud is a false representation of a matter of fact, whether by words or by conduct, by false or misleading allegations, or by concealment of that which should have been disclosed. Deception is the act of deceiving or intentionally misleading by falsehood whether spoken or acted. Knowingly and willfully making a false statement or representation, express or implied, pertaining to a present or past fact. Uttering is the act of passing a forged document in person or by telephone. Examples of fraud and deception include: forged checks; altered prescriptions, bait and switch; con games, shell games and flim-flam. In the present embodiment of this invention, each of the inquiries is made and the information is collected via the telephone equipment 107. An inquiry 3223 is made to determine what weapons were involved or mentioned. Where the responsible person is located is identified 3224. If possible, the description of the suspect person is determined 3225. How the person arrived is determined 3226. An inquiry 3227 is made to learn if the caller is safe and out of danger. The pre-arrival instructions 3228 are prepared. The determinate value is set 3229 as follows. If a life threat exists the determinate value is set to E1. If the officer or dispatcher believes, in his or her discretion, that the call is critical, the determinate value is set to E2. If the incident is in progress or occurred within the last five minutes, the determinate value is set to D1. If the suspect is on still on the scene or is nearby, the determinate value is set to D2. If the incident occurred more than five minutes ago, the determinate value is set to C1. If a medical response is required, the determinate value is set to C2. If the incident occurred more than thirty minutes ago, the determinate value is set to B1. If the suspect is not on the scene and is not nearby, the determinate value is set to B2. If the call provides information to be sent over the air only, the determinate value is set to A1. If the call is only a referral, the determinate value is set to $\Omega 1$. Once a determinate value is set 3229, the appropriate response is dispatched 3230 and pre-arrival instructions 3228 are provided to the caller. The appropriate dispatched response 3230 is based on the calculated determinate value. The preferred pre-arrival instructions 3228 of this protocol include: (a) if appropriate, have all required paperwork (such as an affidavit of forgery) ready. The axioms of this fraud/deception protocol are (1) There is usually some element of truth or believability in a con artist's story; (2) Elderly people frequently are the targets for con artists; and (3) Con artists may operate by telling people they will help find funding for college education, ask them to hold something of value but require some money from the victim first as a "good faith" gesture, write checks on closed accounts, or have insufficient funds to cover the check.

FIG. 3u shows the preferred steps of the Harassment/Stalking/Threats Protocol. Harassment can be the making of a telephone call without purpose of legitimate communications, especially when it is made to another in an insulting, taunting or challenging manner likely to provide violent or disorderly response, or making repeated communications anonymously, at extremely inconvenient hours or in offensively coarse language. Stalking is the crime of willfully, maliciously, and repeatedly following or harassing another and making threats intended to put the person in imminent fear of death or serious bodily injury. In the present embodiment of this invention, each of the inquiries is made and the information is collected via the telephone equipment 107. An inquiry 3231 is made to determine what weapons were involved or mentioned. What the threat is determined 3232. Where the responsible person is located is identified 3233. If possible, the description of the suspect person is determined 3234. How the suspect person arrived is determined 3235. The telephone number of the suspect is identified 3236 if possible. An inquiry 3237 is made to learn if a court order is in place. Whether anyone is injured or sick is determined 3238. An inquiry 3239 is made to learn if the caller is safe and out of danger. Pre-arrival instructions 3240 are prepared. The determinate value is set 3241 as follows. If a life threat exists the determinate value is set to E1. If the officer or dispatcher believes, in his or her discretion, that the call is critical, the determinate value is set to E2. If the incident is in progress or occurred within the last five minutes, the determinate value is set to D1. If the suspect is on still on the scene or is nearby, the determinate value is set to D2. If the incident occurred more than five minutes ago, the determinate value is set to C1. If a medical response is required, the determinate value is set to C2. If the incident occurred more than thirty minutes ago, the determinate value is set to B1. If the suspect is not on the scene and is not nearby, the determinate value is set to B2. If the call provides information to be sent over the air only, the determinate value is set to A1. If the call is only a referral, the determinate value is set to $\Omega 1$. Once a determinate value is set 3241, the appropriate response is dispatched 3242 and pre-arrival instructions 3240 are provided to the caller. The appropriate dispatched response 3242 is based on the calculated determinate value. The preferred pre-arrival instructions 3240 of this protocol include: (a) make a list of all dates, times and details of previous incidents; (b) do not disturb anything at the scene including weapons, tools, or objects found nearby; (c) if by telephone, do not erase the caller ID or recorded message; and (d) if by telephone, attempt a telephone trace by dialing *69, or the equivalent, if you get a recording saying the line is blocked, dial *57 or the equivalent. This protocol provides the following rule: all stalking situations are considered to be dangerous and potentially violent. The axioms of this harassment/stalking/threats protocol are: (1) In most cases, dialing *69 will obtain the telephone of the last call received and then provide the option of dialing it; (2) Information recorded when dialing *57 can be released only to local law enforcement personnel because it may include blocked or normally unobtainable numbers; and (3) The victim commonly knows the suspect.

FIG. 3v shows the preferred steps of the Indecency/Lewdness Protocol. Lewdness is gross and wanton indecency so notorious as to tend to corrupt the community's morals. Indecency is conduct that is considered provocative or offensive. This term is often used when referring to pornography, prostitution and improper exposure of the body. In the present embodiment of this invention, each of the inquiries is made and the information is collected via the telephone equipment 107. Where the responsible person is located is identified 3243. If possible, the description of the suspect person is determined 3244. How the suspect person arrived is determined 3245. Whether anyone is injured or sick is determined 3246. An inquiry 3247 is made to learn if the caller is safe and out of danger. Pre-arrival instructions 3248 are prepared. The determinate value is set 3249 as follows. If a life threat exists the determinate value is set to E1. If the officer or dispatcher believes, in his or her discretion, that the call is critical, the determinate value is set to E2. If the incident is in progress or occurred within the last five minutes, the determinate value is set to D1. If the suspect is on still on the scene or is nearby, the determinate value is set to D2. If the incident occurred more than five minutes ago, the determinate value is set to C1. If a medical response is required, the determinate value is set to C2. If the incident occurred more than thirty minutes ago, the determinate value is set to B1. If the suspect is not on the scene and is not nearby, the determinate value is set to B2. If the call provides information to be sent over the air only, the determinate value is set to A1. If the call is only a referral, the determinate value is set to $\Omega 1$. Once a determinate value is set 3249, the appropriate response is dispatched 3250 and pre-arrival instructions 3248 are provided to the caller. The appropriate dispatched response 3250 is based on the calculated determinate value. The preferred pre-arrival instructions 3248 of this protocol include: (a) do not disturb anything at the scene including weapons, tools, or objects found nearby. The axiom of this indecency/lewdness protocol is suspects in indecent exposures are usually male.

FIG. 3w shows the preferred steps of the Juvenile Protocol. A juvenile is a male or female who has not attained the legal age of majority. A juvenile is further defined as a person who has not been deemed an adult by a directive of the courts, or who has not yet attained the age at which he or she should be treated as an adult for the purpose of criminal law. Child neglect is any case in which the child's parents, legal guardians or custodians fail to take the same actions to provide adequate food, clothing, shelter, affection, medical care, other suitable care, or supervision that a prudent parent would take. Abuse is any intentional act that causes physical harm, or harms a child's moral or mental well being. In the present embodiment of this invention, each of the inquiries is made and the information is collected via the telephone equipment 107. An inquiry 3251 is made to determine what weapons were involved or mentioned. Where the responsible person is located is identified 3252. If possible, the description of the suspect person is determined 3253. How the suspect person arrived is determined 3254. If appropriate, a vehicle description is determined 3255. Whether anyone is injured or sick is determined 3256. An inquiry 3257 is made to learn if the caller is safe and out of danger.

Pre-arrival instructions 3258 are prepared. The determinate value is set 3259 as follows. If a life threat exists the determinate value is set to E1. If the officer or dispatcher believes, in his or her discretion, that the call is critical, the determinate value is set to E2. If the incident is in progress or occurred within the last five minutes, the determinate value is set to D1. If the suspect is on still on the scene or is nearby, the determinate value is set to D2. If the incident occurred more than five minutes ago, the determinate value is set to C1. If a medical response is required, the determinate value is set to C2. If the incident occurred more than thirty minutes ago, the determinate value is set to B1. If the suspect is not on the scene and is not nearby, the determinate value is set to B2. If the call provides information to be sent over the air only, the determinate value is set to A1. If the call is only a referral, the determinate value is set to Ω1. Once a determinate value is set 3259, the appropriate response is dispatched 3260 and pre-arrival instructions 3258 are provided to the caller. The appropriate dispatched response 3260 is based on the calculated determinate value. The preferred pre-arrival instructions 3258 of this protocol include: (a) do not disturb anything at the scene including weapons, tools, or objects found nearby; and (b) call me back if the person responsible returns. The axiom of this juvenile (abuse, abandoned, neglect) protocol is third party callers usually report juvenile situations, not the victims themselves.

FIG. 3x shows the preferred steps of the Mental Disorder Protocol. Metal incapacity or incompetence is established when a person lacks essential reasoning faculties, or when a person is incapable of understanding and acting with discretion in the ordinary affairs of life. Mental disorder is a broad term that covers a person exhibiting bizarre, possible mentally related behavior. In the present embodiment of this invention, each of the inquiries is made and the information is collected via the telephone equipment 107. Whether a 1 st person caller or a 2nd or third person caller is calling is determined 3261. If the caller is a 2nd or 3rd person caller, an inquiry 3262 is made to determine what weapons were involved or mentioned. Where the responsible person is located is identified 3263. If possible, the description of the suspect person is determined 3264. Whether anyone is injured or sick is determined 3265. An inquiry 3266 is made to learn if the caller is safe and out of danger. If the caller is a first person caller, an inquiry 3267 is made to learn if anyone else is present. An inquiry 3268 is made to learn if the caller has weapons. Whether the caller is under medical care is determined 3269. An inquiry 3270 is made to learn if there is someone that can be contacted for the caller. An inquiry 3271 is made to learn if the caller is injured. After the caller inquiries are completed, pre-arrival instructions 3272 are prepared. The determinate value is set 3273 as follows. If a life threat exists the determinate value is set to E1. If the officer or dispatcher believes, in his or her discretion, that the call is critical, the determinate value is set to E2. If the incident is in progress or occurred within the last five minutes, the determinate value is set to D1. If the suspect is on still on the scene or is nearby, the determinate value is set to D2. If the incident occurred more than five minutes ago, the determinate value is set to C1. If a medical response is required, the determinate value is set to C2. If the incident occurred more than thirty minutes ago, the determinate value is set to B1. If the suspect is not on the scene and is not nearby, the determinate value is set to B2. If the call provides information to be sent over the air only, the determinate value is set to A1. If the call is only a referral, the determinate value is set to Ω1. Once a determinate value is set 3273, the appropriate response is dispatched 3274 and pre-arrival instructions 3272 are provided to the caller. The appropriate dispatched response 3274 is based on the calculated determinate value. The preferred pre-arrival instructions 3272 of this protocol include: (a) speak softly and calmly, do not upset the person; and (b) write down any drugs (medications) the person is taking. This protocol also provides the following rule: asking a distraught person if they are thinking about suicide does not encourage them to do so. Individuals that have reached that point in depression have already decided to either take their lives or not. The axiom of this mental disorder protocol is the behavior of mentally unstable people may often be unpredictable.

FIG. 3y shows the preferred steps of the Miscellaneous Protocol. This protocol addresses events that do not fit anywhere else in the protocol series. Some examples include: illegal immigrants, weather-generated calls for service and Elvis sightings. In the present embodiment of this invention, each of the inquiries is made and the information is collected via the telephone equipment 107. An inquiry 3275 is made to determine what weapons were involved or mentioned. Where the responsible person is located is identified 3276. If possible, the description of the suspect person is determined 3277. How the suspect person arrived is determined 3278. An inquiry 3279 is made to determine what other information the dispatcher should know. Whether anyone is injured or sick is determined 3280. An inquiry 3281 is made to learn if the caller is safe and out of danger. Pre-arrival instructions 3282 are prepared. The determinate value is set 3283 as follows. If a life threat exists the determinate value is set to E1. If the officer or dispatcher believes, in his or her discretion, that the call is critical, the determinate value is set to E2. If the incident is in progress or occurred within the last five minutes, the determinate value is set to D1. If the suspect is on still on the scene or is nearby, the determinate value is set to D2. If the incident occurred more than five minutes ago, the determinate value is set to C1. If a medical response is required, the determinate value is set to C2. If the incident occurred more than thirty minutes ago, the determinate value is set to B1. If the suspect is not on the scene and is not nearby, the determinate value is set to B2. If the call provides information to be sent over the air only, the determinate value is set to A1. If the call is only a referral, the determinate value is set to Ω1. Once a determinate value is set 3283, the appropriate response is dispatched 3284 and pre-arrival instructions 3282 are provided to the caller. The appropriate dispatched response 3284 is based on the calculated determinate value. The preferred pre-arrival instructions 3282 of this protocol include: (a) do not disturb anything at the scene including weapons, tools, or objects found nearby. This protocol also provides the following rule: when a more specific incident type become known, it is appropriate to shunt to the proper incident type during interrogation.

FIG. 3z shows the preferred steps of the Missing/Found Person Protocol. A missing person is any person whose location is not known, but where there is not evidence that a criminal act has taken place. A found person is a person who has been located. At particular risk of becoming a missing person are very young people, the elderly and persons with physical or mental handicaps that impair their ability to care for themselves, or to make sound decisions based on circumstances presented to them. In the present embodiment of this invention, each of the inquiries is made and the information is collected via the telephone equipment 107. An inquiry 3285 is made to determine the type of call that is determining whether the call concerns a missing person or a found person. If the call concerns a missing person, a description of the missing person is obtained 3286. An inquiry 3287 is made to learn when the caller last saw the person. Whether a vehicle was used is determined 3288. Where the person may have gone is identified 3289. An inquiry 3290 is made to learn if the person has been missing before. If the person took personal items is determined 3291. Whether the missing person has a relevant medical or metal condition is determined 3292. An inquiry 3293 is made to learn if the person may have run away. If appropriate, whether a court order is in place is determined 3294. If the call concerns a found person, an inquiry 3295 is made to get a description of the found person. Whether the person is cooperative is determined 3296. Inquiries are made to determine if the found person knows his or her identity 3297, where he or she lives 3298, and who can be contacted 3300. An inquiry 3301 is made to determine if the person is a runaway. An inquiry 3302 is made to learn if the found person is injured or sick. After the information is gathered from the caller, pre-arrival instructions 3303 are prepared. The determinate value is set 3304 as follows. If a life threat exists the determinate value is set to E1. If the officer or dispatcher believes, in his or her discretion, that the call is critical, the determinate value is set to E2. If the incident is in progress or occurred within the last five minutes, the determinate value is set to D1. If the suspect is on still on the scene or is nearby, the determinate value is set to D2. If the incident occurred more than five minutes ago, the determinate value is set to C1. If a medical response is required, the determinate value is set to C2. If the incident occurred more than thirty minutes ago, the determinate value is set to B1. If the suspect is not on the scene and is not nearby, the determinate value is set to B2. If the call provides information to be sent over the air only, the determinate value is set to A1. If the call is only a referral, the determinate value is set to Ω1. Once a determinate value is set 3304, the appropriate response is dispatched 3305 and pre-arrival instructions 3303 are provided to the caller. The appropriate dispatched response 3305 is based on the calculated determinate value. The preferred pre-arrival instructions 3303 of this protocol include: For a missing person—(a) try to find a recent photograph of him or her; (b) make a list of her or his friends, including their addresses and phone numbers; (c) write down the names of the favorite places he or she frequents; (d) try to locate her or him by checking with her or his friends; and (e) if he or she is located, call back immediately. For a found person—(a) call back if she or he leaves to update with his or her location. The axioms of this missing/found person protocol are: (1) "Missing" elementary school age children are usually found at a friend's home, or return from friend's homes past the time they were expected; (2) Many "missing" middle school age and older children have actually run away from home; and (3) Many murders begin as missing person reports.

FIG. 3aa shows the preferred steps of the Officer Needs Assistance Protocol. This protocol is used when any law enforcement officer needs some type of assistance or aid. It is generally used in emergency situations where the safety of the office is at stake. In the present embodiment of this invention, each of the inquiries is made and the information is collected via the telephone equipment 107. An inquiry 3306 is made to determine what weapons were involved or mentioned. Where the responsible person is located is identified 3307. If possible, the description of the suspect person is determined 3308. How the suspect person arrived is determined 3309. An inquiry 3310 is made to determine where the officer is now. The description of the officer is obtained 3311 and, if appropriate, the police vehicle number is obtained 3312. Whether anyone is injured or sick is determined 3313. An inquiry 3314 is made to learn if the caller is safe and out of danger. Pre-arrival instructions 3315 are prepared. The determinate value is set 3316 as follows. If a life threat exists the determinate value is set to E1. If the officer or dispatcher believes, in his or her discretion, that the call is critical, the determinate value is set to E2. If the incident is in progress or occurred within the last five minutes, the determinate value is set to D1. If the suspect is on still on the scene or is nearby, the determinate value is set to D2. If the incident occurred more than five minutes ago, the determinate value is set to C1. If a medical response is required, the determinate value is set to C2. If the incident occurred more than thirty minutes ago, the determinate value is set to B1. If the suspect is not on the scene and is not nearby, the determinate value is set to B2. If the call provides information to be sent over the air only, the determinate value is set to A1. If the call is only a referral, the determinate value is set to Ω1. Once a determinate value is set 3316, the appropriate response is dispatched 3317 and pre-arrival instructions 3315 are provided to the caller. The appropriate dispatched response 3317 is based on the calculated determinate value. The preferred pre-arrival instructions 3315 of this protocol include: (a) do not disturb anything at the scene including weapons, tools, or objects found nearby; and (b) if the assailant (attacker) is nearby, keep very quiet and stay out of sight. This protocol also provides the following rules: (1) weapons are present at all Officer Needs Assistance scenes; and (2) an Officer Needs Assistance call will create an emotional response from all officers hearing the call, it is important for the dispatcher to maintain control of the response in order to help ensure the safety of the officer involved. The axioms of this officer needs assistance protocol include: (1) Most Officer Needs Assistance calls involve a physical struggle between the officer and another person; and (2) Citizens can call in Officer Needs Assistance calls over the officer's radio.

FIG. 3ab shows the preferred steps of the Public Service Protocol. Public service is where police, fire or others engage in a civil activity or provide a function that does not involve investigating criminal activity. This may include urgent requests to check the well-being of a person who has not been seen or heard from for an unusual period of time or whose situation may be life threatening; non-urgent requests to check the well-being of a person who may need temporary shelter, food, or help in other ways but whose situation does not appear to be life threatening; assistance to people who need help after accidentally lock themselves in or out of their house or vehicle; and requests for officers to standby to keep the peace while people obtain property or exchange children.

In the present embodiment of this invention, each of the inquiries is made and the information is collected via the telephone equipment 107. An inquiry 3318 is made to determine the type of call that is determining whether the call concerns a lock in/lock out situation, a keep the peace situation, or a check welfare situation. If the call concerns a lock in/lock out situation, a description of the vehicle is obtained 3319. An inquiry 3320 is made to learn if the vehicle is occupied. Whether anyone has a key is determined 3321. If possible and appropriate, a description of the suspect is obtained 3322. An inquiry 3323 is made to determine if anyone is injured. If the call is a keep the peace call, an inquiry 3324 is made to determine if weapons are involved or mentioned. If possible, a suspect description is obtained 3325. An inquiry 3326 is made to determine if a court order is in place. Whether anyone is injured or sick is determined 3327. An inquiry 3328 is made to learn if the caller is safe and out of danger. Where the call is a check welfare call, an inquiry 3329 is made to determine if weapons are involved or mentioned, and to determine 3330 if the person is cooperative. If possible, a suspect description is obtained 3331. An inquiry 3332 is made to get a description of the vehicle, if appropriate. Whether the person has any relevant medical or mental conditions is determined 3333. An inquiry 3334 is made to determine if anyone has a key to the resident or vehicle. Whether anyone is injured or sick is determined 3335. An inquiry 3336 is made to learn if the caller is safe and out of danger. After the information is gathered from the caller, pre-arrival instructions 3337 are prepared. The determinate value is set 3338 as follows. If a life threat exists the determinate value is set to E1. If the officer or dispatcher believes, in his or her discretion, that the call is critical, the determinate value is set to E2. If the incident is in progress or occurred within the last five minutes, the determinate value is set to D1. If the suspect is on still on the scene or is nearby, the determinate value is set to D2. If the incident occurred more than five minutes ago, the determinate value is set to C1. If a medical response is required, the determinate value is set to C2. If the incident occurred more than thirty minutes ago, the determinate value is set to B1. If the suspect is not on the scene and is not nearby, the determinate value is set to B2. If the call provides information to be sent over the air only, the determinate value is set to A1. If the call is only a referral, the determinate value is set to Ω1. Once a determinate value is set 3338, the appropriate response is dispatched 3339 and pre-arrival instructions 3337 are provided to the caller. The appropriate dispatched response 3339 is based on the calculated determinate value. The preferred pre-arrival instructions 3337 of this protocol include: (a) if a lockout/welfare check, attempt to notify a keyholder and have them respond; (b) if a keep the peace call, have a copy of related documents ready for the officer; and (c) if a keep the peace call, officers can only stand by while essential personal property is obtained, they will not stand by indefinitely while you negotiate any disposition of property. This protocol also provides the following rules: (1) open line to calls with sounds of a disturbance in the background should be classified as Urgent Check the Welfare calls; and (2) open line to calls with no sounds in the background should be classified as Non-Urgent Check the Welfare calls. The axioms of this public service (lock-out/in, peace, welfare) protocol are: (1) Lockouts can be life-threatening situations if they occur during extreme weather conditions, (2) Check the Welfare calls should be considered crime scenes until information indicates they are otherwise, (3) A homeless person searching for a place to sleep may be a Non-Urgent Check the Welfare call, and (4) Young children playing in the street may be an Urgent Check the Welfare call.

FIG. 3ac shows the preferred steps of the Robbery Protocol. Robbery is defined as the taking of money, personal property, or any other article of value in the possession of another, from his or her person or immediate presence, and against his or her will, which has been accomplished by means of force or fear. In the present embodiment of this invention, each of the inquiries is made and the information is collected via the telephone equipment 107. An inquiry 3340 is made to determine what weapons were involved or mentioned. Where the responsible person is located is identified 3341. If possible, the description of the suspect person is determined 3342. How the suspect person arrived is determined 3343. An inquiry 3344 is made to determine what was taken. Whether anyone is injured or sick is determined 3345. An inquiry 3346 is made to learn if the caller is safe and out of danger. Pre-arrival instructions 3347 are prepared. The determinate value is set 3348 as follows. If a life threat exists the determinate value is set to E1. If the officer or dispatcher believes, in his or her discretion, that the call is critical, the determinate value is set to E2. If the incident is in progress or occurred within the last five minutes, the determinate value is set to D1. If the suspect is on still on the scene or is nearby, the determinate value is set to D2. If the incident occurred more than five minutes ago, the determinate value is set to C1. If a medical response is required, the determinate value is set to C2. If the incident occurred more than thirty minutes ago, the determinate value is set to B1. If the suspect is not on the scene and is not nearby, the determinate value is set to B2. If the call provides information to be sent over the air only, the determinate value is set to A1. If the call is only a referral, the determinate value is set to Ω1. Once a determinate value is set 3348, the appropriate response is dispatched 3349 and pre-arrival instructions 3347 are provided to the caller. The appropriate dispatched response 3349 is based on the calculated determinate value. The preferred pre-arrival instructions 33347 of this protocol include, for a business: (a) if it's safe to do so, lock the door and come back to the phone; (b) secure the videotape of the incident if it is available; and (c) do not disturb anything at the scene including weapons, tools or objects found nearby. The axiom of this robbery protocol is weapons are used or mentioned in most robberies.

FIG. 3ad shows the preferred steps of the Suicidal Person Protocol. A suicidal person is a person considering self-destruction, which is the deliberate termination of one's own life. In the present embodiment of this invention, each of the inquiries is made and the information is collected via the telephone equipment 107. An inquiry 3350 is made to determine if the caller is a 2nd or 3rd party caller or a 1st party caller. If the caller is a 2nd or 3rd party caller, an inquiry 3351 is made to determine if weapons are involved or mentioned. The location of suicidal person is obtained 3352. If possible and appropriate, a description of the suspect is obtained 3353. An inquiry 3354 is made to learn if the person is violent. How the person is going to hurt his or her self is determined 3355. How the person arrived is determined 3356. If possible and appropriate, a description of the suspect is obtained 3322. Whether anyone is injured or sick is determined 3357. An inquiry 3358 is made to learn if the caller is safe and out of danger. If the call is a 1st party caller, an inquiry 3359 is made to determine how the person intends to kill her or his self. A determination 3360 is made to determine if weapons are involved or mentioned. If possible, the caller's description is obtained. An inquiry 3361 is made to determine if anyone else is with the caller. Why the caller wants to kill himself or herself is learned 3362. Whether the caller is injured or sick is determined 3363. After the information is gathered from the caller, pre-arrival instructions 3364 are prepared. The determinate value is set 3365 as follows. If a life threat exists the determinate value is set to E1. If the officer or dispatcher believes, in his or her discretion, that the call is critical, the determinate value is set to E2. If the incident is in progress or occurred within the last five minutes, the determinate value is set to D1. If the suspect is on still on the scene or is nearby, the determinate value is set to D2. If the incident occurred more than five minutes ago, the determinate value is set to C1. If a medical response is required, the determinate value is set to C2. If the incident occurred more than thirty minutes ago, the determinate value is set to B1. If the suspect is not on the scene and is not nearby, the determinate value is set to B2. If the call provides information to be sent over the air only, the determinate value is set to A1. If the call is only a referral, the determinate value is set to Ω1. Once a determinate value is set 3365, the appropriate response is dispatched 3366 and pre-arrival instructions 3364 are provided to the caller. The appropriate dispatched response 3366 is based on the calculated determinate value. The preferred pre-arrival instructions 3364 of this protocol include, for 2nd or 3rd party callers: (a) speak softly and calmly to the person; (b) write down any known drugs (medications) the person has taken; and (c) write down the names, addresses, and phone numbers of any family or friends that he or she might go see, or that the officers can speak with. This protocol also provides the following rule: suicides are considered homicides until proven otherwise. The axiom of this suicidal person protocol is most people who call threatening suicide have not made that decision yet and are really asking for help.

FIG. 3ae shows the preferred steps of the Supplemental Protocol. This protocol is used to add information to an existing report. It can be in the form of additional suspect information, additional items missing or general information about the circumstances of the incident. In the present embodiment of this invention, each of the inquiries is made and the information is collected via the telephone equipment 107. An inquiry 3367 is made to determine the type of incident that information is to be added to. The original case number is obtained 3368. The type of information is determined 3369. An inquiry 3370 is made to learn the name of the officer who took the report. If appropriate, the agency the officer works for is identified 3371. The determinate value is set 3372 as follows. If a life threat exists the determinate value is set to E1. If the officer or dispatcher believes, in his or her discretion, that the call is critical, the determinate value is set to E2. If the incident is in progress or occurred within the last five minutes, the determinate value is set to D1. If the suspect is on still on the scene or is nearby, the determinate value is set to D2. If the incident occurred more than five minutes ago, the determinate value is set to C1. If a medical response is required, the determinate value is set to C2. If the incident occurred more than thirty minutes ago, the determinate value is set to B1. If the suspect is not on the scene and is not nearby, the determinate value is set to B2. If the call provides information to be sent over the air only, the determinate value is set to A1. If the call is only a referral, the determinate value is set to Ω1. Once a determinate value is set 3372, the appropriate response is dispatched 3373. The appropriate dispatched response 3373 is based on the calculated determinate value. This protocol has the following rule supplements are not "In Process" events.

FIG. 3af shows the preferred steps of the Suspicious/Wanted Protocol. Suspicion implies the belief or opinion based upon the facts or circumstances, which do not amount to proof. Wanted refers to a person or vehicle sought by the police in connection with a crime. In the present embodiment of this invention, each of the inquiries is made and the information is collected via the telephone equipment 107. An inquiry 3381 is made to determine what weapons were involved or mentioned. What the person is wanted for is determined 3382. An inquiry 3383 is made to learn what is suspicious about this person. The vehicle description is obtained 3384. The location of the responsible persons is identified 3385. If possible, the description of the suspect person is determined 3386. How the suspect person arrived is determined 3387. Whether anyone is injured or sick is determined 3388. An inquiry 3389 is made to learn if the caller is safe and out of danger. Pre-arrival instructions 3390 are prepared. The determinate value is set 3391 as followed. If a life threat exists the determinate value is set to E1. If the officer or dispatcher believes, in his or her discretion, that the call is critical, the determinate value is set to E2. If the incident is in progress or occurred within the last five minutes, the determinate value is set to D1. If the suspect is on still on the scene or is nearby, the determinate value is set to D2. If the incident occurred more than five minutes ago, the determinate value is set to C1. If a medical response is required, the determinate value is set to C2. If the incident occurred more than thirty minutes ago, the determinate value is set to B1. If the suspect is not on the scene and is not nearby, the determinate value is set to B2. If the call provides information to be sent over the air only, the determinate value is set to A1. If the call is only a referral, the determinate value is set to Ω1. Once a determinate value is set 3391, the appropriate response is dispatched 3392 and pre-arrival instructions 3390 are provided to the caller. The appropriate dispatched response 3392 is based on the calculated determinate value. The preferred pre-arrival instructions 3390 of this protocol include: (a) if appropriate, try to avoid the person or vehicle, inform the dispatcher immediately if the suspect(s) leave the scene; and (b) do not disturb anything at the scene including weapons, tools or objects found nearby. The axiom of this suspicious/wanted (person, circumstances, vehicle) protocol is most wanted people will try to escape if they see officers approaching.

FIG. 3ag shows the preferred steps of the Theft Protocol. Theft or larceny is the act of dishonestly taking property from another with the intent of permanently depriving the other of it. In the present embodiment of this invention, each of the inquiries is made and the information is collected via the telephone equipment 107. An inquiry 3393 is made to determine what weapons were involved or mentioned. Where the responsible person is located is identified 3394. If possible, the description of the suspect person is determined 3395. How the suspect person arrived is determined 3396. An inquiry 3397 is made to determine what was taken. Whether anyone is injured or sick is determined 3398. An inquiry 3399 is made to learn if the caller is safe and out of danger. Pre-arrival instructions 3400 are prepared. The determinate value is set 3401 as follows. If a life threat exists the determinate value is set to E1. If the officer or dispatcher believes, in his or her discretion, that the call is critical, the determinate value is set to E2. If the incident is in progress or occurred within the last five minutes, the determinate value is set to D1. If the suspect is on still on the scene or is nearby, the determinate value is set to D2. If the incident occurred more than five minutes ago, the determinate value is set to C1. If a medical response is required, the determinate value is set to C2. If the incident occurred more than thirty minutes ago, the determinate value is set to B1. If the suspect is not on the scene and is not nearby, the determinate value is set to B2. If the call provides information to be sent over the air only, the determinate value is set to A1. If the call is only a referral, the determinate value is set to Ω1. Once a determinate value is set 3401, the appropriate response is dispatched 3402 and pre-arrival instructions 3400 are provided to the caller. The appropriate dispatched response 3402 is based on the calculated determinate value. The preferred pre-arrival instructions 3400 of this protocol include: (a) do not disturb anything at the scene including weapons, tools, or objects found nearby. The axiom of this theft (larceny) protocol is most stolen property is sold or pawned to support a drug habit.

FIG. 3*ah* shows the preferred steps of the Traffic Accident Protocol. A traffic accident is a when a moving vehicle strikes another vehicle, person, property or animal and causes damage or injury. A hit and run is when the driver of a vehicle involved in an accident leaves the scene of the accident without rendering aid or assistance or exchanging information. An incident involving a gas, liquid or solid that even in small quantities poses a threat to life, health or property is a Hazmat incident. In the present embodiment of this invention, each of the inquiries is made and the information is collected via the telephone equipment 107. An inquiry 3403 is made to determine how many vehicles are involved. Whether anyone is injured is determined 3404. Whether anyone is trapped is determined 3405. Whether anyone was thrown is determined 3406. An inquiry 3407 is made to learn if there are chemicals or fuel leaking. Whether all of the drivers are at the scene is determined 3408. If drugs or alcohol are involved is determined 3409. Descriptions of the vehicles on the scene are obtained 3410. The locations of the vehicles are determined 3411. Whether traffic is adversely affected is determined 3412. An inquiry 3413 is made to learn if other property was damaged. Pre-arrival instructions 3414 are prepared. The determinate value is set 3415 as follows. If a life threat exists the determinate value is set to E1. If the officer or dispatcher believes, in his or her discretion, that the call is critical, the determinate value is set to E2. If the incident is in progress or occurred within the last five minutes, the determinate value is set to D1. If the suspect is on still on the scene or is nearby, the determinate value is set to D2. If the incident occurred more than five minutes ago, the determinate value is set to C1. If a medical response is required, the determinate value is set to C2. If the incident occurred more than thirty minutes ago, the determinate value is set to B1. If the suspect is not on the scene and is not nearby, the determinate value is set to B2. If the call provides information to be sent over the air only, the determinate value is set to A1. If the call is only a referral, the determinate value is set to Ω1. Once a determinate value is set 3415, the appropriate response is dispatched 3416 and pre-arrival instructions 3414 are provided to the caller. The appropriate dispatched response 3416 is based on the calculated determinate value. The preferred pre-arrival instructions 3414 of this protocol include: (a) do not walk in or touch any chemicals or fuel leaking from the vehicles; (b) stand away from the gas or fumes; (c) if vehicle is on fire, stand a safe distance away because of the possibility of explosion; and (d) if a 1st party caller, have your driver's license, vehicle registration, and insurance paperwork ready for the officer. This protocol also provides the following rules: (1) Exact accident location should include information like "in the northbound lanes, south of the intersection"; (2) Chemicals leaking from a vehicle may trigger a Hazardous Materials response; and (3) Accidents involving trains require notifying the train dispatch center to stop additional trains from causing a second accident. The axioms of this traffic accident protocol are: (1) Many hit and run accidents are solvable through scene investigation, and by follow up with witnesses and auto shops; and (2) Placard numbers can be used to determine the cargo of commercial vehicles.

FIG. 3*ai* shows the preferred steps of the Traffic Violation/Complaint Protocol. The protocol addresses the reporting of improper parking or inappropriate driving actions of another, including simple violations such as speeding, very serious violations such as reckless driving, inappropriate driving actions that are accompanied by threats, "Road Rage," and any thing that restricts or blocks traffic. In the present embodiment of this invention, each of the inquiries is made and the information is collected via the telephone equipment 107. An inquiry 3317 is made to determine what weapons were involved or mentioned. The number of involved vehicles is determined 3418. If a moving traffic violation or complaint, the location where the vehicle was last seen is obtained 3419. If possible, the description of the driver is obtained 3420. An inquiry 3421 is made to learn if the caller wants to talk to an officer. If the call concerns a stalled vehicle or a parking violation, an inquiry 3422 is made to learn traffic is adversely affected. Whether anyone is with the vehicle now is determined 3423. Pre-arrival instructions 3324 are prepared. The determinate value is set 3425 as follows. If a life threat exists the determinate value is set to E1. If the officer or dispatcher believes, in his or her discretion, that the call is critical, the determinate value is set to E2. If the incident is in progress or occurred within the last five minutes, the determinate value is set to D1. If the suspect is on still on the scene or is nearby, the determinate value is set to D2. If the incident occurred more than five minutes ago, the determinate value is set to C1. If a medical response is required, the determinate value is set to C2. If the incident occurred more than thirty minutes ago, the determinate value is set to B1. If the suspect is not on the scene and is not nearby, the determinate value is set to B2. If the call provides information to be sent over the air only, the determinate value is set to A1. If the call is only a referral, the determinate value is set to Ω1. Once a determinate value is set 3425, the appropriate response is dispatched 3426 and pre-arrival instructions 3424 are provided to the caller. The appropriate dispatched response 3426 is based on the calculated determinate value. The preferred pre-arrival instructions 3424 of this protocol include: (a) if following the suspect, do not continue to follow or make contact with the driver of the other vehicle. The axiom of this traffic violation/complaint protocol is most traffic violation/complaints require the caller to sign a summons or complaint and testify against the other person in court, if the suspect is located.

FIG. 3*aj* shows the preferred steps of the Trespassing/Unwanted Protocol. Trespassing is any unauthorized intrusion or invasion of private premises or land of another. An unwanted person is a person not wanted at a location, but has not been officially advised by a law enforcement officer that they are trespassing. In the present embodiment of this invention, each of the inquiries is made and the information is collected via the telephone equipment 107. An inquiry 3427 is made to determine what weapons were involved or mentioned. Where the responsible person is located is identified 3428. If possible, the description of the suspect person is determined 3429. An inquiry 3430 is made to learn if the suspect has been asked to leave. How the suspect person arrived is determined 3431. An inquiry 3432 is made to determine who is responsible for the property. Whether anyone is injured or sick is determined 3433. An inquiry 3434 is made to learn if the caller is safe and out of danger. Pre-arrival instructions, if any, are prepared 3435. The determinate value is set 3436 as follows. If a life threat exists the determinate value is set to E1. If the officer or dispatcher believes, in his or her discretion, that the call is critical, the determinate value is set to E2. If the incident is in progress or occurred within the last five minutes, the determinate value is set to D1. If the suspect is on still on the scene or is nearby, the determinate value is set to D2. If the incident occurred more than five minutes ago, the determinate value is set to C1. If a medical response is required, the determinate value is set to C2. If the incident occurred more than thirty minutes ago, the determinate value is set to B1. If the suspect is not on the scene and is not nearby, the determinate value is set to B2. If the call provides information to be sent over the air only, the determinate value is set to A1. If the call is only a referral, the determinate value is set to Ω1. Once a determinate value is set 3436, the appropriate response is dispatched 3437. The appropriate dispatched response 3437 is based on the calculated determinate value. The axioms of this present trespassing/unwanted protocol are (1) some trespassing or unwanted situations occur as a result of a domestic violence situation and (2) many trespassers do not realize they are trespassing.

FIG. 3*ak* shows the preferred steps of the Unknown $3^{rd}$ Party Protocol. An unknown $3^{rd}$ party call is made where not enough details exist to be able to accurately classify the call. An example is the caller who is asked to call the police for another, but does not know what the situation is, or why the other person needs the police. In the present embodiment of this invention, each of the inquiries is made and the information is collected via the telephone equipment 107. An inquiry 3438 is made to determine what weapons were involved or mentioned. Where the person is who asked the caller to call is located is identified 3439. If possible, the description of the person is determined 3440. How the person arrived is determined 3442. Whether anyone is injured or sick is determined 3442. An inquiry 3443 is made to learn if the caller is safe and out of danger.

Pre-arrival instructions, if any, are prepared 3443. The determinate value is set 3444 as follows. If a life threat exists the determinate value is set to E1. If the officer or dispatcher believes, in his or her discretion, that the call is critical, the determinate value is set to E2. If the incident is in progress or occurred within the last five minutes, the determinate value is set to D1. If the suspect is on still on the scene or is nearby, the determinate value is set to D2. If the incident occurred more than five minutes ago, the determinate value is set to C1. If a medical response is required, the determinate value is set to C2. If the incident occurred more than thirty minutes ago, the determinate value is set to B1. If the suspect is not on the scene and is not nearby, the determinate value is set to B2. If the call provides information to be sent over the air only, the determinate value is set to A1. If the call is only a referral, the determinate value is set to Ω1. Once a determinate value is set 3444, the appropriate response is dispatched 3445. The appropriate dispatched response 3445 is based on the calculated determinate value. The axiom of the this present unknown—3rd party protocol is these calls have the potential to be very dangerous because no information is generally available concerning the real nature of the problem.

FIG. 3*al* shows the preferred steps of the Weapons/Firearms Protocol. This protocol deals with situations that involve the carrying or displaying of any article made, adapted, or intended to be used for incapacitating or injuring a person. A shots fired call refers to the act of illegally discharging a weapon such as a handgun, shotgun, rifle, or military weapon, or home made weapon such a potato gun. In the present embodiment of this invention, each of the inquiries is made and the information is collected via the telephone equipment 107. An inquiry 3446 is made to determine what weapons were involved or mentioned. Where the responsible person is located is identified 3447. If possible, the description of the suspect person is determined 3448. How the suspect person arrived is determined 3449. Whether anyone is injured or sick is determined 3450. An inquiry 3451 is made to learn if the caller is safe and out of danger.

Pre-arrival instructions 3452 are prepared. The determinate value is set 3453 as follows. If a life threat exists the determinate value is set to E1. If the officer or dispatcher believes, in his or her discretion, that the call is critical, the determinate value is set to E2. If the incident is in progress or occurred within the last five minutes, the determinate value is set to D1. If the suspect is on still on the scene or is nearby, the determinate value is set to D2. If the incident occurred more than five minutes ago, the determinate value is set to C1. If a medical response is required, the determinate value is set to C2. If the incident occurred more than thirty minutes ago, the determinate value is set to B1. If the suspect is not on the scene and is not nearby, the determinate value is set to B2. If the call provides information to be sent over the air only, the determinate value is set to A1. If the call is only a referral, the determinate value is set to Ω1. Once a determinate value is set 3453, the appropriate response is dispatched 3454 and pre-arrival instructions 3452 are provided to the caller. The appropriate dispatched response 3454 is based on the calculated determinate value. The preferred pre-arrival instructions 3452 of this protocol include: (a) do not disturb anything at the scene including weapons, tools, or objects found nearby. This protocol also provides the following rule: (1) all shots fired calls should be considered automatic until proven otherwise. The axioms of this weapons/firearms protocol are (1) Not all displays of weapons are illegal; and (2) Not all shots fired complaints involve weapons, some vehicle backfires and the use of fireworks are reported as shots fired.

FIG. 3*am* shows the preferred steps of the Critical Caller Instructions Protocol. Critical Caller Instructions are provided responding to calls where the caller may be in danger. In the present embodiment of this invention, each of the inquiries is made and the information is collected via the telephone equipment 107. The caller is asked 3455 if it is safe to relocate. If it is safe to relocate, the caller is asked 3456 where they are going and whether 3457 they can take the phone with them. If they cannot take the phone, the call is terminated 3458 with a request that they call back when they get there. If they can take the phone, the call continues 3461 with entry question number 6, see FIG. 3A. If they cannot safely relocate, the caller is asked 3459 if they can talk freely. If they can, they are asked 3460 for their exact location. If they cannot talk freely, they are asked 3462 if they can answer yes/no questions. If they can, they are asked 3463 to make this call sound like casual conversation and the process continues normally 3464. If they cannot answer yes/no questions, they are asked 3465 if they can tap the phone to answer questions. If they cannot, they are asked 3466 to stay on the line as long as possible. If they can tap, the process continues 3467 collecting information as normally as possible.

FIG. 3*an* shows the preferred steps of the Case Exit Protocol. The Case Exit Protocol is used to collect additional information and to calmly terminate the call. In the present embodiment of this invention, each of the inquiries is made and the information is collected via the telephone equipment 107. If the required information has been collected, the determinate has been calculated, the dispatch made and the post-dispatch instructions given, then it is appropriate to exit the case 3468. If it is a routine disconnect, routine instructions are provided to learn how/where the caller can be contacted 3469, to describe their clothing 3470, their vehicle 3471, to identify witnesses 3471 and other appropriate instructions 3473. If it is a stay on line exit, the caller is instructed to stay on the line 3474 and is asked to provide additional information, including to describe their clothing 3475, to inform if anything changes 3476 and to tell the dispatcher when the officers arrive 3477. If it is an urgent disconnect, the urgent disconnect instruction is given, indicating that another call has come in 3478, to call back if the responsible person returns 3479 or if anything changes 3480 and other appropriate instructions 3481.

Figure 4A:
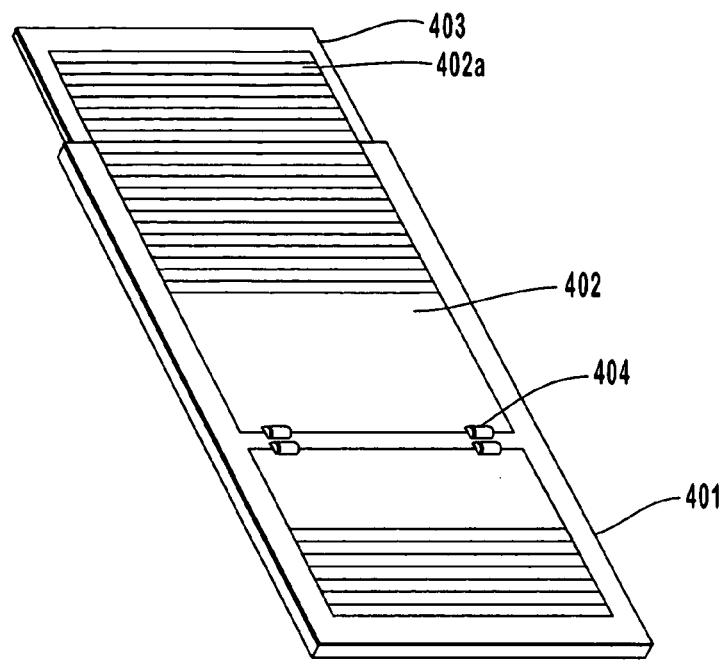
FIG. 4a is a perspective view of the flip card embodiment of this invention.

FIG. 4a depicts a perspective view of the flip card apparatus embodiment of this invention. One preferred embodiment of the invention involves the use of a flip card apparatus 401. The flip card apparatus 401 has the advantage of organizing the cards 402 so that the user can see the top or bottom, label edge of each card. Each card 402 is separately fastened into the apparatus with one or more fasteners 404. The steps embodying the elements of this invention, the entry protocol, are displayed on a top flap 403 and the first card 402a. Alternative embodiments of the card apparatus can be a deck of cards bound in a manner well known to those skilled in the art. In the current embodiment of the flip card apparatus there are seventy-two chief call type cards, a critical caller instruction card, a case exit instruction card, two entry question cards, and one determinant classification card. The cards are generally organized in pairs, with the top card providing the protocol questions, instructions, jump directions and determinant assignments. The bottom card provides information the dispatcher uses to improve the dispatchers decision-making process.

Figure 4B:
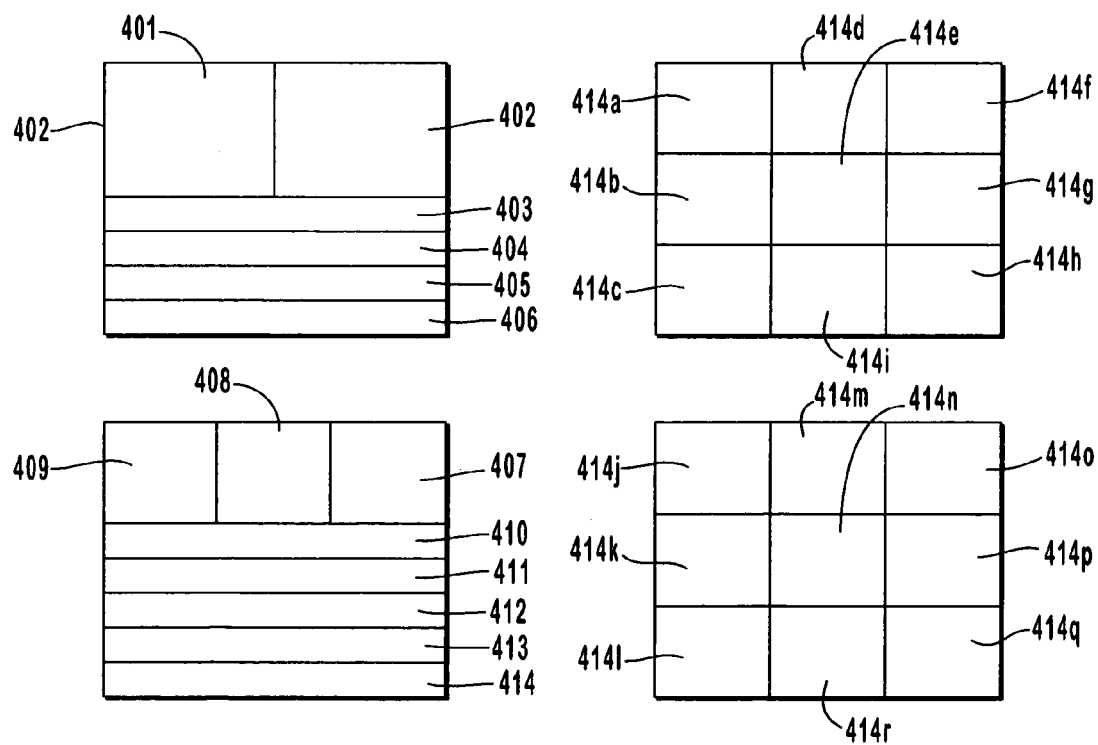
FIG. 4b is a representative view of the flip card embodiment of the invention, showing the various sections of the cards.

FIG. 4b shows a view of the sections of a typical flip card, as used in the flip card apparatus embodiment of the invention. The typical flip card 402 is divided into logical sections for ease of use and consistency. A key question section 405 is provided as a script to the dispatchers to ensure that all key questions are asked in a calm, consistent, systematic manner. After all key questions are asked from the key question section 405, typically the dispatcher determines the appropriate determinant level. Sections A-Alpha 410, B-Bravo 409, C-Charlie 408, D-Delta 407 and Echo 420 are provided to aid the dispatcher in making the determinant designation. Each determinant level may have one or more sublevels. Generally, the most critical call is given a determinant level of E-Echo and the least critical call is given a determinant level of A-Alpha or Ω-Omega. The more critical the determinant level assigned to a call, the more police resources and urgency may be applied to provide help. For example, an A-Alpha call will typically be responded to by police officers proceeding to the scene under the safest method reasonably possible, while an E-Echo call will typically be responded to by the closest police units in the most urgent manner available. Sublevels may not indicate the criticality of the call; rather sublevel designations indicate the type of call, information often especially important to the dispatched police officers. After the determinant code is determined 407-410 the dispatcher is referred to the post-dispatch instructions section 406. The purpose of the post-dispatch instructions is to systematically prepare for and expedite the field personnel's j'b at the scene and prevent further harm to the individuals at the scene. Callers are also routinely advised to "call back if the situation worsens for further instructions." Pre-arrival instructions 411 are provided on alternative cards, shown in FIG. 5aq, subsectioned as shown in FIG. 4b as 411a-r. Sections 412 to 419 provide important information to the dispatcher for the dispatchers use in providing more educated responses. Such information as is systematically provided to place the key questions of section 405, the determinant classifications of sections 407-410, and the post-dispatch instructions of section 406 into context for the dispatcher.

Figure 5M:
FIGS. 5a- to 5BY are detailed views of the preferred cards of the flip card embodiment of this invention.
Figure 5N:
Figure 5A:
Figure 5A:

FIGS. 5a-5by are detailed views of the preferred cards of the flip card embodiment of this invention.

FIG. 5a depicts the preferred embodiment of the flip card 500 showing the steps of the entry questions section of this invention. Nine major entry questions are shown. A "GO TO" column, shown with a down arrow, is provided to prompt police dispatchers to other relevant protocols.

FIG. 5b shows the details card 501 of the entry questions and includes a description of determinate practice, repetitive persistence, Deluca's law and a caller definitions section. Also provided are a rules section and an axioms section. The rules section and the axioms section are provided to put the questions into context for the dispatchers.

FIG. 5c depicts the preferred embodiment of the flip card 502 showing the steps of the Abduction/Kidnapping questions section of this invention. Seven major inquiries are shown. A determinate levels and descriptions section is provided for determination calculation along with the assigned codes. Pre-Arrival instructions are provided, guiding the dispatcher through emergency advice.

FIG. 5d shows the details card 503 of the Abduction/Kidnapping questions and includes a description section, a definition section, a rules section, and an axioms section. The rules section, and axioms section are provided to put the questions into context for the dispatchers.

FIG. 5e depicts the preferred embodiment of the flip card 504 showing the steps of the Administrative questions section of this invention. Seventeen major inquiries are shown. A determinate levels and descriptions section is provided for determination calculation along with the assigned codes.

FIG. 5f shows the details card 505 of the Administrative questions and includes a description essentials section, a definitions section, and an axioms section.

These sections are provided to put the questions into context for the dispatchers.

FIG. 5g depicts the preferred embodiment of the flip card 506 showing the steps of the Alarms questions section of this invention. Eight major inquiries are shown.

A determinate levels and descriptions section is provided for determination calculation along with the assigned codes. Pre-Arrival instructions are provided, guiding the dispatcher through emergency advice.

FIG. 5h shows the details card 507 of the Alarms questions and includes a description essentials section, a definitions section, a rules section, and an axioms section. The rules section and axioms section are provided to put the questions into context for the dispatchers.

FIG. 5i depicts the preferred embodiment of the flip card 508 showing the steps of the Animal questions section of this invention. Ten major inquiries are shown. A determinate levels and descriptions section is provided for determination calculation along with the assigned codes. Pre-Arrival instructions are provided, guiding the dispatcher through emergency advice.

FIG. 5j shows the details card 509 of the Animal questions and includes a description essentials section, a definitions section, a rules section, an axioms section and an information section. The rules section, axioms section, and information sections are provided to put the questions into context for the dispatchers.

FIG. 5k depicts the preferred embodiment of the flip card 510 showing the steps of the Assault/Sexual Assault questions section of this invention. Eight major inquiries are shown. A determinate levels and descriptions section is provided for determination calculation along with the assigned codes. Pre-Arrival instructions are provided, guiding the dispatcher through emergency advice.

FIG. 5l shows the details card 511 of the Assault/Sexual Assault questions and includes a description essentials section, a definitions section, and an axioms section. The axioms section is provided to put the questions into context for the dispatchers.

FIG. 5m depicts the preferred embodiment of the flip card 512 showing the steps of the Assist Other Agencies questions section of this invention. Six major inquiries are shown. A determinate levels and descriptions section is provided for determination calculation along with the assigned codes.

FIG. 5n shows the details card 513 of the Assist Other Agencies questions and includes a description essentials section, a definitions section, a rules section, and an axioms section. The rules section and axioms section are provided to put the questions into context for the dispatchers.

Figure So depicts the preferred embodiment of the flip card 514 showing the steps of the Auto Crime questions section of this invention. Eight major inquiries are shown. A determinate levels and descriptions section is provided for determination calculation along with the assigned codes. Pre-Arrival instructions are provided, guiding the dispatcher through emergency advice.

FIG. 5p shows the details card 515 of the Auto Crime questions and includes a description essentials section, a definitions section, and a rules section. The rules section is provided to put the questions into context for the dispatchers.

FIG. 5q depicts the preferred embodiment of the flip card 516 showing the steps of the Bomb Found/Suspicious Package questions section of this invention. Nine major inquiries are shown. A determinate levels and descriptions section is provided for determination calculation along with the assigned codes. Pre-Arrival instructions are provided, guiding the dispatcher through emergency advice.

FIG. 5r shows the details card 517 of the Bomb Found/Suspicious Package questions and includes a description essentials section, a definitions section, a rules section, and an axioms section. The rules section, axioms section, and information sections are provided to put the questions into context for the dispatchers.

FIG. 5s depicts the preferred embodiment of the flip card 518 showing the steps of the Bomb Threat questions section of this invention. Eighteen major inquiries are shown. A determinate levels and descriptions section is provided for determination calculation along with the assigned codes. Pre-Arrival instructions are provided, guiding the dispatcher through emergency advice.

FIG. 5t shows the details card 519 of the Bomb Threat questions and includes a description essentials section, a definitions section, a rules section, an axioms section and an information section. The rules section, axioms section, and information section are provided to put the questions into context for the dispatchers.

FIG. 5u depicts the preferred embodiment of the flip card 520 showing the steps of the Burglary questions section of this invention. Eleven major inquiries are shown. A determinate levels and descriptions section is provided for determination calculation along with the assigned codes. Pre-Arrival instructions are provided, guiding the dispatcher through emergency advice.

FIG. 5v shows the details card 521 of the Burglary questions and includes a description essentials section, a definitions section, a rules section, and an axioms section. The rules section and axioms section are provided to put the questions into context for the dispatchers.

FIG. 5w depicts the preferred embodiment of the flip card 522 showing the steps of the Damage/Vandalism questions section of this invention. Five major inquiries are shown. A determinate levels and descriptions section is provided for determination calculation along with the assigned codes. Pre-Arrival instructions are provided, guiding the dispatcher through emergency advice.

FIG. 5x shows the details card 523 of the Damage/Vandalism questions and includes a description essentials section, a definitions section, a rules section, and an axioms section. The rules section and axioms section are provided to put the questions into context for the dispatchers.

FIG. 5y depicts the preferred embodiment of the flip card 524 showing the steps of the Deceased Person questions section of this invention. Seven major inquiries are shown. A determinate levels and descriptions section is provided for determination calculation along with the assigned codes. Pre-Arrival instructions are provided, guiding the dispatcher through emergency advice.

FIG. 5z shows the details card 525 of the Deceased Person questions and includes a description essentials section, a definitions section, a rules section, and an axioms section. The rules section and axioms section are provided to put the questions into context for the dispatchers.

FIG. 5aa depicts the preferred embodiment of the flip card 526 showing the steps of the Disturbance questions section of this invention. Nine major inquiries are shown. A determinate levels and descriptions section is provided for determination calculation along with the assigned codes. Pre-Arrival instructions are provided, guiding the dispatcher through emergency advice.

FIG. 5ab shows the details card 527 of the Disturbance questions and includes a description essentials, a definitions section, a rules section, and an axioms section. The rules section, and axioms section are provided to put the questions into context for the dispatchers.

FIG. 5ac depicts the preferred embodiment of the flip card 528 showing the steps of the Disturbance (Domestic) questions section of this invention. Ten major inquiries are shown. A determinate levels and descriptions section is provided for determination calculation along with the assigned codes. Pre-Arrival instructions are provided, guiding the dispatcher through emergency advice.

FIG. 5ad shows the details card 529 of the Disturbance (Domestic) questions and includes a description essentials, a definitions section, a rules section, and an axioms section. The rules section and axioms section are provided to put the questions into context for the dispatchers.

FIG. 5ae depicts the preferred embodiment of the flip card 530 showing the steps of the Driving Under the Influence questions section of this invention. Eight major inquiries are shown. A determinate levels and descriptions section is provided for determination calculation along with the assigned codes. Pre-Arrival instructions are provided, guiding the dispatcher through emergency advice.

FIG. 5af shows the details card 531 of the Driving Under the Influence questions and includes a description essentials section, a definitions section, a rules section, an axioms section and information section. The rules section, axioms section, and the information section are provided to put the questions into context for the dispatchers.

FIG. 5ag depicts the preferred embodiment of the flip card 532 showing the steps of the Drugs questions section of this invention. Eight major inquiries are shown. A determinate levels and descriptions section is provided for determination calculation along with the assigned codes. Pre-Arrival instructions are provided, guiding the dispatcher through emergency advice.

FIG. 5ah shows the details card 533 of the Drugs questions and includes a description essentials section, a definitions section, a rules section, and an axioms section. The rules section and axioms section are provided to put the questions into context for the dispatchers.

FIG. 5*ai* depicts the preferred embodiment of the flip card 534 showing the steps of the Explosion questions section of this invention. Eleven major inquiries are shown. A determinate levels and descriptions section is provided for determination calculation along with the assigned codes. Pre-Arrival instructions are provided, guiding the dispatcher through emergency advice.

FIG. 5*aj* shows the details card 535 of the Explosion questions and includes a description essentials section, a definitions section, an axioms section, and an information sections. The axioms section and information section are provided to put the questions into context for the dispatchers.

FIG. 5*ak* depicts the preferred embodiment of the flip card 536 showing the steps of the Fraud/Deception questions section of this invention. Five major inquiries are shown. A determinate levels and descriptions section is provided for determination calculation along with the assigned codes. Pre-Arrival instructions are provided, guiding the dispatcher through emergency advice.

FIG. 5*al* shows the details card 537 of the Fraud/Deception questions and includes a description essentials section, a definitions section, an axioms section and information sections. The axioms section and information sections are provided to put the questions into context for the dispatchers.

FIG. 5*am* depicts the preferred embodiment of the flip card 538 showing the steps of the Harassment/Stalking/Threats questions section of this invention. Nine major inquiries are shown. A determinate levels and descriptions section is provided for determination calculation along with the assigned codes. Pre-Arrival instructions are provided, guiding the dispatcher through emergency advice.

FIG. 5*an* shows the details card 539 of the Harassment/Stalking/Threats questions and includes a description essentials section, a definitions section, a rules section, and an axioms section. The rules section and axioms section are provided to put the questions into context for the dispatchers.

FIG. 5*ao* depicts the preferred embodiment of the flip card 540 showing the steps of the Indecency/Lewdness questions section of this invention. Five major inquiries are shown. A determinate levels and descriptions section is provided for determination calculation along with the assigned codes. Pre-Arrival instructions are provided, guiding the dispatcher through emergency advice.

FIG. 5*ap* shows the details card 541 of the Indecency/Lewdness questions and includes a description essentials section, a definitions section, and an axioms section. This axioms section is provided to put the questions into context for the dispatchers.

FIG. 5*aq* depicts the preferred embodiment of the flip card 542 showing the steps of the Juvenile questions section of this invention. Seven major inquiries are shown. A determinate levels and descriptions section is provided for determination calculation along with the assigned codes. Pre-Arrival instructions are provided, guiding the dispatcher through emergency advice.

FIG. 5*ar* shows the details card 543 of the Juvenile questions and includes a description essentials section, a definitions section, and an axioms section. The axioms section and other sections are provided to put the questions into context for the dispatchers.

FIG. 5*as* depicts the preferred embodiment of the flip card 544 showing the steps of the Mental Disorder questions section of this invention. Five major inquiries are shown. A determinate levels and descriptions section is provided for determination calculation along with the assigned codes. Pre-Arrival instructions are provided, guiding the dispatcher through emergency advice.

FIG. 5*at* shows the details card 545 of the Mental Disorder questions and includes description essentials section, a definitions section, a rules section and an axioms section. These rules section, axioms section, and other sections are provided to put the questions into context for the dispatchers.

FIG. 5*au* depicts the preferred embodiment of the flip card 546 showing the steps of the Miscellaneous questions section of this invention. Seven major inquiries are shown. A determinate levels and descriptions section is provided for determination calculation along with the assigned codes. Pre-Arrival instructions are provided, guiding the dispatcher through emergency advice.

FIG. 5*av* shows the details card 547 of the Miscellaneous questions and includes a description essentials section, a definitions section and a rules section. The rules and other sections are provided to put the questions into context for the dispatchers.

FIG. 5*aw* depicts the preferred embodiment of the flip card 548 showing the steps of the Missing/Found Person questions section of this invention. Sixteen major inquiries are shown. A determinate levels and descriptions section is provided for determination calculation along with the assigned codes. Pre-Arrival instructions are provided, guiding the dispatcher through emergency advice.

FIG. 5*ax* shows the details card 549 of the Missing/Found Person questions and includes a description essentials section, a definitions section, and an axioms section. The axioms and other sections are provided to put the questions into context for the dispatchers.

FIG. 5*ay* depicts the preferred embodiment of the flip card 550 showing the steps of the Officer Needs Assistance questions section of this invention. Nine major inquiries are shown. A determinate levels and descriptions section is provided for determination calculation along with the assigned codes. Pre-Arrival instructions are provided, guiding the dispatcher through emergency advice.

FIG. 5*az* shows the details card 551 of the Officer Needs Assistance questions and includes a description essentials section, a definitions section, a rules section, and an axioms section. The rules section, axioms section, and other sections are provided to put the questions into context for the dispatchers.

FIG. 5*ba* depicts the preferred embodiment of the flip card 552 showing the steps of the Public Service questions section of this invention. Seventeen major inquiries are shown. A determinate levels and descriptions section is provided for determination calculation along with the assigned codes. Pre-Arrival instructions are provided, guiding the dispatcher through emergency advice.

FIG. 5*bb* shows the details card 553 of the Public Service questions and includes a description essentials section, a definitions section, a rules section, and an axioms section. The rules section, axioms section, and other sections are provided to put the questions into context for the dispatchers.

FIG. 5*bc* depicts the preferred embodiment of the flip card 554 showing the steps of the Robbery questions section of this invention. Seven major inquiries are shown. A determinate levels and descriptions section is provided for determination calculation along with the assigned codes. Pre-Arrival instructions are provided, guiding the dispatcher through emergency advice.

FIG. 5*bd* shows the details card 555 of the Robbery questions and includes a description essentials section, a definitions section, and an axioms section. The axioms section and other sections are provided to put the questions into context for the dispatchers.

FIG. 5*be* depicts the preferred embodiment of the flip card 556 showing the steps of the Suicidal Person questions section of this invention. Fourteen major inquiries are shown. A determinate levels and descriptions section is provided for determination calculation along with the assigned codes. Pre-Arrival instructions are provided, guiding the dispatcher through emergency advice.

FIG. 5*bf* shows the details card 557 of the Suicidal Person questions and includes a description essentials section, a definitions section, a rules section, and an axioms section. The rules section, axioms section, and other sections are provided to put the questions into context for the dispatchers.

FIG. 5*bg* depicts the preferred embodiment of the flip card 558 showing the steps of the Supplemental questions section of this invention. Five major inquiries are shown. A determinate levels and descriptions section is provided for determination calculation along with the assigned codes.

FIG. 5*bh* shows the details card 559 of the Supplemental questions and includes a description essentials section, a definitions section, and a rules section. The rules section and other sections are provided to put the questions into context for the dispatchers.

FIG. 5*bi* depicts the preferred embodiment of the flip card 560 showing the steps of the Suspicious/Wanted questions section of this invention. Nine major inquiries are shown. A determinate levels and descriptions section is provided for determination calculation along with the assigned codes. Pre-Arrival instructions are provided, guiding the dispatcher through emergency advice.

FIG. 5*bj* shows the details card 561 of the Suspicious/Wanted questions and includes a description essentials section, a definitions section, and an axioms section. The axioms section and other sections are provided to put the questions into context for the dispatchers.

FIG. 5*bk* depicts the preferred embodiment of the flip card 562 showing the steps of the Theft questions section of this invention. Seven major inquiries are shown. A determinate levels and descriptions section is provided for determination calculation along with the assigned codes. Pre-Arrival instructions are provided, guiding the dispatcher through emergency advice.

FIG. 5*bl* shows the details card 563 of the Theft questions and includes a description essentials section, a definitions section, and an axioms section. The axioms section, and other sections are provided to put the questions into context for the dispatchers.

FIG. 5*bm* depicts the preferred embodiment of the flip card 564 showing the steps of the Traffic Accident questions section of this invention. Eleven major inquiries are shown. A determinate levels and descriptions section is provided for determination calculation along with the assigned codes. Pre-Arrival instructions are provided, guiding the dispatcher through emergency advice.

FIG. 5*bn* shows the details card 565 of the Traffic Accident questions and includes a description essentials section, a definitions section, a rules section, an axioms section and information sections. The rules section, axioms section, and information sections are provided to put the questions into context for the dispatchers.

FIG. 5*bo* depicts the preferred embodiment of the flip card 566 showing the steps of the Traffic Violation/Complaint questions section of this invention. Seven major inquiries are shown. A determinate levels and descriptions section is provided for determination calculation along with the assigned codes. Pre-Arrival instructions are provided, guiding the dispatcher through emergency advice.

FIG. 5*bp* shows the details card 567 of the Traffic Violation/Complaint questions and includes a description essentials section, a definitions section, a rules section, an axioms section and information sections. The rules section, axioms section, and information sections are provided to put the questions into context for the dispatchers.

FIG. 5*bq* depicts the preferred embodiment of the flip card 568 showing the steps of the Trespassing/Unwanted questions section of this invention. Eight major inquiries are shown. A determinate levels and descriptions section is provided for determination calculation along with the assigned codes. Pre-Arrival instructions are provided, guiding the dispatcher through emergency advice.

FIG. 5*br* shows the details card 569 of the Trespassing/Unwanted questions and includes a description essentials section, a definitions section, and an axioms section. The axioms section, and other sections are provided to put the questions into context for the dispatchers.

FIG. 5*bs* depicts the preferred embodiment of the flip card 570 showing the steps of the Unknown—3rd Party questions section of this invention. Five major inquiries are shown. A determinate levels and descriptions section is provided for determination calculation along with the assigned codes. Pre-Arrival instructions are provided, guiding the dispatcher through emergency advice.

FIG. 5*bt* shows the details card 571 of the Unknown—3rd Party questions and includes a description essentials section, a definitions section, and an axioms section. The axioms section, and other sections are provided to put the questions into context for the dispatchers.

FIG. 5*bu* depicts the preferred embodiment of the flip card 572 showing the steps of the Weapons/Firearms questions section of this invention. Six major inquiries are shown. A determinate levels and descriptions section is provided for determination calculation along with the assigned codes. Pre-Arrival instructions are provided, guiding the dispatcher through emergency advice.

FIG. 5*bv* shows the details card 573 of the Weapons/Firearms questions and includes a description essentials section, a definitions section, a rules section, and an axioms section. The axioms section, and other sections are provided to put the questions into context for the dispatchers.

FIG. 5*bw* depicts the preferred embodiment of the flip card 574 showing the steps of the Critical Caller Instructions protocol of this invention. Nine major steps are shown.

FIG. 5*bx* depicts the preferred embodiment of the flip card 575 showing the steps of the Case Exit protocol of this invention. Three major sections are shown, and a center information section.

FIG. 5*by* shows the details card 545 showing the symbology for notifications, responses, directors and warnings.

The previous described preferred embodiments of the invention are to be considered in all respects only as illustrative and not as restrictive. Although the embodiments shown describe particular components in particular connection configurations, the invention is not limited thereto. The scope of this invention is indicated by the appended claims rather than by the foregoing description. All systems and devices, which come directly within the claims or within the meaning and range of equivalency of the claims, are to be embraced as being within the scope of protection of this invention.

The previous described preferred embodiments of the invention are to be considered in all respects only as illustrative and not as restrictive. Although the embodiments shown describe particular components in particular connection configurations, the invention is not limited thereto. The scope of this invention is indicated by the appended claims rather than by the foregoing description. All systems and devices, which come directly within the claims or within the meaning and range of equivalency of the claims, are to be embraced as being within the scope of protection of this invention.

The invention claimed is:

1. A method for managing the process of dispatching police in response to calls for assistance, comprising the steps of:
   providing instructions to a police dispatcher, including instructions to inquire for specific information, receive said specific information and to use said specific information in said method to determine a determinate value;
   receiving a call from a caller for police assistance;
   determining whether the caller is in danger;
   diverting the caller to pre-scripted critical caller instructions if said determining of danger is positive, said pre-scripted critical caller instructions comprising,
      determining if it is possible for the caller to safely relocate to a safer location,
      instructing the caller to relocate if said determining of safe relocation is positive, wherein said relocation instructions comprise instructing the caller to terminate the call if the call may not be continued during caller relocation, and
      providing the caller with instructions to allow the caller to communicate safely;
   instructing the caller while determining the type of call;
   a pre-scripted interrogation automatically assigning one of a plurality of pre-established determinate values to said call based on a description of a problem for which the caller is requesting police assistance, wherein said assigned determinate value indicates the criticality of the call, and wherein said pre-scripted interrogation automatically assigns said determinate value by
      providing to a police dispatcher a plurality of pre-scripted inquiries for specific information to obtain a description of said problem, wherein said pre-scripted inquiries are ordered to guide said pre-scripted interrogation to systematically obtain said description of said problem and to traverse a path along a logical tree based on responses to said pre-scripted inquiries, and wherein said path along said logical tree ends at an appropriate pre-established determinate value,
      instructing said dispatcher to interrogate said caller using said plurality of pre-scripted inquiries,
      receiving from said dispatcher the caller responses to said pre-scripted inquiries, and
      using said caller responses to traverse said logical tree and thereby assign said appropriate pre-established determinate value; and
   dispatching police assistance based on said determinate value.

2. A method, as recited in claim 1, wherein said automatically assigning a determinate value further comprises:
   (1) setting a value indicating most urgent response is required if said specific information indicates an immediate life threatening situation;
   (2) setting a value indicating urgent response required if said specific information indicates a person in danger;
   (3) setting a value indicating a business-like orderly response if said specific information indicates a hazard without an immediate threat to a person;
   (4) setting a value indicating a safest arrival method possible response if said specific information indicates a least serious call; and
   (5) setting a value for referral if said specific information indicates that no response is required.

3. A method, as recited in claim 1, wherein said specific information is related to an abduction or kidnapping.

4. A method, as recited in claim 1, wherein said specific information is related to one selected from the group consisting of an alarm, an animal call, an assault, a sexual assault, an assistance call, an automobile crime, a bomb found, a bomb threat, burglary, damage, vandalism, a deceased person, a disturbance, a domestic disturbance, a driving while intoxicated event, drugs, an explosion, fraud, deception, harassment, indecency, a juvenile, a mental disorder, a miscellaneous call, a missing person, an officer assist call, a public service call, a robbery, a suicidal person, a supplemental call, a suspicious person, a theft, a traffic accident, a traffic violation, trespassing, an unknown party, weapons.

5. A method, as recited in claim 1, wherein said pre-scripted critical caller instructions further comprise determining whether the caller can talk freely.

6. A method as recited in claim 1, wherein said pre-scripted critical caller instructions further comprise determining whether the caller can communicate by tapping on a telephone used by the caller.

7. A method, as recited in claim 1, further comprising providing post-dispatch instructions to the caller.

8. A method for managing the process for responding to a call for police assistance in a general purpose computer system comprising:
   a central processing unit;
   dynamic memory;
   static memory;
   a display device;
   an input device;
   an output device;
   a mass storage device, which contains
   a number of police call response instruction records;
   a number of type of call profiles;
   a number of caller instructions;
   the method comprising:
   providing instructions to a police dispatcher, including instructions to inquire for specific information, to receive said specific information, and to use said specific information in said method to determine a determinate value;
   receiving a call from a caller for police assistance;
   inquiring for specific information, including inquiring if the caller is in danger from a third party;
   upon determining that a caller is in danger, diverting the caller to pre-scripted critical caller instructions, said pre-scripted critical caller instructions comprising,
      determining if it is possible for the caller to safely relocate to a safer location,
      instructing the caller to relocate if said determining of safe relocation is positive, wherein said relocation instructions comprise instructing the caller to terminate the call if the call may not be continued during caller relocation, and
      providing the caller with instructions to allow the caller to communicate safely;
   instructing caller while determining the type of call;
   a pre-scripted interrogation automatically assigning one of a plurality of pre-established determinate values to said call based on a description of a problem for which the caller is requesting police assistance, wherein said pre-scripted interrogation automatically assigns said determinate value by providing to a police dispatcher a plurality of pre-scripted inquiries for specific information and obtain a description of said problem, wherein said pre-scripted inquiries are ordered to guide said pre-scripted interrogation to systematically obtain said description of said problem and to traverse a path along a logical tree based on responses to said pre-scripted inquiries, and wherein said path along said logical tree ends at an appropriate pre-established determinate value, instructing said dispatcher to interrogate said caller using said plurality of pre-scripted inquiries, receiving from said dispatcher caller responses to said pre-scripted inquiries, and using said caller responses to traverse said logical tree and thereby assign said appropriate pre-established determinant level; and directing a dispatch of police assistance based on said determinate value.

9. The method of claim 8 wherein said pre-scripted critical caller instructions further comprise determining whether a telephone used by the caller is mobile.

* * * * *

UNITED STATES PATENT AND TRADEMARK OFFICE
CERTIFICATE OF CORRECTION

PATENT NO. : 7,436,937 B2
APPLICATION NO. : 10/255905
DATED : October 14, 2008
INVENTOR(S) : Jeffrey J. Clawson et al.

Page 1 of 4

It is certified that error appears in the above-identified patent and that said Letters Patent is hereby corrected as shown below:

Column 1, Line 21 reads, "...emergency, call and producing..." which should read, "...emergency call and producing..."

Column 2, Line 7 reads, "...monitoring system uses infrared..." which should read, "...monitoring system using infrared..."

Column 2, Line 9 reads, "...which describe his, hear condition..." which should read, "...which describe his or her condition..."

Column 2, Line 45 reads, "...describes a network of telemetry..." which should read, "...describes a network telemetry..."

Column 2, Line 51 reads, "...training device in disclosed, which includes..." which should read, "...training device disclosed, which includes..."

Column 3, Line 62 reads, "...health monitoring system is disclosed wherein..." which should read, "...health monitoring system wherein..."

Column 3, Line 2 reads, "...system provides mixed-initiative..." which should read, "...system that provides mixed-initiative..."

Column 8, Line 60 reads, "...will operate on a computers..." which should read, "...will operate on computers..."

Column 9, Line 62 reads, "...bomb threat aFnd life threat..." which should read, "...bomb threat and life threat."

Column 11, Line 52 reads, "...is on still on the scene..." which should read, "...is still on the scene..."

Column 11, Line 62 reads, "...value is set 318..." which should read, "...value is set 3018..."

Column 12, Line 50-51 reads, "...the determinate value the determinate value is set to B2." which should read, "...the determinate value is set to B2."

UNITED STATES PATENT AND TRADEMARK OFFICE
CERTIFICATE OF CORRECTION

| | | |
|---|---|---|
| PATENT NO. | : 7,436,937 B2 | |
| APPLICATION NO. | : 10/255905 | |
| DATED | : October 14, 2008 | |
| INVENTOR(S) | : Jeffrey J. Clawson et al. | |

It is certified that error appears in the above-identified patent and that said Letters Patent is hereby corrected as shown below:

Column 13, Line 26 reads, "If a lift threat exists..." which should read, "If a life threat exists..."

Column 14, Line 15 reads, "...inquires 3061 are made..." which should read, "...inquiries 3061 are made..."

Column 14, Line 22 reads, "...the present the emergency, the phone number called from, the caller's name, incident information..." which should read, "...the present location of the vehicle, if known. An inquiry 3062 is next made to learn whether the..."

Column 14, Line 23 reads, "...caller is save and out..." which should read, "...caller is safe and out..."

Column 14, Line 39 reads, "...the determine value is set..." which should read, "...the determinate value is set..."

Column 14, Line 40 reads, "...the incident occured..." which should read, "...the incident occurred..."

Column 14, Line 44 reads, "...the incident occured..." which should read, "...the incident occurred..."

Column 14, Line 53 reads, "...calculated determine value..." which should read, "...calculated determinate value..."

Column 14, Line 54 reads, "...questions must be asked n animal..." which should read, "...questions must be asked in animal..."

Column 14, Line 63 reads, "In can also..." which should read, "It can also..."

Column 14, Line 65 reads, "A sexual assault is an dispatch call with a determinate value of D1 is generally more critical requiring a more..." which should read, "A sexual assault is an assault or attempted assault of a sexual nature. It can vary from unwanted touching of..."

UNITED STATES PATENT AND TRADEMARK OFFICE
CERTIFICATE OF CORRECTION

PATENT NO. : 7,436,937 B2
APPLICATION NO. : 10/255905
DATED : October 14, 2008
INVENTOR(S) : Jeffrey J. Clawson et al.

It is certified that error appears in the above-identified patent and that said Letters Patent is hereby corrected as shown below:

Column 16, Line 18 reads, "...acts include repossession..." which should read, "...acts including repossession..."

Column 16, Line 25 reads, "...owner's consent. While damage..." which should read, "...owner's consent, while damage..."

Column 18, Line 41 reads, "If the suspect is on still on the..." which should read, "If the suspect is still on the..."

Column 19, Line 35 reads, "...is on still on the scene..." which should read, "...is still on the scene..."

Column 20, Line 9 reads, "...is on still on the scene..." which should read, "...is still on the scene..."

Column 20, Line 18 reads, "...value is set 31 52..." which should read, "...the value is set 3152..."

Column 20, Line 31 reads, "...a person finding of a dead body." which should read, "...a person finding a dead body."

Column 20, Line 49 reads, "...is on still on the scene..." which should read, "...is still on the scene..."

Column 21, Line 26 reads, "...is on still on the scene..." which should read, "...is still on the scene..."

Column 21, Line 65 reads, "...attacks on 'one' elf-esteem and character." which should read, "...attacks on one's self-esteem and character."

Column 22, Line 16 reads, "...is on still on the scene..." which should read, "...is still on the scene..."

Column 22, Line 48 reads, "...and emotional dependence..." which should read, "...emotional dependence..."

UNITED STATES PATENT AND TRADEMARK OFFICE
CERTIFICATE OF CORRECTION

PATENT NO. : 7,436,937 B2
APPLICATION NO. : 10/255905
DATED : October 14, 2008
INVENTOR(S) : Jeffrey J. Clawson et al.

It is certified that error appears in the above-identified patent and that said Letters Patent is hereby corrected as shown below:

Column 23, Line 6 reads, "...is on still on the scene..." which should read, "...is still on the scene..."

Column 23, Line 45 reads, "...is on still on the scene..." which should read, "...is still on the scene..."

Column 24, Line 35 reads, "...is on still on the scene..." which should read, "...is still on the scene..."

Column 25, Line 15 reads, "...is on still on the scene..." which should read, "...is still on the scene..."

Column 26, Line 1 reads, "...is on still on the scene..." which should read, "...is still on the scene..."

Column 26, Line 50 reads, "...is on still on the scene..." which should read, "...is still on the scene..."

Column 27, Line 29 reads, "...is on still on the scene..." which should read, "...is still on the scene..."

Column 27, Line 57 reads, "Whether a 1 st person..." which should read, "Whether a 1st person..."

Column 28, Line 11 reads, "...is on still on the scene..." which should read, "...is still on the scene..."

Signed and Sealed this

Second Day of June, 2009

JOHN DOLL
*Acting Director of the United States Patent and Trademark Office*